United States Patent [19]

P'an et al.

[11] Patent Number: 4,836,026

[45] Date of Patent: Jun. 6, 1989

[54] ULTRASONIC IMAGING SYSTEM

[75] Inventors: Charles T. P'an, Mystic; Dean E. Christie, Ledyard; Robert H. Grills, New London, all of Conn.

[73] Assignee: Science Applications International Corporation, LaJolla, Calif.

[21] Appl. No.: 616,351

[22] Filed: Jun. 1, 1984

[51] Int. Cl.$^4$ ............................................. G01N 29/00
[52] U.S. Cl. ..................................... 73/620; 73/606; 73/609; 73/618
[58] Field of Search ................. 73/606, 607, 609, 618, 73/620

[56] References Cited

U.S. PATENT DOCUMENTS

| | | | |
|---|---|---|---|
| 4,106,346 | 8/1978 | Matzerk | 73/620 |
| 4,226,122 | 10/1980 | Land et al. | 73/609 |
| 4,325,256 | 4/1982 | Horn | 73/607 |
| 4,333,346 | 6/1982 | Renzel | 73/606 |
| 4,359,904 | 11/1982 | Engle et al. | 73/620 |
| 4,381,787 | 5/1983 | Hottinger | 73/620 |
| 4,417,475 | 11/1983 | Okazaki | 73/606 |
| 4,596,145 | 6/1986 | Smith et al. | 73/607 |

FOREIGN PATENT DOCUMENTS 2036322  6/1980  United Kingdom .................. 73/606

Primary Examiner—Howard A. Birmiel
Attorney, Agent, or Firm—Fitch, Even, Tabin & Flannery

[57] ABSTRACT

An ultrasonic imaging system which is used to provide contact imaging of a component. A transducer is scanned across a workpiece to collect image data from a scan area comprising a plurality of pixels. Means for resiliently carrying the transducer with two separate degrees of freedom maintain a tight acoustic coupling between the workpiece surface and the transducer. The image data relating to each position in the scanned area describe the amplitude of a reflection and its depth from a reference. Means are provided for easily varying the size of the image area while the number of pixels remains constant. The system provides a real-time visual display of the scanned area while the transducer is moving over the area in contrast as either a grey scale or a color scale for each pixel. An automatic calibration mode for the sytem is provided as another feature to remove acoustic delay, caused by transducer coupling, from the image data. As an option to the calibration mode, the system provides for the translation of the scan area into a true proportional size for a radial mounting geometry of the workpiece.

11 Claims, No Drawings

ULTRASONIC IMAGING SYSTEM

The invention pertains generally to an ultrasonic imaging system and is more particularly directed to such systems which are used in nondestructive testing of components having internal surfaces without access, or of components for which defects can be determined only by access to an external surface.

Nondestructive testing (NDT) relates to that science which can be used to gain information about the integrity of structures by noninvasive techniques. These systems are used in maintenance programs to test parts of an overall system without having to physically disassemble the tested component from its surroundings. NDT is useful in examining welds of metal conduits used in pipelines, power plants, ship building, aircraft and the like, both immediately after construction and as a part of an ongoing maintenance program. Internal tanks for aircraft and submarines are also places where nondestructive testing assists in reducing maintenance costs. The ability to describe the internal structure of a component by means of this noninvasive technique will lend itself to many other uses in the future.

Many in the past have used x-rays or other penetrating rays to produce images of welds and the like. The hazards to personnel which are produced by the powerful radiation sources needed to penetrate significant depths in most metals and other materials make these systems expensive. Because of the danger posed by the emitting material, extensive safety precautions are taken, such as elaborate protective gear worn by the testing personnel. Further, the test areas must be cleared of other workers and cumbersome shielding provided in relatively confined working areas. These conditions lead not only to considerable expense to the equipment needed to accomplish the test, but also for the delay of other work which must stop around the testing area. Additional costs are incurred for the regulations and records which are required for all personnel in and around the testing area. This record keeping is burdensome and, although unrelated to the condition of the components under test, must still be constantly updated, monitored, and audited.

The nondestructive testing art has now developed ultrasonic testing apparatus which overcome many of the objections to conventional x-ray testing. These systems use an ultrasonic transducer to generate a pulse of ultrasonic energy to perform a test. As the energy propagates through a test component, discontinuities in the part including walls and defects reflect various amounts of the ultrasonic energy depending upon their shape, size, orientation and location. The imaging system detects these reflections or "echoes" and can, by calculating the elapsed time from the test pulse and the amplitude of the reflection, reconstruct the internal structure for the tested component. In general, the elapsed time from the generation of an ultrasonic energy pulse to the detection of a reflection determines the distance from a reference where a defect or discontinuity is located. The amplitude of the reflection of such energy is related to the shape, orientation, and physical size of the discontinuity.

These systems are inherently safer than x-ray systems as the acoustic energy is not harmful and thus requires no shielding, special equipment, or record keeping to protect the test personnel. Therefore, work proximate to the testing areas does not have to be delayed while the NDT tests are being made. This saves considerable time in the construction of structures where the integrity of previously assembled components must be insured before further construction proceeds. Further, for maintenance programs considerable time is saved because the structure need not be disassembled and other maintenance around the test area can continue undisturbed.

Much of the ultrasonic testing apparatus today is hand-held, where single locations of a test component are pulsed with energy and the reflections read from an oscilloscope display (A-Scan) by sweeping the reflected signals with a time base. The discontinuities of a structure are then displayed as the larger amplitude echoes displaced in time from the original pulse. By dividing the distance (time) between an echo and the original pulse by the velocity constant (speed of sound) in the tested material, a rough estimate of the depth of a defect can be determined. Data about a particular component for later interpretation, if recorded at all, is taken by hand location by location. Thus, an accurate and easily interpreted reconstruction of the entire internal structure of a component is difficult.

Others in the art have used pseudo three-dimensional displays (C-Scan) to display an area of a component under test. A scanner is automated to take a number of readings at fixed points of an area and data are recorded and later displayed on a video monitor. The data are represented as either black or white (on-off) elements on the display, depending upon whether the reflection detected was before or after a threshold. Generally, these systems have their transducers coupled through a bath to the tested component and are not portable.

Newer ultrasonic imaging systems record imaging information as a function of two parameters related to each test point. The first parameter is a depth indication showing the distance from the frontal surface to a discontinuity and the second parameter is an amplitude indication related to the size, orientation, and physical structure of the discontinuity. By assembling data from a large number of these points, an image of the internal structure of a component can be generated. The recorded data may be displayed after it has been stored such as on magnetic tape, in a memory, etc. Modern displays or ultrasonic imaging data are on strip chart reorders, visual monitors, such as cathode ray tubes, or on-off displays. The images are generated by playing back a large amount of the stored data as representative parameters of the components.

However, this lack of being able to analyze the data at the test site, because of the delay in displaying the information as a range of depths, often causes mistakes and uncertainty in the interpretation of an image. Personnel at a test site will scan a chosen area on a component and not know until the information is later displayed whether the area is of interest. They usually have only a one dimensional display for a single point in the form of an oscilloscope display (A-Scan) for a real-time display. However, this type of display is difficult to interpret broadly and extrapolate to the area under consideration.

This causes problems in at least two areas, as, initially, it is not known whether the area should have been studied at all, and, secondly, it is not known whether certain portions of the area should have been studied more closely. If there are no defects recorded when the information is displayed, then the time spent scanning a large area surrounding a test site has been wasted. However, if a small area is tested and defects appear when the data is displayed, then additional tests must be done over a larger area to determine the extent of the problem found. Further, retesting of the defects may have to be accomplished at a higher resolution. Upon rescanning, it is difficult to obtain the same calibration over the same area because of resolution differences, area differences, etc. A mismatch in calibration can cause interpretational variances between a first scan and those following such that successive scans of an area may be inconclusive. Further, it is difficult to correlate different images into an overall picture if taken at different resolutions and calibrations.

What is necessary is a real-time display of the information in an easily interpreted form. This would allow testing personnel on site to determine those areas which must be recorded for further visual interpretation or safety assurance recordation. A large area could be scanned rapidly at low resolutions and areas of interest marked for closer inspection at higher resolutions, thereby saving significant amounts of inspection time. Real-time display of an area would also allow the correct indication sizing and resolution of the area scanned to produce data at the same levels and calibration as other scans. When a test person has finally decided that a real-time image is a correct qualitative picture of what the internal structure of a component actually is, then a permanent recording can be made. The amount of data that are finally transformed into a permanent record would be drastically reduced but be of considerably better quality.

The necessity for an easily interpreted display is paramount. The actual electrical signals detected from the reflected ultrasonic energy with a particular amplitude and a particular delay, if shown without further processing, are relatively incomprehensible to test personnel. These are the A-Scan signals and are generally used only in mutual calibrations or the most cursory of inspections. Individually, data points mean little and it is only when a large number of data points are integrated into an image representative of the internal structure of the component that they are relatively useful.

One of the best ways to provide comprehensibility to an integrated display of data is to provide contrast levels between test points or pixels with different physical characteristics. These contrast levels, which can be either a gray scale or a color scale, are interpreted easily as differences in physical features. When a physical feature (depth, amplitude) of a defect in a component changes and the gray level or color level of a particular scan element varies correspondingly, a person interpreting the data can correlate all such changes over a large display by integrating the same contrast level by eye into a visual image of a physical feature (defect).

Another problem experienced with ultrasonic imaging is the coupling of ultrasonic energy to the test piece. Because air is a poor coupling medium, conventional systems has used a liquid bath of either oil, water, or similar liquids to couple the energy. The bath or liquid column is interposed between the ultrasonic transducer and the tested component to couple the energy in an efficient manner. This type of apparatus unduly encumbers the scanning portion of the system and increases the setup and testing time because of the complex structure needed for moving the transducer through the bath. Further, a bath-type scanning apparatus cannot be operated with facility in confined areas where compactness is at a premium, and the apparatus is not portable.

Direct contact systems are more efficient but exhibit problems in maintaining the transducer in a tightly coupled relationship with the component surface. This is particularly a problem when the surface is uneven and the scanning transducer may be tilted at an angle or actually bumped off the tested component by a surface imperfection during the scan. When a decoupling of the transducer from the component surface in a contact ultrasonic imaging apparatus occurs, the data taken during the lapse in coupling are not usable and must be discarded. However, there is no easy method of deciding which data of a scan is incorrect because of a decoupling. Therefore, a contact scanner apparatus must be provided with a means for maintaining a tight coupling of the transducer to an uneven surface so as to insure the integrity of the data.

SUMMARY OF THE INVENTION

The invention provides an improved ultrasonic imaging system which is facile in use because of an easily interpreted display and means for varying the actual size of the imaged area. The apparatus provides the display as a real-time image in which contrast is provided for the pixels forming the image as either a gray scale or a color scale.

In addition, the invention provides a user friendly interface by which test personnel can select a number of automatic operational modes for the apparatus. Importantly, one of the automatic modes which can be selected is a calibration mode where the acoustic delay of the configuration coupling the transducer to the test component is compensated for. The coupling delay in ultrasonic imaging systems is a combination of an electrical delay and a mechanical delay. The electrical delay is caused by the circuitry and cable connecting the pulse generator to the transducer. The mechanical delay is caused by the physical material between the transducer and the tested component. This delay can be due to a coupling block, an angular orientation of the transducer to the test surface, a bath coupling, or the clearance between the tested surface and the transducer. The calibration mode compensates for all such delays by a method which accurately determines the sum of all coupling delays.

Another feature which can be selected during the calibration mode permits the translation of the scan area into larger or smaller sizes and provides a true proportional size for a radial mounting geometry of the scanner. This feature is an aid in interpreting the images, as higher or lower resolution images are available upon command. The proportioning of the scan area for different geometries removes any distortion in the image caused by nonplanar surfaces on the test component.

The ultrasonic imaging system is implemented by a scanner which includes means to carry a transducer in proximity to a tested component while maintaining a constant coupling, an ultrasonic circuit which produces energy pulses for driving the transducer and which encodes reflected echoes detected by the transducer, a microprocessor based system control for controlling the operations of the ultrasonic circuit to produce image data and for controlling the display of the image data when it is received, and a video monitor for visually displaying image data.

In a scanning mode, the system control requests that the ultrasonic circuit pulse the transducer at particular intervals. The ultrasonic circuit receives an electrical signal from the transducer indicative of the detected energy reflected from the workpiece and encodes this information into a depth data word and an amplitude data word for transmission to the system control. At the same time, the system control is tracking the position of the transducer with two position encoder circuits such that the amplitude data and depth data correspond to a particular coordinate position on the surface of the tested component.

The system control contains a large random access memory, part of which is partitioned into a scan memory having an area of the amplitude data as a function of the position of the scanner and an area for depth data as a function of the position of the scanner. Incoming data words are stored in these respective locations in real time when data is received from the ultrasonic circuit producing an array or image of the scan area which builds as the area is scanned. A depth image is constructed in the first area and an amplitude image is constructed in the second area of the memory.

A real-time contrast display of the stored data is provided by the system control communicating image values from the scan memory, as they are received, to a video memory of a graphics controller. The graphics controller regulates an image display on a video monitor from pixel information stored in the video memory. Each data word which is stored in the scan memory is correspondingly transferred to a location in the video memory after a processing step by the system control. The processing step converts the absolute data value into a representation of a gray level or a color level. The translation is accomplished by the system control through a programmable lookup table which stores values for gray levels or color levels used by the video memory as a function of the data. By addressing the lookup table with the data value, the gray level or color value contained in the location addressed is the desired level of contrast. This contrast information is then transferred to the pixel location in the video memory corresponding to the element position location in the scan memory.

Therefore, as data is collected by the scanner, it is immediately displayed as a contrast image on the video monitor. The provision of a scan memory, a video memory, a lookup table, and a graphics controller permits the rapid translation of the datected data into a real-time contrast display point-by-point.

The lookup table which performs the transformation of data information into contrast levels adds flexibility to the system whereby during a setup mode, test personnel can program the table. In the illustrated embodiment, four or eight levels of contrast are provided as choices. In addition, the test personnel may choose the depth range over which the levels correspond and therefore the step size required to produce a contrast change. A choice is also provided for displaying the contrast levels as either gray levels or color levels. Another option permits the assignment of a palette of hues for the different levels. Consequently, test personnel can make an image much easier to interpret visually, by highlighting particular data or excluding other data using different levels of contrast or different colors.

Further, different representations of the imaged area can be displayed because the image is being determined in real time. If the image being formed on the display in real time is not providing the information desired or is providing hard to interpret information, the system can be placed back in the setup mode and a more optimum translation table formed. The test component can then be reimaged and the different representation observed to see if it conveys information in the form desired.

According to another feature of the invention, the position encoder circuits for the scanner are programmable to provide a variable area corresponding to the scan element array. The feature provides a method for easily varying the resolution of the system by changing the actual area which each element in the scan array represents. The position encoder circuit includes a counter which records pulses from an encoder representing fixed increments of actual scanner movement. The encoder circuit is under the control of a microprocessor which is adapted to receive commands from the central processing unit of the system control. The microprocessor can be commanded to read the count from the counter and translate that count into a position from a reference which corresponds to one of the elements of the scan array. The microprocessor accomplishes this task by calculating the number of incremental movements which are contained in an element from a grid size constant input from the central processing unit. During the creation of a header containing the calibration data for the system, this grid size constant can be programmed for the position encoder to change the actual area represented by the scan element array. The grid size constant is then used for a scan mode when the position encoders transfer the transducer position as an element location to the central processing unit.

In addition to changing the grid size constant of the position encoder circuits because of the desired scan area changes, the system provides a feature for changing this constant because of test component geometry. The scanner is mounted on a flexible track which can be located on a test component with a planar geometry or a radial geometry. The position of the scanner on this track is encoded as one of the position signals. If the movement of the scanner along the track does not equal that of the transducer scanning the surface, the image obtained will be out of proportion. This can occur when the track is mounted on a radius of the test component which is larger or smaller than the radius that the transducer traces over the tested area when the component has a radial geometry. A disproportionality can also exist if the movement of the transducer carrier does not equal the movement of the transducer over the tested area. For each of these situations, the system provides an offset for the position encoder circuit constant to take into account the proportionality between the different movements. This produces a translation of the outputs of the encoders into position data which is representative of the true proportional size for the scan area.

The system provides an automatic calibration mode as another feature. This automatic calibration is based upon a test block of a known thickness and of a known material for a velocity constant calibration. The calibration corrects for all coupling delays in combination with the velocity constant calibration. A delay calibration is provided by measuring the difference between twice the time for a first reflection and the time for a second reflection after pulsing the calibration block.

For the velocity constant calibration, the transducer pulses the test block and the resultant data for the echo is stored. A measured velocity constant is calculated as the ratio of the thickness measured to the actual thickness multiplied by a nominal velocity constant. That measured velocity constant is then used to calculate the thickness. A comparison is made between the calculated thickness value and the actual thickness of the test block value by the system. The calculated velocity constant is then increased or decreased until the actual thickness agrees with the calculated thickness within a small error value.

These and other objects, features and aspects of the invention will be readily apparent and more fully described upon reading the following detailed description in conjunction with the appended drawings wherein:

BRIEF DESCRIPTION OF THE DRAWINGS

FIGS. 1A, B, and C are representative pictorial views of the switch settings and controls for the thickness gate, the pulser, and the receiver illustrated in FIG. 1;

FIGS. 7A and 7B are a detailed electrical schematic diagram of the interface circuit for the system illustrated in FIG. 1;

FIG. 9 is an exploded assembly view of the transducer carrying means for the scanner illustrated in FIG. 8;

FIG. 10 is a cross-sectional view of the transducer mounting assembly for the carrying means illustrated in FIG. 9;

FIG. 11 is a bottom view of the transducer sled of the mounting assembly illustrated in FIG. 10;

FIG. 13A is a pictorial representation in tabular form of the data which is stored in the header of a scan record for the system illustrated in FIG. 1;

FIG. 13B is a pictorial representation of the calibration byte CALTYP which is used to determine the type of calibration the system has recorded;

FIGS. 14-1, 14-2, and 14-3 are a system flowchart for the subroutine SCAN called as option 6 from the menu illustrated in FIG. 12;

FIGS. 16-1 and 16-2 are a system flowchart for the subroutine CALSCN which is called from the subroutine CALBRT illustrated in FIG. 13;

FIGS. 18-1, 18-2, 18-3, 18-4, and 18-5 are a system flowchart for the subroutine THIKLCL which is called from the subroutine CALBRT illustrated in FIG. 13;

DETAILED DESCRIPTION OF THE PREFERRED EMBODIMENTS

Figure 1:
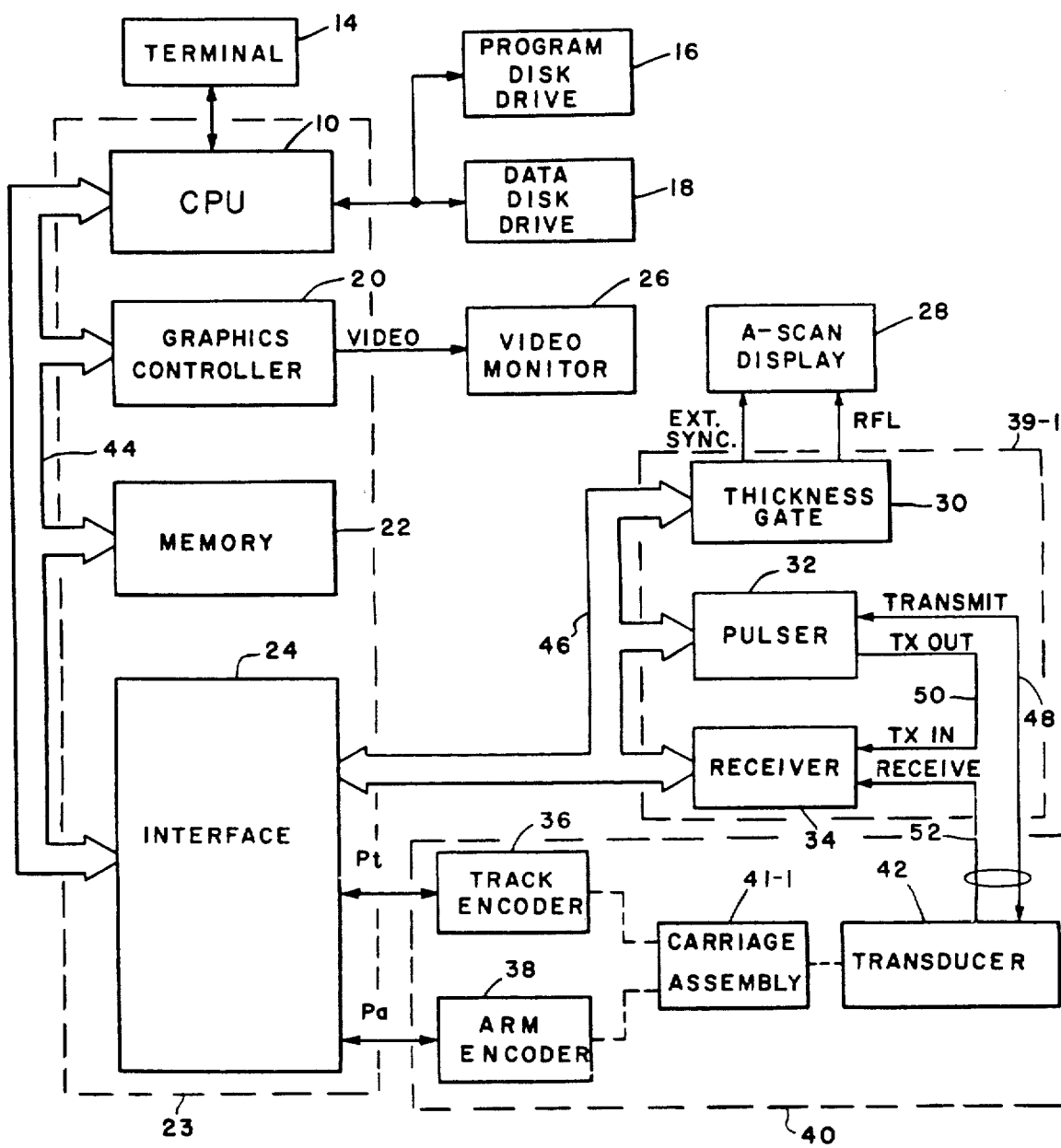
FIG. 1 is a system block diagram of an ultrasonic imaging apparatus constructed in accordance with the invention.

In FIG. 1 there is illustrated a system block diagram for an ultrasonic imaging apparatus which is constructed in accordance with the invention. The imaging apparatus is a microprocessor-controlled imaging system with a central processing unit (CPU) 10 having an on-board disk controller. The disk controller communicates with and controls a dual disk drive which includes a program disk drive 16 and a data disk drive 18. The suitable disk drive for implementing drives 16, 18 is a standard 5¼" floppy disk drive made by the Micropolis Corporation of California.

A program disk can be loaded into the drive 16 and the software contained herein is used to control the system by executing a system program with the CPU 10. A data disk can be loaded into the drive 18 and is used to store image data from the system or to provide stored image data to the system for display. The central processing unit communicates with an operator terminal 14 via one of its serial data ports. The terminal 14 allows an operator to communicate commands to the CPU 10 for execution and to receive error messages from the system. The CPU 10 accesses and has provision for a large random access memory 22 which includes a 100×200 array of locations for depth data and a 100×200 array of locations for amplitude data. These areas will hereinafter be referred to as the scan memory. The memory 22 is additionally used for other data storage and arrays by the system software.

The central processing unit 10 also controls a graphics controller 20 which generates a video output to a video monitor 26. A video output is produced from a video memory which has data stored therein by the CPU 10 under control of the graphics controller 20.

The graphics controller 20 has the ability to control either a monochromatic monitor or a color monitor with a video signal. Preferably, in the implementation that will be described, a color monitor 26 is used and the video signal has separate red, gree, and blue color signals for coupling to the separate color guns of the video monitor 26. The video monitor 26 is used to display prompts from the system software, real time color images of data during a scan process, and analysis images from stored data.

The central processing unit 10 communicates with peripheral devices including a scanner 40 and an ultrasonic circuit 39-1 through an interface circuit 24.

The central processing unit 10, the graphics controller 20, the memory 22, and the interface circuit 24, form a system control 23. All have communications paths between other elements of the system control 23 via a multibus 44 such as that defined by the Intel Corp. of Santa Clara, Calif. The multibus 44 provides a data path, an address path and a control signal path between the separate functions. The ultrasonic circuit 39-1 under control of the CPU 10 is adapted to pulse a transducer 42 and convert the echoes therefrom into digital data words representative of the depth and amplitude of a reading. The scanner 40 is under operator control and can be moved to position the transducer 42 at a desired location on a test component.

The ultrasonic circuit 39-1 includes a pulser 32, a receiver 34, and a gate 30. The circuit 39 converts analog ultrasonic signals into digital signals rapidly for accurate data recording and passes them to the central processing unit 10 via an ultrasonic bus 46. The pulser 32 provides a pulse voltage with a variable pulse width at a predetermined rate to the transducer 42 which converts the electrical pulses into acoustical energy. The receiver 34 detects reflected acoustical pulse energy from a test component and converts the energy into an electrical signal for processing by the gate 30. The gate 30 sets a window or area within the component under inspection from which reflected acoustical energy will be accepted and recorded. It also provides a threshold which the acoustic energy must exceed before it is recorded.

The gate 30 further produces an external sync signal EXT SYNC and an electrical signal RFL representative of the reflected acoustic energy detected by the receiver 34. The RFL signal is the analog signal which is converted to the two digital words for transfer to the system control 23. These signals, RFL and EXT SYNC, are additionally used to drive an A-Scan display 28 which is implemented on an 80 MHz oscilloscope. The display 28 is provided such that the system may be used in a manual mode similar to a hand held ultrasonic test apparatus. The A-Scan is a display of the amplitude of the reflected signal RFL on a time axis referenced to the EXT SYNC signal which is generally the pulser output or some set delay thereafter.

The pulser 32 and receiver 34 can be connected either in a pitch/catch or pulse/echo mode of operation. In the pulse/echo mode of operation, the pulser transmits an electrical pulse via the cable 48 and receives a reflected echo with the same transducer and cable. The reflected electrical energy is passed to the receiver 34 by transmit out (TXOUT) and transmit in (TXIN) terminals in the receiver 34. A cable 50 connects the pulser 32 to the receiver 34 such that the reflected energy can be processed by the receiver, sent to the thickness gate and thereafter sent onto the central processing unit 10.

In the pitch/catch mode, the reflected ultrasonic energy is converted by a second transducer which transmits on cable 52 to the receiver. In either of these modes the control is the same wherein the central processing unit commands the ultrasonic circuitry to produce a pulse and then receives the data in digital form via the ultrasonic bus 46 and the interface circuit 24 which is representative of the measured parameters. For every pulse a digital 12-bit word describing the depth of the reflection and a digital 8-bit word describing the amplitude of the reflection is received by the CPU 10.

The mechanical scanner apparatus 40 supplies position data to the CPU 10 via the interface board 24 and a pair of encoders 36 and 38. The scanner 40 includes a carriage assembly 41-1 that positions the transducer 42 along a track axis and an arm axis to produce a coordinate position (x, y) for the transducer related to its position on the scan area. A track encoder 36 is used to determine the track position $P_t$ and an arm encoder 38 is used to determine the arm position $P_a$. The encoders 36, 38 transfer their position data via a set of square waves in quadrature which can be decoded by the interface board 24 and transformed into digital position data to be later used by the CPU 10.

In FIGS. 1A, 1B, and 1C there is illustrated the switch settings and controls for the thickness gate 30, the pulser 32 and the receiver 34. In FIG. 1A, the thickness gate 30 has three thumbwheel switches 35, 37, and 39 from which the operator can adjust the gate delay, the gate width and the scope trigger delay, respectively. The gate delay thumbwheel switch 35 adjusts the time interval between the firing of the main pulser energy and the leading edge of the gate in the thickness measurement. The gate width thumbwheel 37 controls the width of the gate, providing a time interval in which to detect the reflected pulse under consideration from the test component. The scope trigger delay 39 varies the start of the sweep signal EXT SYNC for the number of microseconds dialed in the thumbwheels after the trigger pulse.

The thickness gate 30, as shown in FIG. 1A, has an initial pulse/gate switch 41 which, depending upon its position, triggers the A-Scan sweep on the main pulse or the beginning of the gate pulse. A range and resolution switch 43 is also provided to select the maximum depth of inspection for the system. The range is equivalent to the sound travel in metals from thicknesses of 0.5 to 50 inches. Setting the range in this manner determines the viewing resolution and the dimension covered by the ultrasonic energy within the material per bit of information storage. Therefore the setting of the resolution simultaneously sets the range (maximum thickness) that can be inspected in a part.

Viewing FIG. 1B it is seen that the pulser 32 has a number of controls which vary the parameters of the pulse transmitted to the transducer. First is a damping control 45 which can be used to adjust a damping resistance in parallel with the pulse output. This provides a step adjustment to the output pulse width. Also, a pulse amplitude control 47 can be used to adjust the output pulse amplitude. In addition to the damping control 45, the pulser 32 includes a low-high pulse width switch 49. In the high position the pulse width (and the pulse energy) is approximately triple that obtained in the low position. This switch 49 is used in conjunction with the damping control 45 to provide a wide range of output pulse widths.

The controls for the receiver 34 are better seen in FIG. 1C. The receiver controls include a function switch 51 which selects either the pulse/echo mode or the pitch/catch mode. A push button 53 is used to select either RF or demodulated video for transmission to the thickness gate 30. Additionally, a filter switch 55 is used to select the lower 3 dB frequency of the receiver band pass. Frequency ranges of 1-4 MHz, 2-8 MHz, and 4-6 MHz and broad band (BB) are available. Finally, seven pushbutton switches 57 are used for attenuation of the receiver input. These seven pushbutton switches allow attenuation of the input signal in one dB steps to 62 dB total. An ultrasonic circuit 39 similar to that described is available from the Metrotele Corp. of Richland, Wash.

Figure 2:
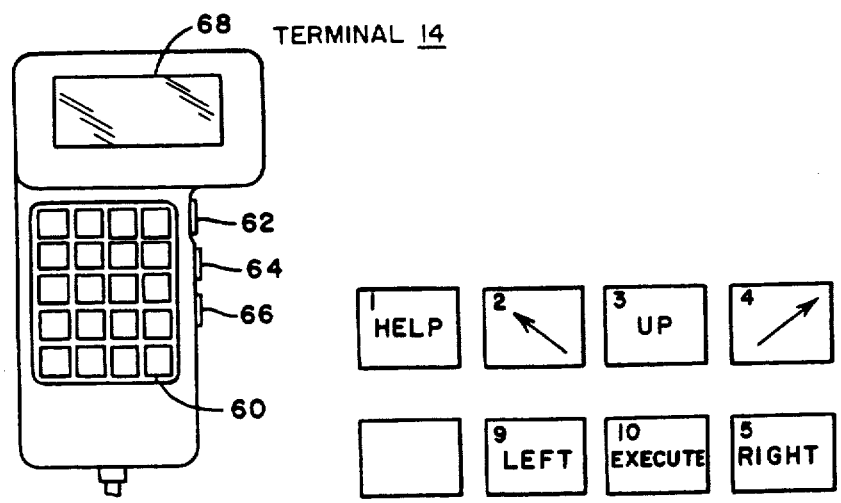
FIG. 2 is a pictorial representation of the front face of the terminal of the system illustrated in FIG. 1.

The terminal unit 14, more fully illustrated in FIG. 2, is a hand held unit which is a miniature terminal enabling bidirectional serial communications with the ultrasonic imaging apparatus via a serial data port of the CPU 10. Input data is generated by 20 alphanumeric keys on a keypad 60 and three shift keys 62, 64 and 66 located on the side of the terminal unit. The shift keys are used to select an upper case character set which is input from the keypad 60. Generally, shift key 62 picks the left character of the upper case of a key, shift key 64 picks the middle character, and shift key 66 picks the right character. Normally, the system operates from the lower case font and produces ASCII coded characters therefrom.

Figure 3:
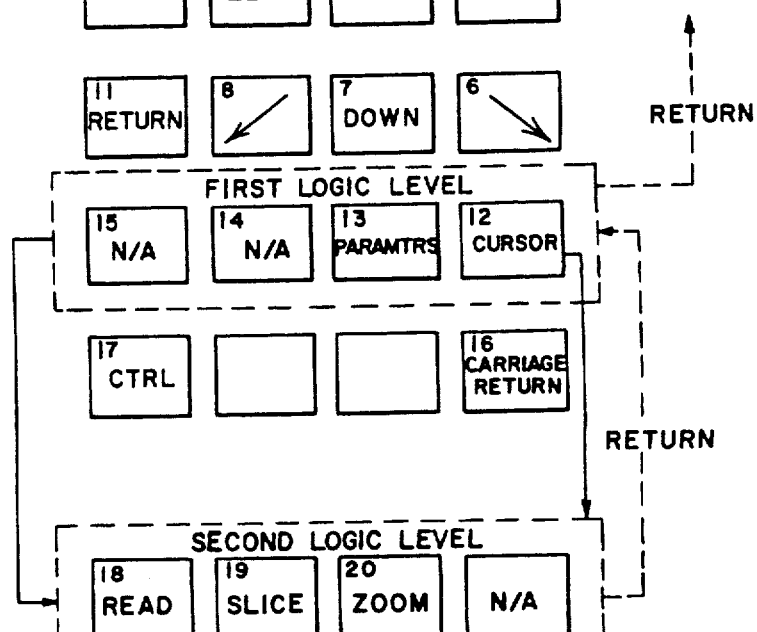
FIG. 3 is a pictorial representation of the commands which can be given to the ultrasonic imaging system in a display mode by the terminal illustrated in FIG. 2.
Figure 3:
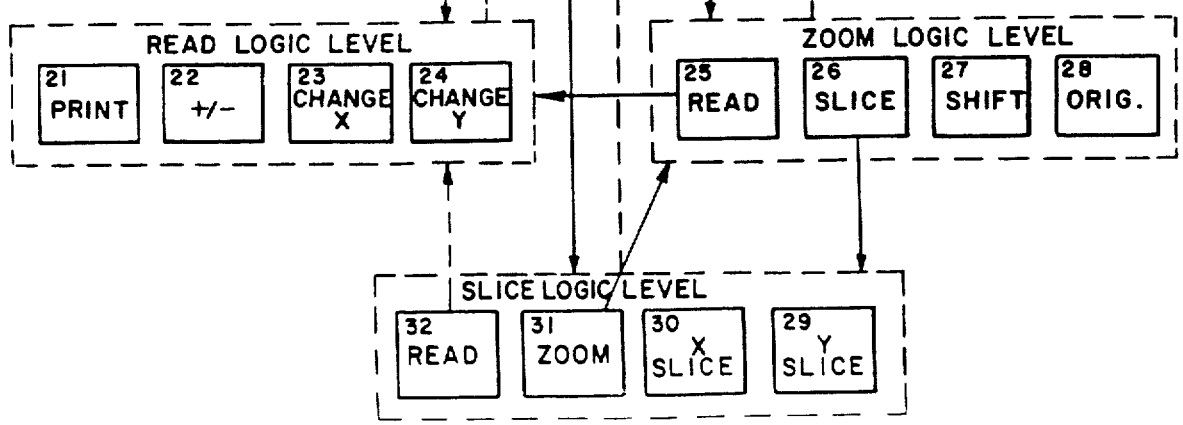

In FIG. 3 the keys 60 of terminal 14 have been translated into special commands for the system in a display mode. A shift to first and second logic levels produces specialized commands in that mode which can be used to expand the display (ZOOM), provide a (B-Scan) two-dimensional display (SLICE), and to move a cursor. On the second logic level, a read logic level, a zoom logic level, and a slice logic level are available. An LED display 68 may be used to display diagnostic messages from the CPU 10 via the serial data port. A terminal which includes the functions illustrated in FIGS. 2 and 3 is a model HT/10 commercially available from the Termiflex Corporation of Nashua, NH.

Figure 4:
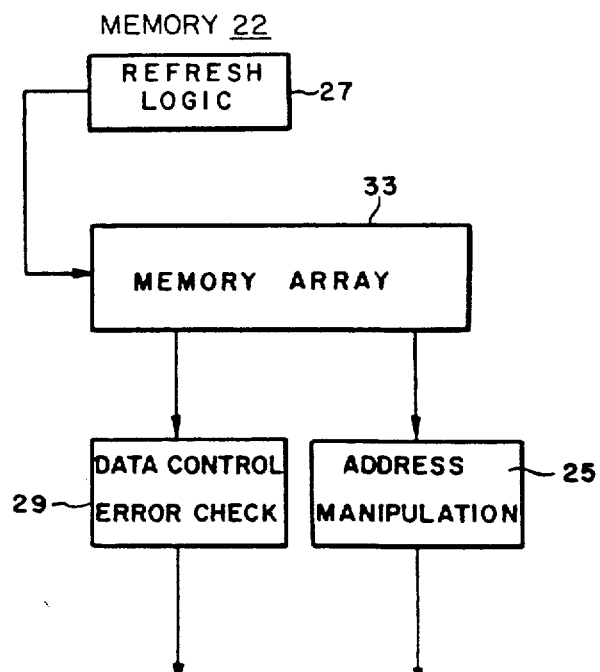
FIG. 4 is a detailed block diagram of the memory of the system illustrated in FIG. 1.
Figure 4:
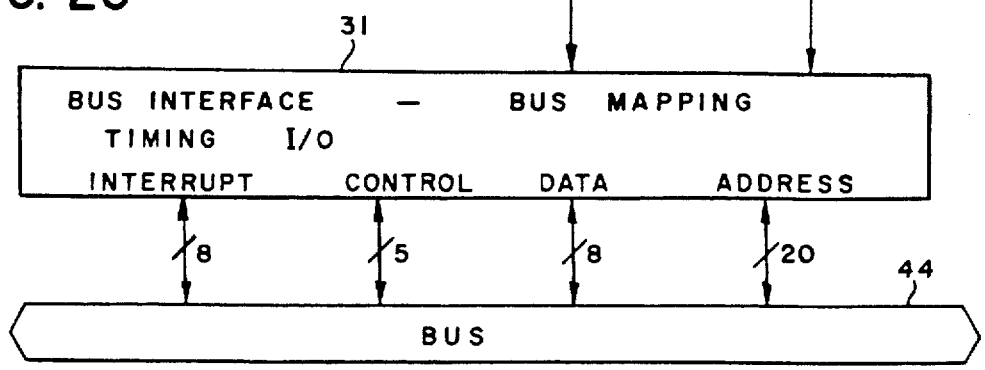

The memory 22, as more fully detailed in FIG. 4, is preferably a random access semiconductor memory using 64k dynamic RAMS with parity error detection. The memory 22 contains a memory array 33, address manipulation circuitry 25, refresh logic 27, data control, timing control, and error detection circuitry 29, and an interface 31 for system I/O. The particular memory used provides 512k bytes of storage and is connected to the multibus 44 by the address lines illustrated. The memory described is a single board memory, which connects directly to a multibus, having a model number PSM512P manufactured by the Plessey Micro Systems Corporation of Hungerford Drive, Rockville, Md., and more thoroughly described in the technical publication "PSM512P Multibus Parity DRAM User Guide", the disclosure of which is hereby incorporated by reference.

Figure 5:
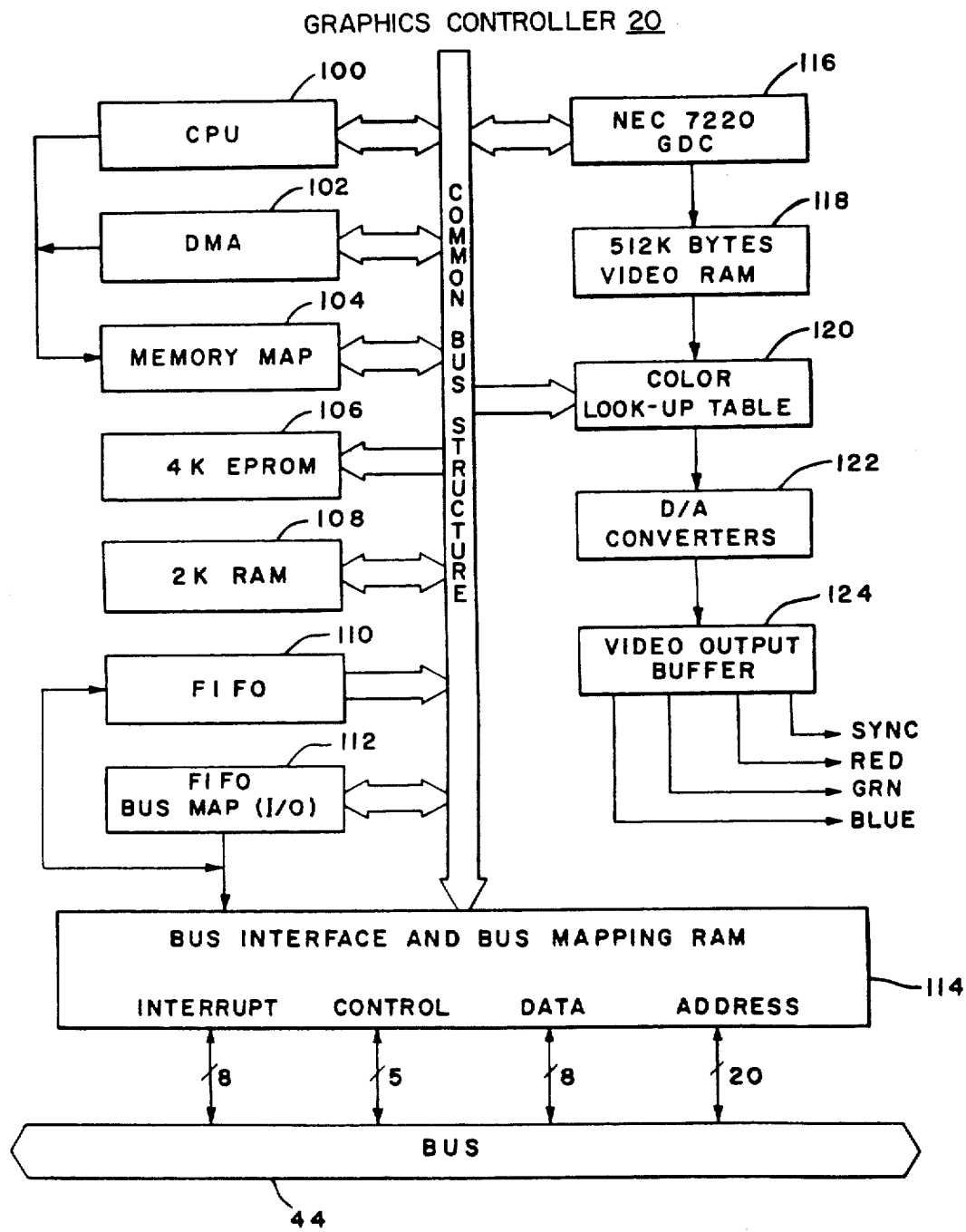
FIG. 5 is a detailed block diagram of the graphics controller of the system illustrated in FIG. 1.

The graphics controller 20 is more fully detailed by the block diagram in FIG. 5. The graphics controller 20 is a master/slave multibus-compatible intelligent video controller which receives the data to be displayed on the video monitor 26 through a multibus interface 114. The controller 20 under control of the CPU 10, through commands transferred over the multibus 44, develops and generates the video signal to the monitor 26 from a video outputbuffer 124 as a sync signal and red, green and blue color signals which can be used to drive the separate color guns of the video monitor 26.

The graphics controller 20 is a device having a central processing unit 100 and a 4k EPROM 106 for graphic programming. In this manner the controller 20 may operate under the program control of the CPU 100 while the CPU 10 of the ultrasonic imaging apparatus is busy with other tasks. A 2k RAM 108 is provided for temporary storage and calculations while running the central program for the device from the EPROM 106. Additionally, a direct memory access device 102 can be used to request data from any of the onboard memory which is connected to the multibus 44. The direct memory access device 102 can bring data into the graphics controller without interrupting the program cycle of the central processing unit 100. A first-in first-out memory buffer 110 offers fast multibus access for the device and is used to buffer commands and data from the central processing unit 10.

The video portion of the graphics controller 20 includes a video display controller 116 embodied as an NEC uPD7220 graphics display controller. In addition to executing the tasks of scanning and refreshing a video memory 118 of 512k bytes, the graphics display controller 116 also has a sophisticated instruction set for hardware figure and character drawing capability. The graphics display controller is under control of the central processing unit 100 via the common bus.

The video memory is configured as four 640×1638 bit planes giving four bits per pixel of information. However, in the present configuration only 640×481 pixels are viewable at any one time. Video memory is addressed as 256k of 16 bit words of continuous memory organized as four blocks of 64k words per plane. A color lookup table 120 translates the four bits/pixel of information from the video memory into 12 bits/pixel, 4 bits for each of the three color guns (red, green and blue) of the video monitor. This means that 16 colors from a palette of 4,096 colors can be displayed at any one time. Colors then may be changed by either writing different values into video memory or by changing the values in the color lookup table 120. Output from the color lookup table 120 is changed from a digital from to an analog form by D/A converters 122 before being buffered onto the output lines by video output buffers 124.

A graphics controller 20 suitable for such purposes and containing the above-referenced functions is an MLZ/VDC color graphic controller made by the HEURIKON Corporation of 3201 Latham Drive, Madison, Wisc. This graphics controller is more fully described in the "Heurikon Video Display Controller User Manual", the disclosure of which is hereby incorporated by reference.

Figure 6:
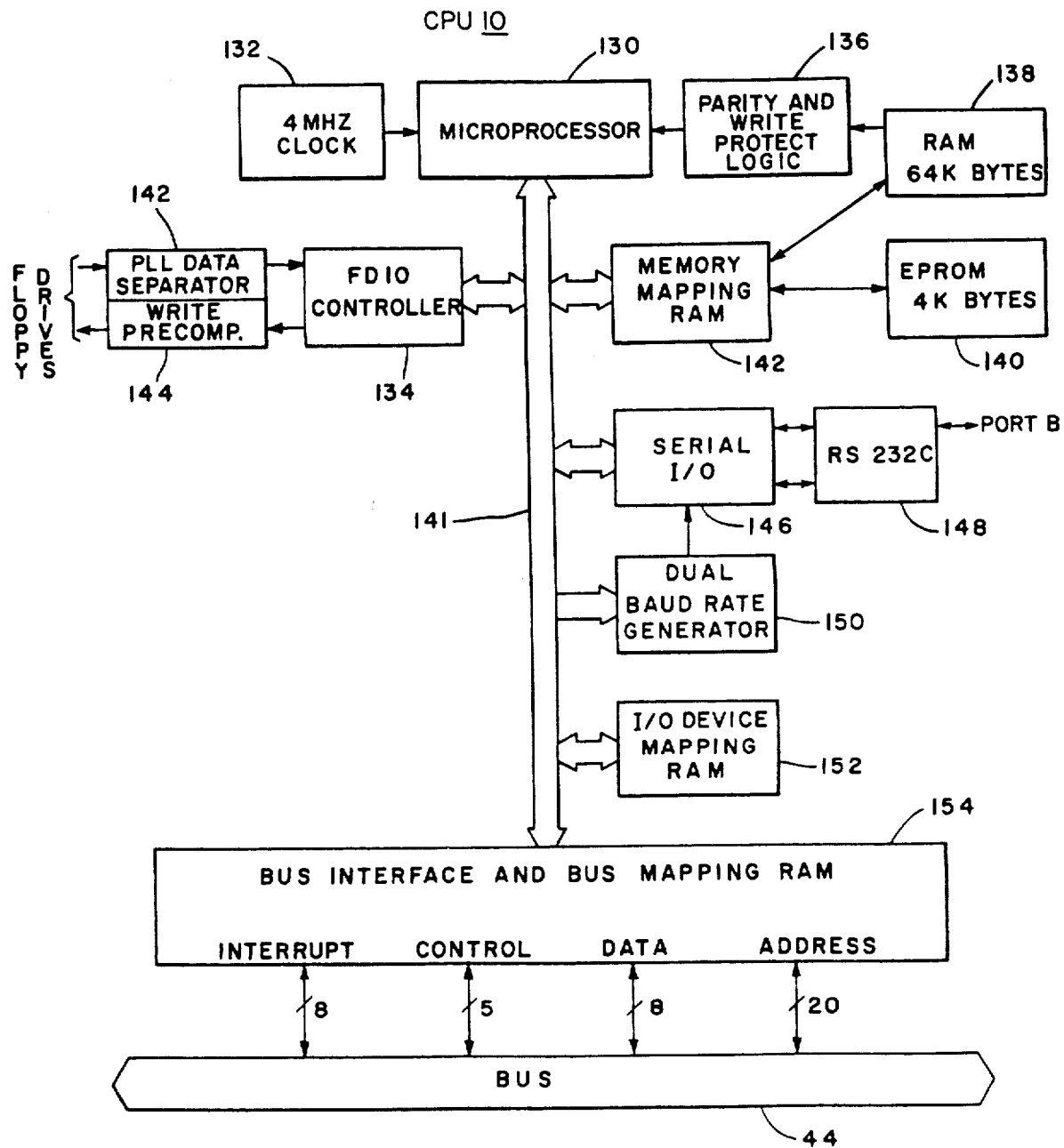
FIG. 6 is a detailed block diagram of the Central Processing Unit of the system illustrated in FIG. 1.

The CPU 10 is more fully detailed in the block diagram shown in FIG. 6. The CPU 10 of the system is implemented as a single board microcomputer which includes a microprocessor 130 which is synchronized by the timing of a 4 MHz clock 132. The microprocessor accesses 64 k bytes of RAM 138 and 4k bytes of EPROM 140 via a common bus 141 and a memory mapping RAM 142. Parity and write protect logic 135 assures valid data and prevents overwriting in certain protected areas of the RAM 138. The microprocessor 130 controls a serial I/O controller 146 with a dual baud rate generator 150 and thereby controls the input and output of serial data through an RS 232 serial port 148. The serial port B is coupled to the terminal 14 for the operator interface described above. Also included for data control and transfer to the two disc drives 16, and 18 is a double density floppy disc interface (FDIO) 134 which uses data separation logic 142 and write precomposition logic 144 for reading and writing, respectively.

The microprocessor 130 communicates to the other elements of the ultrasonic imaging apparatus through a master/slave bidirecional bus interface 154. The bus interface 154 also includes a bus mapping RAM which provides priority and interrupt capability for the single board computer. The bus interface 154 allows the internal bus 141 to interface directly with the multibus 44. The bus interface 154 controls 8 bits of data, a 20 bit address space, 8 interrupt lines, and 5 control lines for input/output and memory access.

The single board computer is preferably a model MLZ-91A microcomputer which is commercially available from the Heurikon Corporation of the address listed above. The single board computer is more fully described in the "MLZ-91A User Manual" published by the manufacturer which disclosure is incorporated by reference herein.

The CPU 10 is equipped with a monitor program which is stored in the EPROM 140 to provide a boot for an operating system from one of the disk drives. In the present embodiment a common disk operating system such as CP/M available from the Digital Research Corporation is loaded from the program disk drive 16 into the RAM 138. The operating system CP/M is then used to interface with the other elements of the system software and loads a system software program from the program disk drive 16 which runs the CPU 10 as an ultrasonic imaging apparatus. The ultrasonic imaging program is a menu driven program which allows the user to enter commands and communicate with the system via the video monitor 26 and the terminal 14. By means of program prompts on the video monitor and the menu choices, the operator controls various modes in the system as will be more fully described hereinafter.

Figure 7B:
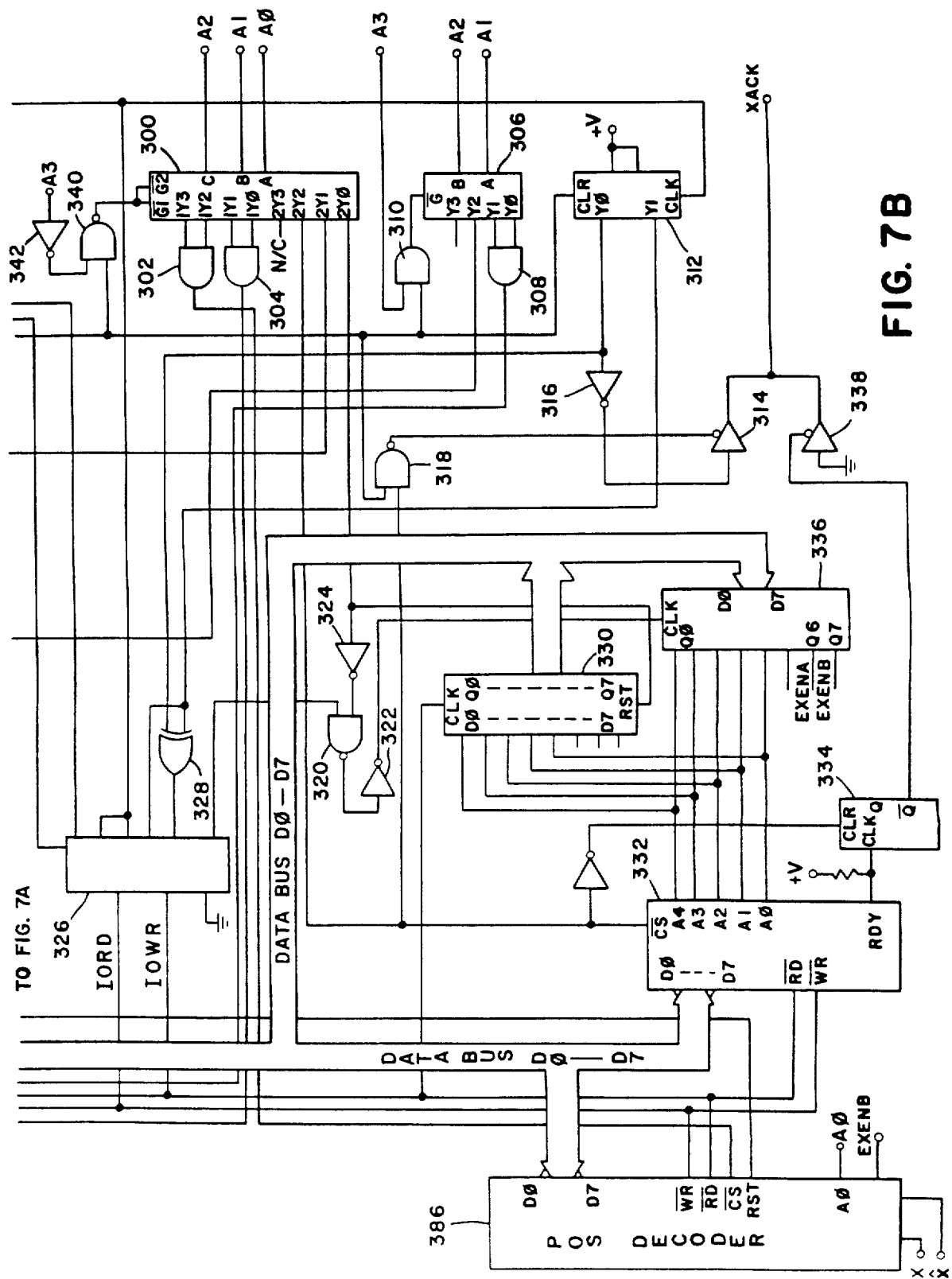

The interface circuit 24 will now be more fully explained with respect to FIGS. 7A and 7B. The interface circuit has provisions for connecting to the multibus 44 through address lines ADR0-ADR7, data lines DAT-0-DAT7, and various control lines. The control lines used for the interface 24 include a memory read signal MRDC, a memory write signal MWTC, a reset signal INIT, an input/output write signal IOWC, an input-/output read signal IORC, and a bus clock signal BCLK. Further, the interface circuit 24 generates signals to the multibus 44 as an interrupt signal INT1 and a bus acknowledge signal XACK. From these inputs the interface circuit 24 develops control and data signals for interfacing with the scanner encoders 36, 38, the ultrasonic bus 46, and a real time clock chip 332.

Each of the input signals, except the MRDC and MWTC signals, are buffered by bus buffers 346 before being input to various decoding circuits. Memory signals MRDC and MWTC are buffered by a NAND gate 358. The interface circuit 24 is enabled by decoding address lines ADR4-ADR7 in a decoder 344 which matches the logic levels on those address lines (inputs A0-A3) with a set of logic levels jumpered to its opposite inputs (B0-B3). In the implementation shown the interface circuit address is hexadecimal 40 to 4F. A successful comparison generates a signal to AND gate 345 and inverter 347 to provide an interface enable signal. The AND gate 345 further has an enabling signal which is either the input/output read or write signals, IOWC, IORC via AND gate 343.

The interface enable signal from the inverter 347 provides the enablement for devices 300, 306 and 312. The device 300 is a decoder which decodes the address lines ADR0-ADR2 into outputs 1Y0-1Y3, 2Y0-2Y3 when address line ADR3 is in a low state. The enabling signal for the decoder device 300 is the output of NAND 340 which combines the address line signal ADR3 with the interface enable signal from the output of inverter 347.

In a similar manner, NAND gate 310 combines the address line ADR3 and the interface circuit enable signal into an enabling signal for another decoder device 306. The address line ADR3 is not inverted for this decoder and, therefore, the states of the address line are used to select between the two sets of functions. The decoder 306 decodes the address lines ADR1, ADR2 into outputs 1Y0-1Y3. The address inputs which decode into the interface circuit function selections of the decoders 300, 306 are more fully set forth in the table of FIG. 7D where the selection address is in two digits of hexadecimal representation. The interface enable signal also is provided to the CLR input of a shift register 312 which provides a generation of two internal clock signals from the bus clock signal BCLK received at its CLK input.

The control of the ultrasonics bus 46 now will be more throroughly described with reference to devices 362 and 364. Device 364 is a programmable peripheral interface (PPI) device which has three bidirectional channels of 8 bits each. The first channel A is labeled PA0-PA7, the second channel B is labeled PB0-PB7, and the third channel C is labeled PC0-PC7. The PPI device 364 latches bytes of data from the data bus lines D0-D7 onto one of the corresponding channels depending upon the bit combination input to its address selection inputs A, B. Further, the PPI device 364 can input data from any of the three channels in byte format and transfer that data to the data bus according to the address selection provided by address lines A0-A1. The device 364 determines whether data bytes are to be written onto the channels or onto the data bus depending upon whether a read operation or a write operation is selected via its inputs labeled WR and RD. For a low-level signal on the WR input, a byte from the data bus is latched and written onto the selected channel. For a low-level signal value on the RD input, a byte is latched from the selected channel and written onto the data bus. The device 364 also includes a reset input RST which allows the device to be cleared and set to an input mode and a chip select input *CS which enables and disables the operation of the device. The ultasonic bus interface also includes a buffer 362, which through its data inputs D0-D7, can transfer data from the ultrasonic circuit to the ultrasonic bus 46 when enabled by inputs labeled *G1, *G2. A flip-flop 325 provides a *RST signal for resetting the device 362.

The channels A, B, C of the PPI device 364 provide three functions. Channel A, through a buffer 366, provides commands for determining a function to be executed by the ultasonic circuit 39. Channel B is used as a write port for receiving data from the CPU 10 and channel C is used as a read port for data which is to be sent to the CPU. Further, status words from lines S0-S4 can be input on the data bus to the CPU 10 via devices 362 and 364.

Therefore, to write data to the address port of the ultrasonic circuit 39, the CPU 10 writes a selection command to port address 48 of the interface circuit 24. The operation enables the output of AND gate 308 to select the PPI device 364 and channel A. Along with the command on the address bus, the processor will generate the command IOWC which through buffer device 326 enables the WR input of the device 364. The IOWC signal further enables a monostable device 348 and the D flip flop 352 to acknowledge data via buffer 356 with the bus acknowledging signal XACK. Data on the data but D0-D7 is then channeled to the device 366 for input to the ultrasonic circuit. The PPI device 364 enables similarly by the output of gate 308 during access to hexadecimal address 49 which causes data on the bus to be written into channel B for input to the write port of the ultrasonic circuit 39-1.

Data can be read from the utrasonic circuit 39-1 through the PPI device 364 by enabling the device 364 with a read port access which is hexadecimal address 4A and applying an input/output read signal IORC to the bus. The read signal via the buffered device 326 enables the read operation of the device 364 and applies data from channel C to the data bus. A mode control signal (hexadecimal 4B) transmitted from the output of the gate 308 enables the device 364 to be able to receive mode data to set up the device for a particular operation in combination with the signal IOWR.

For testing a status input from the ultrasonic circuit 39-1, the central processing unit 10 generates an IORC signal which enables the *G2 input of the buffer 362. The *G2 input is enabled, via the device 326, in the same manner as previously described for the PPI device 364. The status input request is then generated through the address bus as either hexadecimal 4C or 4D which enables the Y2 output of the multiplexer 306 and thereby the *G1 input of the buffer 362. When both the *G1 and *G2 inputs of the buffer 362 are enabled, the data on status line S0-S3 are applied to the data bus by the device.

The second set of devices that the interface circuit controls are two position encoder circuits 384, 386 which receive the quadrature signals X, X̂, Y, Ŷ from the scanner encoders 36, 38 and digitize those signals into data which can be input to the central processing unit 10. The hexadecimal address for reading the data from the X position encoder 386 is 44, for reading data from the Y position encoder 384 is 46, for reading the X status is 45, and for reading the Y status is 47. The addresses 44 and 45 select the X position encoder circuit 386 by a low output signal from the AND gate 304 and the position encoder circuit determines whether data, status, or command information is to be written onto or read from the data bus by the logic level of the address line A0. The process is completed by performing an input or output cycle via the signals IOWC and IORC which enables the inputs WR and RD, respectively, of the position encoder circuit 386 via the circuit 326. The position encoder circuit 386 will apply the data that is requested on the data bus for transfer to the central processing unit 10 or read data from the bus. In a similar manner, the Y position encoder circuit 384 is addressed for data, command, or status by the IOWC or IORC signals and the hexadecimal addresses 46 or 47.

The last device that is interfaced with the multibus 44 by means of the interface circuit 24 is the real-time clock chip 332. The clock chip 332 can be commanded to perform different operational modes to set a time and date in the chip and then can be commanded when needed by the system software to output the date and time from that initial point. Mode control for the clock chip 332 is entered through the address inputs A0-A4 of the device from the outputs Q0-Q5 of a latch 336. The mode commands for the latch 336 are input to that device from the CPU 10 by applying the commands to the data bus D0-D7. The chip 330 outputs data from the interface data bus to the multibus 44 when the CPU 10 outputs address 40 and an IORC command enables the output of the function decoder 300. The latch 336 outputs data from the interface data bus to the clock chip 332 upon a hexadecimal address 40 and an IOWC enabling signal to AND gate 320 from device 326. Additionally, the higher order outputs Q6-Q7 of the latch 336 can be used to change the polarity of the inputs from the encoders 36, 38 for the position encoder circuits 384, 386.

When the mode of the clock chip 332 has been determined, data for the clock chip can either be written into the chip for setting the clock or read from the chip for determining the real time by the software. The CPU 10 accesses the device through the hexadecimal address 42 which enables the input CS via the 2Y3 output of the function decoder 300. During a write cycle, which is started by the signal IOWC and the selection of the chip, data is written into the clock chip 332 through the data input bus and the device inputs D0-D7. Further, when the chip 332 is selected, the signal from output 2Y2 of the decoder 300 clears a D flip-flop 334 which is then set from the RDY output of the device when a byte of data has been accepted. The *Q output of the flip-flop 334 enables the bus acknowledge signal XACK via a tri-state buffer 338. Thus, the chip may accept a number of bytes of data by indicating when it is ready to further process data.

On the opposite cycle, the data can be read from the clock chip in a similar manner by addressing the chip with an IORC signal which, assuming that latch 336 has the proper mode word loaded, will cause the device 332 to output data onto the data bus. In a manner similar to the writing mode multiple bytes can be read from the chip via the IORC signal and the bus acknowledge signal XACK indicating that another byte is ready.

Figures 7C, 7D:
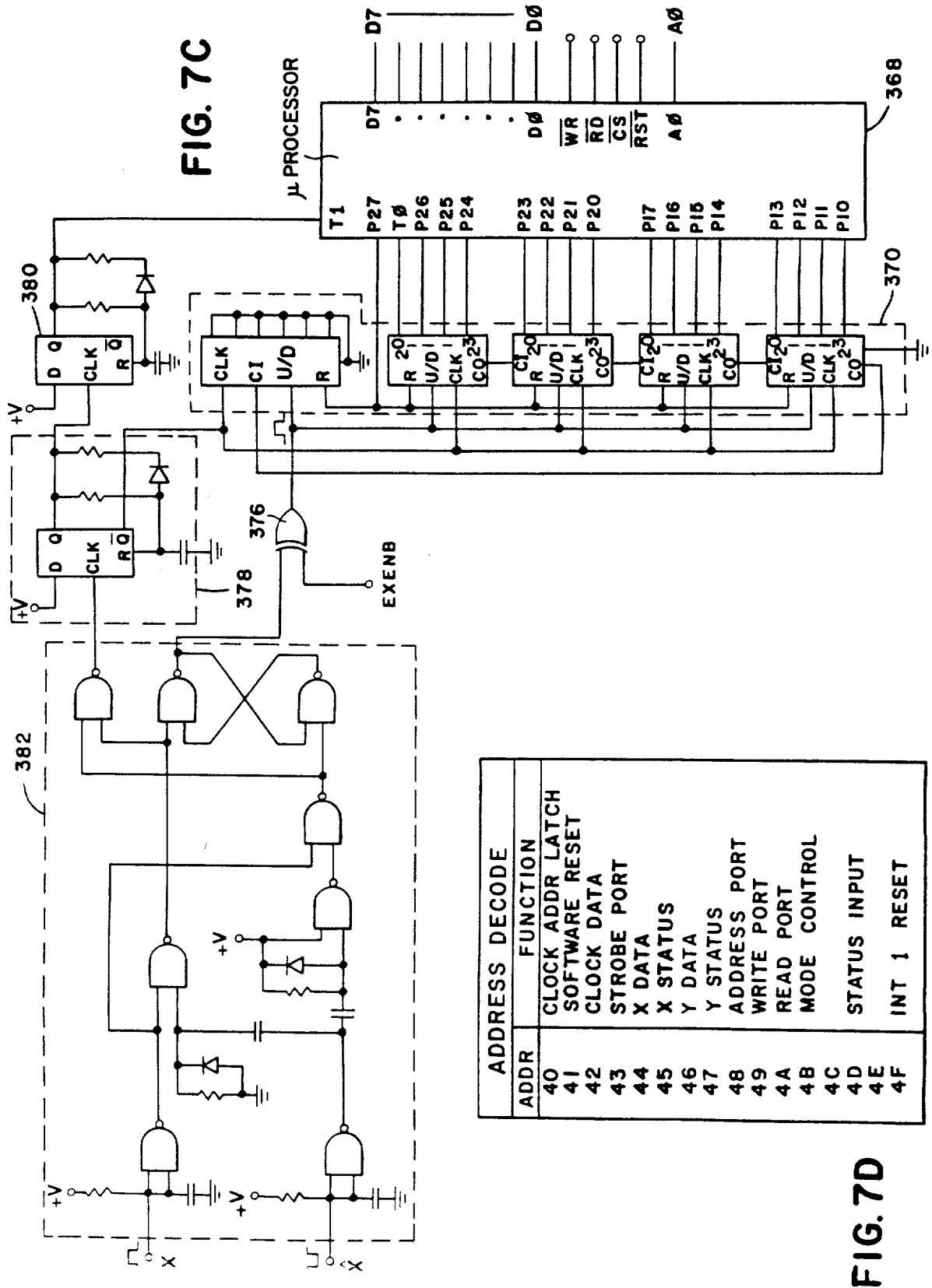
FIG. 7C is a detailed electrical schematic diagram of a position decoder circuit implementing the x and y position decoder circuits of the interface circuit illustrated in FIG. 7.
FIG. 7D is a pictorial representation in tabular form of the address selection sequence for the interface circuit illustrated in FIG. 7.

The detailed circuitry comprising a position encoder circuit, for example, the one shown at 386 for the X coordinate, is better illustrated in FIG. 7C. The circuitry shown in the figure is identical for either the X position encoder circuit 386 or the Y position encoder circuit 384 such that either may be addressed and operated by the interface circuit as previously described. The encoder circuit 386 comprises coincident detecting circuit 382 which determines when the quadrature output, X, X of the encoder 36 is in the correct phase. When the encoder output is correctly phased, an output pulse from the circuit 382 indicates a motion of a certain physical distance along the X axis. These output pulses are fed through an exclusive OR gate 376 to the U/D inputs of an up/down counter 370. The up/down counter 370 records the number of pulses detected as it is clocked by an output from a monostable 378 and thereby contains the distance moved in increments of those pulses from a reference value. The design provides for direction indicating to the U/D inputs of the counter 370 to retain directional polarity along the axis. The sense or direction of the pulses coming from the encoder can be changed by the logic level EXENB which the sofware sets via latch 336 (FIG. 7B). From the clock signal input to the CLK input of a monostable device 380, a pulse is developed to the T1 input of a microprocessor 368. This monostable device 380 provides a pulse which acts as a status signal to indicate to the microprocessor 368 when the counter is being updated.

The outputs of the counter are read by the microprocessor 368 through I/O ports comprising pins P10–P17 and P20–P26. The most significant bit of the counter chips 370 is applied to the T0 input of the microprocessor 368 to indicate an overflow condition. One of the I/O ports of the microprocessor represented by output P27 is used to reset the counters to zero and provide a reference position which is determined by the software.

The microprocessor 368 is run by a control program which is under the command of the CPU 10 of the imaging system. The commands are input in byte form through the data bus D0–D7 when a memory write cycle is generated and the particular decoder circuit is addressed. The output of the decoder chip indicates the position of the scanner along the particular axis selected with respect to a set reference position. The position and status of the encoder may be read in byte form onto the data bus during a memory read cycle by the CPU 10.

The input to the position encoder circuit 386 is a scale factor which informs the program of microprocessor 368 of how many counts of the encoder are contained in a scan element side. Additionally, a command to start a calculation cycle for determining the X, Y coordinate position of the transducer on the scan area can be input. The device 386 provides a status output indicating whether it has finished its calculations, along with two digital bytes indicative of the position calculated. In addition, the position encoder circuit 386 is able to provide a calculation for calibrating the scale factor. A subroutine for the program of microprocessor 368 counts the number of pulses which are received when the scanner is moved a known distance. The routine then calculates a scale factor which is output from the position encoder circuit 386 to change the scale factor for the system.

Figure 8:
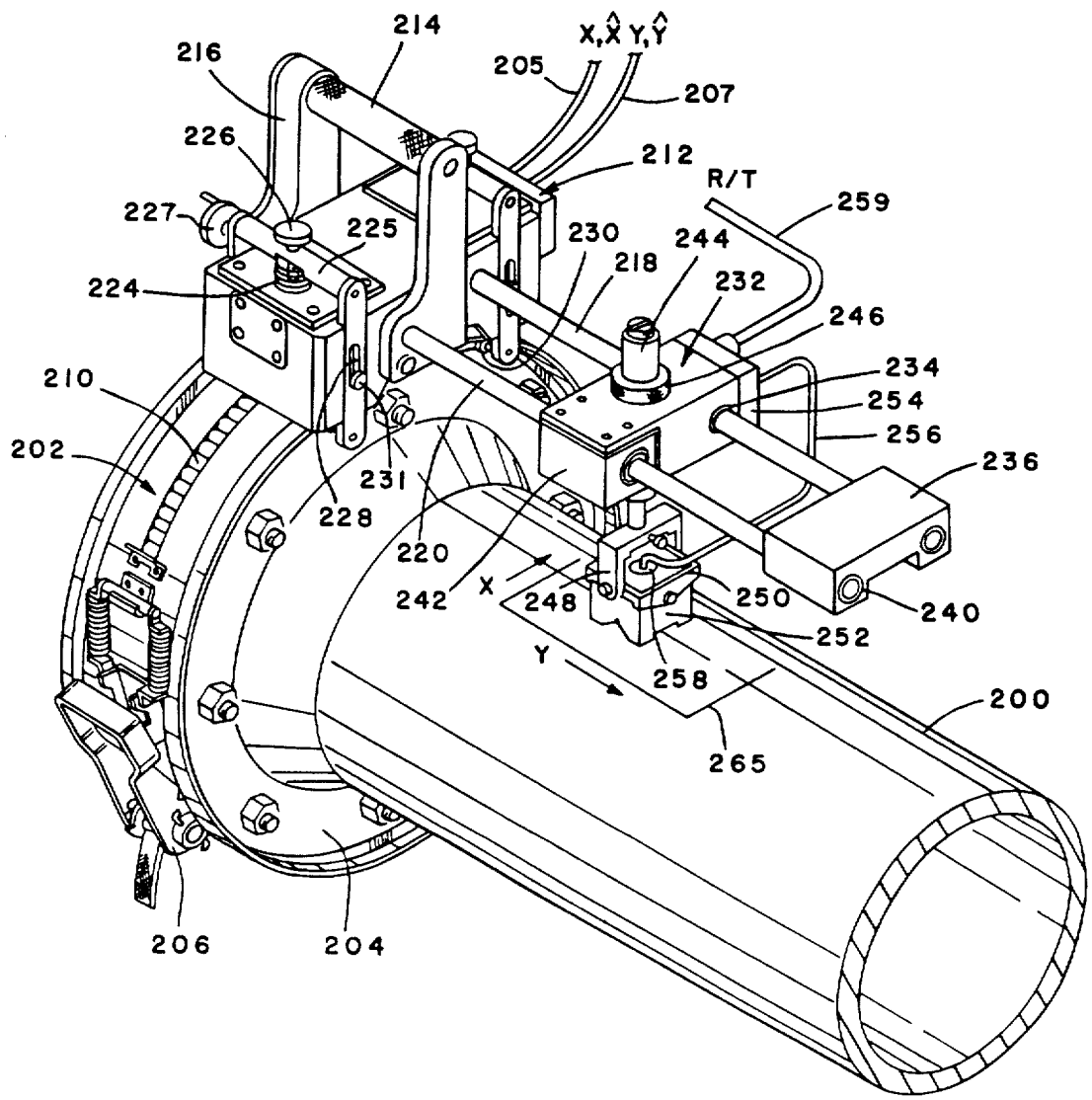
FIG. 8 is an isometric view of the scanner of the system illustrated in FIG. 1 as mounted on a test component of radial geometry.

With respect now to FIG. 8 there is shown the detailed disclosure of the scanner for the ultrasonic imaging apparatus. The scanner 40 is illustrated as mounted on the flang 204 of a pipe 200 by means of a flexible track 202 which supports a scanner carriage 212. The carriage 212 can move around the flange periphery by its attachment to the flexible track 202. The flexible track 202 is securely mounted on the flange by wrapping the track around the flat surface of the coupling and securing the belt end of the track in a ratchet mechanism 206. The track 202 can be used to mount the scanner on a radial surface such as that shown, on a flat surface, or on various other types of surfaces.

The carriage 212 maintains its position on the track 202 by means of links 228, 222 which slide on pins 231 and have rollers 230 which fit under the lip of the flexible track 202. The rollers 230 are tensioned against the track 202 by means of a biased support bar 225 which crosses the carriage 212 and connects the links on opposite sides of the carriage 212. The bias is supplied by a spring 224 and is adjustable by a set screw 226.

A gear internal to the carriage 212 rotates the encoder 16 for the track 202 to provide a position signal indicative of the carriage postion along the axis labeled X in the drawing. The gear is turned by mating it with a flexible chain 210 attached to the track 202. When the carriage moves along the flexible track on the flange 204, a quadrature signal X, X̂ indicative of its incremental movement is output via the terminal lead 205. The quadrature signal is by its frequency (number of pulses) indicative of the actual distance moved and by its phase indicative of the direction.

Motion in the Y direction, as seen in FIG. 8, is provided by a moveable carrier means 232 which is supported on two arms 218 and 220. Arm 218 is stationary and connects the carriage 212 with a stationary bar block 236. The carrier 232 slides on the stationary arm 218 by means of a bushing 234 which journals the arm. The carrier means 232 is moved along the stationary arm 218 by a rotating arm 220. The rotating arm 220 is journaled in a bearing 240 in the bar block 236 and is inserted through a threadless lead screw 242 mounted on the carrier means 232. By rotating the drive bar 220, the threadless lead screw 242 moves the carrier means 232 at any position along the stationary arm 218.

The drive arm 220 is connected internally by a gear which drives an encoder device 38 indicating the incremental movement of the carrier means 232 on the drive arm 220. The output from this encoder is read by the ultrasonic imaging apparatus via the terminal lead 207 as a quadrature signal Y, Ŷ. The gear (not shown) which turns the drive bar 220 is rotated through the chain linkage of a gear body 216 by a handle 214. The handle 214 has a gear linked to the cain in the gear box 216 and provides a convenient method for producing a fine positioning along the support arm by the carrier means 232.

The carrier means 232 mounts a stem 244 which carries an acoustic transducer 258. The stem 244 is vertically adjustable in the carrier means 232 by means of a threaded clamp 246. The stem 244 further mounts a pair of gimbals 248 and 250 in opposition such that two degrees of movement are allowed for a sled 252 which receives the transducer 258. A transducer feed cable 256 provides a conduit for signals going to or from the transducer 258 and terminates at a connection block 254. A coupler picks up the signals from the connection block 254 and via another coupler and a transmission cable 259 carries these signals to the ultrasonic circuit 39. The connection block 254 is used to provide strain relief to the transducer feed cable 256 so that no force is applied to the transducer 258 when the scanner is moved.

In operation the transducer 258 may be scanned over a generally rectangular test area 265 to any position X, Y by turning the handle 214 and moving the carriage 212 along the track 202. The position of the transducer 258 is always available to the imaging apparatus from the signals on the encoder signal lines 205 and 207. The transducer 258 may be pulsed in a pulse/echo mode via the transmission cable 259 (a single transducer) or can be used in a pitch/catch mode with dual transducers by using a second cable for the return signal.

As will be more fully explained hereinafter, any point on the surface area of the part to be tested can be used as reference or zero. Larger or smaller areas can be encoded for the scanner apparatus by simply lengthening the arms 218 and 220. In the X direction the scanner has almost a 360° carriage and thus large areas of the piping 200 can be scanned at one time. The area 265 which is scanned can be extremely large or extremely small depending upon the area assigned for each point or scan element. In accordance with one of the objects of the invention, the element area may be changed dramatically to provide large area scanning to find an area of defects and then small area scanning to more readily identify the actual configuration and severity of those defects, with the reference or zero point located in the area of interest.

Further, the scanner apparatus illustrated in FIG. 8 provides the advantage of contact imaging without a liquid bath or complicated ultrasonic energy coupling apparatus. Generally, the test area 265 is cleaned and a viscous coupling fluid is applied to this surface. The transducer is then lowered by stem 244 into contact with the surfaces and slides along the test area in a tight acoustic coupling with the component. The stem 244, as will be more fully explained hereinafter, is spring loaded and mounts the transducer sled 252 on a set of gimbals to provide two degrees of freedom for sled movement. This produces the effect of having the sled easily transported over uneven surfaces while maintaining firm contact and tight acoustic coupling to the imaged component. Thus, signals from the transducer 258 will not vary because of the transducer becoming decoupled or displaced with the contact area which would cause large coupling differentials to be introduced into the system.

The carrier apparatus 232 and its mounting of the stem 244 and sled 252 and more fully illustrated in FIGS. 9, 10 and 11. The stem 244 can be adjusted by loosening the threaded clamp 246 to where the stem slides freely through the clamp. When the stem 244 is positioned such that the transducer 258 makes contact with the test component under a predetermined amount of pressure, the clamp 246 may be screwed into a socket 247 in the carrier means 232 such that its bayonet prongs close around the stem and hold it in this vertical position.

A post 266 extends from the end of the stem 244 and is mounted in two linear bearings 270 and 272 which are press-fitted coaxially into a set of steps in the stem 244. The post 266 is spring loaded by means of a spring 268 compressed between the bearing 272 and a flange 269 of the post 266. The post 266 is free to slide in the bearings 270 and 272 in an upward vertical direction by compressing the spring 268 thereby producing a resilient return force on the post. The post 266 is locked into a rotationally set position by means of a screw 274 having a keyway joined to another keyway in the post 266 by a key 276. Upward pressure from the sled 252 is balanced against the spring force from spring 268.

The outboard end of post 266 is fixed in an aperture of a first gimbal 248 by means of a set screw 260. A second gimbal 250 is mounted in the first gimbal 248 by means of screws 262. The second gimbal 250 mounts the generally square transducer sled 252 with mounting screws 261. The sled 252 is free to swing on the mounting screws 260 and further is free to swing in gimbal 248.

The assembly for the acoustic transducer 258 is generally cylindrical and has a pair of oppositely positioned mounting pins 280. The pins 280 fit through slots 282 in the transducer sled 252 and can be twisted one-quarter turn to fall into recesses 284 to secure the transducer assembly in sled 252. A bias k for the transducer by means of a spring 278 is provided to form a resilient mounting of the transducer 258 in the sled 252. The transducer protrudes slightly from the sled and contacts the surface with a wear plate 286 which is attached to the bottom of the assembly. The wear plate 286 is backed by the actual acoustic transducer 258 which is preferably a disk-shaped piezoelectric device which converts electrical energy into acoustical energy and vice versa. The transducer 258 is coupled to the transmission cable 256 which is potted in the assembly for strain relief.

Illustrated on the bottom of the sled 252 in FIG. 11 is a rectangular in cross section channel 288 and a triangular in cross section channel 290. The channels 288 and 290 allow the viscous coupling fluid to surround the wear plate 286 without losing contact with the tested surface. The channel 288 is particularly adapted to be moved along a flat surface while the channel 290 is particularly adapted to be moved along a curved or radical surface. The channels provide for an even flow of the coupling fluid to and around the contact plate 286 such that sufficient acoustic coupling is always maintained.

The double resilient mounting of the transducer in conjunction with the freedom of movement provided by the gimbal mounting allows the transducer to step over surface imperfections on a test component and to maintain contact with the component even on curved or uneven surfaces. The mounting permits the transducer to follow the surface contour of the test component with facility along flattest trajectory available to it. A tight acoustic coupling between the transducer and the surface is thereby insured which, as a consequence, insures data integrity from the transducer.

Figure 12:
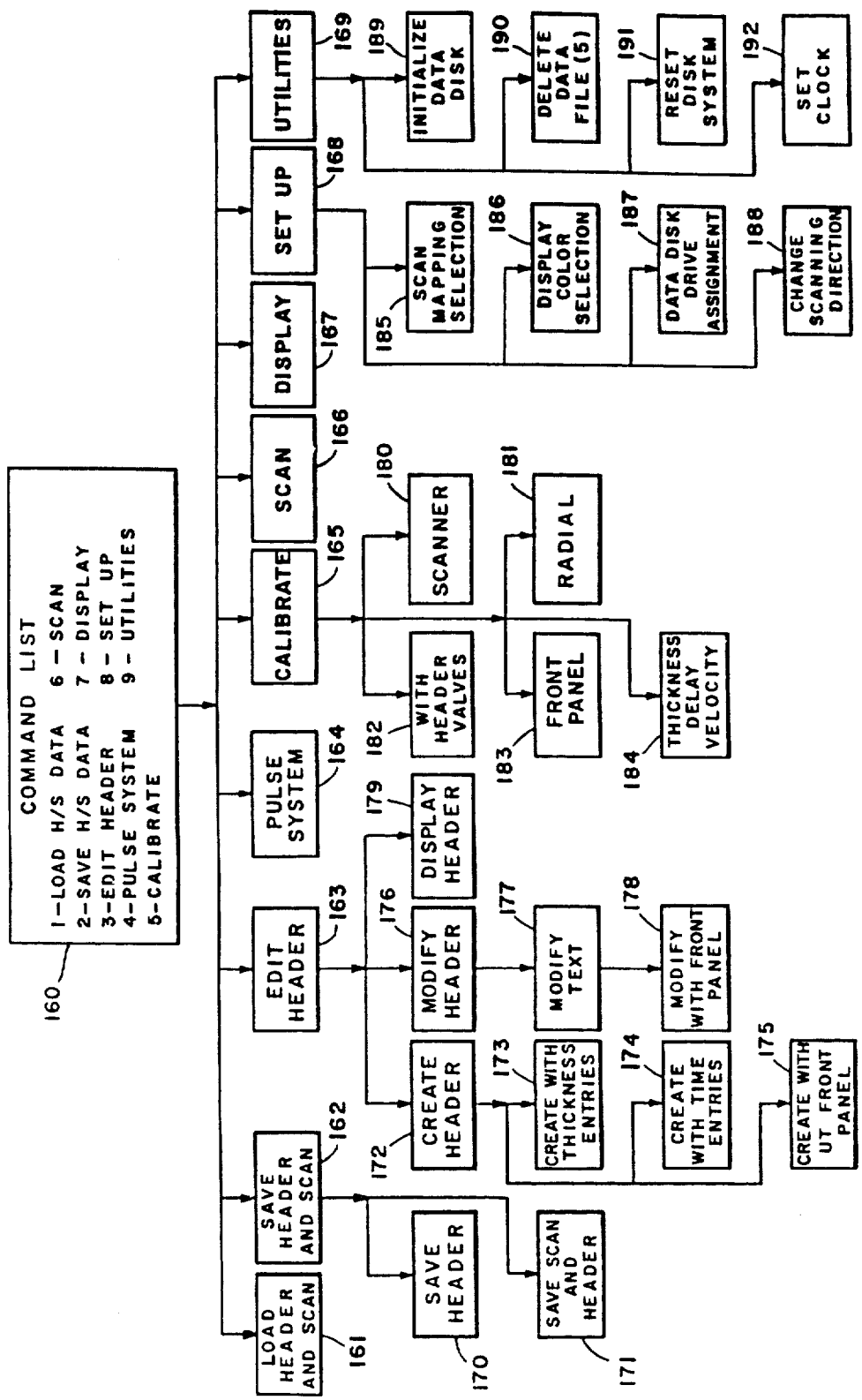
FIG. 12 is an operational flow diagram illustrating the functional modes of the system illustrated in FIG. 1 as selected from a menu program.

A functional flowchart of the system software is illustrated in FIG. 12 where a menu 160 indicates those operations or modes which are available to the testing personnel. The menu 160 is the first item that is displayed on the video monitor after loading the software from the program disk into RAM and initializing the real-time clock. There are nine modes which can be requested from the imaging apparatus including commands to load H/S data, save H/S data, edit header data, pulse the system, calibrate, scan, display, set up, and access utilities. The system block diagram which flows from the menu 160 discloses those functions which can be produced when a particular one of the nine modes illustrated is entered.

The load H/S (Header/Scan) data command (mode 1) in block 161 is used to call a subroutine that displays the header and scan data from the disk file. Therefore, choosing this command will produce a display of all the files on the data disk in a table for selection and transfer the data into the scan memory for subsequent system use. The data files from the data disk are displayed on the video monitor in the format of having a project name, a task name, a number for the scan of the file, and the date and time of the scan was completed. By selecting the record number from the table the operator can transfer that file to the scan memory.

A full record for the system includes a header having information relating the conditions under which a scan was made, and scan data. The scan data comprises a depth data word and an amplitude data word for every one of the 100×200 scan elements of the scan area. Representative header data is illustrated in FIG. 13A where four groups of data are recorded. Group A, administrative data, records information about a particular scan which is used in building a file for a particular task or project and allows an inspector to record his name and a reference number for the file. That data prefaced with an * is automatically calculated and filled in by the system.

Group B data is used to record the scanner setup parameters and defines the scanner operation. The operator enters the physical configuration for the scanner operation which is later transferred to the position encoder circuits and used in calculating actual scanner positin. As in the previous case, those items prefaced by an * are calculated automatically by the system.

Group C provides a place in the header for calibration data which records the parameters that were used during the recording of scan data. The nominal velocity constant, the material tested, the maximum and minimum inspection depth, and other data provide an aid in interpreting the information after it has been recorded.

The group D header data is for storing the ultrasonic circuit settings. This data is used to completely define the operational condition of the ultrasonic circuit during testing. These settings can be transferred to internal settings of the ultrasonic circuit or values for the actual settings can be loaded into the header from the ultrasonic circuit.

The second operational mode, save H/S data, is entered by calling block 162. This mode allows the system to record a file on the disk, and enables header data, or header and scan data, to be transferred from RAM onto the data disk for archiving. A caution message will appear on the video monitor if a scan is not completed or none has been taken when the mode 2 command is selected.

The third mode command (Edit Header) is entered in block 163 and causes the monitor to display an edit header menu which provides a selection among the three options: (1) create, (2) modify or (3) display, a header. The creation of a header in block 172 can be accomplished with thickness entries as in block 173, time entries as in block 174, or with the ultrasonic circuit switch settings as in block 175. When the option to modify the header is called in block 176, the header data can be modified by input from the terminal 14 in a text mode as in block 177 or modified by switches from the ultrasonic circuit as in block 178. Alternatively, block 179 can be entered as a selection, which causes the header to be displayed.

The command mode 4 is entered in block 164 and operates the system in the pulse mode. This mode allows the apparatus to be used in a manner similar to a hand-held ultrasonic instrument. When this mode is chosen the system will pulse at a preset rate and the result will be displayed on the A-Scan display 28 until requested to exit. By moving the scanner to a desired position and pulsing individual scan element areas the scanner can be used as a manual device in this mode.

The calibration mode in block 165 is ordered by selecting command 5 and displays a calibration menu which allows selection among five options for performing a calibration of the apparatus. The choices are a calibration with the present header values in block 182, with the ultrasonic switch settings in block 183, with a delay variable and a velocity constat in block 184, with values from the scanner in block 180, or with values for a radial geometry in block 181.

When calibrating with header values in block 182, the present header values are compared with the actual switch settings of the ultrasonic circuit 39. If the settings agree, then the calibration is accomplished automatically. If the settings do not agree with the header values, then the errors or disagreements appear on the video monitor stipulting what the settings should be. A message to correct the ultrasonic circuit settings is displayed on the video monitor along with a request to enter a carriage return when the settings have been corrected. Once the corrections have been made the calibration will again proceed automatically.

The option to calibrate from the front panel in block 183 enables an operator to enter the pulse mode and to calibrate the system by physically changing the ultrasonic circuit switch settings to obtain a desired set of calibration parameters.

A velocity constant calibration is performed in block 184 by pulsing a calibration reference block of a known thickness. When the transducer is first pulsed a counter is initiated, and when a signal within the preset region of interest exceeds the threshold level, the counted pulses are multiplied by a selected velocity constant entered in memory to provide a result in thickness units. A measured velocity constant is thereafter calculated as the ratio of the actual thickness to the measured thickness multiplied by the selected velocity constant. A calculated thickness is then formed by pulsing the block using the measured velocity constant. A comparison between the calculated thickness and the actual thickness of the reference standard is made by the system. The calculated velocity constant is increased or decreased by iteration until the difference between the measured and actual thickness values is minimized.

The scanner calibration in block 180 entails moving the scanner a known distance and entering that distance into memory. As the scanner is being moved, the encoders 36, 38 output pulses proportional to the distance traversed. The system then compares this distance with the encoder pulse count and calculates a scale factor.

In the last calibration option, in block 181, a radial offset adjustment is calculated. When the transducer carrying means is mounted on a track or arm with a curved surface, the transducer is scanning a component area with a different diameter than the encoders are indicating. The radial offset calibration must be performed to provide an adjustment to the reading so the display of the scan area is proportional.

The sixth command or scan mode in block 167 initiates with selected header items displayed for viewing. An inspector identifier is entered and the scanner is set up at the start of a scan area with the coordinates 0, 0 in the upper left hand corner. The area to be scanned is divided into 100×200 scan elements of between 0.02-0.20 inches on a side. When the scanner is displaced in either of the X or Y directions, the scan elements on the video display illuminae with contrast levels to indicate acceptable received data. If a scan rate greater than approximately six inches/seconds is reached, then the input capacity of the system has been exceeded and the scan lines do not illuminate the raster. When a complete scan has been taken, a D is input on the hand-held terminal indicating that scanning is complete. The scan data with a corresponding header can be saved on the disk file by exiting and then choosing mode 2.

In the seventh command mode or the display mode in block 167, a scan data file can be displayed on the video monitor for either depth or amplitude analysis. The amplitude plot displays the scan data in various levels of grey or color to denote amplitude variations in the return signals, thereby enabling calculation of flaw or defect sizes. The depth dislay illustrates the scan data in various levels of grey or color to denote variations in depth to a discontinuity.

A cursor is available and can be selected to appear on the display. The locatin (X, Y) and size of the cursor are variable via input from the terminal unit 14. The cursor placement function enables the operator to position the cursor at any location on the display for magnification, a percent thinning calculation of a particular flaw, or the display of the actual depth of a flaw from the front surface. The cursor size (X and Y) can be increased or decreased depending upon the size of a flaw to accurately calculate a percent thinning factor. Slice plotting along the X or Y axis is provided to illustrate a cross-sectional display indicating the overall thinning of a component from the back surface.

In block 168 the setup mode or the eighth command is illustrated. This mode provides a scan color selection, a display color selection, a data disk drive assignment function, and a scanning direction change function. The scan color selection option in block 185 allows for the selection of 4 or 8 grey or color levels with high and low viewing thesholds. The display color selection option in block 186 allows the selection of grey or color levels and the size of the step changes. The data disk drive assignment option in block 187 allows data disk drive A or B to be assigned as the data disk. The scanning direction change option in block 188 reverses the X and Y scanning axis directions.

The last of the operational modes is the utilities mode 9, entered in block 169. The choice among the utilities options allow an initilization of the data disk in block 189, a deletion of selected data files in block 190, a system reset of the disk system in block 191, and an ability to reset the real tim clock in block 192.

Figure 13:
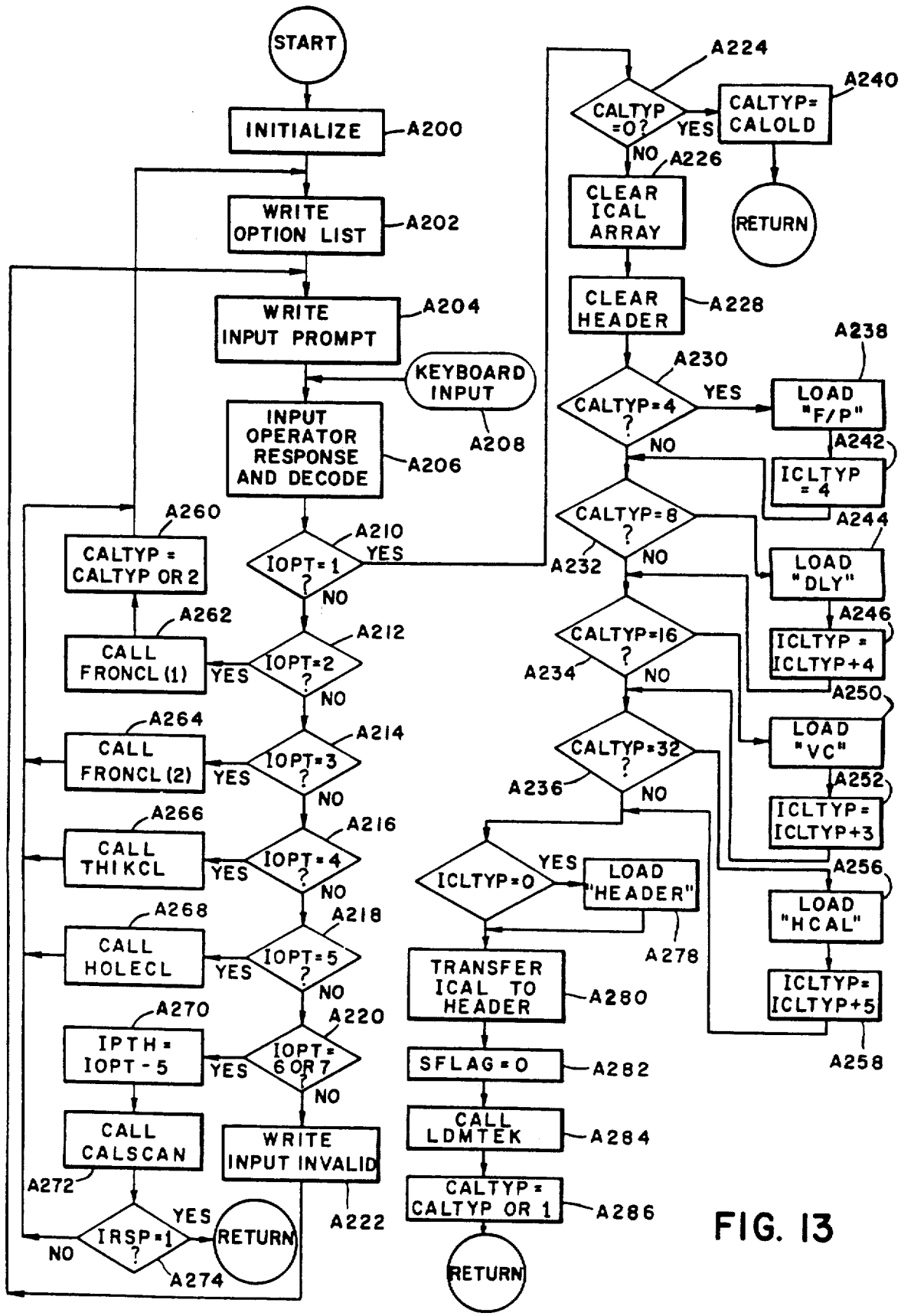
FIG. 13 is a system flowchart for the subroutine CALBRT called as option 5 from the menu illustrated in FIG. 12.

The flowchart for the subroutine CALBRT used for the calibration option is shown in FIG. 13. The routine starts in block A200 by initializing variables and flags which are used later in the routine. After initialization, the routine writes a menu or option list in block A202 from which the operator can choose a calibration of the system from the ultrasonic circuit switch settings, a hole size or thickness calibration, or a calibration from the header. In addition, options are provided for a scanner calibration where the geometry is either radial or planar. Next, in block A204 a prompt is written to the video monitor requesting the operator to choose one of the options. The operator inputs his choice through the keyboard of the terminal in block A208 and that input is decoded in block A206. The variable IOPT is set equal to a value from 1–7 depending upon the option chosen and is decoded in blocks A210–A220.

An option value of 2 or 3 is chosen when an ultrasonic circuit switch setting or header calibration is desired and the subroutine FRONCL is called in block A262 or block A264. An option value of 3 will cause the subroutine FRONCL to produce a calibration from the switch settings of the ultrasonic circuit while a value of 2 will cause the subroutine to provide a calibration from the header parameters. After returning, the subroutine FRONCL sets bits 2 in the byte CALTYP if an ultrasonic circuit switch setting calibration was done.

FIG. 13B is a pictorial representation of the byte CALTYP and the type of calibration each bit represents. The header calibration bit 1 is set in CALTYP if the program returns from a header calibration in block A260. If the option value for the variable IOPT is 4, decision block A216 transfers control to block A266 where the subroutine THIKCL is called to provide a thickness calibration. The subroutine THIKCL returns after the calibration with either bit 3 or bit 4 of CAL-TYP set depending upon the procedure accomplished in the subroutine THIKCL. The subroutine provides the options for a velocity constant calibration or a delay time calibration as will be more fully explained hereinafter.

If the option value IOPT is 5, then an affirmative response to the test in decision block A218 produces a hole sizing calibration in block A268. The calibration is done by calling the subroutine HOLCAL which returns with bit 5 set in the byte CALTYP.

A value of 6 or 7 for the variable IOPT transfers control from block A220 to block A270 where the constant 5 is subtracted from IOPT. This produces a value for a variable IPTH which is either 1 or 2. The program next calls the subroutine CALSCAN which depending upon the value of IPTH provides either a scanner calibration or a radical calibration as will be more fully described hereinafter. If IOPT is not equal to a value between 1 and 7 the system indicates that there has been invalid input in block A222.

After the calibration subroutines have been called and executed, the program will return to the mode option list in block A202 so the operator may determine whether another calibration should be accomplished or if he should exit to the mode command list. If the operator desires, a direct exit to the mode option list can be taken by setting IRSP=1 in the CALSCAN routine to exit the calibration mode. This result is detected by block A274 which exits on an affirmative test of the variable IRSP. If the operator desires to exit normally, IOPT is set equal to 1 by input through the terminal in block 208 and is decoded in block A206. Decision block A210 will then produce an affirmative response and will branch the program to block A224.

The program firs determines in block A224 whether any of the available calibrations have been done. If none of the calibrations have been accomplished then the previous value of the calibration byte CALOLD is loaded into the byte CALTYP in block A240 before the routine returns to the mode option list. If CLATYP is not zero, indicating that a calibration has been accomplished, then the header must be updated with character data to account for this. Therefore, in blocks A226, A228 the place in memory for intermediate storage of the type of calibration, the CALTYP array, and the calibration type location in the header are cleared.

The byte CALTYP is thereafter decoded in blocks A230–276 to determine which calibration type character code should be placed in the header. A front panel calibration, as decoded by block A230, causes an "F/P" to be loaded in the ICAL array. Similarly, the codes "DLY", "VC", "HCAL", and "Header" are loaded into the array in blocks A238, A244, A250, and A275 respectively. Next these intermediate values, ICAL, are transferred into the header in block A280. The scan flag SFLAG is reset in block A282 and the ultrasonic circuit is sent the correct calibration values based upon the recent input by calling LDMTEK in block A284. The routine, before exiting to the mode list, sets the calibration complete bit in block A286.

The subroutine SCAN will now be more fully described with respect to FIG. 14-1, 14-2, and 14-3, which illustrate a system flowchart of the program. Block A300 is used to initialize the flags and constants for the routine and will transfer control to block A302 where the subroutine TIMDIS is called to write the label "SCAN" on the video display. Thereafter, the system checks for a calibration in block A304 by testing the CALTYP byte and continuing to block A306 if bit 0 of that byte is not set. If this branch is taken, the system writes a message indicating that the syste is not calibrated in block A306 and waits for a keyboard response from block A308 before exiting.

If the calibration bit is set then the program continues to block A310 where the variable SFLAG is tested. The scan flag (SFLAG) indicates whether the system can resume a scan that has been terminated by the transfer of control to anothermode or is to start a new scan. If the scan flag is equal to zero this is indicative of the desire for a new scan and the program transfers control to block A331. Otherwise, the program branches to block A312 where ICLR is set equal to one and block A314 where a question is output to the video monitor asking the operator whether he wishes to resume scanning. Depending upon the keyboard response from block A315, the program either exits from block A316 for a negative response (IRSP=1) or continues kto blocks A318 and A391 for a positive answer.

In block A322 the system tests whether the scan flag, SFLAG, is eqyal to one and transfers control to block A331 if a negative answer is found. A scan flag which is equal to one causes the program to continue to block A324 where the variable ICLR set equal to one and a prompt alerting the operator that the scan data in memory has not been saved on the disk is written to the video monitor in block A326. Further, the question is displayed on the monitor: "Do you wish to rescan?" in block A328. Upon an affirmative answer in block A330, the program continues to block A331 and upon a negative answer exits the routine.

The calibration type is then moved from the header to a temporary location labeled ICAL in block A331. Thereafter, the header values of the ultrasonic circuit switch settings for the velocity constant and threshold are coded into an internal bit pattern by calling the subroutine CDHDR. Errors in the coding are checked by testing the error variable IERR in block A337 and exiting if the variable is equal to one. Next the program continues to block A334 where the switch settings that were coded are stored in a buffer IBC. In the next step, block A334, the program compares the values in the buffer IBC with the values in the buffer IBUF which have been loaded from the switch settings of the ultrasonic circuit. If the header settings do not compare with the switch settings in the ultrasonic circuit then in block A336, a message indicating that the ultrasonic settings in the header do not match those used for calibration is output to the video monitor. The system then requests the operator determine if he wishes to recalibrate the system in block A337. Depending upon his answer from keyboard input in block A338, the program either continues to block A340 or exits immediately.

If the answer to the prompt to recalibrate is affirmative, an exit will return the operator back to the command list where he can call the calibration routine. If he determines to go ahead with the scan, block A340 codes the ultrasonic switch settings into the header, erasing the values which do not compare. Thereafter, if an error is detected in the header coding by block A341 then the program will immediately exit. To notify the operator, during a display of the header, that the values found therein are from the switch settings and not from an actual calibration, a "pre" is put in front of the calibration type in the header area in block A342.

The program continues to block A343 where the velocity constant IVC from the ultrasonic circuit is loaded into the headerbuffer with the memory access routine MEM. Thereafter, the locations for the velocity constant and attenuation constant in the header are blanked in block A344. The bit value for the velocity constant is then encoded to an integer value and further encoded to an ASCII string before being loaded into the header in block A345. The integer value for the velocity constant is translated to a floating point value and encoded to the header in ASCII by a call to the subroutine NCDEF. Next, an attenuation setting IATTN, which is in a buffer of the memory, is read out in block A346 and converted to an ASCII string value before being loaded in the header in block A347.

Thereafter, in block A348 the maximum and minimum inspection depths, the static system delay, the velocity constant, the scan axis, and the grid size are displayed on the video monitor. The program then prompts the operator to input an identifier character string for the person who is going to do the scan in block A349. The input characters from the keyboard input of block A350 are read into the system by a call to the subroutine READI and are checked by a call to the subroutine INPTCK. The checking routine for the input characters from the keyboard returns with an error value IERR=1 if the routine has detected bad data. If the answer in block A352 is negative, a subroutine call to the routine INPINV will produce an output message on the video monitor indicating that there is an invalid input. The program will thereafter loop back to the prompt in block A349 to reprompt for the input.

When the identifier data is stored within memory correctly it is then moved to the header by block A353. Next the range of the data is loaded from the header into the variable RANGE. There follows a test to detemine if the third element of the VIEW array is less than 3. If the test is affirmative then the program will branch to block A355 where the scan display is filled with one color.

Otherwise, in block A357, the variable ICL is set equal to four. In the next block A358, if ICN is greater than 2, then in block A359, ICL is set equal to eight. The program thereafter continues by setting up the color table for translation of the display depth while the scanning is taking place. The first two elements of the array VIEW are loaded into the variables VL and VH respectively in block A360. In block A361 these variables are compared to each other to determine which is larger. If the low threshold (stored in VL) is equal to the high threshold (stored in VH) then VH is unchanged. If in block A361 (the value of the low threshold is greater than the value for the high threshold, then the bytes are swapped in block A362 such that the value of VL is placed in VH and the value of VH is placed in VL. Next the step size is calculated in block A363 by differencing VH and VL and dividing by ICL.

The program next builds an address table ITAB in steps from the high threshold and decrementing that level by subtracting the value of STEP from it successively until the loop is finished in blocks A366 and A367. The program thereafter fills the color translation table with colors at this address of the array ITAB. In the next block the memory access routine MEM is called to the load offset address OE with zero.

There follows a portion of the subroutine in blocks A370–A391 similar to that of the subroutine CALSCN in which an internal area factor is calculated. The linear scale factor for the track is read from the header as variable LSFT, the linear scale factor for the arm is read from the header as variable LSFA, and the grid area factor is read as variable IGS in block A370. Thereafter, the radial offsets are calculated by setting the variable RTRK equal to the ratio of the first element of the RADIAL array divided by the second element of the RADIAL array in block A371. The variable RARM is set equal to the division of the third element of that array by the fourth element. The program then enters a loop to determine the largest internal area factor for the arm and track which are within range. These factors are calculated by the loop for all area multiplication constants from 20 to 320. In block A375 after each pass through the loop the scale factor ISFT and the seal factor ISFA are tested to determine if they are less than their maximum values of 250.

If none of these area factors are within range, then the loop will end after the five iterations and transfer control to block A376 where the subroutine TIMDIS outputs the scan label to the video display and writes a message that there is an error because the scanner overflows on the highest area factor in block A392. A message indicating that the operator should go to the header and reduce the grid size is also permitted in block A378. The program then waits in block A378 until the operator enters a key stroke on the keyboard in block A383 and then returns to the calling routine. This path allows the operator to call the edit header mode and reduce the grid size.

If an internal area factor was selected, the program will instead transfer control to block A380 where a test is accomplished to determine if either of the internal scale factors ISFT, ISFA are less than the actual scale factors LSFT and LSFA. If either one of the these conditions is true, block A381 writes a warning message that the linear scale is greater than the actual scale. The program then halts until an input is entered by the operator in block A382 at which point the routine continues. Next the internal area factor IAFACT is loaded into memory in the block A384.

The program continues by determining whether the scan direction stored in memory is the track or the arm direction by decoding a valve from the header in block A385. If the scan axis is picked as the track direction then blocks A386, A387 load the memory with the port addresses of the position encoders and the scale factors, accordingly. If the scan axis is selected as the y direction, then the blocks A388, A389 load the memory with the port addresses of the position encoder and the scale factors in reverse order.

The program then transfers control to block A391 where the value IPTH is tested to determine whether it is equal to zero. If IPTH is not equal to zero, then a rescan has been requested and the subroutine RESCAN is called in block A390 to fill out an incomplete scan. If, however, this is an initial scan the variable IPTH is equal to zero and the system continues at block A392 where the variable SDELAY is loaded with the system delay value from the header. Next, the delay in counts per bit of resolution is coded from the value of SDELAY, the velocity constant VCT, and the range constant RANGE. This variable IDLY is then converted into floating point notation in block A393 and thereafter loaded back into memory.

The initialization continues by clearing the scan memory by calling the subroutine INITM in block A394 which initializes all locations within the memory. Next, the scan flag SFLAG is set equal to 2 to indicate that a scan has not yet been accomplished. The variable SLOAD is set equal to a logical value of FALSE and the memory offset location 0D (hexadecimal) is loaded with zero in block A395.

Block A396 calls the subroutine TIMGET to load the header with the time from the real-time clock. This indicates, if the scan is saved, at what time a particular test occurred. The routine then calls the subroutine PRESCN in block 397 which actually produces the scanning and display of the real-time data on the video monitor. After a return from RESCAN or PRESCN the program tests the variable IEXIT in block A398. This variable is set by those two scanning routines when the operator desires to end a scan. If IEXIT is greater than zero then the program will immediately exit. Otherwise the nominal thickness is read from the header and placed in the variable THICK in block A399. The nominal depth NDSCLD is then calculated from the values for THICK and the range variable RANGE in block A301 and thereafter stored in memory in block A301.

The scan flag SFLAG is set equal to one in the following block A305 to indicate that a scan has been accomplished. The next step of the routine, block A307, loads the version number of the software into the header to provide the operator with an indication of what softward update was used to store the data. The radial ratio locations in the header are then replaced with blanks and loaded with the values of the variables RTRK and RARM in block A309.

The RAM of the system is now fully loaded with scan data and header data. This includes a full record of information, such as all entries in areas A-D of the header, as well as depth data areas and amplitude data areas for the scan memory. Therefore, in block A311 the program prints out the scan label by a call to the subroutine TIMIDIS, and then writes a message on the video display asking the operator whether he wishes to save the scan data to the disk. The system then pauses for a keyboard response from block A313. If the response is affirmative as tested by block A315 the system sets the variable RARG equal to 2.3 in block A317. This produces an indication to the system that the present scan data and header should be saved on the disk file. The routine then exits.

Figure 14A:
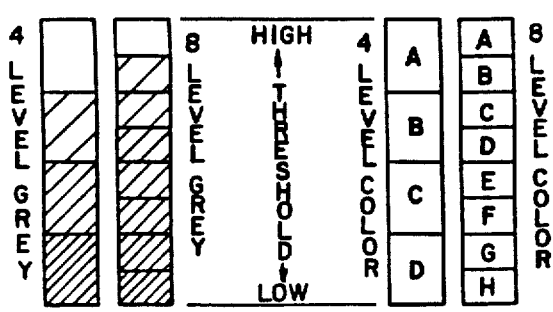
FIG. 14A is a pictorial representation of the contrast levels for black and white or color video displays.
Figure 14B:
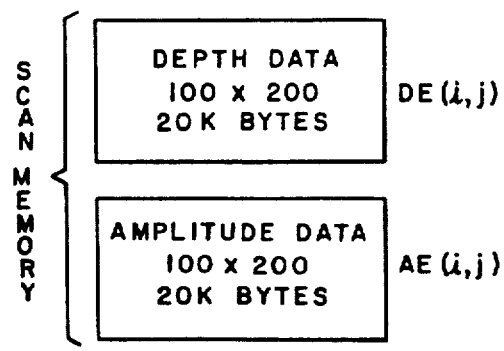
FIG. 14B is a pictorial representation of the division of scan memory into depth and amplitude data areas.

After the scan routine has loaded the scan memory with data, that data is also transferred element by element to the video memory to produce a real-time display. The transfer of the scanned data to the video memory for a real-time display will now be more fully explained with reference to FIGS. 14A-14D. It is seen in FIG. 14B that scan data relating to depth information and amplitude information is stored in scan memory. The scan memory comprises 200×200 storage locations, of depth elements DE (i,j) and amplitude elements AE (i,j), which relate a position of an element of the scan area to a corresponding depth value and an amplitude value. As the scanner is moved over the scan area, each element position of the scanner i,j (i=100, j=200) has two data values input for it by pulsing the transducer and encoding the results. The scan memory is loaded in real time, location by location, depending upon the rate of movement of the scanner.

Figure 14C:
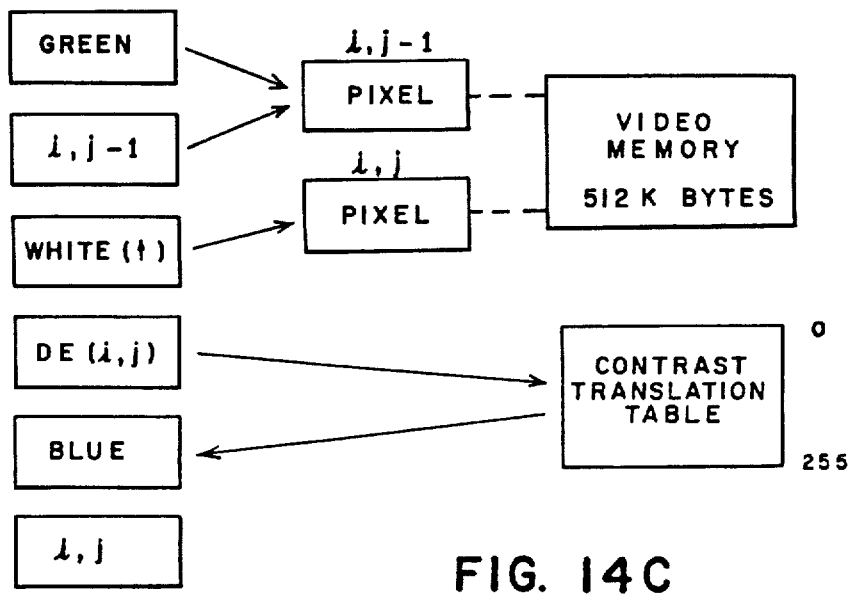
FIG. 14C is a functional flowchart of the operations performed for a real-time display of scan memory data.

The scanning routine which accomplishes the pulsing and reading of data for the elements of the scan area further produces a real-time display of contrast levels for the data as it is input to the scann memory. The constrast levels can be either 4-level grey scale or 4-level color or 8-level grey scale or 8-level color as seen in FIG. 14A. FIG. 14C is a functional flowchart of the operations performed for a real-time display of the scan memory data. After an element DE (i,j) is stored in the scan memory it is additionally stored in an intermediate storage location in the RAM in step (1). The next step (2) is to output a contrast level or color (green) to a pixel of the video memory corresponding to the location i, j−1 of the previous element scanned. The present data is then translated in step (3) by a contrast translation table (built in the subroutines SCAN and SET UP) into a value which will produce a grey level or a color (blue) on the video monitor when loaded into the video memory. Thereafter, in the stop labeled (4) the corresponding location (i,j) is stored along with the pixel color. As a final step (5) the system will output the color (white) to the pixel at location (i,j) to light the element for a visible cursor, which indicates the location of the transducer.

After the next scan data DE (i,j+1) is loaded into the scan memory, that data is stored in the location previously used for DE (i,j) and the process repeated for steps 2–5 before cycling for more data. After all elements of a row have been filled then another row (i+1, j) is filled and so on until the entire video memory area corresponding to the scan area has data stored therein. Although the example given shows scanning in an orderly manner, actual scanning can be accomplished in an entirely random fashion.

Figure 14D:
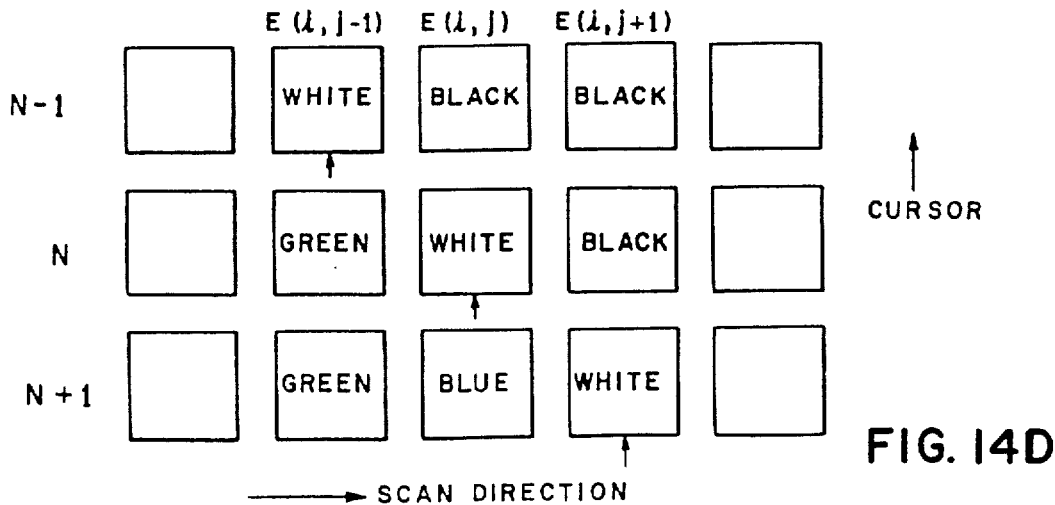
FIG. 14D is a pictorial representation of a sequence of representative pixels displayed to the operator during three successive time periods.
Figures 1, 14:
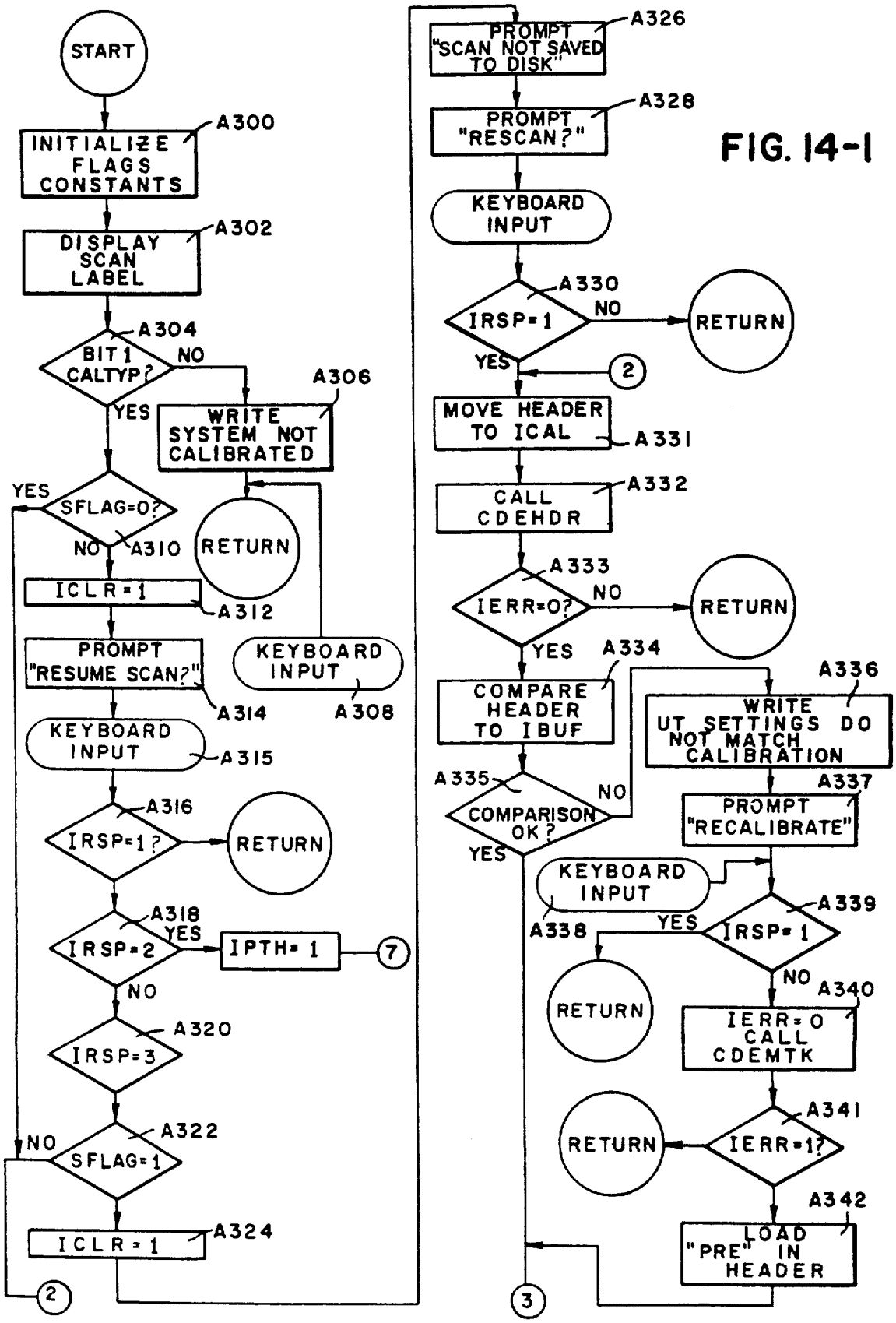
Figures 2, 14:
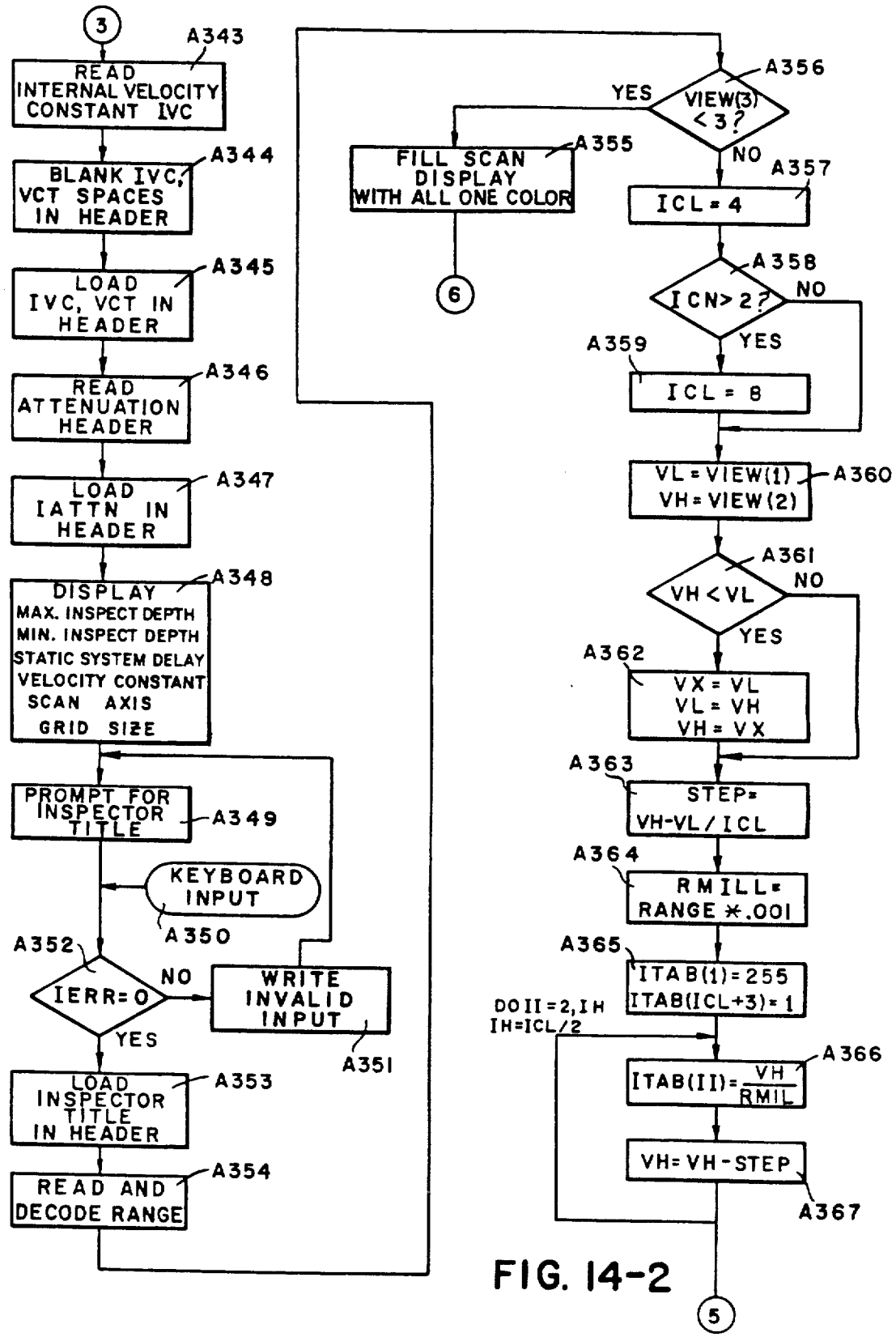
Figures 3, 14:
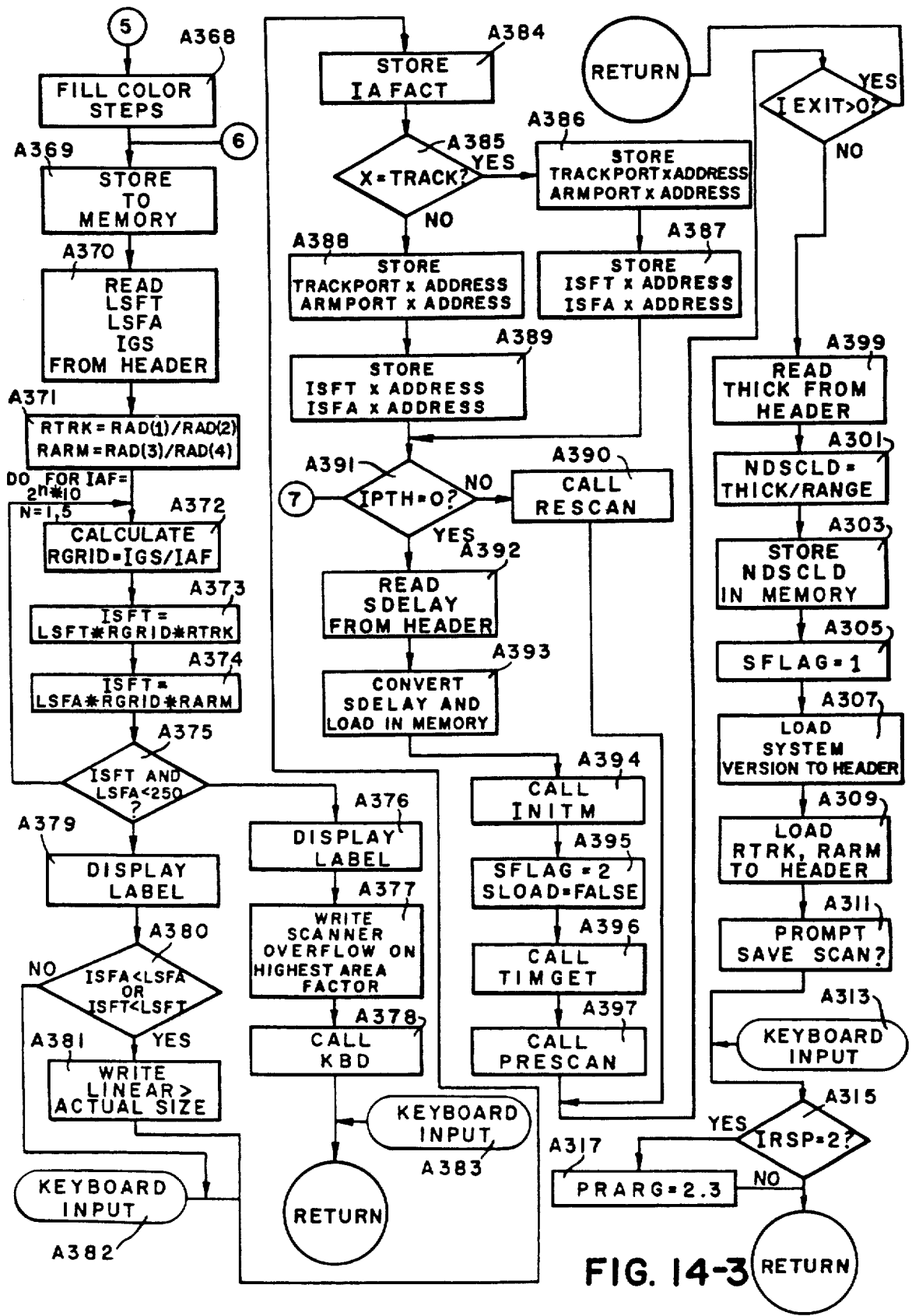

The representative image displayed to the operator is shown in FIG. 14D for three time periods N−1, N, N+1. The length of these time periods is dependent upon how fast the scanner is moved over the scanned area. For each of these times a number of successive display area or pixels on the video monitor are shown. Each of the pixels corresponds to an element E in the scan area, namely E (i, j−1), E (i,j), and E (i, j+1). At time N−1 the pixel E (i, j−1) is lighted with the color white to indicate to the operator the real-time position of the transducer and the corresponding element location where scan data is being taken. Because the scanning direction is from left to right as seen in the drawing, pixels E (i,j) and E (i, j+1) are not lighted as no data has been taken for those element locations. The scanner moves from location i, j−1 to location i,j at time N and the cursor records this fact by lighting pixel E (i,j) with the color white. The data translated into a contrast level (green) which was taken at N−1 for pixel E (i, j−1), is now displayed as such. This process continues with movement of the scanner such that at time N+1, the cursor has moved to light element E (i, j+1) with white and element E (i,j) with the data recorded at time N namely the contrast level (blue).

Thus, as the test area is scanned on the component, element by element, a real time contrast image pixel by pixel becomes visible on the display screen of the video monitor. The image is displayed in dependence upon the interpretation the operator has built into the translation table. The image is used to ensure the operator that valid data is being stored in the scan memory and further, the real-time display provides him with the information necessary to determine if the entire scan area or a larger or smaller area should be rescanned before the data is stored on the disk.

Figure 15:
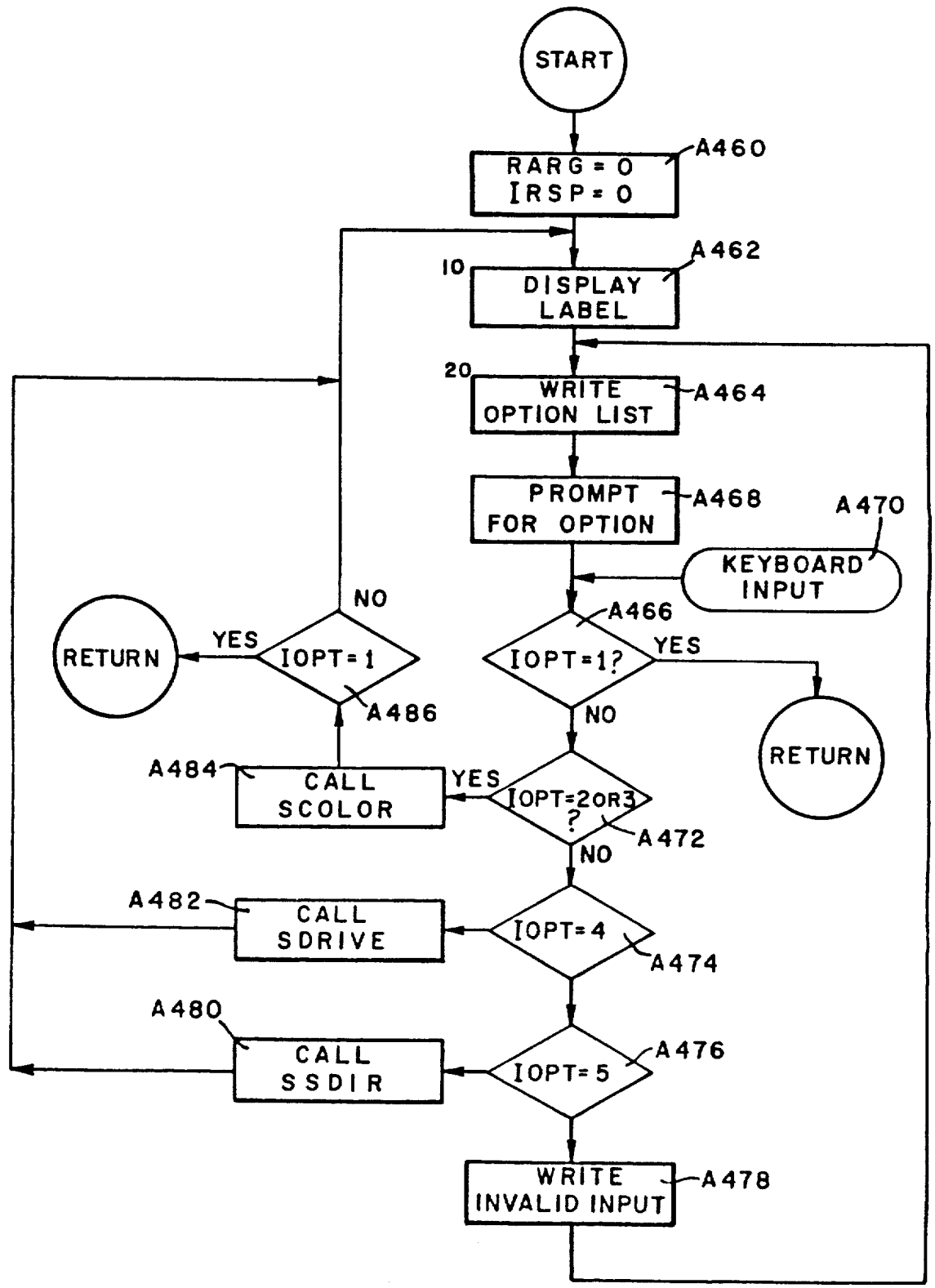
FIG. 15 is a system flowchart for the subroutine SETUP called as option 8 from the menu illustrated in FIG. 12.

The detailed description of the routine SETUP will now be more fully disclosed with respect to FIG. 15, which illustrates a system flowchart for the program. The first block A460 of the routine clears the variables RARG, IRSP while the second block A462 writes the label "Set U" to the video monitor to inform the operator of the mode he has selected. The program next writes the option list in the block A464 on the video monitor and prompts for a keyboard response in block A468. The program then decodes the keyboard response from block A470 in blocks A466–A476. If the second character input is not a carriage return and the first character is not an option character 1–5, then the program proceeds to block A478 where a message that invalid input has been entered is displayed on the video monitor by calling the subroutine INPINV. The command list is redisplayed if an invalid data character is input by looping back to block A464.

Otherwise, the input characters are decoded as the variable IOPT, ranging from 1–5, by subtracting a constant from the first character input. Thereafter, depending upon the value of IOPT, the program will branch to either block A484, block A482, or block A480. If IOPT has a value of 1, the program immediately returns to the calling routine. A transfer to block A484 when IOPT is equal to either 2 or 3 calls the subroutine SCOLOR to provide the operator a selection of colors for the scan display or a selection of colors for the display mode. Upon a return from the SCOLOR routine, the program tests whether the variable IOPT that is return is equal to one in block A486. If the test is affirmative then the program exits but if not, loops back to the block A462 where the command list is again displayed.

If block A482 is chosen by a value of IOPT equal to 4, then the data disk drive assignment program SDRIVE is called. Upon return from the routine SDRIVE, the program moves back to the block A464 where the command list is again displayed. In a similar manner if block A480 is chosen then the scanning direction change subroutine SSDIR is called. After the routine SSDIR returns the program loops back to block A464 where the command list is again displayed.

The subroutine CALSCAN will now be more fully described with reference to FIGS. 16-1 and 16-2. The routine begins by initializing its constants and flags in Block A400. The title of the calibration chosen is then written to the video monitor depending upon the value if IPTH as tested in Block A402. If IPTH equals 1 then the "Calibrate Scanner" prompt is issued in Block A406. Otherwise, for IPTH equal to 2, the message is "Calibrate Radial" issued in Block A406. Next the variables IERR, IRSP are set equal to zero.

The next set of operational steps in Block A410 reads the track linear scale factor LSFT, the arm linear scale factor LSFA, and the grid area factors IGS from the header. A check is provided in Block A412 to determine if any of these parameters are zero. If any of the variables are zero, the program prompts the operator in Block A414 with a message indicating that header data is missing and that he should either read a header or create one. The program then waits for the input of a key from the terminal indicating a desire to return to the mode option list so that the error can be fixed by editing the header. A keyboard input from Block A418 allows the program to continue to Block A416 where the variable IRSP is set equal to one. This value for IRSP will call the command mode list as the routine exits in the next step.

If the header data is complete, the decision block A420 permits the program to determine whether this access requires a scanner or a radial calibration by the value of IPTH. If the variable IPTH equals 1 (scanner), the track and arm linear scale factors LSFT, LSFA, and the internal area factor IAFACT are loaded into the correct locations in memory for transfer to the interface circuit by the memory access routine MEM in block A422. The are factor is set equal to 20 so that the scanner calibration on the accomplished with a convenient scan area. Thereafter, in block A424, the x direction and y direction for the scanner are defined. The track direction is defined as the x coordinate and the arm direction is defined as the y coordinate. At this point in the program, the memory has stored calculations for the grid area, the linear scale factors, and the axis directions. The scanner calibration is now ready to be accomplished by calling the subroutine SCNCAL in Block A426 which compares the count for a known physical movement of the scanner to the theoretical count as determined by the scale factors to determine if there is any error between them.

The subroutine SCNCAL produces actual linear scale factors for the arm and track from the calibration operation. After a return from SCNCAL, the actual track and arm scale factors are reloaded into the header in block A430 after deleting the old factors in block A428.

The subroutine then transfers control to block A432 where the radial offsets RTRK, RARM are calculated from diameter values input during the radial calibration. If the calibration is for planar geometry the radial offsets are equal to 1. If the calibration is for a radial geometry, RTRK is the ratio of the diameter of the transducer movement RADIAL (1) divided by the track diameter RADIAL(2) and RARM is the ratio of the diameter of the transducer movement RADIAL(3) divided by the arm diameter RADIAL(4). These calculated values are then stored into the header in block A436 after the locations receiving them have been cleared in Block A434.

Next, an internal area factor IAF is calculated by a D0 loop in blocks A438–A444. The loop calculates the internal scale factors ISFT, ISFA for the track and arm for various IAFs, to choose the largest area factor which does not cause an overflow of the internal scale factors. The scale factors are representative of the number of encoder pulses which are to be used to determine the length of a side for an individual scan element. Initially, a grid ratio is calculated in block A438 by dividing the grid size variable IGS by the internal area factor IAF. This being the first pass through the loop, the division is the smallest IAF, 20. The result of the calculation RGRID is used in combination with the linear scale factors LSFT, LSFA, and the radial offset RTRK, RARM to calculate the internal scale factors ISFT, ISFA in blocks A440, A442. These internal scale factors are tested for an overflow condition in block A444 and, if both are within range, then the programd continues to block A450. However, if either overflows, then the program does another iteration of the loop using a larger internal area factor, 40 for pass two. The loop continues until the overflow condition is broken or the largest factor, 320, is sued. If the loop finds that an overflow condition on the larges internal area factor occurs, then a branch to block A445 is taken where the "calibrate scanner" label is displayed.

If the calculation for the internal area factor is out of range at all sizes, the program will prompt with an error message that the scanning factors entered into the system overflow on the highest area factor in block A446. The program thereafter allows for a keyboard input in block A449 and an exit to the edit header routine to reduce the grid size IGS. If the test for over range is passed by an affirmative branch to block A450 then the program will test the calculation of IAF for under range. The program first prompts with the correct label in block A450 depending upon whether the cailbration is for a radial (IPTH=2) or a scanner (IPTH=1) operation.

A comparison between the actual scale factors (ISFT, ISFA) and the linear scale factors (LSFT, LSFA) is then made. If either of the linear factors are greater than the actual counterparts then a warning to that effect is given in block A454. The screen of the video monitor is then provided with an output in block A456 to display the linear and actual scale factors for both the track and the arm (ISFA, ISFT, LSFA, LSFT), the track and arm diameters, the transducer movement diameters in RADIAL (1-4), the grid size (IGS), and the area factor (IAF).

For a radial calibration which is executed when IPTH=2 at block A420, the program sets the radial offset elements of the array RADIAL(1-4) equal to 1 in block A399. If no scale factor is needed then the ratio of these factors will be 1 and no proportioning of the grid size will be produced. However, for a radial geometry these offsets will produce a proportional sizing of the elements of the grid. The system prompts the operator to input values for the track diameter, the arm diameter, and the transducer diameter in block A401. The response by the operator is read into memory from keyboard input in block A413 and tested for validity and range in block A407. If any of the inputs are out of range or invalid, then an error message is given in block A411 informating the operator that invalid data was received. The program loops back to block A401 where prompts for the data are again written to the video monitor, and the operator is repeated until data is input correctly, causing an affirmative branch from block A407. The program thereafter stores the input in the radial array elements RADIAL(1-4) in block A409 and then merges with the scanner calibration portion of the routine at block A432.

Figure 16A:
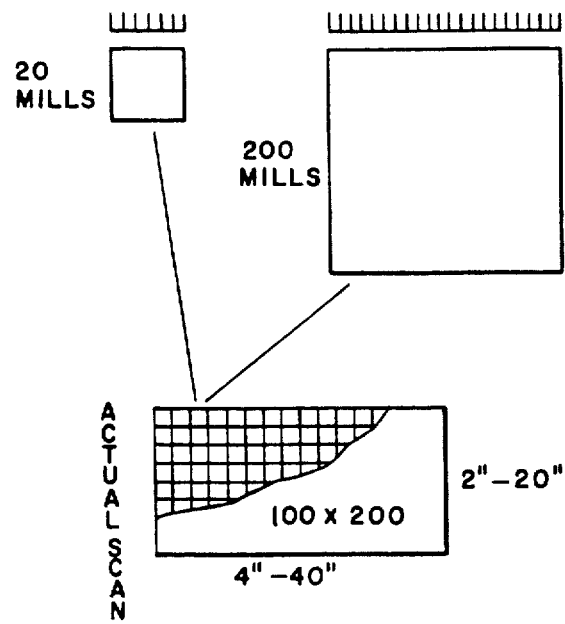
FIGS. 16A and 16B are pictorial representations of the variations in scan element size produced by the subroutine CALSCN illustrated in FIG. 16.
Figure 16B:
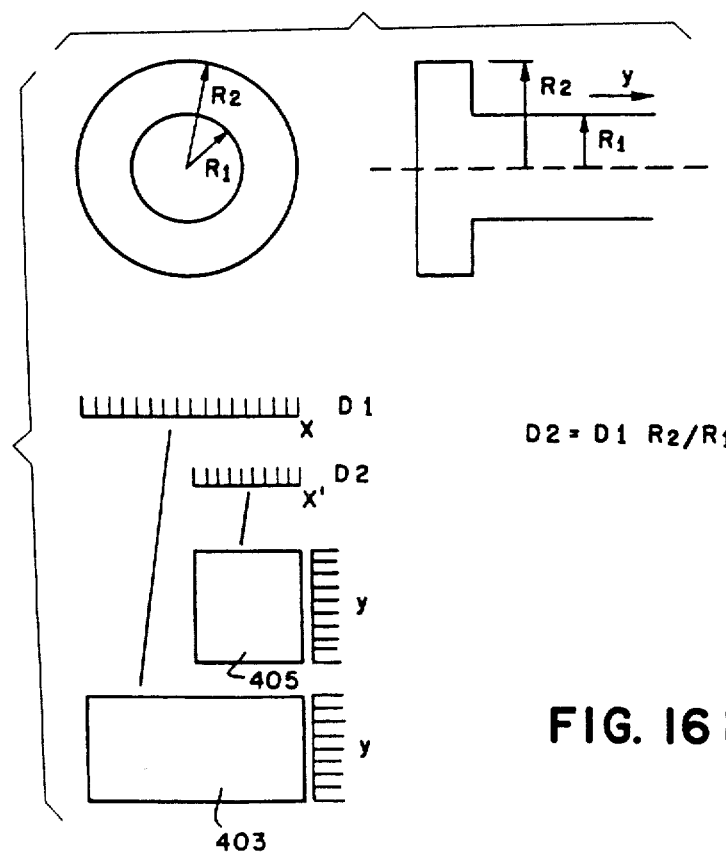
Figures 1, 16:
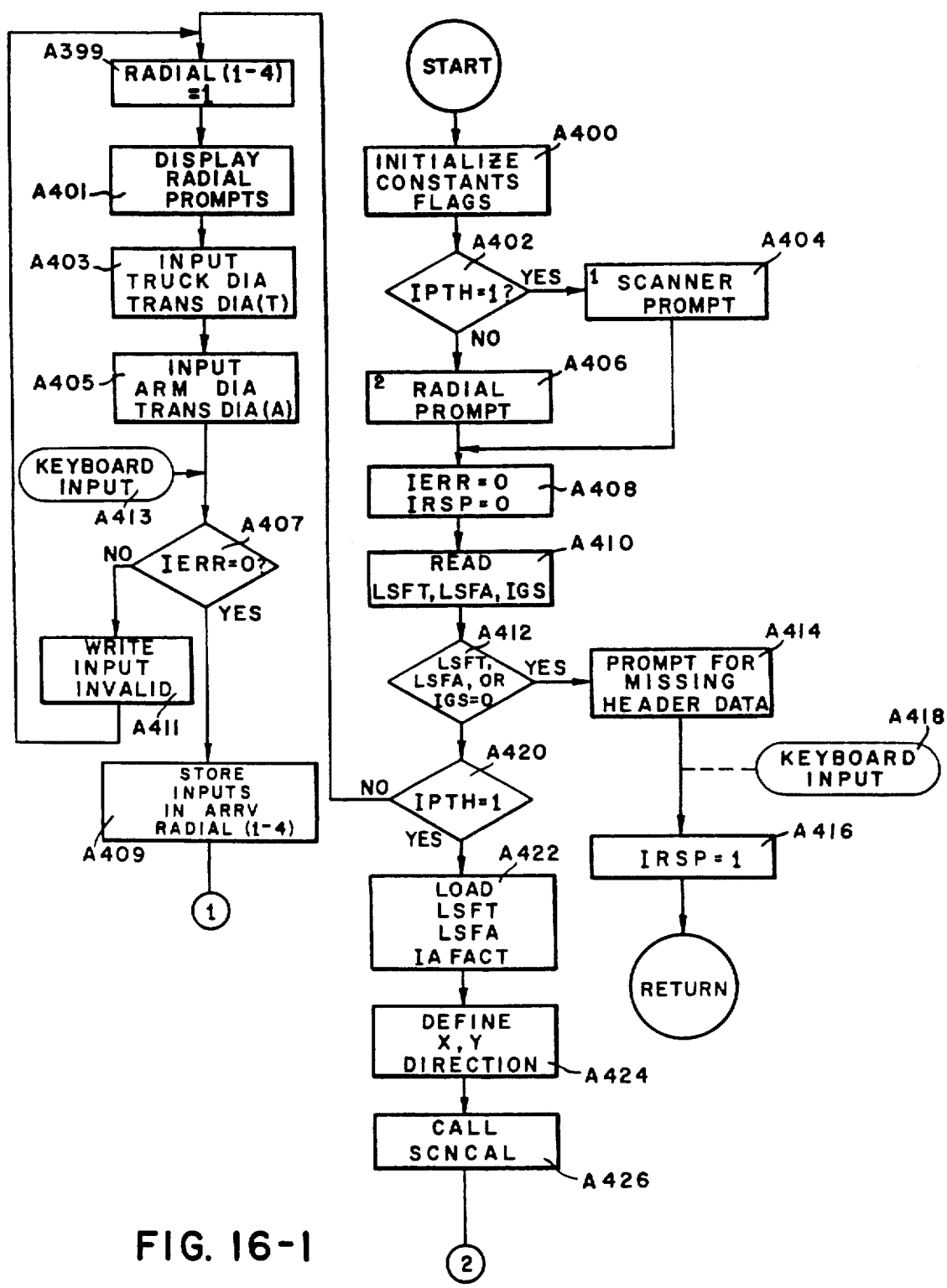
Figures 2, 16:
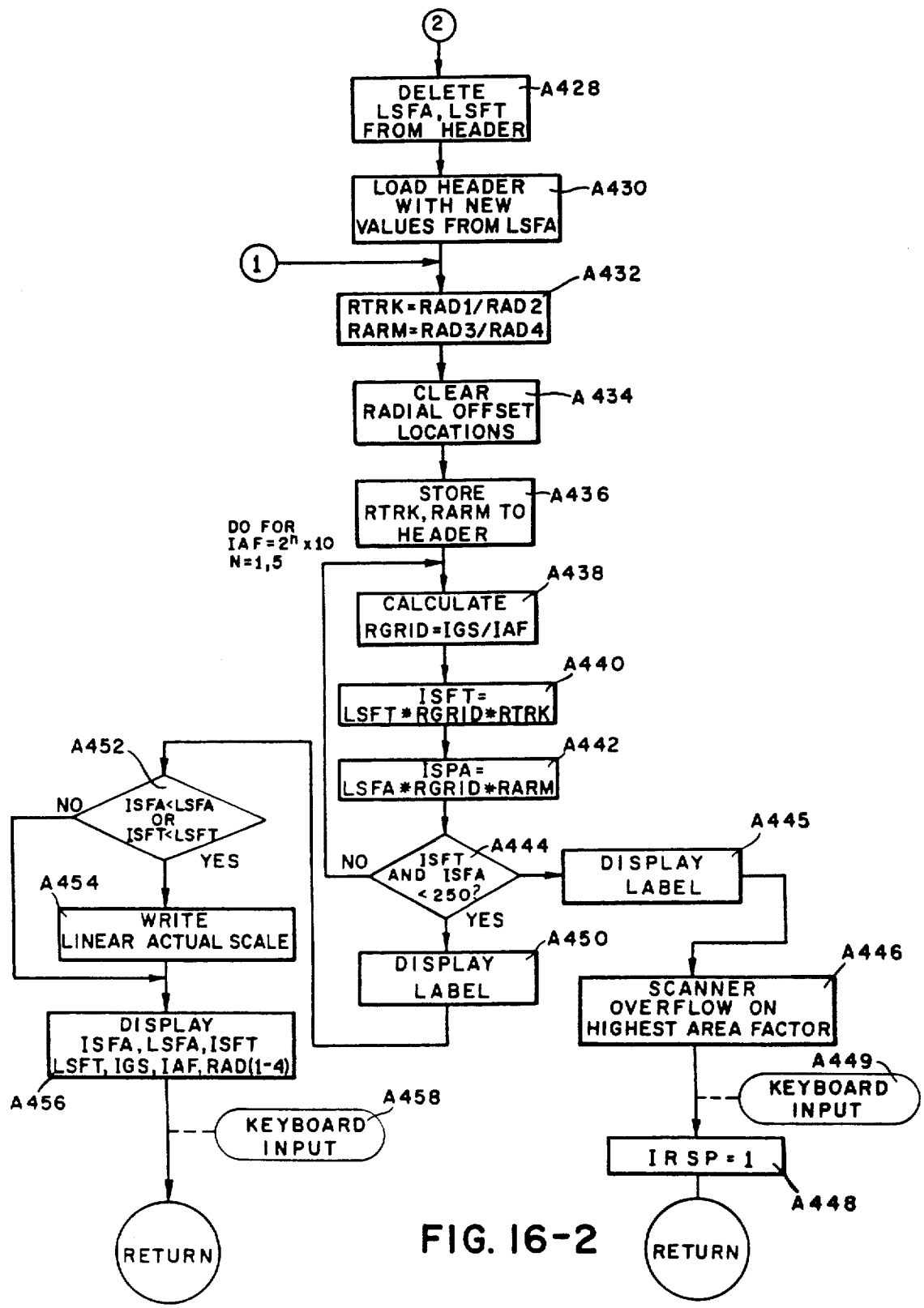

In FIGS. 16A and 16B the scanner calibration for the grid size and the radial offsets is illustrated. The grid or scan area is divided into 100×200 elements. Every element corresponds to an area of between 20 mills–200 mills along an edge producing an actual scan area which may vary between 2″33 4″ and 20″×40″. The grid size, or the actual area each element represents, is easily changed by setting the grid constant in the header. The software automatically calculates the internal scale factors which are transmitted to the position encoding circuits. Because the position encoding circuits relate a position from a reference in the scan area to an element in the scan memory and do so by counting pulses from the encoders which measure actual increments of distance, defining the number of pulses which produce a position or coordinate change from one element to another defines the actual area of each element and thus the actual size of the entire grid area. Therefore, the operator, by entering a grid size constant, may vary the actual scan area to that needed for a particular purpose. For inspection scanning of large areas, a large grid factor can be dialed into the system. For a more detailed analysis of a particular feature or a higher resolution image of a defect, a smaller scan area can be chosen.

Additionally, the scanner scale factors can be varied to ensure proportionality of the image. If a radial geometry workpiece is scanned as illustrated in FIG. 8 and FIG. 16B, the track encoder is generating counts of the actual distance traveled along the radius R2 for the x direction. The transducer, however, is actually traveling along the radius R1. As the transduceer moves in the x direction, its movements correspond on a one-to-one basis with distance movements along the y direction which are linearly encoded. If the counts from the x encoder are not modified, a distortion of the scan area elements will take place on the display. The skewed image can make interpretation of the display difficult or impossible. A movement of D1 in the x or radial direction will produce an image which appears elongated in the X direction as illustrated at 403 in FIG. 16B. What is needed is a method of restoring the one-to-one proportionality to the counts of the encoders for each axis. Therefore, the system provides an operation in the calibration mode where the ratio of the diameter of the track to the transducer movement is calculated. This proportionality constant R2/R1 is multiplied by the grid size constant or scale factor bore it is transmitted to position encoder circuits. The counts from the encoders are modified accordingly such as at 405, in FIG. 16B, so that an area distortion does not occur. Although the track direction has been described for a radial geometry, it is evident that for aradial geometry in the arm direction that a similar radial offset can be provided and/or that both directions can be provided with radial offsets of different sizes.

Figure 17:
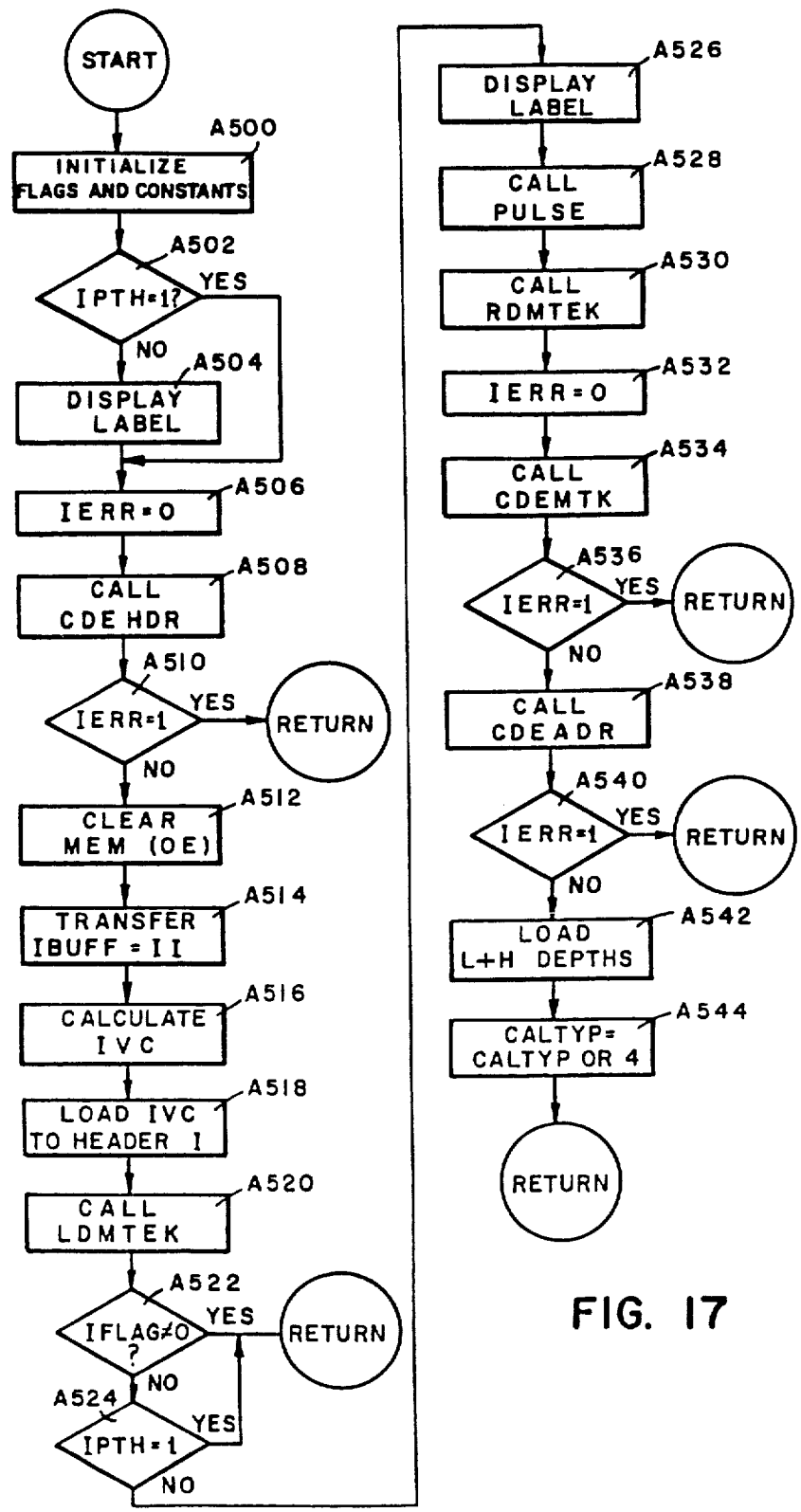
FIG. 17 is a system flowchart of the subroutine FRONCL called from the subroutine CALBRT illustrated in FIG. 13.

The subroutine FRONCL for performing a front panel or header calibration will now be more fully disclosed with respect to FIG. 17. This figure shows a system flowchart for the subroutine FRONCL. FRONCL begins with block A500 where the flags and constants for the program are initialized. The routine then determines whether a front panel or header calibration has been requested by decoding the value of the variable IPTH in block A502. For a front panel calibration (IPTH=2) the program displays the label "FRONT PANEL" at block A504 to indicate the difference.

Both the header calibration and the front panel calibration merge at block A506 where the variable IERR is set equal to zero. The program thereafter codes the ASCII values of the header into an internal bit pattern representing the ultrasonic circuit switch settings, the velocity constant, and the threshold values. The routine CDEHDR is called in block A508 to perform this operation and loads these values into an array IBUF for further processing. The subroutine CDEHDR returns with an error code IERR depending upon whether the converted data input is valid.

If the subroutine CDEHDR returns with IERR=1, as tested by block A510, then there is a defective header value and the subroutine exits. Otherwise, the values returned from the subroutine are valid and are loaded into their corresponding locations in the array IBUF. Thereafter, the velocity constant is transferred from the array IBUF to the array II as two bytes in block A514. The two bytes of the velocity constant are then converted to a floating point number and thereafter into an ASCII string value IVC in block A516 for input into the header in block A518.

The velocity constant IVC is thereafter loaded into the ultrasonic circuit with a subroutine call to LDMTEK. The system tests the value of IFLAG in block A522 to determine whether the ultrasonic circuit was loaded correctly. If the subroutine LDMTEK returns bits 4 and 5 set for IFLAG then the routine will flag the error in block A522 and exit to the calling routine CALBRT. If the error flag has not been set, the routine continues by testing whether the variable IPTH is equal to 1 in block A524. An affirmative test indicates that the calibation for a header input has been accomplished and the routine returns.

If IPTH is not equal to one then the rest of the front panel calibration must be accomplished. Therefore, th program calls for the display label "Calibrate Front Panel" on the video monitor in block A526 and for the pulsing of the ultrasonis circuit by the subroutine PULSE in block A528. The front panel of the ultrasonic circuit is then decoded with the subroutne RDMTEK in block A530 and those values returned are coded into the header by the subroutine CDEMTK in block A534.

Before coding the values into the header they are checked to determine if an error exists. If any errors have occurred, the error flag IERR is set equal to 1. A determination of whether there has been an error in the encoding of the front panel settings is determined in block A536 where the value for IERR is tested against 1. If there was an error in the encoding of the front panel settings then the program exits.

If the variables on the front panel (now stored in the header) are correctly read, then the program continues at block A538 where the subroutine CDEHDR codes these values to the array IBUF. In addition, the memory access routine MEM is called to reload the memory buffer with the low and high depth limits for the calibration in block A542. To complete the routine the CALTYP byte is set in block A544 to indicate that a front panel calibration has been accomplished. The routine then returns to the CALBRT routine from which it was called.

The subroutine which is used to produce the thickness calibration THIKCL will now be more fully explained with reference to the system flowchart in FIGS. 18-1, 18-2, 18-3, 18-4 and 18-5. The routine begins by initializing its constants and flags in block A550 before calling a screen display subroutine TIMDIS to write to the video monitor in block A552. The subroutine TIMDIS writes the label "Calibrate Delay" to inform the operator of the mode of operation. Next, in block A554 the program reads the header for the range, gate delay, gate width, calibration block thickness, and velocity constant.

Next a calibration adjustment variable CALADJ is calculated by summing two products together in block A556. The first product is the [(DELAY+WIDTh)×2.0×0.05] and the second product is (CALBLK×VCH½). This calculation yields an internal resolution for the system taking into account the thickness of the calibration block and the system coupling delay. In the next block A558, the variable RESI is set equal to a value between 0.002 and 0.1, based upon the value for the variable CALADJ. Thereafter, in block A560 the switch setting for the range IRSW is set from the calculation for RESI. Depending upon the value of the variable RESI, the range switch variable IRSW is set equal to values from hexadecimal F0 to F5.

The next set of instructions in blocks A562 and A564 initially sets the error value IERR equal to zero prior to calling the subroutine CDEHDR. The subroutine CDEHDR decodes the ASCII values of the header into an internal bit pattern representing the switch seetings, velocity constant, and threshold and stores these values in the IBUF array. The next step of the routine, block A566, tests whether the storage resulted in any defective header values. If IERR is equal to 1, an error was found and the routine exits. if, however, the values from the header were stored correctly, the program continues in block A568 by transferring the array IBUF to an intermediate array II with the memory access routine MEM.

The program thereafter prompts the operator with the question "Do Delay Calibration?" in block A570. Depending upon the input from the keyboard in block A572, which is given the variable name IRSP, the system will either perform a delay calibration, continue with the velocity calibration or immediately return. If IRSP equals 1 a delay calibration has been requested and the program continues to block A576 where the label "Calibrate Delay" is displayed on the video monitor. The memory access routine MEM is thereafter called in block A578 to set the delay constant to zero in memory. Next, the switch settings of the ultrasonic circuits are read with a call to the subroutine RDMTEK in block A580. These switch values are then reloaded into the buffer IBUF before continuing.

The value for the internal resolution is output to a variable IRSWI by calling the memory acces routine MEM in block 582 so as to provide an intermediate value for comparison. A value for the ultrasonic switch settings variable IRSW is then loaded into that same memory location. The velocity constant is set to a value of $2 \times 10^{-5}$ in Block A588.

Subsequently, a test is performed in block A590 to determined if the variable RANGE is greater than 50 and the resolution RESI is less than or equal to 0.01. If both of these conditions are true the program transfers control to block A596 where IRSW is compared to IRSWI. If the new range value is not equal to the old range value a prompt is written in block A598 to request that the operator change the resolution to the value of the variable RESI. Additionally, a prompt in block A600 request that the operator change the delay and switch settings. Otherwise the values for IRSW and IRSWI are compared in block A592 and control is transferred by the program to block A594 if the two variables are equal and to block A612 if not equal. If the two are not equal the prompt to change the resolution to the value of RESI is written on the video monitor in block A594 before transferring control to block A610.

If the path to the program is to block A598 the gate delay value and gate width value are read out of the memory by calling the memory routein MEM in block A602. These values are shifted up one decade in value in block A604 before being loaded in memory in block A606 in order to match the change in the switch settings. At block A610 the program waits for a carriage return from block A608 to continue. This gives the operator time to change the switch setting and then signal the program that he has accomplished the task.

After continuing in block A612 the program loads the ultrasonic circuit with the perimeter values now in the IBUF array by calling the subroutine LDMTER. After the values are loaded the value of IFLAG is tested in block A614 to determine if there was an error in the loading of the perimeters. If there was an error, bit 5 of IFLAG will be set and the program will immediately return. The path for a program with a good load is to block A615 where the subroutine TIMDIS outputs to the video monitor the "Calibrate Delay" label. The subroutine PULSE is then called in block A616 to generate a pulse to the transducer for reading a first thickness. The data which is returned from the ultrasonic circuit is input to the system by the subroutine READTK in block A618 by variables which are representative of the distance measurement ITHK1 and an amplitude measurement IAMP.

Next the value of the variable IERR is checked to determine whether there was an error in the reading of the values. If so, the message that there was an error in the thickness measurement is sent to the video monitor in block A622. Additionally, the program asks the operator whether he wants to try again in block A621. In response to this prompt, the program either returns or branches back to block A615 where the system is again pulsed.

When there is no error in the readings, the program continues to block A263 where the variable TIME1 is calculated from the value for ITHK1 and the variable RANGE. Multiplying the thickness measurement by the resolution and dividing by the velocity constant yields a time measurement for a first echo from the back surface of the calibration block. The program then outputs the variable TIME1 to the video monitor in terms of microseconds.

The system thereafter sets up to read the second echo from two traversals of the pulse through the calibration block. First, in block A626, a message is output to the video monitor indicating that the operator should move the gate delay and width to read the second echo. A message prompts the operator to enter a carriage return from block A627 when ready to continue. Next, in block A628, the program calls the subroutine IMPULSE, which provides a pulse for the transducer upon sensing the carriage return from the operator. Thereafter, the ultrasonic circuit readings are input into the memory by calling the subroutine RDMTEK in block A629.

All the switch settings except the gate delay and the gate width settings are stored in the intermediate memory locations from array IBUF in block A630. Further, the internal resolution is set to the value of IRSW in block A681. Following these steps, the program displays the "Calibrate Delay" label on the video screen in block A632 and then reads the second echo signal by a call to the subroutine READTK in block A633. This produces the two inputs for the transducer position which are variables ITHK2 and IAMP. Next, in block A634 the program checks for errors in the variables produced for the second echo. If the error value IERR is not equal to zero, in block A642 the operator is sent a message on the video screen that the thickness measurement is in error. The system also provides a prompt to ask if he would like to try again in block A641. Depending upon his response, the program either returns or loops back to block A626 where the operator is again requested to move the gate delay and gate width to read the second echo. The error is possibly due to the fact that the operator did not move the gate or delay far enough to read the second echo and this sequence allows him another change to determine what the value of ITHK2 is by again pulsing the system.

If there were no errors detected in the second echo reading then the time TIME2 is calculated by multiplying the thickness measurement ITHK2 by the resolution and then dividing by the velocity constant in block A635. The system delay variable SDELAY is then calculated in block A636 as twice the variable TIME1 minus the variable TIME2. This is the delay due to transducer coupling and is the sum of all electrical and mechanical delays.

The system thereafter writes out the values of TIME1 and TIME2 in microseconds on the video monitor and further writes a value for the system delay SDELAY in microseconds in blocks A637, A638. The variable SDELAY is then checked to determine if it greater than zero in block A643. If this condition is true then it is indicative of a good value for the delay measurement. If the value of the delay measurement is negative, in block B640 the program outputs an error message that the delay measurement product is negative. In block B642 the program waits for the operator to input a keyboard character from block B641 to continue. The program then returns to block A568 to redo the calibration.

If the system delay has a valid value then the system waits at block A644 for a keyboard input from block A645 to continue. The delay value in the header is cleared in the next step in block A646 before loading the new value for SDELAY into the header in block A647. Next bit 3 of the CALTYP byte is set in block A648 to indicate that a delay calibration has been accomplished before ending this portion of the program.

Thereafter, the program falls through to the velocity calibration part of the program where the label "Calibrate Velocity" is output to the video monitor in block A649. Next, the values in the array IBUF are loaded into the intermediate array in block A650 before continuing with a prompt in block A652, that asks the operator whether he desires to do a velocity calibration. Depending upon the keyboard response from block A652, the program continues to block A654 or returns. If the decision is to do a velocity calibration then the program reads the value SDELAY from the header in block A654 and converts it to a floating point number with a call to the subroutine DCDEF. Thereafter, the value for SDELAY is converted from a floating point number in units of microseconds to bits having units of counts per bit of resolution in block A655. These values for IDLY are then loaded into the memory in block A656 by calling the subroutine MEM with IDLYL and IDLYH. The switch settings of the ultrasonic circuit are now read by calling the subroutine RDMTEK in block A657, and the value for the switch setting IRSW1 is loaded into memory in block A658.

Next, in blocks A659–672 the internal resolution for the velocity calibration is set up in much the same way that the resolution for the delay calibration was performed. After the resolution steps have been accomplished the program waits at block A674 for a carriage return from block A673 before continuing. The ultrasonic circuit is then loaded with the parameter values which were set in memory in block A675. An error in loading is checked by reading IFLAG and testing it in block A676, where the program will exit if the value is not equal to zero. If, however, a good load has been accomplished the program continues at block A677 where the velocity calibration label is output by a call to the subroutine TIMDIS. The system is thereafter pulsed by a call to the subroutine PULSE in block A678. Next the result of the pulse is read by calling to the subroutine READTK in block A680 to generate the thickness and amplitude variables ITHK and IAMP.

Before continuing to the calculation for the velocity constant the program checks for an error by testing the value IERR. If the error is not equal to zero then the program prompts the operator with the message that there is an error in the thickness measurement in block A682. It further prompts the operator with a message requesting whether he desires to try again in block A683. Depending upon the keyboard response the program thereafter exits from block A685 or continues to block A677 where the system is pulsed again.

Upon indication of a good thickness measurement, the program continues to block A686 where a thickness measurement THICKM is calculated from the product of the variables ITHK and RESI. This is the product of the thickness reading from the pulsing of the transducer and the resolution of the system which yields a distance or thickness for comparison measurement.

A measured velocity constant VCM is then calculated by multiplying a nominal velocity constant (2.0) times the calibration block thickness CALBLK and dividing that product by the measured thickness variable THICKM in block A687. The measured velocity constant VCM is then converted to the variable IVCM in the correct units in block A688 of the program. Thereafter, the measured thickness variable THICKM, measured delay ITHK, and the measured velocity constant IVCM are output in the correct units to the video monitor in block A689.

The measured velocity constant IVCM is then reloaded into memory in block A691. Next, the system delay SDELAY is recalculated in counts per resolution by using the measured velocity constant in block A692. The result of the calculation is the variable IDLY which is converted into different units and reloaded into the memory by calling the subroutine MEM in block A693. Thereafter, the ultrasonic circuit is loaded with the calculated delay value and the calculated velocity constant by a call to the subroutine LDMTEK in block A694.

The system is then pulsed with these new values by a call to the subroutine READTK in block A695 which returns with the thickness variable ITHK and the amplitude variable IAMP. Thereafter, the error flag IERR is checked to determine whether it is equal to zero in block A696 and if it is the program continues to block B600. Otherwise, the program executes an error routine by prompting the operator that there is an error in the thickness measurement in block B696. It further questions whether he wishes to try again in block B696 and depending upon his from block A678 either returns or continues to block A695. At this point in the program, the label for the calibrate velocity mode is displayed on the video monitor and control is transferred to block A695 where the system is again pulsed.

After a valid reading for the system has been made, block B600 calculates a second thickness measurement THICKM from the variables ITHK and RESI. These variables are then written to the video monitor in block B602 before attempting a comparison between the measured value and actual calibration block value. An adjustment loop is entered via block B608, where initially measured thickness is tested to determine whether it is equal to or less than the calibration block thickness CALBLK in block B600. If the thicknesses are equal, control is transferred to block B610. Otherwise the variables THICKM and CALBLK are again compared in block A699 to determine which is larger. IF CALBLK is greater, the variable IVCM is incremented by one unit in block B604, or if THICKM is greater then the variable IVCM is decremented by one unit in block A698. Next, the number of tries stored in variable ITRY is incremented by one in block A697 before looping to block A691 where the system once again pulses the calibration block and does a thickness measurement.

This produces an adjustment for the measured velocity constant to calibrate the velocity constant as closely as possible to the actual physical conditions under which the system operates.

In block B610, the velocity constant VCM is calculated and transmitted to the video monitor, along with the header velocity constant VCH for the calibration block material, the measured thickness THICKM and the calibration block thickness CALBLK. The program thereafter waits in block B616 for a keyboard character from block B614 before continuing.

After continuing, the CALTYP byte is loaded such that bit 4 is set in block B618, indicating that a velocity calibration has been accomplished. Thereafter, the velocity constant adjustment and maximum and minimum inspection depths are blanked out of the header in block B620. The variables VCM and IVCM are then loaded into the header into the correct places, and new minimum and maximum inspection depths are calculated in blocks B622 and B624, respectively. The new minimum inspection depth DMIN and the new maximum inspection depth DMAX are then loaded into the header in block B626. Next, the variable DMAX is tested to determine whether it is over range in block B628 and upon an affirmative response a warning is displayed in block B630. The program then waits in block 634 for a keyboard response from block 632 before continuing. Otherwise, for DMAX within range the program loads the intermediate buffer from the array IBUF in block B638 before returning to the calling routine.

Figure 18A:
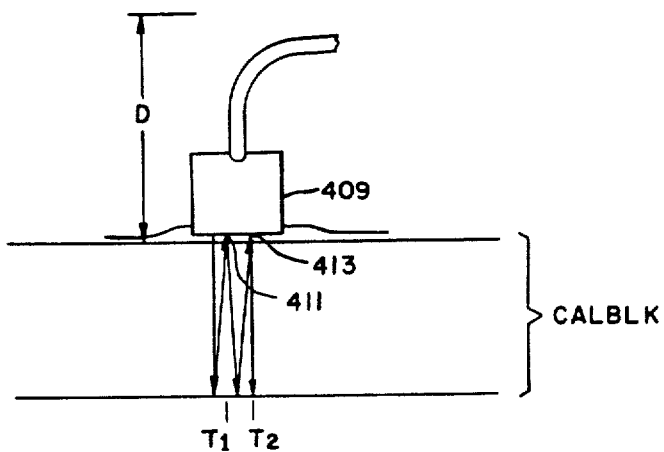
FIGS. 18A and 18B are pictorial representations of the waveforms and calculations used for the delay and velocity constant calibrations performed by the subroutine THIKCL illustrated in FIG. 18.

The automatic calibration will now be more fully described with respect to FIG. 18A. To perform the automatic calibration of the system a calibration block of a known thickness, CALBLK, and of a known material is pulsed by the transducer 409. The ultrasonic pulse propagates through the material to the back surface where it is reflected back to the transducer for detection at 411. The ultrasonic wave is also reflected from the front surface where it is directed to the back surface once more. A second reflection of the waveform is thereafter also detected by the transducer at 413.

Figure 18B:
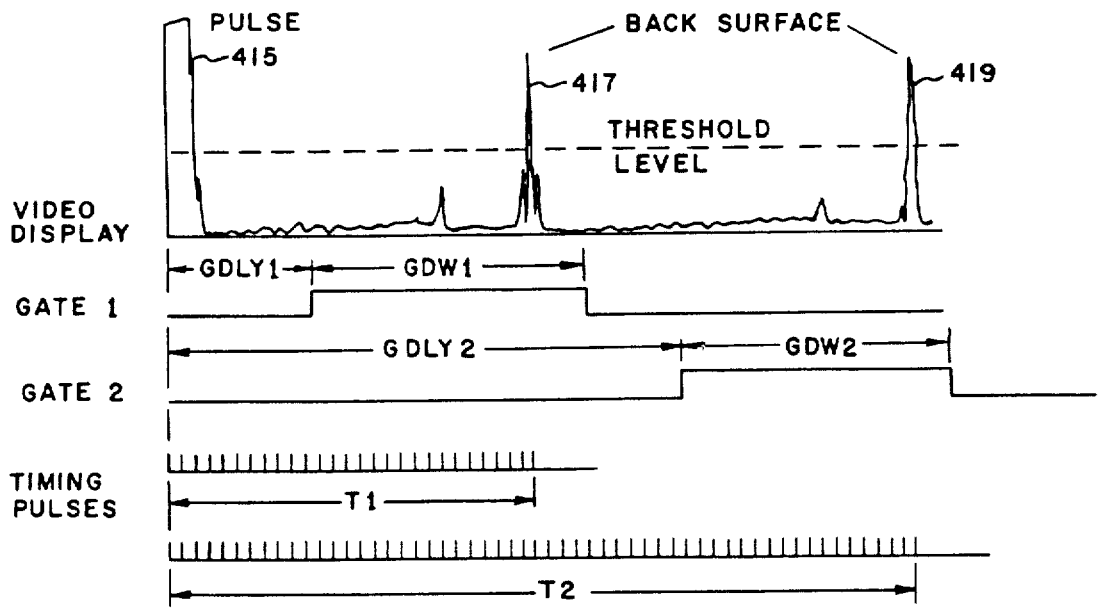
Figures 1, 18:
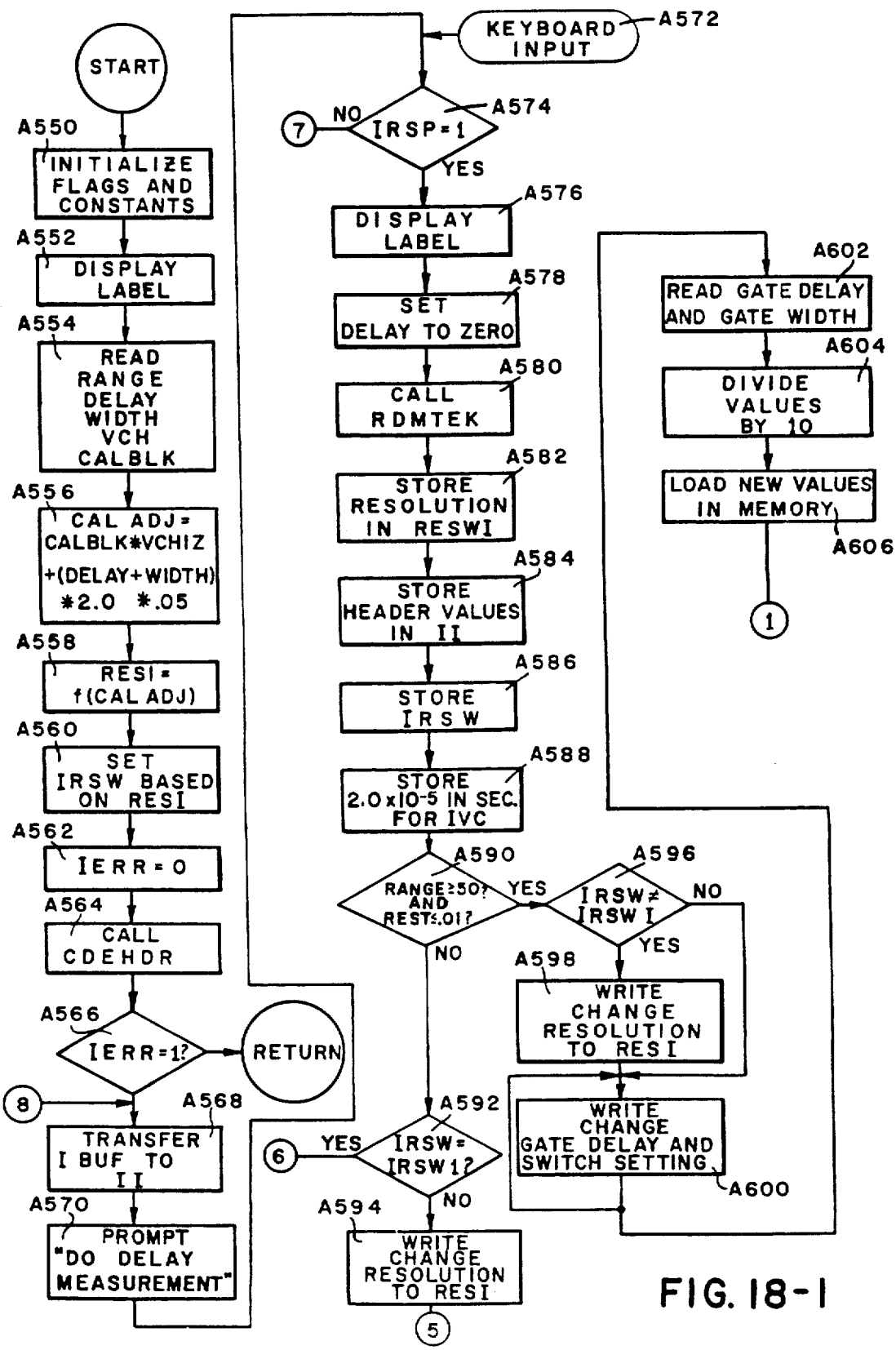
Figures 2, 18:
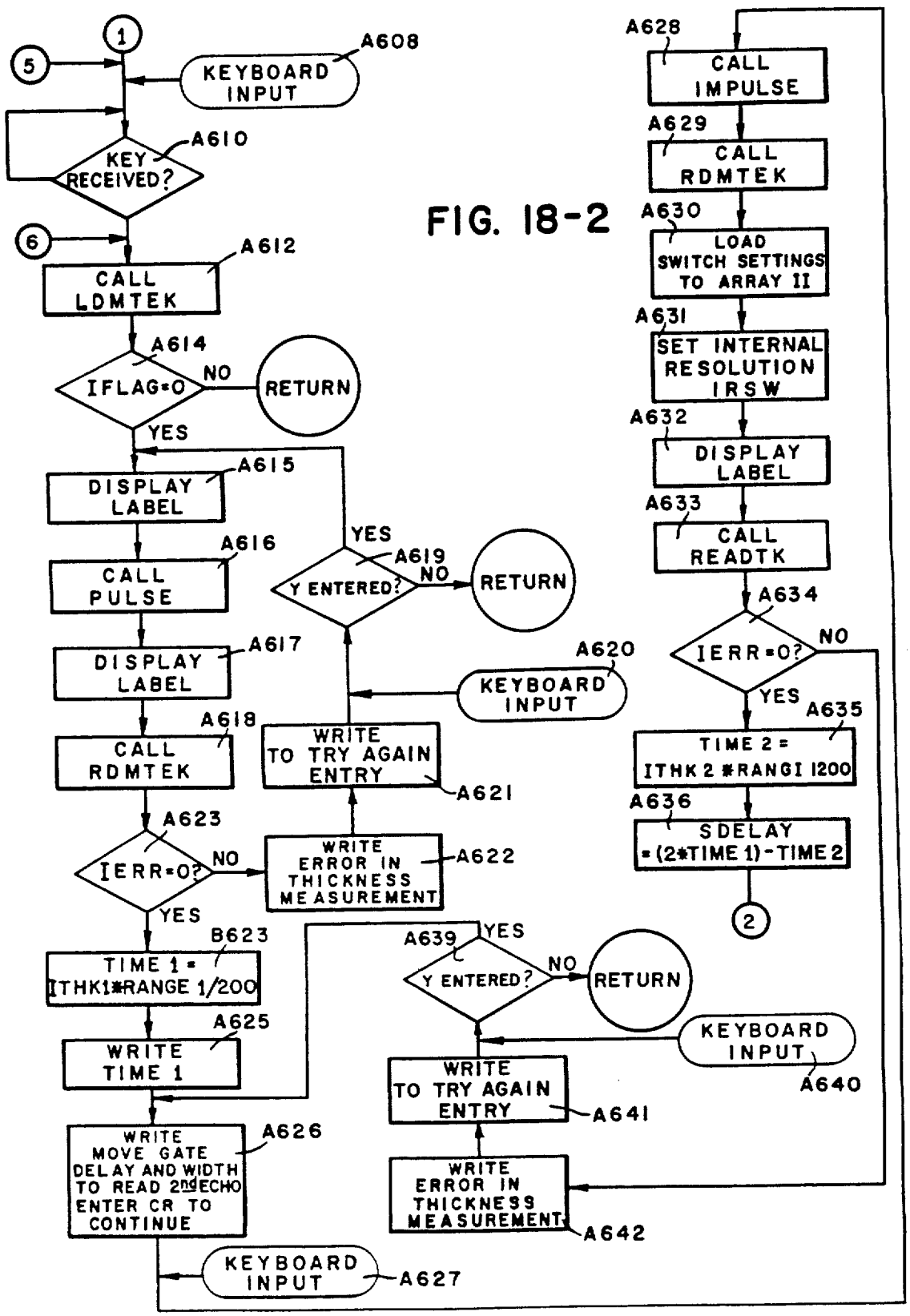
Figures 3, 18:
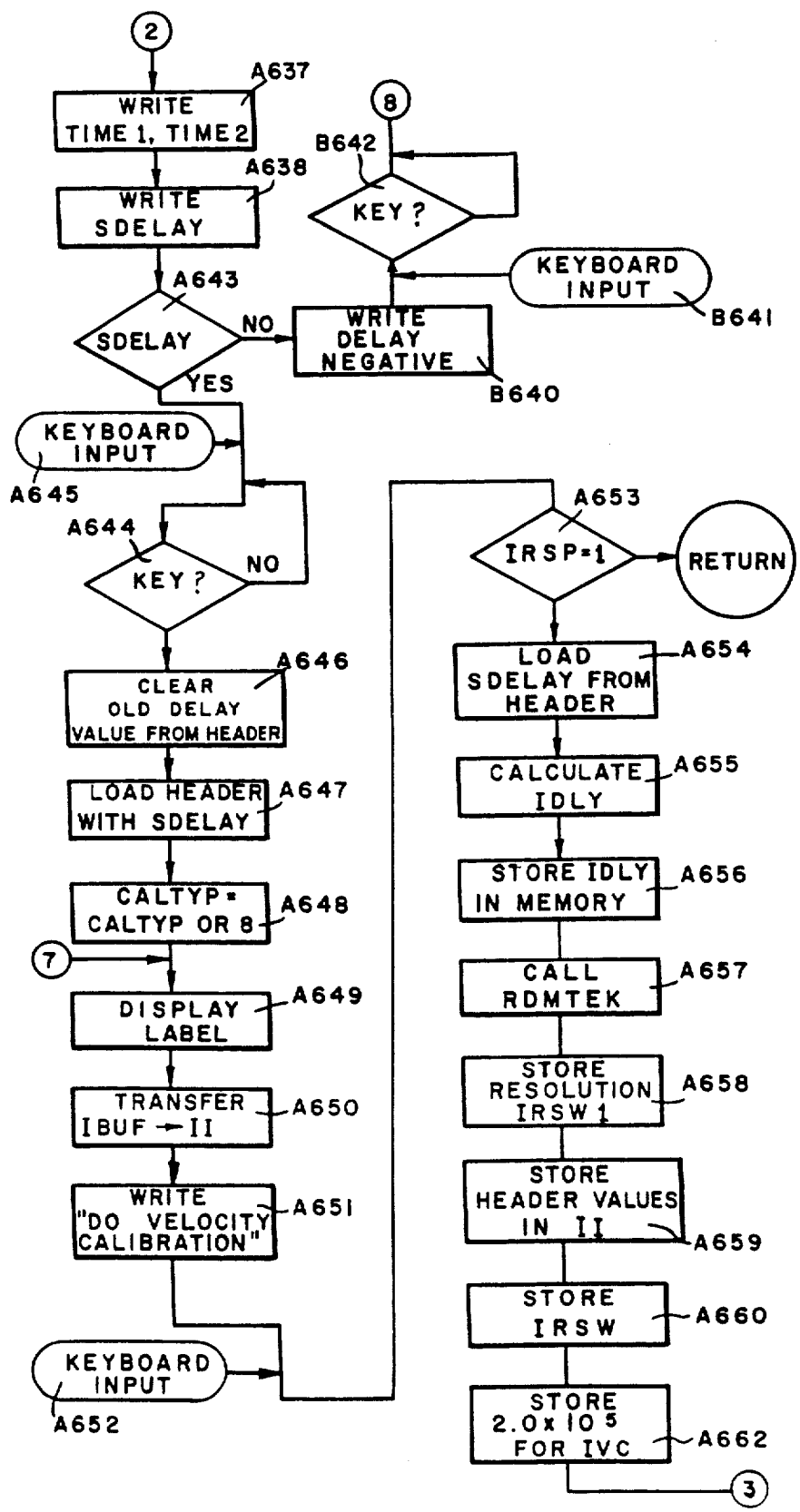
Figures 4, 18:
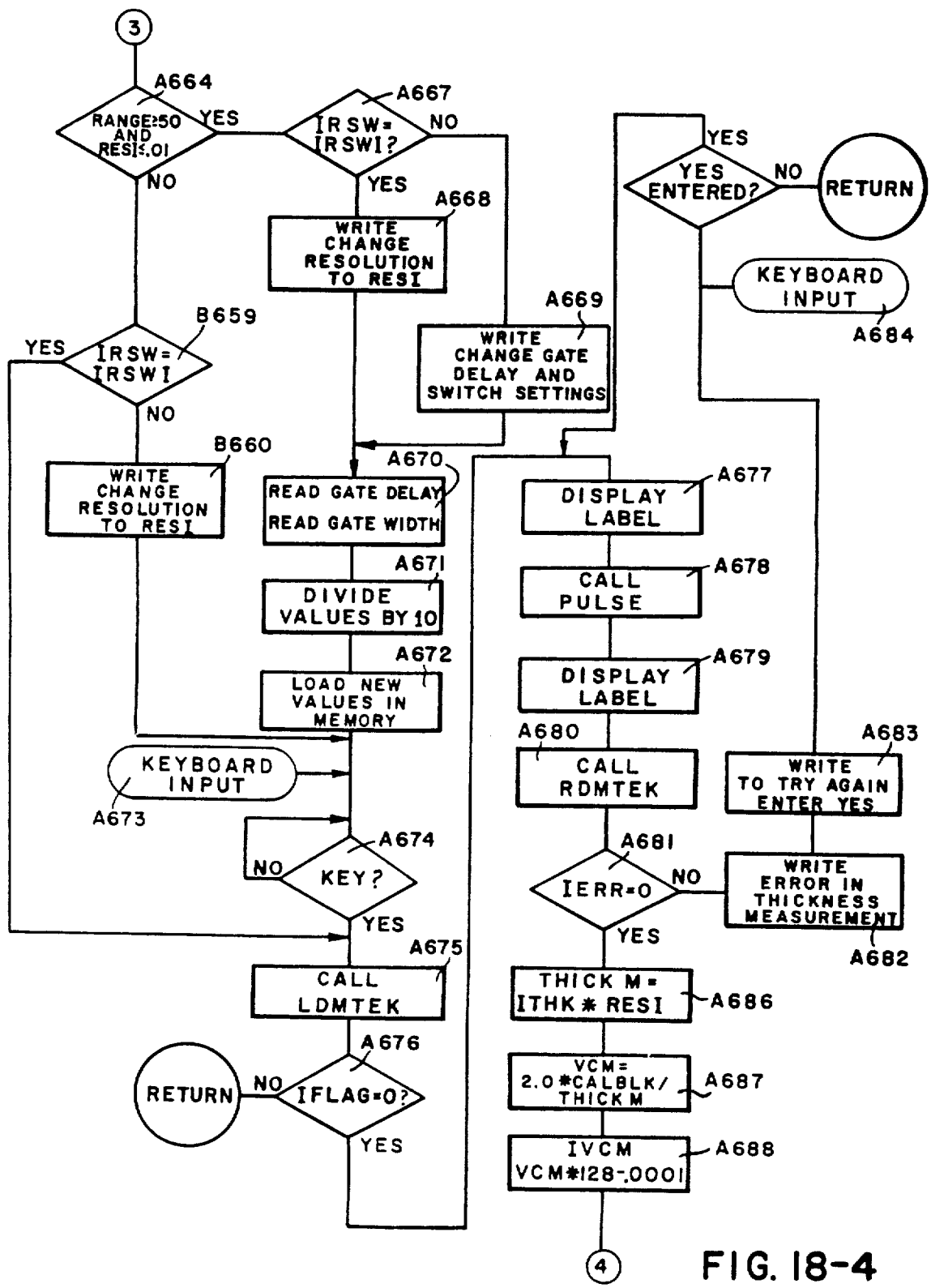
Figures 5, 18:
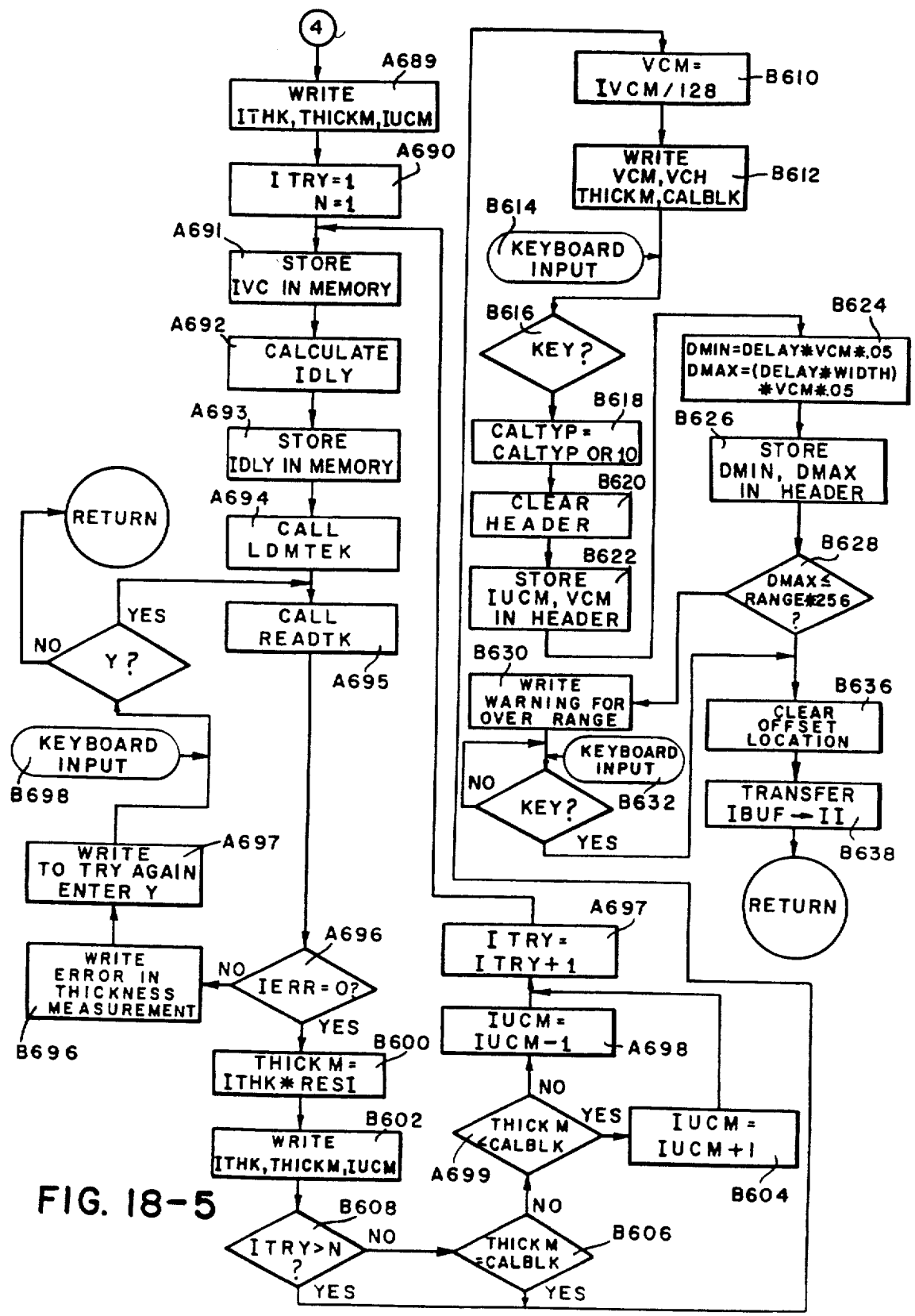

The detection of these two reflections, one from the back surface and the second after another traversal, are shown in FIG. 18B as an A-Scan display where the X-axis is time. The first large amplitude wavepeak 415 is the ultrasonic energy pulse entering the test block, the second wavepeak 417 is the first reflection, and the third wavepeak 419 is the second reflection. The time it takes for the ultrasonic energy to travel to the back surface and back to the detection point (first reflection) is recorded by a counter in the ultrasonic circuit by counting timing pulses and is illustrated as $T_1$. The time it takes the ultrasonic energy to travel substantially twice that distance (second reflection) is recorded in a similar manner and is labeled T2. The A-scan display is used by the operator to adjust the gate delay GDLY1 and gate width GDW1 to capture the second pulse 417 for the recording of T1 and then to readjust the delay and width to GDLY2, GDW2 in order to capture the third pulse 149 for the recording of T2.

The calculations shown in the FIG. 18B are then made to determine the delay time caused by coupling of the ultrasonic waveform into the test material. The delay time may be extensive because of the use of a coupling block or a bath coupling of the transducer to the workpiece. In any event, this calculation provides the system with the sum of all electrical and mechanical delay times so they can be subtracted from a depth reading before its use.

The product of T1 and the system resolution R used for reading the calibration block is a value in units of thickness. This thickness is equal to the thickness of the calibration block CALBLK plus the delay DTH in units of thickness. Multiplying the second time T2 by the same resolution R yields a thickness equal to the delay thickness DTH times twice the calibration block thickness 2(CALBLK). Combining these two equations and solving for DTH produces the result.

$$DTH = R(2T1 = T2) \qquad (1).$$

Since the time for the preparation of an ultrasonic waveform through a medium can be determined by dividing the thickness traveled by the velocity constant, the delay time DT is equivalent to that shown in equation 2 where VC is the velocity constant.

$$DT = (R/VC)(2T1 - T2) \qquad (2).$$

If the resolution is chosen as 2 mills/bit and the velocity constant is $2 \times 10^5$ in/sec. then the delay time can be calculated from the difference of the values 2T1 and T2 multiplied by a factor which places the decimal point. This will calculate DT in units of time.

The delay factor is then used in the velocity constant calibration. First the method is used for calculating a measured velocity constant using a nominal velocity constant, a measured thickness for the calibration block, and the actual thickness. The measured velocity constant VCM is calculated as the ratio of the actual thickness of the block CALBLK over the measured thickness of the block (ITHK*RESI) multiplied by the nominal velocity constant (2.0) as seen in FIG. 18B. The thickness of the calibration block is again measured using measured velocity constant VCM. If the calculated calibration block thickness is different from the actual thickness, the measured velocity constant VCM is then adjusted unitl they are equal or within a small difference of each other.

Figure 19:
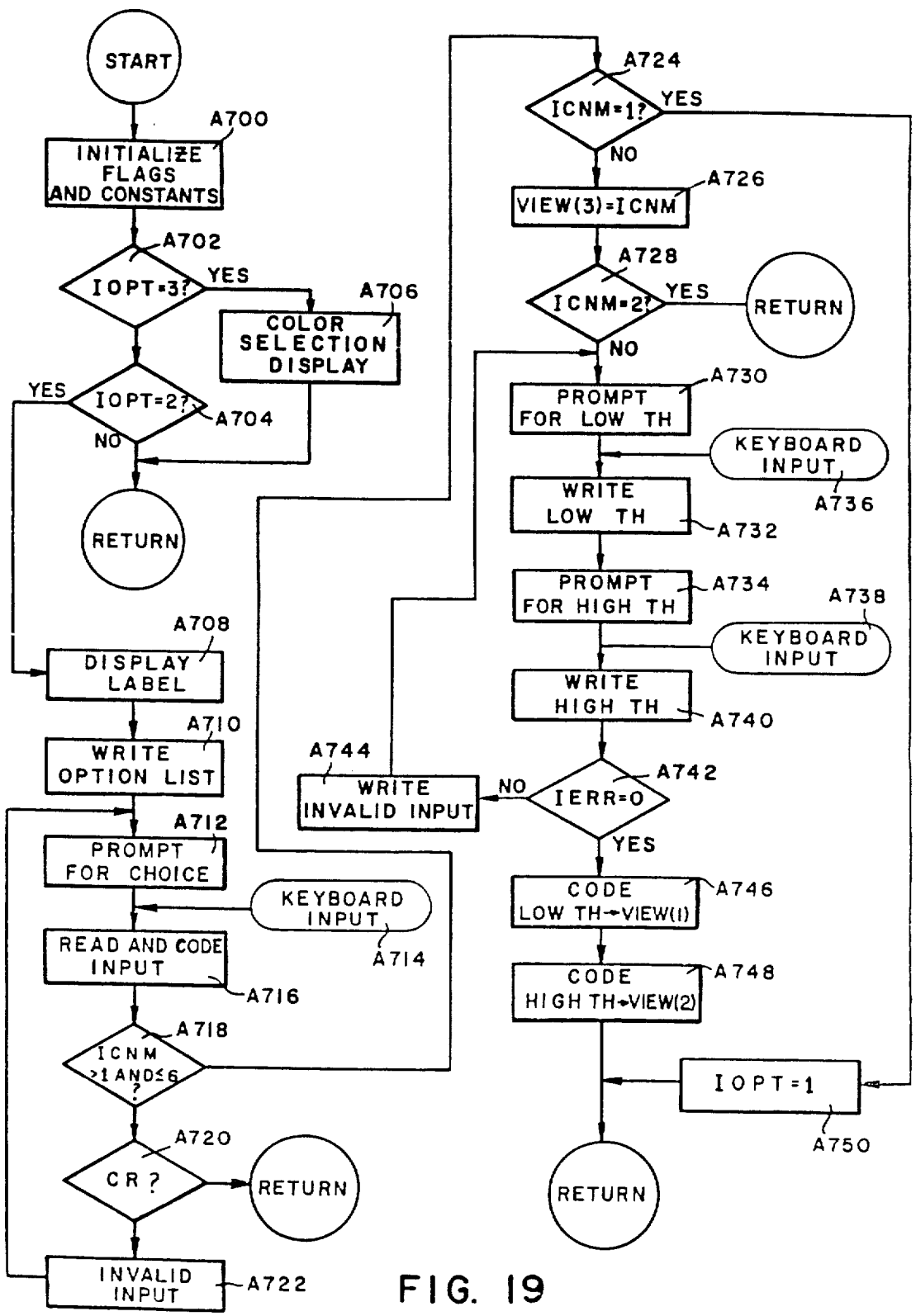
FIG. 19 is a system flowchart of the subroutine SCOLOR which is called from the subroutine SETUP illustrated in FIG. 15.

The subroutine SCOLOR, which permits the operator to select the mapping colors for the scanning mode or for the display mode, will now be more fully explained with reference to the system flowchart in FIG. 19. The routine begins in block A700 where the initialization of flags, constants and common variables is accomplished. The program proceeds to block A702 where the value of the variable IOPT (transferred from the subroutine SETUP) is tested. Depending upon the value of IOPT, at block A708 the program branches to either a program sequence for a color selection in the display mode or for a color selection in the scan mode. If IOPT is equal to 2 as tested in block A704, the color mapping for the scanning mode is chosen, and if IOPT is equal to 3 as tested in block A702, the color mapping for the display is chosen. If the value of IOPT is equal to 1 or some other value, then the program immediately exits to the main menu for the mode list.

Assuming that the branch for the color selection of the scanning mode has been chosen, the program sequences to block A708 where the data label "Set Up" is written to the video screen by the subroutine TIMDIS. Next, two messages are written to the video screen which form the command selection options for the scan color choices in block A710. A message indicating that the operator should enter an option number, or a carriage return for no change, is then output to the video monitor from block A712.

The operator input in response to the prompt in block A714 is received by calling the subroutine READI which encodes the input ASCII character string into an integer variable ICNM in block A716. Continuing, the routine tests the value of the variable ICNM to determine which of the options the operator has chosen. In block A718, if ICNM is greater than one and less than or equal to six, then the operator has chosen one of the commands. Therefore, the program will transfer control to block A724 where these commands are decoded. Otherwise, if a carriage return is decoded in block A720, then the program returns to the calling routine. If a command or a carriage return is not recognized, then the program falls through to block A722 where the subroutine INPINV is called to output an invalid input character message. Thereafter, the program will loop back to block A712 where the prompt to enter the option number or carriage return is again given.

If a valid command has been given, the program begins the decoding process by determining if the variable ICNM is equal to 1 in block A724. If the answer is affirmative, the programs responds by branching to block A750 where the variable IOPT is set equal to 1. The program then exits and will cause a return to the command mode list. If the option chosen was not equal to 1, then in block A726 the third element of the VIEW array is set equal to the floating point value of the command ICNM. This stores the option input by the operator for use in the scan routine to produce real-time contrast imaging depending upon which option was selected.

In the subsequent block, A728, the subroutine tests for ICNM=2, which indicates that the option chosen is no color levels. If the test is affirmative, the programs exits; if negative, the program continues to block A730. At this point, the choice has been decoded into options 3, 4, 5 or 6, corresponding to the contrast displays. The programs then prompts the operator to input the low and high threshold values in blocks A730 and A734, respectively. He responds in blocks A736 and A738 by keyboard input and his input is displayed back to him in blocks A732 and A734, respectively, on the video monitor. The echo of his input allows him to determine if the values read by the system are those which were to be input. The inputs are validated for errors and if an error occurs in the input cycle, block A742 will intercept it by testing the error variable IERR. An error will cause block A744 to output an invalid input message before the program cycles back to redo the prompts in block A730. If the threshold values are found to be valid, then they are stored as the first and second elements of the array VIEW in blocks A746, A748, respectively, before the program returns to its calling routine.

Figure 20:
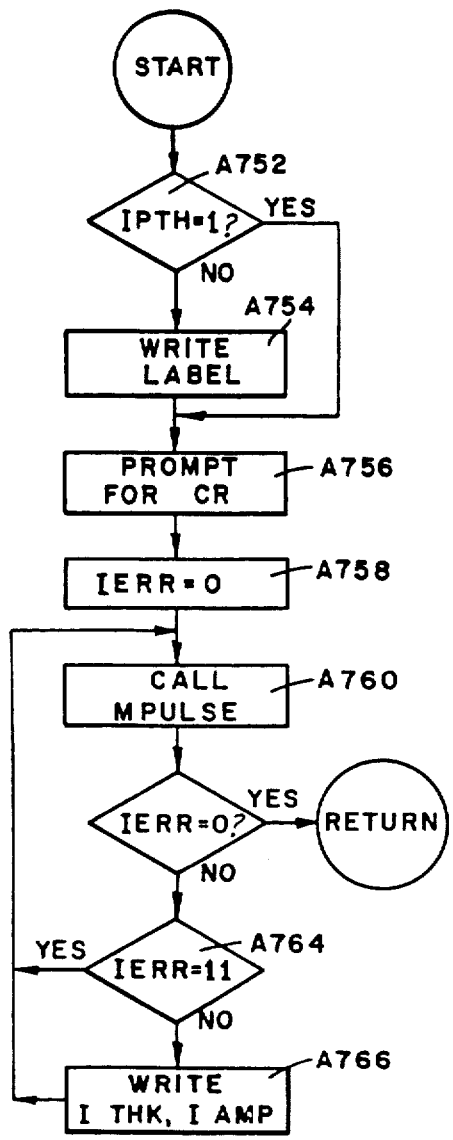
FIG. 20 is a system flowchart of the subroutine PULSE called as option 4 from the menu illustrated in FIG. 12.

The subroutine PULSE will now be more fully described with respect to the system flowchart in FIG. 20. Initially, the program chooses between blocks A754, A756 by testing the variable IPTH to determine whether it is equal to 1 in block A752. If IPTH does not equal 1, then the video monitor is cleared and the label "pulse system" is displayed in block A754. If IPTH is equal to 1, then the screen is not cleared and the operator is prompted with a message on the video display indicating that the system is in an internal pulse mode and he should enter a "CR" for an exit. Thereafter, the error value IERR is set equal to zero in block A758 before calling the subroutine MPULSE in block A760 which commands the ultrasonic circuit to pulse the transducer either at a rate previously set in the header or at a nominal 1 KHz rate.

Upon returning from the subroutine MPULSE the decisional block A762 is entered to determine if the value IERR is equal to zero. If the test is affirmative, then the pulsing routine has not detected an error and the system exits this routine. If a negative answer is given, the program continues in block A764 where the value IERR is tested to determine if it is equal to 11. If the condition is true, the program cycles back to block A760 where the system is again pulsed by calling the subroutine MPULSE. If at block A764 the value IERR is not equal to 11, then an output ITHK, and the amplitude IAMP, of the PULSE is displayed on the video screen in block A766 prior to returning to block A760. This gives the operator an option to display data points as they are being read and to determine why the system is not operating properly. To exit the pulse mode, the operator enters a carriage return, which produces an exit to the main command mode routine.

While a preferred embodiment of the invention has been illustrated, it will be obvious to those skilled in the art that various modifications and changes may be made thereto without departing from the spirit and scope of the invention as defined in the appended claims.

```
A644           0230  *
A644 CD 7C A8  0240  PRESCAN   CALL   REZO        ;set 0-0 point & load scanner scale factors
A647 CD 14 0C  0250            CALL   SCANMD      ;put system display into scan mode
A64A CD 57 B9  0260            CALL   AREA2       ;clear screen & draw scan area
A64D 21 00 00  0270            LXI    H,0         ;set previous location scan cursor
A650 22 0F DB  0280            SHLD   SAVEREF     ;for 1st pass
A653 3A 25 B0  0290            LDA    RECCOLR
A656 32 27 B0  0300            STA    PXLCOLR     ;set color for 1st pass
A659 2A 20 B0  0310            LHLD   FDELAY
A65C 7D        0320            MOV    A,L
A65D 2F        0330            CMA
A65E 6F        0340            MOV    L,A
A65F 7C        0350            MOV    A,H
A660 2F        0360            CMA
A661 67        0370            MOV    H,A
A662 23        0380            INX    H           ;compliment plus 1
A663 22 20 B0  0390            SHLD   FDELAY
A666 .         0400  *
A666 CD 14 BC  0410  PRESCAN1  CALL   SCANMD      ;put display into scan mode
A669 CD 72 A6  0420            CALL   SCAN        ;start scanning
A66C 06 00     0430            MVI    B,000
A66E CD 91 A3  0440            CALL   VOROT       ;CODE TO CLEAR SCREEN (CAT-100 IN TEXT MODE)
A671 C9        0450            RET
A672 .         0460  *
A672           0470  * This code controls scanning
A672           0480  *
A672 21 84 B1  0490  SCAN      LXI    H,LDATA     ;LOCATION OF LOCAL DATA SWITCHES,
A675 06 20     0500            MVI    B,20H       ;FLAGS AND COUNTERS 32 OF
A677 36 00     0510  LOOP1     MVI    M,0         ;WRITE ALL ZEROES OUT
A679 23        0520            INX    H
A67A 05        0530            DCR    B
A67B C2 77 A6  0540            JNZ    LOOP1       ;NOT ZERO REPEAT LOOP1
A67E           0550  *
A67E           0560  * Start of scan loop
A67E           0570  *
A67E AF        0580  LOCA      XRA    A           ;quick check for input
```

```
A65F D1 CD    0590                  OUT   SERISTAT    ;send to chip
A601 DB C5    0600                  IN    SERISTAT    ;get status
A603 E6 01    0610                  ANI   1
A605 CA CB A6 0620                  JZ    NOIN        ;bit zero is data ready
A608          0630 *
A608 0E 06    0640 LOCA1            MVI   C,6         ;Direct I/O
A60A 1E FF    0650                  MVI   E,0FFH      ;Flag for input
A60C CD 05 00 0660                  CALL  BDOS
A60F A7       0670                  ANA   A           ;If a=0 no input
A610 CA CB A6 0680                  JZ    NOIN
A613 E6 DF    0690                  ANI   0DFH        ;convert lower to upper case
A615 FE 4D    0700                  CPI   'M'         ;IF "M" TOGGLE BIT 0 OF MESPRINT
A617 C2 B1 A6 0710                  JNZ   LOCA2       ;CHECK FOR "E"
A61A 3A 0D D0 0720                  LDA   MESPRINT    ;MESSAGE OUTPUT FLAG WORD
A61D EE 01    0730                  XRI   1           ;TOGGLE BIT 0
A61F 32 0D D0 0740                  STA   MESPRINT    ;SAVE NEW FLAG WORD
A622 11 23 A9 0750                  LXI   D,M50       ;on - message
A625 CA AB A6 0760                  JZ    LOCA1A
A628 11 26 A9 0770                  LXI   D,M51       ;off
A62B CD 1C A9 0780 LOCA1A           CALL  TERMIERRI   ;output toggle position
A62E C3 7E A6 0790                  JMP   LOCA
A631          0800 *
A631 FE 44    0810 LOCA2            CPI   'D'
A633 C2 BD A6 0820                  JNZ   LOCA3
A636 CD 3B DC 0830                  CALL  TEXTMD      ;Sscan complete - reset system for text display
A639 CD EA D0 0840                  CALL  INITS1      ;restore original memory map
A63C C9       0850                  RET
A63D          0860 *
A63D FE 03    0870 LOCA3            CPI   03H         ;CHECK FOR CNTL-C =ESCAPE TO EXEC. ;CHECK FOR E = ESCAPE BACK TO BASIC EX
EC
A63F C2 88 A6 0880                  JNZ   LOCA1       ;NOT AN E  DISREGARD INPUT
A642          0890 *
A642 CD 3B DC 0900                  CALL  TEXTMD      ;SWITCH TO TEXT SCREEN
A645 CD EA D0 0910                  CALL  INITS1      ;RESELECT ON BOARD MEMORY
A648 C3 00 00 0920                  JMP   CPMBOOT     ;warm start - to cmd. list
A64B          0930 *
A64B          0940 *
A64B          0950 *
A64B CD 5C BB 0960 NOIN             CALL  PULSEMTEK   ;pulse metrotek
A64E          0970 *
A64E          0980 *
A64E          0990 *  read scanner position
A64E          1000 *
A64E 3A 09 D0 1010 READX            LDA   XSTAPORT    ;X STATUS PORT
A651 21 B4 B1 1020                  LXI   H,NEWX      ;LOCATION FOR NEW X DATA
A654 CD 5E B1 1030                  CALL  RDXY        ;READ NEW X
A657 21 B6 BA 1040                  LXI   H,XSGNORG   ;POINTER TO DATA TO COMPUTE X-COORD OF CURSOR ON SCREEN
A65A D2 FB A6 1050                  JNC   READX1      ;SCANNER IN LIMITS, CONTINUE
A65D 3A A6 B1 1060                  LDA   LIMITTEST
A660 E6 7F    1070                  ANI   7FH         ;RESET MSB, X AXIS OUT OF LIMITS
A662 32 A6 B1 1080                  STA   LIMITTEST
A665 79       1090                  MOV   A,C         ;GET SCANNER X AXIS STATUS WORD
A666 E6 40    1100                  ANI   40H         ;LOOK AT BIT 6 FOR OVER OR UNDER FLOW
A668 7E       1110                  MOV   A,M
A669 23       1120                  INX   H
A66A C2 F5 A6 1130                  JNZ   READX2      ;OVERFLOW
A66D 23       1140                  INX   H           ;SCANNER LESS THAN X-ORIGIN (UNDERFLOW)
A66E 96       1150                  SUB   M           ;MOVE CURSOR BACK FROM SCAN AREA
A66F 32 9F B1 1160                  STA   MODX        ;STORE CURSOR LOCATION
ADDR B1 B2 B3 B4 LINE LABEL         OPCD  OPERAND
A672 C3 19 A7 1170                  JMP   READY       ;GO CHECK Y
A675 86       1180 READX2           ADD   M           ;X-AXIS LENGTH
A676 23       1190                  INX   H
A677 86       1200                  ADD   M           ;MOVE CURSOR PAST END OF SCAN AREA
A678 32 9F B1 1210                  STA   MODX        ;STORE CURSOR X-COORD
A67B C3 19 A7 1220                  JMP   READY
A67E CA 0A A7 1230 READX1           JZ    READX3      ;0, NO ERROR GO TO READ Y
A781          1240 *
A781          1250 *  scanner error - no data from 8741's
A781          1260 *
A781 11 2A A9 1270 ERR1             LXI   D,M60       ;SCANNER ERROR MESSAGE ADDRESS
A784 CD 1C A9 1280                  CALL  TERMIERR
A787 C3 7E A6 1290                  JMP   LOCA        ;START AGAIN
A78A          1300 *
A78A 3A 8A B1 1310 READX3           LDA   NEWX        ;GET GOOD NEW X AND
A78D 86       1320                  ADD   M           ;ADD X-COORD OF START OF AREA SCAN ON SCREEN
A78E 32 9F B1 1330                  STA   MODX        ;MOVE IT TO MODIFIED X
A711 3A A6 B1 1340                  LDA   LIMITTEST
A714 F6 80    1350                  ORI   80H         ;MAKE SURE NO X AXIS LIMIT ERROR
A716 32 A6 B1 1360                  STA   LIMITTEST
A719 3A 0A D0 1370 READY            LDA   YSTAPORT    ;Y STATUS PORT
A71C 21 8D B1 1380                  LXI   H,NEWY      ;LOCATION FOR NEW Y DATA
A71F CD 5E B1 1390                  CALL  RDXY        ;READ NEW Y
A722 21 D9 BA 1400                  LXI   H,YSGNORG   ;POINTER TO DATA NEEDED TO COMPUTE Y-COORD OF CURSOR ON SCREEN
A725 D2 49 A7 1410                  JNC   READY1      ;SCANNER IN LIMITS, CONTINUE
A728 3A A6 B1 1420                  LDA   LIMITTEST
A72B E6 FE    1430                  ANI   0FEH        ;RESET LSB, Y AXIS OUT OF LIMITS
A72D 32 A6 B1 1440                  STA   LIMITTEST
A730 79       1450                  MOV   A,C         ;GET SCANNER Y AXIS STATUS WORD
A731 E6 40    1460                  ANI   40H         ;LOOK AT BIT 6 FOR OVER OR UNDER FLOW
A733 7E       1470                  MOV   A,M         ;Y-COORD OF START OF SCAN AREA ON SCEEN
A734 23       1480                  INX   H
A735 C2 40 A7 1490                  JNZ   READY2      ;OVERFLOW
A738 23       1500                  INX   H           ;UNDERFLOW MOVE TO DIST. OFF SCAN AREA
A739 96       1510                  SUB   M           ;BACK CURSOR OFF SCAN AREA
A73A 32 A0 B1 1520                  STA   MODY        ;STORE FOR DISPLAY PROG.
A73D C3 5B A7 1530                  JMP   READY3
A740 86       1540 READY2           ADD   M           ;LENGTH OF Y-AXIS
A741 23       1550                  INX   H           ;DIST. OFF SCAN AREA
A742 86       1560                  ADD   M           ;MOVE PAST END OF SCAN AREA
A743 32 A0 B1 1570                  STA   MODY        ;TO MODIFIED Y
A746 C3 5B A7 1580                  JMP   READY3
A749 C2 01 A7 1590 READY1           JNZ   ERR1        ;NOT ZERO GO TO ERROR OUTPUT
A74C 3A 8B B1 1600                  LDA   NEWY        ;GET GOOD NEW Y AND
A74F 86       1610                  ADD   M           ;ADD Y-ORIGIN OF SCAN AREA
A750 32 A0 B1 1620                  STA   MODY        ;MOVE IT TO MODIFIED Y
A753 3A A6 B1 1630                  LDA   LIMITTEST
A756 F6 01    1640                  ORI   1           ;MAKE SURE NO Y AXIS LIMIT ERROR
A758 32 A6 B1 1650                  STA   LIMITTEST
A75B 3A A6 B1 1660 READY3           LDA   LIMITTEST
A75E E6 81    1670                  ANI   81H         ;LOOK AT LSB AND MSB
```

```
A760 EE B1      1690            XRI     SUH
A762 CA 65 A7   1700            JZ      XCHANGE         ;NO SCANNER LIMIT ERRORS, CONTINUE
A765 C3 21 A9   1710            JMP     ASDIS           ;GO TO DISPLAY
A768            1710 *
A768            1720 * Check if scanner position has changed.
A768            1730 *
A768 2A 89 B1   1740 XCHANGE    LHLD    OLDX            ;previous x-y coord.
A76B E0         1750            XCHG
A76C 2A 8A B1   1760            LHLD    NEWX            ;present x-y coord
A76F 7D         1770            MOV     A,E             ;x coord
A770 BD         1780            CMP     L               ;compare to present
A771 C2 79 A7   1790            JNZ     UPDY            ;update if different
A774 7A         1800            MOV     A,D             ;old y coord
A775 BC         1810            CMP     H               ;new y coord
A776 CA 85 A7   1820            JZ      LOCE            ;coord same
A779            1830 *
A779 22 89 B1   1840 UPDY       SHLD    OLDX            ;save present coord. for next pass
A77C            1850 *
A77C            1860 *      INITIALIZE FOR NEW X Y POSITION
A77C            1870 *
A77C 21 8C B1   1880            LXI     H,PASS          ;LOCATION OF PASS
A77F AF         1890            XRA     A               ;ZERO A
A780 77         1900            MOV     M,A             ;PASS=0
A781 23         1910            INX     H               ;LOCATION OF TSUM
A782 77         1920            MOV     M,A             ;TSUM=0
A783 23         1930            INX     H               ;LOCATION OF TSSUM
A784 77         1940            MOV     M,A             ;TSSUM=0
A785            1950 *
A785            1960 * check amplitude and depth
A785            1970 *
A785 3E 47      1980 LOCE       MVI     A,47H           ;COMMAND METROTEK AMPLITUDE READ
A787 D3 48      1990            OUT     SWPORT1         ;OUTPUT COMMAND
A789 CD A3 A8   2000            CALL    CKDAV           ;CHECK DATA AVAILABLE
A78C B7         2010            ORA     A               ;TEST A FOR NON-ZERO VALUE
A78D C2 7E A6   2020            JNZ     LOCA            ;START AGAIN IF ERROR
A790 DB 4A      2030            IN      SWPORT3         ;READ IN AMPLITUDE DATA
A792 21 90 B1   2040            LXI     H,DTAMP         ;LOCATION TO SAVE AMPLITUDE DATA
A795 77         2050            MOV     M,A             ;STORE AMPLITUDE
A796 E6 80      2060            ANI     80H             ;CHECK THRESHOLD EXCEEDED
A798 21 92 B1   2070            LXI     H,SUM1          ;LOCATION OF THRESHOLD NOT EXCEEDED COUNTER
A79B CA C0 A7   2080            JZ      LOCF            ;=0 THRESHOLD EXCEEDED GOOD
A79E            2090 *
A79E            2100 *      BAD AMPLITUDE
A79E            2110 *
A79E 34         2120            INR     M               ;SUM1=SUM1+1
A79F 3E 14      2130            MVI     A,14H           ;CHECK LIMIT OF 20
A7A1 96         2140            SUB     M
A7A2 C2 7E A6   2150            JNZ     LOCA            ;GO BACK TO BEGINNING
A7A5 36 00      2160            MVI     M,0             ;zero bad amplitude counter
A7A7 CD 59 A8   2170            CALL    PRETEST         ;SEE IF THRESHOLD ERROR IS CAUSED BY SWITCH ERRORS
A7AA CA B0 A7   2180            JZ      LOCE1           ;THRESHOLD ERROR
A7AD C3 44 A8   2190            JMP     PASSS1          ;SWITCH ERROR
A7B0 11 40 A9   2200 LOCE1      LXI     D,M72           ;THRESHOLD NOT EXCEEDED MESSAGE
A7B3 CD 16 A9   2210            CALL    TERMEER         ;PRINT ERROR MESSAGE
A7B6 2A 8A B1   2220            LHLD    NEWX            ;present x-y location
A7B9 CD 98 B9   2230            CALL    SLGP1           ;get old depth data
A7BC 50         2240            MOV     D,B             ;move depth for asdis
A7BD C3 21 A8   2250            JMP     ASDIS           ;display cursor position
A7C0            2260 *
A7C0            2270 *      GOOD AMPLITUDE
A7C0            2280 *
A7C0 77         2290 LOCF       MOV     M,A             ;SUM1=0
A7C1            2300 *
A7C1            2310 * Read high 8 mid thicknesses for 4 pulses
A7C1            2320 *
A7C1 3E 48      2330            MVI     A,48H           ;COMMAND TO READ HI ORDER THICKNESS
A7C3 D3 48      2340            OUT     SWPORT1         ;OUTPUT COMMAND
A7C5 CD A3 A8   2350            CALL    CKDAV           ;CHECK DATA AVAILABLE
A7C8 B7         2360            ORA     A               ;TEST A FOR NON-ZERO VALUE
A7C9 C2 7E A6   2370            JNZ     LOCA            ;START AGAIN IF ERROR
A7CC DB 4A      2380            IN      SWPORT3         ;READ IN HI ORDER THICKNESS
A7CE E6 0F      2390            ANI     0FH             ;MASK OFF TOP 4 BITS  ALWAYS SET
A7D0 57         2400            MOV     D,A             ;high thk byte
A7D1 3E 49      2410            MVI     A,49H           ;COMMAND TO READ MID ORDER THICKNESS
A7D3 D3 48      2420            OUT     SWPORT1         ;OUTPUT COMMAND
A7D5 CD A3 A8   2430            CALL    CKDAV           ;CHECK DATA AVAILABLE
A7D8 B7         2440            ORA     A               ;TEST A FOR NON-ZERO VALUE
A7D9 C2 7E A6   2450            JNZ     LOCA            ;START AGAIN IF ERROR
A7DC DB 4A      2460            IN      SWPORT3         ;READ IN MID ORDER THICKNESS
A7DE 5F         2470            MOV     E,A             ;mid thk byte
A7DF 2A 8D B1   2480            LHLD    TSUM            ;sum of pulses
A7E2 19         2490            DAD     D               ;add latest pulse to others
A7E3 22 8D B1   2500            SHLD    TSUM            ;store sum
A7E6 21 8C B1   2510            LXI     H,PASS          ;LOCATION OF PASS COUNTER
A7E9 34         2520            INR     M               ;PASS = PASS + 1
A7EA 7E         2530            MOV     A,M             ;PASS INTO A
A7EB D3 49      2540            OUT     STROBEPORT      ;pass number to strobe port
A7ED FE 04      2550            CPI     4               ;check if pass 4
A7EF C2 44 A8   2560            JNZ     PASS3           ;If not check switches
A7F2            2570 *
A7F2            2580 * Pass 4 - get average of thk. & display to screen
A7F2            2590 *
A7F2 2A 8D B1   2600 PASS4      LHLD    TSUM            ;sum of pulses
A7F5 7C         2610            MOV     A,H             ;divide by 4
A7F6 1F         2620            RAR
A7F7 67         2630            MOV     H,A
A7F8 7D         2640            MOV     A,L
A7F9 1F         2650            RAR
A7FA 6F         2660            MOV     L,A
A7FB 7C         2670            MOV     A,H
A7FC 1F         2680            RAR
A7FD 57         2690            MOV     D,A             ;ave. thk. to DE
A7FE 7D         2700            MOV     A,L
A7FF 1F         2710            RAR
A800 CE 00      2720            ACI     0               ;round off value
A802 5F         2730            MOV     E,A
A803 7A         2740            MOV     A,D             ;clear upper nibble
A804 CE 00      2750            ACI     0               ;round high byte if needed
A806 E6 0F      2760            ANI     0FH
A808 57         2770            MOV     D,A             ;now DE = average thickness
A809            2780 *
A809 2A 20 B0   2790            LHLD    PDELAY          ;subtract delay
A80C 19         2800            DAD     D
A80D 7C         2810            MOV     A,H             ;high byte should be zero
A80E A7         2820            ANA     A
```

```
A80F C2 34 A8    2880            JNZ     LOCG            ;high byte not zero - thk. error
A812             2890    *
A812 B5          2900            ORA     L               ;see if low byte zero
A813 CA 34 A8    2920            JZ      LOCG            ;if zero - thk. error
A816             2930    *
A816             2880    * Thickness good - continue
A816             2890    *
A816 55          2900            MOV     D,L             ;thickness
A817 3A 96 B1    2910            LDA     DTAMP           ;AMPLITUDE FOR OUTPUT
A81A 5F          2920            MOV     E,A             ;SAVE IN E
A81B 2A 8A B1    2930            LHLD    NEWX            ;location of scan cell
A81E CD 63 B0    2940            CALL    SLCT2           ;GET OLD THICKNESS  STORE NEW THICKNESS AND AMPLITUDE
A821             2950    *
A821 CD 54 B0    2960  ASDIS     CALL    DISPAREA        ;GO TO DISPLAY AREA SCANNED
A824             2970    *
A824 3E 05       2980            MVI     A,5             ;5 to strobe port
A826 D3 46       2990            OUT     STROBEPORT
A828             3000    *
A828 21 BC B1    3010  P4INIT    LXI     H,PASS          ;Initialize for new scan cell
A82B AF          3020            XRA     A               ;ZERO A
A82C 77          3030            MOV     M,A             ;PASS=3
A82D 23          3040            INX     H               ;
A82E 77          3050            MOV     M,A             ;TSUM=0
A82F 23          3060            INX     H               ;
A830 77          3070            MOV     M,A             ;TSSUM=0
A831             3080    *
A831 C3 7E A6    3090            JMP     LOCA            ;GO BACK TO BEGINNING
A834             3100    *
A834             3110    *
A834 11 52 A9    3120  LOCG      LXI     D,M73           ;thk. error
A837 CD 16 A9    3130            CALL    TERMIERR
A83A 2A 8A B1    3140            LHLD    NEWX            ;x-y coord
A83D CD 9B B0    3150            CALL    SLCT1           ;get previous depth
A840 50          3160            MOV     D,B
A841 C3 21 A8    3170            JMP     ASDIS           ;display cursor
A844             3180    *
A844             3190    *
A844 CD 59 A8    3200  PASS3     CALL    PRETEST         ;check metrotek switches.
A847 CA 7E A6    3210            JZ      LOCA            ;NO SWITCH ERRORS, TRY PASS 4
A84A 11 5C A9    3220  PASS31    LXI     D,M74           ;SWITCH POSITION ERROR MESSAGE ADDRESS
A84D CD 16 A9    3230            CALL    TERMIERR
A850 CD 40 B0    3240            CALL    TESTSW          ;test & output switch errors
A853 CD 14 BC    3250            CALL    SCANMD          ;put display into scan mode
A856 C3 2B A8    3260            JMP     P4INIT          ;reset pass before restart
A859             3270    *
A859 21 94 B1    3280  PRETEST   LXI     H,SWL1          ;address of array for switch readings
A85C CD 71 A8    3290            CALL    MSWREAD         ;load current switch positions
A85F 06 0B       3300            MVI     B,11            ;NUMBER OF WORDS TO TEST
A861 11 10 B0    3310            LXI     D,ISWL1         ;BASELINE SWITCH POSITIONS
A864 21 94 B1    3320            LXI     H,SWL1          ;CURRENT SWITCH POSITIONS
A867 1A          3330  PRETEST2  LDAX    D               ;LOAD A WITH BASELINE WORD
A868 BE          3340            CMP     M               ;COMPARE CURRENT SETTING
A869 C0          3350            RNZ                     ;ERROR
A86A 13          3360            INX     D               ;NEXT BASELINE WORD
A86B 23          3370            INX     H               ;NEXT CURRENT WORD
A86C 05          3380            DCR     B               ;TEST NUMBER OF
A86D C2 67 A8    3390            JNZ     PRETEST2        ;WORDS CHECKED
A870 C9          3400            RET                     ;IF RETURN FROM HERE, NO ERROR
A871             3410    *
A871             3420    *
A871             3430    * Load current MTEK switch positions into array pointed to by HL regs.
A871             3440    *
A871 00          3450  MSWREAD   NOP
A872 3E 10       3460            MVI     A,10H           ;PULSER WORD 0 COMMAND
A873 D3 49       3470            OUT     SWPORT1         ;OUTPUT COMMAND TO METROTEK
A876 00          3480            NOP                     ;DELAY
A877 DB 4A       3490            IN      SWPORT3         ;READ SWITCH POSITIONS
A879 77          3500            MOV     M,A             ;STORE IN MEMORY
A87A 3E 11       3510            MVI     A,11H           ;PULSER WORD 1 COMMAND
A87C D3 48       3520            OUT     SWPORT1
A87E 23          3530            INX     H               ;NEXT LIST STORAGE ADDRESS
A87F DB 4A       3540            IN      SWPORT3
A881 77          3550            MOV     M,A
A882 3E 20       3560            MVI     A,20H           ;RECEIVER WORD 0 COMMAND
A884 D3 48       3570            OUT     SWPORT1
A886 23          3580            INX     H
A887 DB 4A       3590            IN      SWPORT3
A889 77          3600            MOV     M,A
A88A 3E 21       3610            MVI     A,21H           ;RECEIVER WORD 1 COMMAND
A88C D3 48       3620            OUT     SWPORT1
A88E 23          3630            INX     H
A88F DB 4A       3640            IN      SWPORT3
A891 77          3650            MOV     M,A
A892             3660    *
A892             3670  *MSWRD2 NOP  ;read gate
A892 06 07       3680            MVI     B,7             ;SET LOOP FOR 7 PASSES
A894 0E 40       3690            MVI     C,40H           ;INITIAL COMMAND FOR GATE IN C
A896 79          3700  LOOPM     MOV     A,C             ;MOVE COMMAND TO A
A897 D3 48       3710            OUT     SWPORT1         ;OUTPUT TO METROTEK
A899 23          3720            INX     H               ;ADJUST LOCATION
A89A 0C          3730            INR     C               ;GET NEXT COMMAND
A89B DB 4A       3740            IN      SWPORT3         ;INPUT POSITION DATA
A89D 77          3750            MOV     M,A             ;SAVE IN LIST
A89E 05          3760            DCR     B               ;DECREMENT COUNT
A89F C2 96 A8    3770            JNZ     LOOPM           ;NOT ZERO REPEAT LOOPM
A8A2 C9          3780            RET                     ;ZERO RETURN TO CALLING ROUTINE
A8A3             3790    *
A8A3             3800    *
A8A3             3810    *
A8A3 DB 4C       3820  CKDAV     IN      SWPORT4         ;INPUT STATUS WORD
A8A5 E6 01       3830            ANI     DAVBIT          ;MASK OFF ALL EXCEPT DAV BIT
A8A7 21 91 B1    3840            LXI     H,SUM           ;LOCATION OF DATA NOT AVAILABLE COUNTER
A8AA C2 C6 A8    3850            JNZ     DAV             ;GOOD DAV READY
A8AD 34          3860            INR     M               ;SUM=SUM+1
A8AE 7E          3870            MOV     A,M             ;SUM INTO A
A8AF D6 05       3880            SUI     5               ;CHECK TO SEE IF SUM=5 LIMIT
A8B1 C2 A3 A8    3890            JNZ     CKDAV           ;LIMIT NOT REACHED TRY AGAIN
A8B4 CD 59 A8    3900            CALL    PRETEST         ;TEST FOR SWITCH ERROR
A8B7 CA B0 A8    3910            JZ      CKDAV1          ;NOT A SWITCH ERROR
A8BA C3 4A A8    3920            JMP     PASS31          ;SWITCH ERROR
A8BD 11 40 A9    3930  CKDAV1    LXI     D,M71           ;DAV ERROR MESSAGE ADDRESS
A8C0 CD 16 A9    3940            CALL    TERMIERR
A8C3 3E 71       3950            MVI     A,71H           ;LOAD ERROR CODE AGAIN
A8C5 C9          3960            RET                     ;RETURN TO CALLING ROUTINE
```

```
A806 AF          3970 DAY                XRA    A              ;ZERO OUT A AND FLAGS
A807 77          3980                    MOV    M,A            ;SUM=0
A808 C9          3990                    RET                   ;RETURN TO CALLING ROUTINE
A809             4000 *
A809             4010 *
A809             4020 * Interrupt driven interval timer. Counter at ONEMS is incremented at pre-set
A809             4030 * time intervals.
A809             4040 *
A809 FB          4050 TIMER               EI                   ;enable timer interrupts - starts counter
A80A 3A 22 B9    4060                    LDA    ONEMS          ;time counter
A80D 4F          4070                    MOV    C,A            ;save counter
A80E 3A 22 B9    4080 TIMERLP1           LDA    ONEMS          ;read again
A811 B9          4090                    CMP    C              ;check if counter changed
A812 CA 0E A8    4100                    JZ     TIMERLP1       ;wait till counter changed
A815 C9          4110                    RET
A816             4120 *
A816             4130 *
A816             4140 * Pulse UT until (CR) entered to keyboard
A816             4150 *       arg1 - 16 bit thickness
A816             4160 *       arg2 - 16 bit amplitude
A816             4170 *       arg3 - 8 bit flag
A816             4180 *
A816 CD 71 B8    4190 PRTTHK             CALL   READTHK        ;single reading
A819 E1          4200                    POP    H              ;arg1 - thk
A81A 73          4210                    MOV    M,E
A81B 23          4220                    INX    H
A81C 72          4230                    MOV    M,D            ;thk saved
A81D E1          4240                    POP    H              ;arg2 - amp
A81E 71          4250                    MOV    M,C
A81F 23          4260                    INX    H
A820 70          4270                    MOV    M,B            ;amp saved
A821 E1          4280                    POP    H              ;arg3 - flag
A822 36 01       4290                    MVI    M,1            ;TEMPORARY FOR TESTING
A824 C9          4300                    RET
A825             4310 *
A825 C5          4320 METROPULSE         PUSH   B              ;arg1 - flag
A826 D5          4330                    PUSH   D              ;arg2 - amplitude
A827 E5          4340                    PUSH   H              ;arg3 - thk
A828             4350 *
A828 CD 5C B8    4360 METROPULSE1        CALL   PULSEMTEK      ;pulse mtek
A82B             4370 *
A82B 0E 06       4380 SERSTA             MVI    C,06H          ;check for keyboard input
A82D 1E FF       4390                    MVI    E,0FFH         ;flag for input
A82F CD 05 00    4400                    CALL   BDOS
A832 A7          4410                    ANA    A              ;check for input
A833 CA E8 A8    4420                    JZ     METROPULSE1
A836 FE 0D       4430                    CPI    0DH            ;CHECK FOR "CR"
A838 CA 0A A9    4440                    JZ     METROPULSE2    ;return if 'cr'
A83B FE 03       4450                    CPI    03H            ;check for cntl-c
A83D CA 10 A9    4460                    JZ     METROPULSE3    ;cntl-c - warm boot
A840 E6 DF       4470                    ANI    0DFH           ;convert to upper case
A842 FE 52       4480                    CPI    'R'
A844             4490 * JZ PRTTHK ;R means read thk.
A844 CA E8 A8    4492                    JZ     METROPULSE1
A847 C3 E8 A8    4500                    JMP    METROPULSE1    ;pulse again
A84A             4510 *
A84A E1          4520 METROPULSE2        POP    H              ;strip args
A84B E1          4530                    POP    H
A84C E1          4540                    POP    H              ;flag
A84D 36 00       4550                    MVI    M,0            ;set flag to zero
A84F C9          4560                    RET
A850             4570 *
A850 E1          4580 METROPULSE3        POP    H
A851 E1          4590                    POP    H
A852 E1          4600                    POP    H
A853 C3 00 00    4610                    JMP    CPMBOOT        ;warm start
A856             4620 *
A856 00          4630 TERMERR            NOP
A857 3A 00 B9    4640                    LDA    MESPRINT       ;SET FLAGS
A85A 07          4650                    ORA    A              ;IF 1 DON'T PRINT MESSAGE
A85B C0          4660                    RNZ                   ;GET ADDRESS OF MESSAGE TO BE PRINTED
A85C EB          4670 TERMERR1           XCHG                  ;OUTPUT TO TERMFLEX ONLY
A85D 3E 02       4680                    MVI    A,2
A85F CD 5D A5    4690                    CALL   SYSOUT         ;GO OUTPUT MESSAGE
A862 C9          4700                    RET
A863             4710 *
A863             4720 * Error messages
A863             4730 *
A863 0A          4740 M50                DB     0AH
A864 4F CE       4750                    DTH    'ON'
A866 0A          4760 M51                DB     0AH
A867 4F 46 C6    4770                    DTH    'OFF'
A86A             4780 *
A86A 53 43 41    4790 M60                DTH    'SCANNER ERR'
A86D 4E 4E 45
A870 52 20 45
A873 52 D2
A875             4800 *
A875 53 54 41    4810 M70                DTH    'START PULSE'
A878 52 54 20
A87B 50 55 4C
A87E 53 C5
A880 44 41 54    4820 M71                DTH    'DATA N/A'
A883 41 20 4E
A886 2F C1
A889 0A          4830 M72                DB     0AH
A88A 54 48 52    4840                    DTH    'THRESHOLD'
A88D 45 53 48
A890 4F 4C C4
A893 0A          4850 M73                DB     0AH
A894 54 48 49    4860                    DTH    'THICKNESS'
A897 43 4B 4E
A89A 45 53 D3
A89D 0A          4870 M74                DB     0AH
A89E 55 54 2D    4880                    DTH    'UT-SWITCHES'
A8A0 53 57 49
A8A3 54 43 48
A8A6 45 D3
A8A8             4890 *
SCANNER.S                                SCANNER.S
A8A8             0010 *
A8A8             0020 *
A8A8             0030 * THIS CODE SET UP THE SCANNER X/Y SCALE FACTORS
A8A8             0040 *      AND THE SCAN AREA MULTIPLIER.
```

```
A968                0050 *
A968                0060 *   THERE ARE TWO ENTRY POINTS INTO THIS ROUTINE:
A968                0070 *       SCAL  - FOR SCANNER CALIBRATION
A968                0080 *       REZO  - FOR HOLE CAL & SCAN
A968                0090 *
A968                0100 *
A968                0110 *** THIS PROGRAM LAST MODIFIED ON 3/18/80 BY DEC ***
A968                0120 *   6/17/80 - CTP - ACTIVATE USE OF SCANNER SCALE FACTORS IN HEADER
A968                0130 *   6/18/80 - CTP - IF FROM HCAL USE FLAT BLOCK SCALE FACTORS
A968                0140 *   6/19/80 - CTP - CHANGE S.F. LOW LIMIT FROM 8 TO 16
A968                0150 *   3/17/81 - CTP - SCAN AREA MULTIPLIER FOR EXXON/HOUSTON
A968                0160 *   8/20/82 - CTP - MADE SYS RESET JUMP TO 100H
A968                0170 * 11/29/82 - CTP - FIX ERROR RET FROM LOADSF
A968                0180 * 12/01/82 - CTP - SEPARATE SCANNER CAL FROM SCAN
A968                0190 *                  NOW SCANNER CAL ONLY COMPUTES "LINEAR SCALE FACTORS
A968                0200 *   1/31/83 - CTP - RESET MEMORY MAP ON FATAL ERROR
A968                0210 *   6/16/83 - CTP - track & arm axis for prompts
A968                0220 *   6/27/83 - CTP - reset location counters properly
A968                0230 *   7/13/83 - CTP - Filter lower case
A968                0240 *
A968                0250 *
A968                0260 *
A968 CD 6C A9       0270 SCAL      CALL   SCALE0         ;THIS CALL PUT ALL CALLS AT THE SAME LEVEL
A96B C9             0280           RET                   ; RELATIVE TO FORTRAN.
A96C                0290 *
A96C                0300 *
A96C 3A 0D B0       0310 SCALE0    LDA    ERRORFLAG
A96F E6 0F          0320           ANI    0FH
A971 32 0D B0       0330           STA    ERRORFLAG
A974 D3 41          0340 CALIN     OUT    41H            ;RESET BOTH X & Y 8741'S
A976 DB 4C          0350 CALIN1    IN     SVPORT4
A978 E6 80          0360           ANI    RST41BIT       ;CHECK FOR RESET COMPLETE
A97A CA 76 A9       0370           JZ     CALIN1         ;BIT IS RESET STATUS
A97D                0380 *                                ;WAIT FOR BIT SET TO 1
A97D 3E 11          0390           MVI    A,011H         ; SCAN AREA MULT. OF 1 (2X4 INCHES)
A97F CD E1 AB       0400           CALL   SCALESCAN      ; SET SCAN AREA MULT.
A982 CD F1 AB       0410           CALL   ZERO41         ;zero location counters
A985                0420 *
A985                0430 * CHECK SCANNER SCALE FACTORS FROM HEADER
A985                0440 *
A985 2A 2A B0       0450 HEDSF     LHLD   SCXSF          ; S.F. FROM HEADER
A988 7D             0460           MOV    A,L            ; X-SCALE FACTOR
A989 B7             0470           ORA    A
A98A CA 93 A9       0480           JZ     HEDSF10        ; IF ZERO CHECK Y S.F.
A98D CD 26 AC       0490           CALL   VALIDSF1       ; CHECK IF VALID S.F.
A990 CA F7 A9       0500           JZ     HEDSF50        ; ZERO MEANS INVALID
A993 7C             0510 HEDSF10   MOV    A,H            ; Y-SCALE FACTOR
A994 B7             0520           ORA    A
A995 C2 9F A9       0530           JNZ    HEDSF20
A998 8D             0540           CMP    L              ; Y S.F  ZERO CHECK IF X S.F. ALSO ZERO
A999 CA 00 AA       0550           JZ     REP10          ; BOTH ZERO GET NEW SCALE FACTORS
A99C C3 F7 A9       0560           JMP    HEDSF50        ; X & Y NOT BOTH ZERO
A99F 6C             0570 HEDSF20   MOV    L,H            ; Y-S.F. TO L-REG
A9A0 CD 26 AC       0580           CALL   VALIDSF1       ; CHECK FOR VALID S.F.
A9A3 CA F7 A9       0590           JZ     HEDSF50        ; IN-VALID S.F.
A9A6 3A 2A B0       0600           LDA    SCXSF          ; X-S.F. FROM HEADER
A9A9 B7             0610           ORA    A
A9AA CA F7 A9       0620           JZ     HEDSF50        ; Y-S.F. NOT ZERO IF X=0 INVALID S.F.
A9AD 3A 0D B0       0630 HEDSF30   LDA    ERRORFLAG      ; CHECK IF IN HOLE CAL
A9B0 E6 01          0640           ANI    1              ; LOW BIT SET MEANS FROM H-CAL
A9B2 C2 D0 A9       0650           JNZ    HEDSF40        ; USE STD FLAT BLOCK S.F.
A9B5 21 24 AD       0660           LXI    H,SCM40        ; ASK TO USE HEADER S.F.
A9B8 CD 16 AC       0670           CALL   SCALEOUT
A9BB CD 4B B0       0680           CALL   SYSIN
A9BE FE 01          0690           CPI    1
A9C0 C2 AD A9       0700           JNZ    HEDSF30        ; TOO MANY CHARS
A9C3 7E             0710           MOV    A,M            ; GET INPUT
A9C4 E6 DF          0720           ANI    0DFH           ;convert to upper case
A9C6 FE 4E          0730           CPI    'N'
A9C8 CA 00 AA       0740           JZ     REP10          ; GET NEW S.F. IF N
A9CB FE 59          0750           CPI    'Y'
A9CD C2 AD A9       0760           JNZ    HEDSF30        ; IF NOT Y TRY AGAIN
A9D0                0770 *
A9D0                0780 * LOAD SCALE FACTORS FROM HEADER
A9D0                0790 *
A9D0 2A 2A B0       0800 HEDSF40   LHLD   SCXSF          ; S.F. FROM HEADER
A9D3 22 A1 B1       0810           SHLD   XSF            ; STORE S.F. FOR 8741A
A9D6 3A 09 B0       0820           LDA    XSTAPORT       ; X-AXIS STATUS PORT
A9D9 01 88 84       0830           LXI    B,08488H       ; COMMANDS TO 8741A
A9DC 21 A1 B1       0840           LXI    H,XSF          ; X-SCALE FACTOR
A9DF CD B2 AB       0850           CALL   LOADSF         ; LOAD 8741A X-S.F.
A9E2 C2 34 AC       0860           JNZ    ERR            ; NON-ZERO IS ERROR RETURN
A9E5 3A 0A B0       0870           LDA    YSTAPORT       ; Y-AXIS STATUS PORT
A9E8 01 08 04       0880           LXI    B,0408H        ; 8741A COMMANDS
A9EB 21 A2 B1       0890           LXI    H,YSF          ; ADDRESS OF Y-S.F.
A9EE CD B2 AB       0900           CALL   LOADSF         ; LOAD Y-S.F.
A9F1 C2 34 AC       0910           JNZ    ERR            ; ERROR ON NON-ZERO
A9F4 C3 6F AB       0920           JMP    SCALEND        ;8741A SET
A9F7                0930 *
A9F7 21 54 AD       0940 HEDSF50   LXI    H,SCM45        ; IN-VALID S.F. MESAGE
A9FA CD 16 AC       0950           CALL   SCALEOUT
A9FD C3 00 AA       0960           JMP    REP10          ; GET NEW S.F.
AA00                0970 *
AA00                0980 * ASK TO CAL SCANNER
AA00                0990 *
AA00 21 85 AC       1000 REP10     LXI    H,SCM3         ;LOCATION OF MESSAGE    Scanner calibration (Y or N) ?
AA03 CD 16 AC       1010           CALL   SCALEOUT
AA06 CD 4B B0       1020 REP11     CALL   SYSIN          ;BRING IN ONE ASCII CHARACTER
AA09 FE 01          1030           CPI    1
AA0B C2 00 AA       1040           JNZ    REP10
AA0E 7E             1050           MOV    A,M
AA0F E6 DF          1060           ANI    0DFH           ;convert to upper case
AA11 FE 4E          1070           CPI    'N'
AA13 CA 0F AB       1080           JZ     EXTRN          ;CHECK FOR "N"
AA16 FE 59          1090           CPI    'Y'            ;GO TO EXTERNAL CAL
AA18 C2 00 AA       1100           JNZ    REP10          ;CHECK FOR "Y"
AA1B                1110 *                                ;REPEAT INPUT REQUEST
AA1B                1120 * CAL SCANNER
AA1B                1130 *
AA1B 21 50 AC       1140 SELF0     LXI    H,SCM1
AA1E CD 16 AC       1150           CALL   SCALEOUT       ;Position scanner .... MESSAGE
AA21 CD 4B B0       1160           CALL   SYSIN          ;GET 1 CHAR
AA24 FE 01          1170           CPI    1
AA26 C2 1B AA       1180           JNZ    SELF0
```

```
AA29 7E        1190          MOV    A,M          ;CHAR TO A-REG
AA2A E6 DF     1200          ANI    0DFH         ;convert to upper case
AA2C FE 59     1210          CPI    'Y'          ;IS INPUT A 'Y'
AA2E C2 18 AA  1220          JNZ    SELF0        ;IF NOT READ AGAIN
AA31 CD F1 AD  1230          CALL   ZERO41       ;zero location counters
AA34           1240  *
AA34 21 BE AC  1250          LXI    H,SCM31      ;LOCATION OF MESSAGE  Move scanner in
AA37 CD 16 AC  1260          CALL   SCALEOUT     ;CALL OUTPUT
AA3A 21 AC AC  1270          LXI    H,SCM21
AA3D CD 16 AC  1280          CALL   SCALEOUT
AA40 21 CE AC  1290          LXI    H,SCM35
AA43 3E 01     1300          MVI    A,1
AA45 CD 5B A5  1310          CALL   SYSOUT
AA48 21 F0 AC  1320  SELF1   LXI    H,SCM32
AA4B 3E 01     1330          MVI    A,1
AA4D CD 5B A5  1340          CALL   SYSOUT
AA50 CD 51 B0  1350          CALL   SYSINDEC     ;BRING IN DISTANCE, 1,2,3, or 4
AA53 DA 48 AA  1360          JC     SELF1
AA56 7D        1370          MOV    A,L
AA57 B7        1380          ORA    A
AA58 CA 48 AA  1390          JZ     SELF1
AA5B FE 05     1400          CPI    5
AA5D D2 48 AA  1410          JNC    SELF1
AA60 AF        1420          XRA    A
AA61 C6 32     1430  REP3    ADI    50           ;NUMBER OF 20 mil CELLS/INCH
AA63 2D        1440          DCR    L
AA64 C2 61 AA  1450          JNZ    REP3
AA67 32 A3 B1  1460          STA    XSD
AA6A 21 A3 B1  1470          LXI    H,XSD        ;LOCATION OF X SCALED DISTANCE
AA6D 56        1480          MOV    D,M          ;VALUE OF XSD INTO D
AA6E 3A 09 B0  1490          LDA    XSTAPORT     ;X AXIS STATUS PORT
AA71 0E 90     1500          MVI    C,90H        ;COMMAND X SCALED DISTANCE 8741A READ
AA73 CD 3D B1  1510          CALL   WTXY         ;CALL TO OUTPUT XSD
AA76 B7        1520          ORA    A
AA77 C2 3F AC  1530          JNZ    RESETSYS     ;CODE 60
AA7A 3A 09 B0  1540          LDA    XSTAPORT     ;X AXIS STATUS PORT
AA7D 32 B2 B1  1550          STA    AXISTAOUT+1
AA80 CD 0B B1  1560          CALL   IBFT         ;TEST I/F UNTIL READY
AA83 B7        1570          ORA    A            ;ERROR CODE CHECK
AA84 C2 3F AC  1580          JNZ    RESETSYS     ;OUTPUT ERROR MESSAGE
AA87 3E 84     1590          MVI    A,84H        ;COMMAND 8741A TO PROVIDE XSF
AA89 CD 81 B1  1600          CALL   AXISTAOUT    ;MUST BE IN RAM LOCATIONS
AA8C 3A 09 B0  1610          LDA    XSTAPORT     ;X AXIS STATUS PORT
AA8F 21 A1 B1  1620          LXI    H,XSF        ;ADDRESS OF SCALE FACTOR X
AA92 CD 5E B1  1630          CALL   RDXY         ;READ XSF FROM 8741A
AA95 B7        1640          ORA    A            ;ERROR CODE CHECK
AA96 C2 34 AC  1650          JNZ    ERR          ;OUTPUT ERROR MESSAGE
AA99 6E        1660          MOV    L,M
AA9A CD 26 AC  1670          CALL   VALIDSF1     ;TO VALIDATE XSF
AA9D CA 34 AC  1680          JZ     ERR
AAA0 21 BE AC  1690  YCAL0   LXI    H,SCM31      ;MOVE Y MESSAGE
AAA3 CD 16 AC  1700          CALL   SCALEOUT     ;CALL OUTPUT
AAA6 21 B6 AC  1710          LXI    H,SCM22
AAA9 CD 16 AC  1720          CALL   SCALEOUT
AAAC 21 E1 AC  1730          LXI    H,SCM36
AAAF 3E 01     1740          MVI    A,1
AAB1 CD 5B A5  1750          CALL   SYSOUT
AAB4 21 F0 AC  1760  YCAL3   LXI    H,SCM32
AAB7 3E 01     1770          MVI    A,1
AAB9 CD 5B A5  1780          CALL   SYSOUT
AABC CD 51 B0  1790          CALL   SYSINDEC     ;BRING IN Y DISTANCE 1 OR 2
AABF DA B4 AA  1800          JC     YCAL3
AAC2 7D        1810          MOV    A,L
AAC3 B7        1820          ORA    A
AAC4 CA B4 AA  1830          JZ     YCAL3
AAC7 FE 03     1840          CPI    3
AAC9 D2 B4 AA  1850          JNC    YCAL3
AACC AF        1860          XRA    A
AACD C6 32     1870  YCAL2   ADI    50
AACF 2D        1880          DCR    L
AAD0 C2 CD AA  1890          JNZ    YCAL2
AAD3 32 A4 B1  1900  YCAL1   STA    YSD
AAD6 21 A4 B1  1910          LXI    H,YSD        ;LOCATION OF Y SCALED DISTANCE
AAD9 56        1920          MOV    D,M          ;VALUE OF YSD INTO D
AADA 3A 0A B0  1930          LDA    YSTAPORT     ;Y AXIS STATUS PORT
AADD 0E 10     1940          MVI    C,10H        ;COMMAND Y SCALED DISTANCE 8741A READ
AADF CD 3D B1  1950          CALL   WTXY         ;CALL TO OUTPUT YSD TO 8741A
AAE2 B7        1960          ORA    A
AAE3 C2 3F AC  1970          JNZ    RESETSYS     ;CODE 60
AAE6 3A 0A B0  1980          LDA    YSTAPORT     ;Y AXIS STATUS PORT
AAE9 32 B2 B1  1990          STA    AXISTAOUT+1
AAEC CD 0B B1  2000          CALL   IBFT         ;TEST IBF UNTIL READY
AAEF B7        2010          ORA    A            ;ERROR CODE CHECK
AAF0 C2 3F AC  2020          JNZ    RESETSYS     ;OUTPUT ERROR MESSAGE
AAF3 3E 04     2030          MVI    A,4          ;COMMAND 8741A TO PROVIDE YSF
AAF5 CD 81 B1  2040          CALL   AXISTAOUT    ;MUST BE IN RAM LOCATIONS
AAF8 3A 0A B0  2050          LDA    YSTAPORT     ;Y AXIS STATUS PORT
AAFB 21 A2 B1  2060          LXI    H,YSF        ;ADDRESS OF SCALE FACTOR Y
AAFE CD 5E B1  2070          CALL   RDXY         ;READ YSF FROM 8741A
AB01 B7        2080          ORA    A            ;ERROR CODE CHECK
AB02 C2 34 AC  2090          JNZ    ERR          ;OUTPUT ERROR MESSAGE
AB05 6E        2100          MOV    L,M
AB06 CD 26 AC  2110          CALL   VALIDSF1     ;TO VALIDATE YSF
AB09 C2 6F AB  2120          JNZ    SCALEND      ;NO ERROR CLEAN UP FOR RETURN
AB0C C3 34 AC  2130          JMP    ERR
AB0F          2140  *
AB0F          2150  *    ENTER SCANNER SCALE FACTORS
AB0F          2160  *
AB0F 21 06 AD 2170  EXTRN   LXI    H,SCM33      ;EXTERNAL CAL MESSAGE
AB12 CD 16 AC  2180          CALL   SCALEOUT     ;CALL OUTPUT
AB15 21 AC AC  2190          LXI    H,SCM21
AB18 CD 16 AC  2200          CALL   SCALEOUT
AB1B 21 0G AD  2210          LXI    H,SCM34
AB1E 3E 01     2220          MVI    A,1
AB20 CD 5B A5  2230          CALL   SYSOUT
AB23 CD 51 B0  2240          CALL   SYSINDEC     ;BRING IN X SCALE FACTOR
AB26 DA 0F AB  2250          JC     EXTRN
AB29 CD 21 AC  2260          CALL   VALIDSF0
AB2C CA 0F AB  2270          JZ     EXTRN
AB2F 01 88 84  2280          LXI    B,8488H      ; COMMANDS FOR 8741A
AB32 21 A1 B1  2290          LXI    H,XSF        ; ADDRESS OF X-SCALE FACTOR
AB35 77        2300          MOV    M,A          ; SAVE S.F.
AB36 3A 09 B0  2310          LDA    XSTAPORT     ; X-AXIS STATUS PORT
AB39 CD 82 AB  2320          CALL   LOADSF       ; LOAD SCALE FACTOR TO 8741
```

```
AB1C C2 34 AC    2330         JNZ    ERR         ; ZERO FLAG CLEARED ON ERROR RETURN
AB3F 21 06 AD    2340 YTEST   LXI    H,SCMG3     ;YSF MESSAGE
AB42 CD 16 AC    2350         CALL   SCALEOUT    ;CALL OUTPUT
AB45 21 B6 AC    2360         LXI    H,SCM23
AB48 CD 16 AC    2370         CALL   SCALEOUT
AB4B 21 0C AD    2380         LXI    H,SCMG4
AB4E 3E 01       2390         MVI    A,1
AB50 CD 5B A5    2400         CALL   SYSOUT
AB53 CD 51 B0    2410         CALL   SYSINDEC    ;BRING IN Y SCALE FACTOR
AB56 DA 3F AB    2420         JC     YTEST
AB59 CD 21 AC    2430         CALL   VALIDSF0
AB5C CA 3F AB    2440         JZ     YTEST
AB5F 01 08 04    2450         LXI    B,0408H     ; COMMANDS FOR 8741A
AB62 21 A2 B1    2460         LXI    H,YSF       ; ADDRESS OF Y-S.F.
AB65 77          2470         MOV    M,A         ; SAVE Y-S.F.
AB66 3A 0A B0    2480         LDA    YSTAPORT    ; Y-AXIS STATUS PORT
AB69 CD B2 AB    2490         CALL   LOADSF      ; LOAD 8741A
AB6C C2 34 AC    2500         JNZ    ERR         ; ZERO FLAG CLEARED ON RETURN ERROR
AB6F             2510 *
AB6F 3A 00 B0    2520 SCALEND LDA    ERRORFLAG   ;FROM HCAL OR SCAN?
AB72 E6 01       2530         ANI    1
AB74 C0          2540         RNZ                ;LOW BIT MEANS YES - RETURN
AB75 2A A1 B1    2550         LHLD   XSF         ;SCALE FACTORS FROM CALIBRATION
AB78 22 2A B0    2560         SHLD   SCXSF       ;SAVE FOR HEADER
AB7B C9          2570         RET
AB7C             2580 *
AB7C             2590 * SET SCAN START POINT.
AB7C             2600 * INITIALIZE 8741'S, LOAD ADJUSTED SCALE FACTORS & SWAP AXIS IF REQUESTED.
AB7C             2610 *      USE LOW BIT IN ERROR FLAG.
AB7C             2620 *
AB7C 21 83 AD    2630 REZ0    LXI    H,SCM7      ;SET SCANNER TO ORIGIN MSG
AB7F CD 16 AC    2640         CALL   SCALEOUT
AB82 CD 4E B9    2650         CALL   SYSIN
AB85 FE 01       2660         CPI    1
AB87 7E          2670         MOV    A,M
AB88 E6 DF       2680         ANI    0DFH        ;convert to upper case
AB8A FE 59       2690         CPI    'Y'
AB8C C2 7C AB    2700         JNZ    REZ0        ;IF NOT 'Y' TRY AGAIN
AB8F             2710 *
AB8F 3A 00 B0    2720         LDA    ERRORFLAG   ; SEE IF FROM HCAL
AB92 E6 01       2730         ANI    1
AB94 CA 9F AB    2740         JZ     REZ01       ;FROM SCAN
AB97 CD 74 A9    2750         CALL   CALIN       ;SETUP 8741A'S FOR HCAL
AB9A 3E 11       2760         MVI    A,011H      ;AREA FACTOR OF 1 FOR HCAL
AB9C C3 AE AB    2770         JMP    REZ02
AB9F 3E 01       2780 REZ01   MVI    A,1         ;SET ERRORFLAG TO 1
ABA1 32 00 B0    2790         STA    ERRORFLAG
ABA4 CD 74 A9    2800         CALL   CALIN       ;SETUP 8741A'S FOR SCAN
ABA7 AF          2810         XRA    A           ;ZERO A-REG
ABA8 32 00 B0    2820         STA    ERRORFLAG   ;CLEAR ERRORFLAG
ABAB 3A 2C B0    2830         LDA    SCASF       ; SCAN AREA MULT. FROM HEADER
ABAE CD E1 AB    2840 REZ02   CALL   SCALESCAN   ; SET SCAN AREA MULT.
ABB1 C9          2850         RET                ;BACK TO EXEC
ABB2             2860 *
ABB2             2870 *
ABB2             2880 *
ABB2             2890 *
ABB2             2900 *************************************************
ABB2             2910 *
ABB2             2920 *                  LOADSF
ABB2             2930 *
ABB2             2940 *   ROUTINE TO LOAD SCALE FACTORS TO 8741A
ABB2             2950 *
ABB2             2960 *   A  -- AXIS STATUS PORT
ABB2             2970 *   B  -- COMMAND TO READ SCALE FACTOR FROM 8741A
ABB2             2980 *   C  -- COMMAND TO WRITE SCALE FACTOR TO 8741A
ABB2             2990 *   DE -- NOT USED
ABB2             3000 *   HL -- ADDRESS OF SCALE FACTOR
ABB2             3010 *
ABB2             3020 *************************************************
ABB2             3030 *
ABB2 E5          3040 LOADSF  PUSH   H           ; ADDRESS OF SCALE FACTOR
ABB3 C5          3050         PUSH   B           ; 8741A COMMANDS
ABB4 32 82 B1    3060         STA    AXISTAOUT+1 ; STATUS PORT - MODIFIES CODE
ABB7 56          3070         MOV    D,M         ; SCALE FACTOR
ABB8 CD 3D B1    3080         CALL   WTXY        ; WRITE S.F. TO 8741A
ABBB B7          3090         ORA    A           ; CHECK ERROR STATUS
ABBC C2 3F AC    3100         JNZ    RESETSYS    ; NON-ZERO IS ERROR
ABBF 3A 82 B1    3110         LDA    AXISTAOUT+1 ; STATUS PORT - LOADED ABOVE
ABC2 CD 0B B1    3120         CALL   IBFT        ; TEST IBF UNTIL READY
ABC5 B7          3130         ORA    A           ; CHECK FOR ERROR
ABC6 C2 3F AC    3140         JNZ    RESETSYS
ABC9 C1          3150         POP    B 8741A COMMANDS
ABCA 78          3160         MOV    A,B         ; COMMAND TO READ 8741A
ABCB CD 81 B1    3170         CALL   AXISTAOUT
ABCE 3A 82 B1    3180         LDA    AXISTAOUT+1 ; AXIS STATUS PORT
ABD1 21 A5 B1    3190         LXI    H,ZSF       ; TEMP ADDRESS TO READ 8741A
ABD4 CD 5E B1    3200         CALL   RDXY        ; READ S.F. FROM 8741A
ABD7 B7          3210         ORA    A           ; CHECK ERROR STATUS
ABD8 CA DD AB    3220         JZ     LOADSF1     ;NO ERROR JUMP
ABDB E1          3230         POP    H
ABDC C9          3240         RET
ABDD 7E          3250 LOADSF1 MOV    A,M         ; S.F. FROM 8741A
ABDE E1          3260         POP    H           ; ADDRESS OF S.F.
ABDF 96          3270         SUB    M           ; COMPARE BOTH S.F.
ABE0 C9          3280         RET                ; NON-ZERO IS ERROR RETURN
ABE1             3290 *
ABE1             3300 *
ABE1             3310 *************************************************
ABE1             3320 *
ABE1             3330 *                  SCALESCAN
ABE1             3340 *
ABE1             3350 *  SCALES THE SCAN AREA BY MULTIPLES OF 2 X 4 INCHES
ABE1             3360 *
ABE1             3370 *   A  - SCAN MULT. COMMAND WORD (MULTIPLIER * 16 + 1)
ABE1             3380 *
ABE1             3390 *************************************************
ABE1             3400 *
ABE1 2A 09 B0    3410 SCALESCAN LHLD XSTAPORT    ; X & Y AXIS 8741 STATUS PORT
ABE4 EB          3420         XCHG
ABE5 21 82 B1    3430         LXI    H,AXISTAOUT+1 ; RAM ADDRESS FOR OUTPUTTING TO 8741
ABE8 73          3440         MOV    M,E         ; X STATUS PORT
ABE9 CD 81 B1    3450         CALL   AXISTAOUT   ; OUTPUT COMMAND
ABEC 72          3460         MOV    M,D         ; Y STATUS PORT
ABED CD 81 B1    3470         CALL   AXISTAOUT   ; OUTPUT COMMAND
ABF0 C9          3480         RET
```

```
ABF1            3490 *
ABF1            3500 *
ABF1            3510 **************************************************
ABF1            3520 *
ABF1            3530 *    ZERO LOCATION COUNTERS IN 8741'S
ABF1            3540 *
ABF1            3550 **************************************************
ABF1            3560 *
ABF1 3A 09 B0   3570 ZERO41    LDA   XSTAPORT        ;zero x counter
ABF4 32 82 B1   3580           STA   AXISTAOUT+1     ;set port for x-axis
ABF7 CD 0B B1   3590           CALL  IBFT            ;check if input buffer full
ABFA B7         3600           ORA   A               ;check for error
ABFB C2 3F AC   3610           JNZ   RESETSYS        ;if error back to beginning
ABFE 3E A0      3620           MVI   A,0A0H          ;command to zero x-axis
AC00 CD 81 B1   3630           CALL  AXISTAOUT
AC03            3640 *
AC03 3A 0A B0   3650           LDA   YSTAPORT        ;zero y counter
AC06 32 82 B1   3660           STA   AXISTAOUT+1     ;set y-axis port
AC09 CD 0B B1   3670           CALL  IBFT            ;check input buffer
AC0C B7         3680           ORA   A
AC0D C2 3F AC   3690           JNZ   RESETSYS        ;back to beginning if not ready
AC10 3E 20      3700           MVI   A,020H          ;command to zero y-axis
AC12 CD 81 B1   3710           CALL  AXISTAOUT
AC15 C9         3720           RET
AC16            3730 *
AC16            3740 *
AC16 06 0A      3750 SCALEOUT  MVI   B,0AH
AC18 CD 01 A4   3760           CALL  VDROT
AC1B 3E 01      3770           MVI   A,1
AC1D CD 5B A5   3780           CALL  SYSOUT
AC20 C9         3790           RET
AC21            3800 *
AC21            3810 *
AC21 7C         3820 VALIDSF0  MOV   A,H
AC22 B7         3830           ORA   A
AC23 C2 32 AC   3840           JNZ   BADSF
AC26 7D         3850 VALIDSF1  MOV   A,L
AC27 FE 10      3860           CPI   SFLL
AC29 DA 32 AC   3870           JC    BADSF
AC2C FE FB      3880           CPI   SFUL+1
AC2E D2 32 AC   3890           JNC   BADSF
AC31 C9         3900           RET
AC32            3910 *
AC32 AF         3920 BADSF     XRA   A
AC33 C9         3930           RET
AC34            3940 *
AC34            3950 *
AC34 21 03 AE   3960 ERR       LXI   H,SCMERR
AC37 3E 01      3970           MVI   A,1
AC39 CD 5B A5   3980           CALL  SYSOUT
AC3C C3 74 A9   3990           JMP   CALIN           ;BACK TO BEGINNIN
AC3F            4000 *
AC3F            4010 *
AC3F 21 C0 AD   4020 RESETSYS  LXI   H,SCM10
AC42 3E 01      4030 RESETSYS1 MVI   A,1
AC44 CD 5B A5   4040           CALL  SYSOUT
AC47 CD 4E B0   4050           CALL  SYSIN           ;WAIT FOR ANY INPUT
AC4A CD EA B0   4060           CALL  INITSI          ;RESET MEMORY MAP
AC4D C3 00 C1   4070           JMP   100H            ;GO TO TOP OF PROG.
AC50            4080 *
AC50            4090 *
AC50 53 65 74   4100 SCM1      DT    'Set up scanner for scanner calibration.'
AC53 20 75 70
AC56 20 73 63
AC59 61 6E 6E
AC5C 65 72 20
AC5F 66 6F 72
AC62 20 73 63
AC65 61 6E 6E
AC68 65 72 20
AC6B 63 61 6C
AC6E 69 62 72
AC71 61 74 69
AC74 6F 6E 2E
AC77 0D         4110           DB    0DH
AC78 45 6E 74   4120 SCM2      DTH   'Enter "Y" when ready '
AC7B 65 72 20
AC7E 22 59 22
AC81 20 77 68
AC84 65 6E 20
AC87 72 65 61
AC8A 64 79 20
AC8D A0
AC8E 53 63 61   4130 SCM3      DTH   'Scanner calibration (Y or N) '
AC91 6E 6E 65
AC94 72 20 63
AC97 61 6C 69
AC9A 62 72 61
AC9D 74 69 6F
ACA0 6E 20 28
ACA3 59 20 6F
ACA6 72 20 4E
ACA9 29 20 A0
ACAC 74 72 61   4140 SCM21     DTH   'track axis'
ACAF 63 6B 20
ACB2 61 78 69
ACB5 F3
ACB6 61 72 6D   4150 SCM22     DTH   'arm axis'
ACB9 20 61 78
ACBC 69 F3
ACBE 4D 6F 76   4160 SCM31     DTH   'Move scanner in '
ACC1 65 20 73
ACC4 63 61 6E
ACC7 6E 65 72
ACCA 20 69 6E
ACCD A0
ACCE 20 31 2C   4170 SCM35     DT    ' 1,2,3,or 4 inches'
ACD1 32 2C 33
ACD4 2C 6F 72
ACD7 20 34 20
ACDA 69 6E 63
ACDD 68 65 73
ACE0 0D         4180           DB    0DH
ACE1 20 31 20   4190 SCM36     DT    ' 1 or 2 inches'
ACE4 6F 72 20
ACE7 32 20 69
```

```
ACEA  6E 65 64
ACED  65 72
ACEF  0D              4200              DB      8DH
ACF0  45 6E 74        4210 SCN32        DTH     'Enter distance moved '
ACF3  65 72 20
ACF6  64 69 73
ACF9  74 61 6E
ACFC  63 65 20
ACFF  6D 6F 76
AD02  65 64 20
AD05  A0
AD06  49 6E 70        4220 SCN33        DTH     'Input '
AD09  75 74 A0
AD0C  20 73 63        4230 SCN34        DTH     ' scale factor [16-250] '
AD0F  61 6C 65
AD12  20 66 61
AD15  63 74 6F
AD18  72 20 5B
AD1B  31 36 2D
AD1E  32 35 30
AD21  5D 20 A0
AD24  55 73 65        4240 SCN40        DTH     'Use scanner scale factors from Header (Y or N) '
AD27  20 73 63
AD2A  61 6E 6E
AD2D  65 72 20
AD30  73 63 61
AD33  6C 65 20
AD36  66 61 63
AD39  74 6F 72
AD3C  73 20 66
AD3F  72 6F 6D
AD42  20 48 65
AD45  61 64 65
AD48  72 20 28
AD4B  59 20 6F
AD4E  72 20 4E
AD51  29 20 A0
AD54  53 43 41        4250 SCN45        DT      'SCANNER SCALE FACTORS FROM HEADER ARE INVALID '
AD57  4E 4E 45
AD5A  52 20 53
AD5D  43 41 4C
AD60  45 20 46
AD63  41 43 54
AD66  4F 52 53
AD69  20 46 52
AD6C  4F 4D 20
AD6F  48 45 41
AD72  44 45 52
AD75  20 41 52
AD78  45 20 49
AD7B  4E 56 41
AD7E  4C 49 44
AD81  20
AD82  8D              4260              DB      08DH
AD83  53 65 74        4270 SCNZ         DT      'Set up scanner at start of scan area.'
AD86  20 75 70
AD89  20 73 63
AD8C  61 6E 6E
AD8F  65 72 20
AD92  61 74 20
AD95  73 74 61
AD98  72 74 20
AD9B  6F 66 20
AD9E  73 63 61
ADA1  6E 20 61
ADA4  72 65 61
ADA7  2E
ADA8  0D              4280              DB      0DH
ADA9  45 6E 74        4290              DTH     'Enter "Y" when ready. '
ADAC  65 72 20
ADAF  22 59 22
ADB2  20 77 68
ADB5  65 6E 20
ADB8  72 65 61
ADBB  64 79 2E
ADBE  20 A0
ADC0  53 63 61        4300 SCN10        DT      'Scanner interface error'
ADC3  6E 6E 65
ADC6  72 20 69
ADC9  6E 74 65
ADCC  72 66 61
ADCF  63 65 20
ADD2  65 72 72
ADD5  6F 72
ADD7  0D              4310 SCN11        DB      0DH
ADD8  46 61 74        4320              DTH     'Fatal system error. Hit any key to restart.'
ADDB  61 6C 20
ADDE  73 79 73
ADE1  74 65 6D
ADE4  20 65 72
ADE7  72 6F 72
ADEA  2E 20 48
ADED  69 74 20
ADF0  61 6E 79
ADF3  20 6B 65
ADF6  79 20 74
ADF9  6F 20 72
ADFC  65 73 74
ADFF  61 72 74
AE02  A0
AE03  0D              4330 SCNERR       DB      0DH
AE04  45 52 52        4340              DT      'ERROR DURING SCANNER CALIBRATION. TRY AGAIN.'
AE07  4F 52 20
AE0A  44 55 52
AE0D  49 4E 47
AE10  20 53 43
AE13  41 4E 4E
AE16  45 52 20
AE19  43 41 4C
AE1C  49 42 52
AE1F  41 54 49
AE22  4F 4E 20
AE25  20 54 52
AE28  59 20 41
AE2B  47 41 49
AE2E  4E 2E
```

```
AE69            0010 *
AE69            0020 * THIS JUMP TABLE IS USED BY FORTRAN ROUTINES TO ACCESS MICROPOLIS ASSM ROUTINES
AE69            0030 *      CARRIED OVER FROM SCINI
AE69            0040 *
AE69            0050 *  12/0/82 - CTP - SEPARATE SCANNER CAL FROM SCAN
AE69            0055 *   3/27/83 - CTP - CHANGE CABLE/PWR TO PWRUP
AE69            0057 * 11/22/83 - CTP - Change READMTK to AVETHK
AE69            0060 *
AE69            0070 *
AE69            0080              ORG     DPAGE+030H      ;CODE MUST BE LOADED AT THIS ADDRESS
B030            0090 *
B030            0100 *
B030 C3 BD A4   0110             JMP     CREM            ;REMOVE CURSOR
B033            0120 *
B033            0130 *
B033 C3 3B BC   0140             JMP     TXTMD           ;SET CAT-100 TO TEXT MODE
B036            0150 *
B036            0160 *
B036 C3 BD B0   0170             JMP     INITS           ;INITIALIZE AMP. AND DEPTH MEMORY TO 0
B039            0180 *
B039            0190 *
B039 C3 E5 A8   0200             JMP     METROPULSE      ;PULSE METROTEK AT 1KHz RATE FOR SET-UP
B03C            0210 *
B03C            0220 *
B03C C3 44 A6   0230             JMP     PRESCAN         ; SCAN
B03F            0240 *
B03F            0250 *
B03F C3 A3 B8   0260             JMP     AVETHK          ;pulse 8 pass back thickness(4-pulse average)
B042            0270 *
B042            0280 *
B042 C3 D9 B9   0290             JMP     HOLECAL         ;HOLE SIZE CALIBRATION
B045            0300 *
B045            0310 *
B045 C3 31 AE   0320 SYSINIT     JMP     PWRUP           ;SOME INITIALIZATION ROUTINES
B048            0330 *
B048            0340 *
B048 C3 46 B8   0350             JMP     LOADMTEK        ;LOAD AND CHECK METROTEK
B04B            0360 *
B04B            0370 *
B04B C3 E6 B1   0380 TESTSW      JMP     TESTSWJ         ; USED BY "CPAGE" TO CALL TESTSW
B04E C3 02 B7   0390 SYSIN       JMP     SYSINJ          ; INPUT FROM TERMIFLEX
B051 C3 64 B7   0400 SYSINDEC    JMP     SYSINDECJ       ; NUMERIC INPUT
B054 C3 DC BA   0410 DISPAREA    JMP     DISPAREAJ       ; DISPLAY DEPT WHILE SCANNING
B057 C3 FB BA   0420 AREA2       JMP     AREA2J          ; DRAW 2K4 AREA FOR SCAN 8 CLEAR MEMORY
B05A            0430 *
B05A            0440 *
B05A C3 3F B8   0450             JMP     READMTEK        ; READ METROTEK SWITCHES 8 STORE IN D010H AREA
B05D C3 60 A9   0460             JMP     SCAL            ; SCANNER CAL
B060 C3 66 A6   0470             JMP     PRESCAN1        ; CONTINUE SCANNING WHERE YOU LEFT OFF
B063            0480 *
B063            0490 *
B063            0500             END
SCANMEM.S
B063            0010 *
B063            0020 * THIS ROUTINE STORES DATA TO SCAN MEMORY
B063            0030 *              READS DEPTH DATA FROM SCAN MEMORY
B063            0040 *              CLEARS SCAN MEMORY
B063            0050 *              RESTORES THE MEMORY MAP
B063            0060 *
B063            0070 *  8/31/82 - JRM -
B063            0080 *
B063            0090 * DECODE H&L FOR ADDDRESS TO LOAD IN WHICH 8K PAGE
B063            0100 * OF MEMORY
B063            0110 *
B063            0120 *    SAVE DEPTH AND AMPLITUDE IN SCAN MEMORY
B063            0130 *
B063            0140 * INPUTS THAT ARE REQUIRED.
B063            0150 *
B063            0160 * REG. D IS THE DEPTH DATA
B063            0170 * REG. E IS THE AMPLITUDE DATA
B063            0180 * REG. H IS THE Y COORDINATE 0-99
B063            0190 * REG. L IS THE X COORDINATE 0-199
B063            0200 *
B063            0210 *  ORG 04000H ;ORIGIN SET AT 4TH 8K PAGE
B063            0220 *
B063      0020  0230 RFN         EQU     TWINDOW/100H    ;MAPPING RAM FUNNEL NUMBER 2000-3FFFH
B063      0000  0240 OFSTD       EQU     00H             ;OFFSET PHYSICAL BLOCK ADR FOR DEPTH DATA 0000-7FFFH
B063      0008  0250 OFSTA       EQU     08H             ;OFFSET PHYSICAL BLOCK ADR FOR AMPL. DATA 8000-FFFFH
B063      001F  0260 YMASK       EQU     01FH            ;Y-ADR MASK RANGE 0 THRU 31
B063      0006  0270 BMASK       EQU     06H             ;8K BANK MASK
B063      007F  0280 CMASK       EQU     07FH            ;ON-CARD MASK
B063      00A0  0290 MEMMAP      EQU     0A0H            ;MEMORY MAP PORT ADR.
B063            0300 *
B063            0310 *
B063 7C         0320 SLCT2       MOV     A,H             ;GET Y-COORD
B064 07         0330             RLC
B065 07         0340             RLC
B066 07         0350             RLC
B067 07         0360             RLC             ;ROTATE LEFT 4 TIMES
B068 E6 06      0370             ANI     BMASK           ;MASK FOR 8K BANK 0,2,4,OR 6
B06A 32 BC B9   0380             STA     BANK            ;SAVE BANK #
B06D            0390 *
B06D 7C         0400             MOV     A,H             ;GET Y-COORD
B06E E6 1F      0410             ANI     YMASK           ;MASK FOR Y-ADR ON CORRECT BANK
B070 C6 20      0420             ADI     RFN             ;ADD FUNNEL NUMBER TO IT
B072 67         0430             MOV     H,A             ;PUT IT BACK INTO HIGH ADR. REG
B073            0440 *
B073 0E A0      0450             MVI     C,MEMMAP        ;GET MEMORY MAP PORT #
B075            0460 *
B075 AF         0470             XRA     A               ;CLEAR A 8 CARRY
B076 3A BC B9   0480             LDA     BANK            ;GET BANK SELECT # 0-3
B079 C6 00      0490             ADI     OFSTD           ;ADD OFFSET DEPTH SCAN MEMORY ADR. TO IT
B07B 1F         0500             RAR                     ;ROT. RIGHT OR DEVIDE BY 2
B07C 2F         0510             CMA                     ;COMPLEMENT IT (HARDWARE REQ.)
B07D 06 20      0520             MVI     B,RFN           ;LOAD RFN INTO REG B
B07F ED         0530             DB      0EDH
B080 79         0540             DB      079H            ;OUT(C),A "Z-80 INSTRUCTION"
B081            0550 *
B081 06 30      0560             MVI     B,RFN+010H      ;LOAD REG. B WITH OTHER 8K HALF
B083 ED         0570             DB      0EDH
B084 79         0580             DB      079H            ;OUT(C),A
B085            0590 *
B085 72         0600             MOV     M,D             ;SAVE DEPTH DATA IN MEMORY
B086            0610 *
B086 AF         0620             XRA     A               ;CLEAR A 8 CARRY
```

```
B987 3A BC B0    0630            LDA     BANK            ;GET BANK SELECT
B98A C6 08       0640            ADI     OFSTA           ;ADD OFFSET AMPL. SCAN MEMORY ADR. TO IT
B98C 1F          0650            RAR                     ;DEVIDE BY 2
B98D 2F          0660            CMA                     ;COMPLEMENT IT
B98E 06 20       0670            MVI     B,RFN           ;B REG = 8K RAM FUNNEL #
B990 ED          0680            DB      0EDH
B991 79          0690            DB      079H            ;OUT(C),A
B992             0700    *
B992 06 30       0710            MVI     B,RFN+010H      ;REG B = OTHER 1/2 OF BLOCK
B994 ED          0720            DB      0EDH
B995 79          0730            DB      079H
B996             0740    *
B996 73          0750            MOV     M,E             ;SAVE AMPLITUDE DATA IN MEMORY
B997             0760    *
B997 C9          0770            RET
B998             0780    *
B998             0790    *   READ DEPTH DATA IN SCAN MEMORY AND RETURN THE VALUE
B998             0800    *   IN REGISTER B
B998             0810    *
B998             0820    *   DECODE H&L FOR ADDDRESS TO LOAD IN WHICH 8K PAGE
B998             0830    *   OF MEMORY
B998             0840    *
B998             0850    *   INPUTS THAT ARE REQUIRED.
B998             0860    *
B998             0870    *   REG. H IS THE Y COORDINATE 0-99
B998             0880    *   REG L IS THE X COORDINATE 0-199
B998             0890    *
B998 7C          0900    SLCT1   MOV     A,H             ;GET Y-COORD
B999 07          0910            RLC
B99A 07          0920            RLC
B99B 07          0930            RLC
B99C 07          0940            RLC                     ;ROTATE LEFT 4 TIMES
B99D E6 06       0950            ANI     BMASK           ;MASK FOR BANK 0,2,4,OR 6
B99F 32 BC B0    0960            STA     BANK            ;SAVE BANK #
B9A2             0970    *
B9A2 7C          0980            MOV     A,H             ;GET Y-COORD
B9A3 E6 1F       0990            ANI     YMASK           ;MASK FOR Y ADR.
B9A5 C6 20       1000            ADI     RFN             ;ADD REF. FUNNEL # TO IT
B9A7 67          1010            MOV     H,A             ;PUT IT INTO HIGH MEM. REG.
B9A8             1020    *
B9A8 0E A0       1030            MVI     C,MEMMAP        ;LOAD C WITH MEMMAP PORT ADRESS
B9AA             1040    *
B9AA AF          1050            XRA     A               ;CLEAR A & CARRY
B9AB             1060    *
B9AB 3A BC B0    1070            LDA     BANK
B9AE C6 00       1080            ADI     OFSTD           ;ADD IT TO THE OFFSET SCAN MEM. DEPTH ADR
B9B0 1F          1090            RAR                     ;ROT. RIGHT OR DEVIDE BY 2
B9B1 2F          1100            CMA                     ;COMPLEMENT IT (HARDWARE REQ.)
B9B2 06 20       1110            MVI     B,RFN           ;LOAD RFN INTO REG B
B9B4 ED          1120            DB      0EDH
B9B5 79          1130            DB      079H            ;OUT(C),A "Z-80 INSTRUCTION"
B9B6             1140    *
B9B6 06 30       1150            MVI     B,RFN+010H      ;LOAD REG. B WITH OTHER 8K HALF
B9B8 ED          1160            DB      0EDH
B9B9 79          1170            DB      079H            ;OUT(C),A
B9BA             1180    *
B9BA 46          1190            MOV     B,M             ;PUT DEPTH DATA INTO REG B
B9BB C9          1200            RET
B9BC             1210    *
B9BC 00          1220    BANK    DB      0               ;BANK SELECT 8K VALUE (2=8K)
B9BD             1230    *
B9BD             1240    *
B9BD             1250    * INITILIZE MEMORY FOR THE SCAN DEPTH & AMPLITUDE DATA
B9BD             1260    *
B9BD             1270    *
B9BD 1E 00       1280    INITS   MVI     E,0             ;BANK COUNTER
B9BF 0E A0       1290            MVI     C,MEMMAP        ;LOAD C WITH MAPPING RAM PORT ADR.
B9C1             1300    *
B9C1 7B          1310            MOV     A,E             ;MOVE BANK INTO ACCUM
B9C2 C6 00       1320    LOPY    ADI     OFSTD           ;ADD OFFSET OF DEPTH SCAN MEMORY BLOCK
B9C3 2F          1330            CMA                     ;COMPLEMENT IT
B9C5 06 20       1340            MVI     B,RFN           ;PUT RAM FUNNEL INTO REG B
B9C7 ED          1350            DB      0EDH            ;OUT(C),A (Z-80 INSTRUCTION)
B9C8 79          1360            DB      079H
B9C9 06 30       1370            MVI     B,RFN+010H      ;OTHER 8K HALF
B9CB ED          1380            DB      0EDH
B9CC 79          1390            DB      079H            ;OUT(C),A
B9CD             1400    *
B9CD D5          1410            PUSH    D
B9CE 11 00 20    1420            LXI     D,2000H         ;SET UP LOOP COUNTER
B9D1 26 20       1430            MVI     H,RFN           ;START POINT IN RAM
B9D3 2E 00       1440            MVI     L,0
B9D5 36 00       1450    LOPZ    MVI     M,0             ;ZERO MEMORY
B9D7 23          1460            INX     H               ;INCREMENT MEMORY
B9D8 1B          1470            DCX     D               ;DECREMENT COUNT
B9D9 7B          1480            MOV     A,E
B9DA B2          1490            ORA     D
B9DB C2 D5 B0    1500            JNZ     LOPZ
B9DE D1          1510            POP     D
B9DF 1C          1520            INR     E               ;INCREMENT BANK COUNTER
B9E0 7B          1530            MOV     A,E             ;MOV INTO A REG
B9E1 FE 08       1540            CPI     08H             ;HAS IT DONE 8 X 8K BANKS
B9E3 C2 C2 B0    1550            JNZ     LOPY            ;IF NOT ZERO DO ANOTHER BANK
B9E6             1560    *
B9E6 CD EA B0    1570            CALL    INITS1          ;RESTORE THE MEMORY MAPPING RAM 8K WINDOW
B9E9             1580    *
B9E9 C9          1590            RET
B9EA             1600    *
B9EA             1610    *   RESTORE THE MEMORY MAPPING RAM.
B9EA             1620    *
B9EA             1630    *
B9EA 0E A0       1640    INITS1  MVI     C,MEMMAP        ;REG C = MEM. MAP PORT
B9EC 06 20       1650            MVI     B,RFN           ;PUT FUNNEL NUMBER INTO REG B
B9EE AF          1660            XRA     A               ;CLEAR A & CARRY
B9EF 3E 20       1670            MVI     A,RFN
B9F1 0F          1680            RRC
B9F2 0F          1690            RRC
B9F3 0F          1700            RRC
B9F4 0F          1710            RRC
B9F5 3C          1720            INR     A               ;ADD ONE
B9F6 2F          1730            CMA                     ;COMPLEMENT IT
B9F7 E6 7F       1740            ANI     CMASK           ;MASK IT FOR ON CARD MEMORY
```

```
B0F9 ED         1750            DB      0EDH
B0FA 79         1760            DB      079H            ;OUT(C),A "Z80 INSTRUCTION"
B0FB 06 30      1770            MVI     B,RFN+010H      ;OTHER HALF OF OK
B0FD AF         1780            XRA     A
B0FE 3E 30      1790            MVI     A,RFN+010H
B100 0F         1800            RRC
B101 0F         1810            RRC
B102 0F         1820            RRC
B103 0F         1830            RRC
B104 3C         1840            INR     A
B105 2F         1850            CMA
B106 E6 7F      1860            ANI     CMASK
B108 ED         1870            DB      0EDH
B109 79         1880            DB      079H            ;OUT(C),A
B10A C9         1890            RET
SCANDPG.S
B10B            0010    *
B10B            0020    *       THESE ROUTINES TALK TO SCANNER INTERFACE (8741'S)
B10B            0030    *       AND CONTAIN DATA MODIFIED DURING SCANNING
B10B            0040    *
B10B            0050    *       8/27/82 - CTP - REMOVED JUMP TABLE TO DJUMP.S
B10B            0060    *                     - REMOVED DATA TO SCAN MEMORY TO SCANMEM.S
B10B            0070    *       3/09/83 - CTP - WAIT COUNT SET TO 0FFH
B10B            0080    *       6/02/83 - CTP - delete variable for alarm timer
B10B            0090    *       6/30/82 - CTP - moved some data to mtek.s
B10B            0100    *       8/08/83 - CTP - delete spin, % area scan ; add version from equiable.s
B10B            0110    *
B10B            0120    * SUBROUTINE TO WAIT UNTIL INPUT BUFFER FULL 8741A READY
B10B            0130    *
B10B            0140            SCANDPG.S
B10B            0150    *
B10B 32 11 B1   0160    IBFT    STA     SPORT+1         ;STORE STATUS PORT
B10E 06 FF      0170            MVI     B,0FFH          ;LOAD B COUNTER
B110 DB 45      0180    SPORT   IN      45H             ;INPUT STATUS WORD
B112 E6 02      0190            ANI     2               ;CHECK IBF
B114 C8         0200            RZ                      ;RETURN WHEN =0
B115 05         0210            DCR     B               ;DECREMENT COUNTER
B116 C2 10 B1   0220            JNZ     SPORT           ;REPEAT IF NOT 0
B119 3E 60      0230            MVI     A,60H           ;ERROR CODE INTO A
B11B C9         0240            RET                     ;RETURN
B11C            0250    *
B11C            0260    *
B11C            0270    *       SPECIAL IBF TEST ONLY WHEN 8741A IS IN OPERATE MODE
B11C            0280    *       ON ENTRY A CONTAINS STATUS PORT AND C THE COMMAND
B11C            0290    *
B11C            0300    *
B11C 32 29 B1   0310    IBFS    STA     SPORS+1         ;STORE STATUS PORT
B11F 32 38 B1   0320            STA     DOIT+2          ;STORE STATUS PORT
B122 3D         0330            DCR     A               ;GET DATA PORT
B123 32 3A B1   0340            STA     DOIT+4          ;STORE DATA PORT
B126 06 FF      0350            MVI     B,0FFH          ;LOAD B COUNTER
B128 DB 45      0360    SPORS   IN      45H             ;INPUT STATUS PORT
B12A E6 02      0370            ANI     2               ;CHECK IBF
B12C CA 36 B1   0380            JZ      DOIT            ;IBF IS 0 READY
B12F 05         0390            DCR     B               ;DECREMENT COUNTER
B130 C2 28 B1   0400            JNZ     SPORS           ;REPEAT IF NOT 0
B133 3E 60      0410            MVI     A,60H           ;ERROR CODE INTO A
B135 C9         0420            RET                     ;RETURN
B136 79         0430    DOIT    MOV     A,C             ;LOAD COMMAND
B137 D3 45      0440            OUT     45H             ;OUTPUT COMMAND
B139 DB 44      0450            IN      44H             ;IMMEDIATE INPUT TO CLEAR OUT BAD DATA
B13B AF         0460            XRA     A               ;CLEAR A FOR GOOD RETURN
B13C C9         0470            RET                     ;RETURN
B13D            0480    *
B13D            0490    *
B13D            0500    *
B13D            0510    * WTXY SUBROUTINE TO OUTPUT DATA TO 8741A'S
B13D            0520    *       REG    AT INPUT      USED    AT OUTPUT
B13D            0530    *       A      STATUS PORT    +      CODE IF ERROR, 0 IF GOOD
B13D            0540    *       B        -            +
B13D            0550    *       C      STATUS CMD     +      STATUS COMMAND
B13D            0560    *       D      OUTPUT DATA    +      OUTPUT DATA
B13D            0570    *       E
B13D            0580    *       HL       -            -
B13D            0590    *
B13D            0600    *
B13D 32 4B B1   0610    WTXY    STA     BET+1           ;STORE STATUS PORT
B140 32 52 B1   0620            STA     CAM+2           ;STORE STATUS PORT
B143 32 54 B1   0630            STA     CAM+4           ;STORE STATUS PORT
B146 3D         0640            DCR     A               ;GET DATA PORT
B147 32 5B B1   0650            STA     ALP+1           ;STORE DATA PORT
B14A 3E 45      0660    BET     MVI     A,45H           ;LOAD STATUS PORT
B14C CD 0B B1   0670            CALL    IBFT            ;WAIT FOR INPUT BUFFER FULL READY
B14F C0         0680            RNZ                     ;INPUT BUFFER ERROR
B150 79         0690    CAM     MOV     A,C             ;STATUS COMMAND TO A
B151 D3 45      0700            OUT     45H             ;OUTPUT STATUS COMMAND
B153 3E 45      0710            MVI     A,45H           ;LOAD STATUS PORT
B155 CD 0B B1   0720            CALL    IBFT            ;WAIT FOR INPUT BUFFER FULL READY
B158 C0         0730            RNZ                     ;INPUT BUFFER ERROR
B159 7A         0740            MOV     A,D             ;DATA TO A
B15A D3 44      0750    ALP     OUT     44H             ;OUTPUT DATA
B15C AF         0760            XRA     A               ;CLEAR A FOR GOOD RETURN
B15D C9         0770            RET                     ;END OF OUTPUT DATA TO 8741A'S ROUTINE
B15E            0780    *
B15E            0790    *
B15E            0800    * RDXY SUBROUTINE TO READ DATA FROM 8741A'S
B15E            0810    *       REG    AT INPUT      USED    AT OUTPUT
B15E            0820    *       A      STATUS PORT    +      CODE IF ERROR; A=0 IF GOOD
B15E            0830    *       B        -            +
B15E            0840    *       C        -            +      STATUS IF GOOD
B15E            0850    *       D        -            -
B15E            0860    *       E
B15E            0870    *       HL     OUTPUT ADR     +      OUTPUT ADDRESS
B15E            0880    *
B15E            0890    *
B15E 32 68 B1   0900    RDXY    STA     BETA+1          ;STORE STATUS PORT
B161 3D         0910            DCR     A               ;GET DATA PORT
B162 32 7C B1   0920            STA     ALPH+1          ;STORE DATA PORT
B165 06 FF      0930    XYRL    MVI     B,0FFH          ;SET COUNTER
B167 DB 45      0940    BETA    IN      45H             ;INPUT STATUS (PORT GETS MODIFIED)
B169 4F         0950            MOV     C,A             ;SAVE IN C
B16A 1F         0960            RAR                     ;CHECK OBF
B16B DA 76 B1   0970            JC      ALPH            ;OBF=1 GO TO ALPH
B16E 05         0980            DCR     B               ;DECREMENT COUNTER
B16F C2 67 B1   0990            JNZ     BETA            ;LIMIT NOT REACHED TRY AGAIN
```

```
B172 AF         1000            XRA     A               ;CLEAR ACCUM AND FLAGS
B173 C6 61      1010            ADI     61H             ;ERROR CODE INTO A WITH ZERO FLAG CLEARED
B175 C9         1020            RET                     ;RETURN TO CALLING ROUTINE
B176 17         1030  ALPH      RAL                     ;GET ORIGINAL STATUS BACK
B177 47         1040            MOV     B,A
B178 E6 80      1050            ANI     80H             ;CLEAR ACCUM AND
B17A 17         1060            RAL                     ;TEST FOR SCANNER LIMITS
B17B DB 44      1070  ALPH1     IN      44H             ;INPUT DATA (PORT BITS MODIFIED)
B17D D8         1080            RC                      ;RETURN IF OUT OF LIMITS
B17E 77         1090            MOV     M,A             ;SAVE DATA
B17F AF         1100            XRA     A               ;CLEAR ACCUM AND FLAGS
B180 C9         1110            RET                     ;END OF 8741A DATA INPUT ROUTINE
B181            1120  *
B181            1130  *
B181 D3 FF      1140  AXISTAOUT OUT     0FFH            ;DUMMY OUTPUT PORT (MODIFIED WHEN PROGRAM RUNS)
B183 C9         1150            RET
B184            1160  *
B184            1170  *
B184     B184   1180  LDATA     EQU     *               ;LOCAL DATA FOR SCAN
B184 C2 9C      1190  VDATE     DW      NPAGVER         ;version date from equiable:s
B186 00         1200  IOF       DB      0               ;ERROR FLAG =0 GOOD  NOT=0 BAD
B187 00         1210  SUNN      DB      0               ;NOT TIME TO START COUNTER  LIMIT 20
B188 00         1220  OLDX      DB      0               ;PREVIOUS GOOD X
B189 00         1230  OLDY      DB      0               ;PREVIOUS GOOD Y
B18A 00         1240  NEWX      DB      0               ;CURRENT GOOD X INPUT
B18B 00         1250  NEWY      DB      0               ;CURRENT GOOD Y INPUT
B18C 00         1260  PASS      DB      0               ;PASS COUNTER
B18D 00         1270  TSUM      DB      0               ;LOWER 8 BITS OF SUMMED MID THICKNESS
B18E 00         1280  TSSUM     DB      0               ;UPPER 8 BITS OF SUMMED MID THICKNESS
B18F 00         1290  TMID      DB      0               ;MID THICKNESS INPUT DATA
B190 00         1300  DTAMP     DB      0               ;INPUT AMPLITUDE DATA
B191 00         1310  SUM       DB      0               ;DATA NOT AVAILABLE COUNTER
B192 00         1320  SUM1      DB      0               ;THRESHOLD NOT EXCEEDED COUNTER
B193 00         1330  SUM2      DB      0               ;BAD THICKNESS DATA COUNTER
B194    04 00   1340  SWL1      FILL    4,0             ;CURRENT P+R SWITCH POSITIONS
B198    07 00   1350  SWL2      FILL    7,0             ;CURRENT GATE SWITCH POSITIONS
B19F 00         1360  MODX      DB      0               ;MODIFIED X ADDRESS
B1A0 00         1370  MODY      DB      0               ;MODIFIED Y ADDRESS
B1A1            1380  *
B1A1            1390  *
B1A1 00         1400  XSF       DB      0               ;X SCALE FACTOR
B1A2 00         1410  YSF       DB      0               ;Y SCALE FACTOR
B1A3 00         1420  XSD       DB      0               ;MAX X IN 1020 INCH UNITS
B1A4 00         1430  YSD       DB      0               ;MAX Y IN 1020 INCH UNITS
B1A5 00         1440  ZSF       DB      0               ;TRIAL SCALE FACTOR FROM 8741A
B1A6 81         1450  LIMITTEST DB      81H             ;OUT OF LIMITS FLAG WORD, SET FOR NO ERRORS
B1A7            1460  *
B1A7            1470  *
B1A7 00         1480  ATTSW     DB      0               ;ATT SW ACT
B1A8            1490  *
B1A8            1500            END
CABL/PWR.S
B805            0010  *
B805            0020  *
B805            0030  *  This routine is used for communication with the Metrotek ultrasonic 3100.
B805            0040  * Functions are :
B805            0050  *     READ - get switch settings, threshold, and velocity constant
B805            0060  *     LOAD - load threshold and velocity constant & check switch settings.
B805            0070  *     PULSE - pulse at rate set in interrupt timer
B805            0080  *     MEASURE THICKNESS - pulse and read thickness
B805            0090  *
B805            0100  * Measure thickness uses Microsoft calling convention.
B805            0110  *
B805            0120  *  6/30/83 - CTP - based on TCAL3.S
B805            0130  *  8/03/83 - CTP - add PULSEMTEK
B805            0140  *  11/22/83 - CTP - change READTHK to AVETHK
B805            0150  *                   add new READTHK
B805            0160  *  12/07/83 - CTP - Fix for 4-point average
B805            0170  *
B805            0180  *
B805            0190  *
B805 00         0200  TRCNT     DB      0               ;threshold exceeded counter
B806 00         0210  PASS4DATA DB      0               ;4-pulse counter
B807 00 00      0220  AVGDW     DW      0               ;sum of thicknesses
B809            0230  *
B809 45 52 52   0240  MESS1     DTH     'ERROR - UI-3200 DATA TRANSFER'
B80C 4F 52 20
B80F 20 20 55
B812 49 20 33
B815 32 30 30
B818 20 44 41
B81B 54 41 20
B81E 54 52 41
B821 4E 53 46
B824 45 52
B826 45 52 52   0250  MESS2     DTH     'ERROR - NO SIGNAL IN GATE'
B829 4F 52 20
B82C 2D 20 4E
B82F 4F 20 53
B832 49 47 4E
B835 41 4C 20
B838 49 4E 20
B83B 47 41 54
B83E C5
B83F            0260  *
B83F            0270  *
B83F            0280  * READ METROTEK FRONT PANEL & STORE VALUES IN D010H AREA
B83F            0290  *
B83F 21 10 B9   0300  READMTEK  LXI     H,ISWL1         ; ADDRESS TO STORE SWITCH SETTINGS
B842 CD 71 A8   0310            CALL    MSWREAD         ;load mtek switch readings into HL array
B845 C9         0320            RET
B846            0330  *
B846            0340  * LOAD VELOCITY CONSTANT & THRESHOLD TO METROTEK
B846            0350  *       AND THEN CHECK FRONT PANEL.
B846            0360  *
B846 2A 19 B9   0370  LOADMTEK  LHLD    VCLOTA          ; VELOCITY CONSTANT
B849 CD 7B B9   0380            CALL    HIVOUT          ; OUTPUT VEL CONST TO METROTEK
B84C            0390  * OUTPUT THRESHOLD
B84C 3E 4B      0400            MVI     A,ADTHSRD
B84E D3 48      0410            OUT     SWPORT1
B850 3A 1B B9   0420            LDA     THRSHLD         ; THRESHOLD
B853 D3 49      0430            OUT     SWPORT2
B855 CD 90 B9   0440            CALL    STROBE
B858 CD 4B B0   0450            CALL    TESTSW          ; CHECK FOR SWITCH ERRORS
B85B C9         0460            RET
```

```
B95C         0470 *
B95C         0480 *
B95C         0490 * Pulse metrotek at rate set in interupt timer
B95C         0500 *
B95C FB      0510 PULSEMTEK    EI                      ;enable interupts from timer
B95D 3A 22 B9 0520           LDA    ONEMS              ;timer counter
B960 4F      0530            MOV    C,A                ;save counter
B961 3A 22 B9 0540 PLSEMTLP1  LDA    ONEMS             ;read counter again
B964 B9      0550            CMP    C                  ;has it changed?
B965 CA 61 B9 0560           JZ     PLSEMTLP1          ;wait till it does
B968         0570 *
B968 3E 46   0580            MVI    A,ADPULSE          ;address to pulse
B96A D3 48   0590            OUT    SWPORT1
B96C 3E 00   0600            MVI    A,STROBEBIT        ;strobe MTEK
B96E D3 48   0610            OUT    STROBEPORT
B970         0620 *
B970 C9      0630            RET
B971         0640 *
B971         0650 *
B971         0660 * Read thickness and amplitude
B971         0670 *
B971         0680 * Returns: BC - amplitude
B971         0690 *          DE - thickness (12 bits)
B971         0700 *
B971 CD 5C B8 0710 READTHK   CALL   PULSEMTEK          ;pulse UT at pre-set rate
B974 3E 47   0720            MVI    A,ADAMP            ;set up to check threshold
B976 D3 48   0730            OUT    SWPORT1
B978 CD 5C B9 0740           CALL   DAVCAL             ;wait for data available
B97B DB 4A   0750            IN     SWPORT3            ;get threshold detect & amp.
B97D 4F      0760            MOV    C,A
B97E E6 80   0770            ANI    80H                ;check theshold detect
B980 CA 8A B8 0780           JZ     THKRD              ;if zero read thk.
B983 01 00 00 0790           LXI    B,0                ;return zero amplitude
B986 11 00 00 0800           LXI    D,0                ;and thickness
B989 C9      0810            RET
B98A         0820 *
B98A 3E 48   0830 THKRD     MVI    A,ADTHKHI          ;get high byte
B98C D3 48   0840            OUT    SWPORT1
B98E CD 5C B9 0850           CALL   DAVCAL
B991 DB 4A   0860            IN     SWPORT3
B993 E6 0F   0870            ANI    0FH                ;only 4 bits used
B995 57      0880            MOV    D,A
B996 3E 49   0890            MVI    A,ADTHKMID         ;get mid-byte
B998 D3 48   0900            OUT    SWPORT1
B99A CD 5C B9 0910           CALL   DAVCAL
B99D DB 4A   0920            IN     SWPORT3
B99F 5F      0930            MOV    E,A                ;DE now = 12 bit thk
B9A0 06 00   0940            MVI    B,0                ;zero high byte of amplitude
B9A2 C9      0950            RET
B9A3         0960 *
B9A3         0970 *
B9A3         0980 *
B9A3         0990 * Measure thickness - uses 4 pulse average
B9A3         1000 *    arg1 - 16 bit thickness
B9A3         1010 *    arg2 - 16 bit amplitude (last pulse)
B9A3         1020 *    arg3 - 8 bit error flag (0 = no error)
B9A3         1030 *
B9A3 E5      1040 AVETHK    PUSH   H                  ;arg1 - thickness
B9A4 C5      1050            PUSH   B                  ;arg3 - error flag
B9A5 D5      1060            PUSH   D                  ;arg2 - amplitude
B9A6 AF      1070            XRA    A                  ;zero all args
B9A7 02      1080            STAX   B
B9A8 12      1090            STAX   D
B9A9 13      1100            INX    D
B9AA 12      1110            STAX   D
B9AB 77      1120            MOV    M,A
B9AC 23      1130            INX    H
B9AD 77      1140            MOV    M,A
B9AE         1150 *
B9AE         1160 * Initialize some data
B9AE         1170 *
B9AE CD 4B B9 1180           CALL   INTLIZE
B9B1         1190 *
B9B1         1200 * PULSE METROTEK 4 TIMES & TAKE AVERAGE
B9B1         1210 *
B9B1 CD 59 A8 1220 THSTART   CALL   PRETEST            ;COMPARISON ROUTINE
B9B4 CA BF B9 1230           JZ     THSTART1
B9B7 CD 4B B9 1240           CALL   TESTSW             ;DISPLAY SWITCH ERROR
B9BA 06 0B   1250            MVI    B,0BH
B9BC CD 01 A4 1260           CALL   VDROT
B9BF         1270 *
B9BF CD 5C B8 1280 THSTART1  CALL   PULSEMTEK          ;pulse at rate set in timer
B9C2         1290 *
B9C2 3E 47   1300            MVI    A,ADAMP            ;READ AMP. CMD.
B9C4 D3 48   1310            OUT    SWPORT1
B9C6 CD 5C B9 1320           CALL   DAVCAL             ;DATA AVAILABLE CHECK
B9C9 DB 4A   1330            IN     SWPORT3
B9CB 47      1340            MOV    B,A                ;save amplitude
B9CC E6 80   1350            ANI    80H
B9CE CA E9 B9 1360           JZ     THKHI              ;THRESHLD. EXCEEDED
B9D1         1370 *
B9D1 3A 05 B8 1380           LDA    THCNT
B9D4 3D      1390            DCR    A
B9D5 32 05 B8 1400           STA    THCNT
B9D8 B7      1410            ORA    A
B9D9 C2 B1 B9 1420           JNZ    THSTART            ;COUNT NOT EXCEEDED
B9DC         1430 *
B9DC 3E 0B   1440 THKERR    MVI    A,11               ;error in thickness reading
B9DE C1      1450            POP    B                  ;strip arg2
B9DF C1      1460            POP    B                  ;error flag
B9E0 02      1470            STAX   B                  ;set error flag
B9E1 C1      1480            POP    B                  ;strip arg1
B9E2 21 26 B8 1490           LXI    H,MESS2            ;COUNT EXCEEDED THRHLD TOO HI
B9E5 CD 93 B9 1500           CALL   ONLINEOUT
B9E8 C9      1510            RET                       ;RETURN TO EXEC.
B9E9         1520 *
B9E9 78      1530 THKHI     MOV    A,B                ;amplitude
B9EA E1      1540            POP    H                  ;address of arg2
B9EB 77      1550            MOV    M,A                ;store
B9EC E5      1560            PUSH   H                  ;save address
B9ED 3E 48   1570            MVI    A,ADTHKHI          ;CMD HI ORDER THKNESS.
B9EF D3 48   1580            OUT    SWPORT1
B9F1 CD 5C B9 1590           CALL   DAVCAL
B9F4 DB 4A   1600            IN     SWPORT3
```

```
B8F6 E6 OF      1610              ANI   OFH                   ;STRIP UPPER NIBBLE
B8F8 57         1620              MOV   D,A                   ; HIGH THICKNESS BITS
B8F9 3E 49      1630  THKMID      MVI   A,AUTHKMID            ;CMD MID WD
B8FB D3 48      1640              OUT   SWPORT1
B8FD CD 5C B9   1650              CALL  DAVCAL
B900 DB 4A      1660              IN    SWPORT3
B902 5F         1670              MOV   E,A                   ; MID THK.
B903            1680  *
B903 2A 07 B8   1690              LHLD  AVGDW                 ;sum of thickness readings
B906 19         1700              DAD   D                     ; ADD THK.
B907 22 07 B8   1710              SHLD  AVGDW                 ;STORE SUM
B90A 3A 06 B8   1720              LDA   PASS4DATA
B90D 3D         1730              DCR   A
B90E 32 06 B8   1740              STA   PASS4DATA
B911 C2 B1 B8   1750              JNZ   THSTART
B914            1760  * COMPUTE AVE. THK.
B914 C1         1770              POP   B                     ;strip arg2 & arg3 off stack
B915 C1         1780              POP   B                     ;arg3 - error flag
B916 7C         1790              MOV   A,H
B917 1F         1800              RAR                         ;ROTATE RIGHT THRU CARRY
B918 67         1810              MOV   H,A
B919 7D         1820              MOV   A,L
B91A 1F         1830              RAR
B91B 6F         1840              MOV   L,A
B91C 7C         1850              MOV   A,H
B91D 1F         1860              RAR
B91E 67         1870              MOV   H,A
B91F 7D         1880              MOV   A,L
B920 1F         1890              RAR
B921 6F         1900              MOV   L,A                   ;thickness now in HL
B922 D2 26 B9   1910              JNC   THK10                 ;no round up
B925 23         1920              INX   H                     ;round up
B926 7C         1930  THK10       MOV   A,H                   ;strip high nibble from thickness
B927 E6 OF      1940              ANI   OFH
B929 67         1950              MOV   H,A                   ;back to HL
B92A            1960  * subtract "fixed delay" from thickness
B92A EB         1970              XCHG                        ;thk to DE
B92B 2A 20 B8   1980              LHLD  FDELAY                ;fixed delay
B92E 7D         1990              MOV   A,L
B92F 2F         2000              CMA
B930 6F         2010              MOV   L,A
B931 7C         2020              MOV   A,H
B932 2F         2030              CMA
B933 67         2040              MOV   H,A
B934 23         2050              INX   H                     ;compliment plus 1
B935 19         2060              DAD   D                     ;subtract delay from thickness reading
B936 7C         2070              MOV   A,H                   ;check for negative and zero thickness
B937 A7         2080              ANA   A
B938 FA 46 B9   2090              JM    THK20                 ;error if negative
B93B B5         2100              ORA   L                     ;check for zero
B93C CA 46 B9   2110              JZ    THK20
B93F C1         2120              POP   B                     ;arg1 - thickness
B940 7D         2130              MOV   A,L
B941 02         2140              STAX  B
B942 03         2150              INX   B
B943 7C         2160              MOV   A,H
B944 02         2170              STAX  B                     ;actual thickness to arg1
B945 C9         2180              RET
B946            2190  *
B946 C5         2200  THK20       PUSH  B                     ;make conditions the same for error
B947 C5         2210              PUSH  B
B948 C3 DC B8   2220              JMP   THKERR
B94B            2230  *
B94B 3E 64      2240  INTLIZE     MVI   A,100
B94D 32 05 B8   2250              STA   THCNT                 ;THRESHOLD COUNTER
B950 3E 04      2260              MVI   A,4
B952 32 06 B8   2270              STA   PASS4DATA             ;4-PASS COUNTER
B955 AF         2280              XRA   A
B956 67         2290              MOV   H,A
B957 6F         2300              MOV   L,A
B958 22 07 B8   2310              SHLD  AVGDW                 ;SUM OF MID. WD.
B95B C9         2320              RET
B95C            2330  *
B95C 06 50      2340  DAVCAL      MVI   B,80                  ;INITIAL DELAY FOR STABLE DAV
B95E 05         2350  DAV01       DCR   B
B95F C2 5E B9   2360              JNZ   DAV01
B962 06 0A      2370              MVI   B,10
B964 DB 4C      2380  DAV00       IN    SWPORT4
B966 E6 01      2390              ANI   DAVBIT
B968 C0         2400              RNZ
B969 05         2410              DCR   B
B96A C2 64 B9   2420              JNZ   DAV00
B96D 21 09 B8   2430              LXI   H,MESS1               ;DATA XFER ERR
B970 3E 0A      2440              MVI   A,10
B972 C1         2450              POP   B                     ;strip arg2
B973 C1         2460              POP   B                     ;arg3 - error flag
B974 02         2470              STAX  B                     ;set error flag
B975 C1         2480              POP   B                     ;strip arg1
B976 CD 95 B9   2490              CALL  ONLINEOUT
B979 F1         2500              POP   PSW                   ;RESTORE STACK
B97A C9         2510              RET                         ;RETURN TO EXEC.
B97B            2520  *
B97B 3E 4D      2530  HIVOUT      MVI   A,ADVCHI              ;OUTPUT VC HI ORDER
B97D D3 48      2540              OUT   SWPORT1
B97F 7C         2550              MOV   A,H
B980 D3 49      2560              OUT   SWPORT2
B982 CD 90 B9   2570              CALL  STROBE
B985 3E 4C      2580  LOVOUT      MVI   A,ADVCLO              ;OUTPUT VC LO ORDER
B987 D3 48      2590              OUT   SWPORT1
B989 7D         2600              MOV   A,L
B98A D3 49      2610              OUT   SWPORT2
B98C CD 90 B9   2620              CALL  STROBE
B98F C9         2630              RET
B990            2640  *
B990 3E 09      2650  STROBE      MVI   A,STROBEBIT
B992 D3 48      2660              OUT   STROBEPORT
B994 C9         2670              RET
B995            2680  *
B995 06 0D      2690  ONLINEOUT   MVI   B,0DH
B997 CD 0A A5   2700              CALL  VCRLF
B99A CD 01 A4   2710              CALL  VDROP
B99D 3E 01      2720              MVI   A,CRT
B99F CD 5B A5   2730              CALL  SYSOUT
```

Handwritten annotations:
B950 — CHKDAV
PUSH A
NOP
POP A
OUT SWPORT4

```
BAB6             0010 *           GRAPHIC BOARD INTERFACE FOR SCAN ROUTINES
BAB6             0020 *
BAB6             0030 *
BAB6             0040 *  4/08/83 - CTP - MOVE ALL GRAPHICS HARDWARE INTERFACE TO GRAPHVDC.S
BAB6             0050 *
BAB6             0060 *
BAB6             0070 *
BAB6             0080 *  THIS ROUTINE SUPPORTS TO DISPLAY DURING SCANNING
BAB6             0090 *  THERE ARE TWO ENTRIES TO THIS ROUTINE:
BAB6             0100 *      DISPAREAJ  - WHICH DISPLAYS THE SCAN POINT
BAB6             0110 *                   PRESENTLY ACTIVE.
BAB6             0120 *      AREA2J     - WHICH CLEARS THE SCREEN & OUTPUTS
BAB6             0130 *                   THE 2X4 SCAN AREA
BAB6             0140 *
BAB6             0150 *
BAB6             0160 *
BAB6             0170 *
BAB6             0180 * Data defining scan area display. This data is also used in scan routine (SCAN.S).
BAB6             0190 *
BAB6 32          0200 XSCNORG    DB    50        ;X-COORD AREA 2 X 4 RECT.
BAB6 C8          0210 XSCNLEN    DB    0C8H      ;X-LENGTH OF SCAN RECT.
BAB8             0220 OOLRIM     DB    4H        ;DIST. FROM SCAN AREA IF OUT OF LIMITS
BAB9 1B          0230 YSCNORG    DB    1BH       ;Y-COORD 2 X 4 AREA ON SCREEN
BABA 64          0240 YSCNLEN    DB    064H      ;Y-LENGTH OF SCAN RECT.
BABB 04          0250            DB    4H        ;DIST. FROM SCAN AREA IF OUT OF LIMITS
BABC             0260 *
BABC 00          0270 DISPAREAJ  NOP             ;ENTRY TO SHOW SCANNER POSITION
BABD             0280 *
BABD             0290 *  DE-Reg assumed to contain depth & amplitude
BABD             0300 *     Only depth presently used
BABD             0310 *
BABD             0320 *  First reset previous pixel but don't destroy DE reg
BABD             0330 *
BABD D5          0340            PUSH  D         ;SAVE DEPTH
BABE 2A 07 B0    0350            LHLD  SAVEMEM   ;OLD COORD
BAC1 3A 27 BB    0360            LDA   PXLCOLR   ;PIXEL COLOR FOR LAST SCAN POINT
BAC4 CD F0 BA    0370            CALL  OUTPXL    ;SET OLD PIXEL
BAC7             0380 *
BAC7             0390 *  Check if cursor is out of scan limits
BAC7             0400 *
BAC7 D1          0410            POP   D         ;RESTORE DEPTH
BAC8 3A A6 B1    0420            LDA   LIMITTEST
BACB E6 81       0430            ANI   81H       ;STRIP X & Y OOL BITS
BACD EE 81       0440            XRI   81H       ;IF EITHER IS ZERO IT IS OOL.
BACF CA D8 BA    0450            JZ    CONT      ;IF TEST IS ZERO IN SCAN LIMITS
BAD2 3A 25 BB    0460            LDA   BKGCOLR   ;OOL SO USE BACKGROUND COLOR FOR PIXEL
BAD5 C3 E0 BA    0470            JMP   CONT1
BAD8             0480 *
BAD8             0490 *  Get color for depth scanned
BAD8             0500 *
BAD8 5A          0510 CONT       MOV   E,D       ;DEPTH
BAD9 16 00       0520            MVI   D,0
BADB 21 00 A1    0530            LXI   H,DMAP    ;ADDRESS FOR COLOR LOOK UP TABLE
BADE 19          0540            DAD   D         ;POINT TO COLOR
BADF 7E          0550            MOV   A,M       ;GET COLOR
BAE0             0560 *
BAE0 32 27 BB    0570 CONT1      STA   PXLCOLR   ;SAVE FOR WHEN CURSOR MOVES
BAE3             0580 *
BAE3             0590 * Now show cursor at new location
BAE3             0600 *
BAE3             0610 *
BAE3 2A 9F B1    0620            LHLD  MODX      ;X,Y COORD MODIFIED FOR DISPLAY
BAE6 22 07 B0    0630            SHLD  SAVEMEM   ;SAVE COORD FOR WHEN CURSOR MOVES
BAE9 3A 28 BB    0640            LDA   CUSRCOLR  ;VALUE TO LIGHT PIXEL
BAEC CD F0 BA    0650            CALL  OUTPXL    ;SET RGB-GRAPH
BAEF             0660 *
BAEF C9          0670            RET
BAF0             0680 *
BAF0             0690 *  ROUTINE TO LIGHT PIXEL TO PRE SET COLOR
BAF0             0700 *     H REG - Y-COORD
BAF0             0710 *     L REG - X-COORD
BAF0             0720 *     A-REG - PIXEL VALUE
BAF0             0730 *
BAF0 00          0740 OUTPXL     NOP
BAF1 32 24 BB    0750            STA   VSPXL     ;OUTPUT VALUE FOR VDC
BAF4 11 01 01    0760            LXI   D,0101H   ;1x1 area fill
BAF7 CD F2 BC    0770            CALL  GDCFILL
BAFA C9          0780            RET
BAFB             0790 *
BAFB             0800 *CLEAR SCREEN AND DRAW 2 X 4 RECTANGLE
BAFB             0810 *
BAFB             0820 *
BAFB             0830 *
BAFB 00          0840 AREA2J     NOP             ;ENTRY
BAFC 3A 25 BB    0850            LDA   BKGCOLR   ;LOAD BACKGROUND COLOR
BAFF CD B6 BC    0860            CALL  GDCCLEAR  ;CLEAR PAGE
BB02             0870 *
BB02             0880 *  DRAW 2 X 4 RECTANGLE
BB02             0890 *
BB02 3A 26 BB    0900            LDA   RECTCOLR  ;COLOR OF 2X4 AREA
BB05 32 24 BB    0910            STA   VSPXL
BB08 3A B8 BA    0920            LDA   XSCNORG   ;X-COORD OF 2X4 AREA
BB0B 6F          0930            MOV   L,A
BB0C 3A B9 BA    0940            LDA   YSCNORG   ;Y-COORD OF 2X4 AREA
BB0F 67          0950            MOV   H,A
BB10 3A B7 BA    0960            LDA   XSCNLEN   ;X-DIM OF AREA
BB13 5F          0970            MOV   E,A
BB14 3A BA BA    0980            LDA   YSCNLEN   ;Y-DIM OF AREA
BB17 57          0990            MOV   D,A
BB18 CD F2 BC    1000            CALL  GDCFILL
BB1B C9          1010            RET
GRAPHVDC.S
```

61: C   GDEMTK-CODE METROTEK SWITCH SETTING TO HEADER
62: C   MPULSE-ASSEMBLY CALL TO PULSE METROTEK
63: C   TKCCAL- THICKNESS CALIBRATION ASSEMBLY CALL
64: C   INITM- ZERO THE SCAN MEMORY
65: C   HOLCAL-HOLE CALIBRATION ASSEMBLY CALL
66: C   RATTEN-DECODE ATTEN. SWITCH SETTING TO HEADER
67: C   DCDEI- DECODE INTERGER HEADER ==> BUFFER
68: C   NCDEI- ENCODE INTERGER VALUE ==> HEADER

```
 69: C     TIMDIS- PRINT LABEL AND TIME ON 1ST LINE OF SCREEN
 70: C     --------------------------------------------------
 71: C
 72: C           SUBROUTINE CALBRT
 73:            LOGICAL CALOLD
 74:            LOGICAL ICAL(15)
 75:            LOGICAL IL,ICHRD(5,4),IARRY(15),HDRCMP,IHCAL
 76:            LOGICAL INPUT(15)
 77: C
 78:            LOGICAL LABEL(15)
 79:            LOGICAL HEADER(15,48)
 80:            LOGICAL CALTYP,SFLAG,SLOAD
 81:            COMMON /CHDRS/HEADER,NGRP(4),IGRP(4)
 82:            COMMON /CDATS/INPUT,IBUF(16),CALTYP,SFLAG,SLOAD,RADIAL(4),
 83:          $           VIEW(3)
 84: C
 85:            DATA ICHRD/ 'V','C','D','L','Y',
 86:          $             'H','C','A','L',' ',
 87:          $             'F','/','F',' ','H',
 88:          $             'E','A','D','E','R'/
 89: C
 90:            DATA LABEL/'C','A','L','I','B','R','A','T','E',' ',' ',' ',' ',
 91:          $            ' ',' ',' '/
 92: C
 93: C   INITIALIZE FLAGS
 94: C
 95:            RARG = 0
 96:            ICLTYP = 0
 97:            CALOLD = CALTYP
 98:            CALTYP = 0
 99:            IGP1 = NGRP(1)
100:            IGP2 = NGRP(1) + NGRP(2)
101:            IGP3 = NGRP(1) + NGRP(2) + NGRP(3)
102: C
103: C
104: 10         CALL SRN(1,0)
105: C
106:            CALL TIMDIS(LABEL)
107:            CALL SRN(3,4)
108: C
109:            WRITE(3,2000)
110: 50         CALL SRN(3,14)
111:            WRITE(3,2100)
112:            CALL READI
113:            CALL CHRSCN(INPUT,LEN)
114:            CALL DCDEI(INPUT,IOPT,LEN)
115:            CALL MEMMAP(8,36,2,1)
116:            IF(IOPT.GT.5) CALL MEMMAP(8,40,2,1)
117:            GO TO(800,200,300,400,500,600,600),IOPT
118:            CALL INPINV
119:            CALL SRN(3,14)
120:            CALL SRN(2,1)
121:            GO TO 50
122: C
123: 200        CALL FRONCL(1)
124:            CALTYP = CALTYP .OR. 2
125:            GO TO 10
126: C
127: 300        CALL FRONCL(2)
128:            GO TO 10
129: 400        CALL THIKCL
130:            GO TO 10
131: 500        CALL HOLECL
132:            GO TO 10
133: 600        IPTH = IOPT - 5
134:            CALL CALSCN(IPTH,IRSP)
135:            IF(IRSP.EQ.1) GO TO 1000
136:            GO TO 10
137: C
138: C   Check to see what was done
139: C
140: 800        IF((CALTYP .AND. Z'3E') .EQ. 0)GO TO 1100
141: C
142: C   CLEAR CALTYP ARRAY & CALTYPE IN HEADER
143: C
144:            DO 810 IL=1,15
```

```
145:              ICAL(IL) = ' '
146:              HEADER(IL,ICP2+15) = ' '
147:  810    CONTINUE
148: C
149:         IF(CALTYP.AND.04) GO TO 815
150:         GO TO 830
151: C
152: C  LOAD F/P INTO CALTYP
153: C
154:  815    DO 820 IL=1,4
155:              ICAL(IL)=ICHRD(IL,3)
156:  820    CONTINUE
157:         ICLTYP = 4
158: C
159: C  Check for delay cal.
160: C
161:  830    IF(CALTYP.AND.Z'08') GO TO 832
162:         GO TO 835
163: C
164: C  LOAD "DLY" INTO CALTYP
165: C
166:  832    DO 834 IL=1,3
167:              II = ICLTYP + IL
168:              IJ = IL + 2
169:              ICAL(II) = ICHRD(IJ,1)
170:  834    CONTINUE
171:         ICLTYP = ICLTYP + 4
172: C
173: C  Check for velocity cal.
174: C
175:  835    IF(CALTYP.AND.Z'10') GO TO 837
176:         GO TO 850
177: C
178: C  LOAD "VC" INTO CALTYP
179: C
180:  837    DO 839 IL=1,2
181:              II = ICLTYP + IL
182:              ICAL(II) = ICHRD(IL,1)
183:  839    CONTINUE
184:         ICLTYP = ICLTYP + 3
185: C
186: C  CHECK FOR HOLE CAL
187: C
188:  850    IF(CALTYP.AND.Z'20') GO TO 855
189:         GO TO 870
190: C
191: C  LOAD HCAL TO CALTYP
192: C
193:  855    DO 860 IL=1,5
194:              II = ICLTYP + IL
195:              ICAL(II) = ICHRD(IL,2)
196:  860    CONTINUE
197:         ICLTYP = ICLTYP + 5
198: C
199: C  CHECK FOR ANY CAL DONE IF NOT PUT HEADER IN CALTYP AND RETURN
200: C
201:  870    IF(ICLTYP.NE.0)GO TO 910
202: C
203: C
204: C  TRANSFER "HEADER" INTO CALTYP ARRAY
205: C
206:         DO 900 IL = 1,6
207:              II = IL + 4
208:              ICAL(IL) = ICHRD(II,3)
209:  900    CONTINUE
210: C
211: C  SET CAL. FLAG ON
212: C  TRANSFER CALTYP INTO HEADER
213: C  TURN SCAN FLAG OFF
214: C  LOAD METROTEK WITH PROPER VALUES WHEN EXITING CALIBRATION.
215: C
216:  910    DO 920 IL=1,15
217:              HEADER(IL,ICP2+15) = ICAL(IL)
218:  920    CONTINUE
219: C
220:         SFLAG = 0
```

```
221:            CALL LOMPEK
222:            CALTYP = CALTYP .OR. 1
223:    C
224:    C RETURN TO CALLING ROUTINE
225:    C
226:    1000    RETURN
227:    C
228:    C
229:    C   Preserve old caltyp
230:    C
231:    1100    CALTYP = CALOLD
232:    C
233:            RETURN
234:    C
235:    C   FORMAT STATEMENTS FOR CALIBRATION
236:    C
237:    2000    FORMAT(1H+,29X,'CALIBRATION',//,
238:         $          22X,'1 - RETURN TO COMMAND LIST',//,
239:         $      12X,'2 - WITH HEADER VALUES      6 - SCANNER',/,
240:         $      12X,'3 - UT FRONT PANEL          7 - RADIAL',/,
241:         $      12X,'4 - THICKNESS',/,
242:         $      12X,'5 - HOLE SIZE')
243:    C
244:    2100    FORMAT('+   Enter option NUMBER - ')
245:    C
246:            END
```

```
  1:            SUBROUTINE CALSCN(IPTH,IRSP)
  2:    C
  3:    C    CALIBRATE THE SCANNER "COUNTS/UNIT AREA"
  4:    C    AND RADIAL OFFSETS.
  5:    C
  6:    C    LAST MOD. 4/5/83  FOR SCREEN SIZE CHANGES
  7:    C
  8:    C    CREATED JRM 02-24-83
  9:    C
 10:    C
 11:            LOGICAL LABEL1(15)
 12:            LOGICAL LABEL2(15)
 13:            LOGICAL IL,INPUT(15)
 14:            LOGICAL HEADER(15,48)
 15:            LOGICAL PROMPT(20,48),TITLE(15,48),GROUPT(30,4)
 16:            LOGICAL CALTYP,SFLAG,SLOAD
 17:            COMMON /CHDR$/HEADER,NGRP(4),IGRP(4)
 18:            COMMON /CHDD$/PROMPT,TITLE,GROUPT
 19:            COMMON /CDAT$/INPUT,IBUF(16),CALTYP,SFLAG,SLOAD,RADIAL(4),
 20:         $          VIEW(3)
 21:    C
 22:            DATA LABEL1/'C','A','L','I','B','R','A','T','E','.','S','C','A',
 23:         $          'N','R'/
 24:    C
 25:            DATA LABEL2/'C','A','L','I','B','R','A','T','E','.','R','A','D',
 26:         $          'L',' '/
 27:    C
 28:            IGP1 = NGRP(1)
 29:            IGP2 = NGRP(1) + NGRP(2)
 30:            IGP3 = NGRP(1) + NGRP(2) + NGRP(3)
 31:    C
 32:    400     CALL SRN(1,0)
 33:            IF(IPTH.EQ.1) CALL TIMDIS(LABEL1)
 34:            IF(IPTH.EQ.2) CALL TIMDIS(LABEL2)
 35:            CALL SRN(3,4)
```

```
36:    C
37:              IERR = 0
38:              IRSP = 0
39:    C
40:    C    GET TRACK LINEAR FACTOR FROM HEADER
41:    C
42:              CALL CHRSCH(HEADER(1,ICP1+2),ILEN)
43:              CALL DCDEI(HEADER(1,ICP1+2),LSFT,ILEN)
44:    C
45:    C    GET ARM LINEAR FACTOR FROM HEADER
46:    C
47:              CALL CHRSCH(HEADER(1,ICP1+3),ILEN)
48:              CALL DCDEI(HEADER(1,ICP1+3),LSFA,ILEN)
49:    C
50:    C    GET HEADER GRID AREA FACTOR
51:    C
52:              CALL CHRSCH(HEADER(1,ICP1+1),ILEN)
53:              CALL DCDEI(HEADER(1,ICP1+1),IGS,ILEN)
54:    C
55:    C    CHECK FOR GOOD DATA IN HEADER FOR TRACK,ARM,&AREA FACTORS.
56:    C
57:              IF((LSFT.NE.0).AND.(LSFA.NE.0).AND.(IGS.NE.0)) GO TO 410
58:    C
59:    C    PRINT ERROR MESSAGE THAT HEADER IS NOT LOADED WITH ANY VAUES.
60:    C
61:              CALL SRN(3,4)
62:              WRITE(3,3000)
63:              CALL SRN(2,1)
64:              CALL KBD(2,IRSP)
65:              IRSP = 1
66:              GO TO 1600
67:    C
68:    C    Split up between scanner cal & radial cal.
69:    C
70:    410       GO TO(500,515),IFTH
71:    C
72:    C
73:    C    FORCE AREA FACTOR TO 20MIL SPACES FOR SCANNER CALIBRATION
74:    C
75:    500       IAFACT = 17
76:    C
77:    C    LOAD THE LINEAR TRACK & ARM AND THE FORCED AREA FACTOR
78:    C
79:              CALL MEM(1,Z'2A',LSFT)
80:              CALL MEM(1,Z'2B',LSFA)
81:              CALL MEM(1,Z'2C',IAFACT)
82:    C
83:    C    X = TRACK , Y = ARM
84:    C
85:              CALL MEM(1,Z'09',Z'45')
86:              CALL MEM(1,Z'0A',Z'47')
87:    C
88:    C    CALL THE SCAN-CAL ASSM PROGRAM.
89:    C
90:              CALL SCNCAL
91:    C
92:    C    RE-LOAD LINEAR TRACK,ARM FACTORS INTO HEADER
93:    C
94:              CALL MEM(2,Z'2A',LSFT)
95:              CALL MEM(2,Z'2B',LSFA)
96:    C    BLANK OUT OLD X & Y SCALE FACTORS IN THE HEADER
97:              DO 510 IL= 1,15
98:              HEADER(IL,ICP1+2) = 32
99:              HEADER(IL,ICP1+3) = 32
100:   510       CONTINUE
101:   C    Put new scale factors into header.
102:             CALL NCDEI(HEADER(1,ICP1+2),LSFT)
103:             CALL NCDEI(HEADER(1,ICP1+3),LSFA)
104:   C
105:   C    GO TO Calc. RADIAL ratios
106:   C
107:             GO TO 560
108:   C
109:   C    RADIAL OFF-SETS.
110:   C
111:   515       RADIAL(1) = 1.0
```

```
112:              RADIAL(2) = 1.0
113:              RADIAL(3) = 1.0
114:              RADIAL(4) = 1.0
115: C
116: 520          ITEM = IGP2 + 4
117: C
118:              DO 550 II=1,4
119:              ISRNL = (II * 3) + 4
120: 530          CALL SRN(3,ISRNL)
121:              IF(II.EQ.1) WRITE(3,4210)
122:              IF(II.EQ.2) WRITE(3,4220)
123:              IF(II.EQ.3) WRITE(3,4230)
124:              IF(II.EQ.4) WRITE(3,4240)
125:              WRITE(3,3100)(PROMPT(JJ,ITEM),JJ=1,20)
126:              CALL READ
127: C
128: C   SET ITEM CHECK TO THE THICKNESS PROMPT
129: C
130:              CALL INPTCK(INPUT,ITEM,IERR)
131: C
132: C   CHECK FOR VALIDITY.
133: C
134:              IF(IERR.EQ.0) GO TO 540
135: C
136:              CALL INPINV
137:              CALL SRN(3,ISRNL)
138:              CALL SRN(2,2)
139:              GO TO 530
140: C
141: 540          ISRNX = ISRNL + 2
142:              CALL SRN(3,ISRNX)
143:              CALL SRN(2,1)
144:              CALL CURSCH(INPUT,LEN)
145:              CALL DCDEF(INPUT,RADIAL(II),LEN)
146: C
147: 550          CONTINUE
148: C
149: C   CALCULATE RADIAL OFF-SETS
150: C
151: 560          RTRK = RADIAL(1)/RADIAL(2)
152:              RARM = RADIAL(3)/RADIAL(4)
153: C
154: C   CLEAR RADIAL RATIOS IN HEADER AND LOAD NEW ONES
155: C
156:              DO 565 II = 1,15
157:              HEADER(II,IGP1+8) = 32
158:              HEADER(II,IGP1+9) = 32
159: 565          CONTINUE
160: C
161:              CALL NCDEF(HEADER(1,IGP1+8),RTRK)
162:              CALL NCDEF(HEADER(1,IGP1+9),RARM)
163: C
164: C
165: C   CALCULATE THE AREA FACTOR
166: C
167:              DO 570 II = 1,5
168:              IAF = 10 * 2 ** II
169:              IAFACT = 1 + (16 * II)
170:              RCRID = FLOAT(IOS)/FLOAT(IAF)
171:              ISFT = IFIX(FLOAT(ISFT) * RCRID * RTRK)
172:              ISFA = IFIX(FLOAT(ISFA) * RCRID * RARM)
173: C
174: C   CHECK FOR WITH-IN RANGE COND.
175: C
176:              IF(ISFT.LE.256 .AND. ISFA.LE.256) GO TO 580
177: 570          CONTINUE
178: C
179: C   IF THE DO LOOP ENDED BY THE LAST CONTINUE THE
180: C   CORRECT IAF WASN'T FOUND.
181: C
182:              CALL SRN(1,0)
183:              IF(IPTR.EQ.1) CALL TIMDIS(LABEL1)
184:              IF(IPTR.EQ.2) CALL TIMDIS(LABEL2)
185:              CALL SRN(3,4)
186:              WRITE(3,4400)
187:              CALL SRN(2,1)
```

```
188:            CALL KBD(2,IRSP)
189:            IRSP = 1
190:            GO TO 1000
191:    C
192:    C   THE CORRECT IAF WAS SELECTED. "LET'S SEE IF UNDER RANGE ?"
193:    C
194:    580    CALL SRN(1,0)
195:            IF(IPTR.EQ.1) CALL TIMDIS(LABEL1)
196:            IF(IPTR.EQ.2) CALL TIMDIS(LABEL2)
197:            CALL SRN(3,4)
198:            IF(ISFT.LT.LSFT .OR. ISFA.LT.LSFA) WRITE(3,4500)
199:            WRITE(3,4600) LSFT,ISFT,LSFA,ISFA,(RADIAL(I),I=1,4),
200:       $              ICS,IAF
201:            CALL SRN(2,1)
202:            CALL KBD(1,IRSP)
203:    C
204:    C
205:    1000   RETURN
206:    C
207:    C  FORMAT STATEMENTS FOR CALSCN
208:    C
209:    3000   FORMAT(10X,'HEADER DATA NOT PRESENT EITHER READ OR ',
210:       $              'CREATE ONE.')
211:    C
212:    3100   FORMAT(5X,29A1,3H - )
213:    4210   FORMAT('+    Enter track dia.')
214:    4220   FORMAT('+    Enter track/transducer dia.')
215:    4230   FORMAT('+    Enter arm dia.')
216:    4240   FORMAT('+    Enter arm/transducer dia.')
217:    4400   FORMAT('+  ** ERROR **  SCANNER FACTOR(S) OVERFLOW ON THE',
218:       $              ' HIGHEST AREA FACTOR.',//,
219:       $              5X,'Go to header and reduce the GRID SIZE !')
220:    4500   FORMAT(1H+,9X,'** WARNING **  THE LINEAR > ACTUAL SCALE ',
221:       $              'FACTOR(S).',/)
222:    4600   FORMAT(1H+,24X,'SCANNER SET-UP VALUES',//,
223:       $              17X,'Track S.F. linear = ',I3,2X,'actual = ',I3,/,
224:       $              17X,'Arm S.F.   linear = ',I3,2X,'actual = ',I3,//,
225:       $              17X,'Track dia. = ',F7.3,8X,'xducer = ',F7.3,/,
226:       $              17X,'Arm dia.   = ',F7.3,8X,'xducer = ',F7.3,//,
227:       $              17X,'Header Grid size = ',I3,2X,'Area factor = ',I3)
228:    C
229:            END
230:
231:
232:
233:
234:
235:
236:
237:
238:
239:
240:

1:             SUBROUTINE CDEHDR(IERR)
2:     C
3:     C  CODE HEADER VALUES FOR METROTEK
4:     C
5:     C  THE CODE HEADER TAKES THE METROTEK HEADER VALUES
6:     C  IN COMMON BLOCK HEADER(X,Y) & CONVERTS THEM INTO
7:     C  THEIR EQUIVALAT SWITCH SETTINGS AND LOADS THEM
8:     C  INTO THE IBUF(16) COMMON BLOCK.
9:     C
10:    C  Last mod 9.22.83 for removal of hole cal. values such as pixel
11:    C                   counts, low and high limits.
12:    C
13:    C  Last mod 7.11.83 for which velocity constant to get for ibuf(x)
14:    C
15:    C  DATE LAST MODIFIED 11/08/82 BY: JRM
16:    C
17:    C       FOR: NEW METRO-TEK MODULES
18:    C
19:    C  DATE LAST MODIFIED 03/02/83 BY: JRM
20:    C  FOR COMMON BLOCK SIZES
21:    C
22:             DIMENSION IKOL(12)
23:             LOGICAL INPUT(15)
```

```
 24:          LOGICAL HEADER(15,48)
 25:          LOGICAL CALTYP,SFLAG,SLOAD
 26:          COMMON /CHDR2/HEADER,NCRP(4),ICRP(4)
 27:          COMMON /CDATA2/INPUT,IBUF(16),CALTYP,SFLAG,SLOAD,RADIAL(4),
 28:       $             VIEW(3)
 29: C
 30: C   SET UP HEADER DATA IN 1ST COL..
 31: C   AND GET CHARACTER LENGTH OF EACH ELEMENT
 32: C
 33:          ICP2 = NCRP(1)+NCRP(2)
 34:          ICP3 = NCRP(1)+NCRP(2)+NCRP(3)
 35:          IMAX = NCRP(4)
 36:          DO 100 I=1,IMAX
 37:          II = ICP3+I
 38:          CALL CHRSCH(HEADER(1,II),IHDL(I))
 39: 100      CONTINUE
 40: C
 41: C
 42: C   CODE PULSE AMPLITUDE
 43: C
 44:          CALL DCDEI(HEADER(1,ICP3+1),IVAL,IHDL(1))
 45:          IBUF(1) = 0
 46:          IF (IVAL .EQ. 100) IBUF(1) = 15
 47:          IF (IVAL .EQ. 80) IBUF(1) = 23
 48:          IF (IVAL .EQ. 60) IBUF(1) = 27
 49:          IF (IVAL .EQ. 40) IBUF(1) = 29
 50:          IF (IVAL .EQ. 20) IBUF(1) = 30
 51:          IF (IBUF(1) .EQ. 0) GO TO 2050
 52: C
 53: C   CODE PULSE DAMPENING
 54: C
 55:          CALL DCDEI(HEADER(1,ICP3+2),IVAL,IHDL(2))
 56:          IBUF(2) = 0
 57:          IF (IVAL .EQ. 150) IBUF(2) = 15
 58:          IF (IVAL .EQ. 100) IBUF(2) = 23
 59:          IF (IVAL .EQ. 50) IBUF(2) = 27
 60:          IF (IVAL .EQ. 25) IBUF(2) = 29
 61:          IF (IVAL .EQ. 10) IBUF(2) = 30
 62:          IF (IBUF(2) .EQ. 0) GO TO 2060
 63: C
 64: C   ADD IN HI OR LOW TO IBUF(2)
 65: C
 66:          IF (HEADER(1,ICP3+3).EQ. 72 .AND.
 67:       $    HEADER(2,ICP3+3).EQ. 79) IBUF(2) = IBUF(2)+128
 68: C
 69: C   DECODE FOR IBUF(3) FILTER,FUNCTION,& RF DET.
 70: C
 71: C   FILTER
 72: C
 73:          IVAL1 = 0
 74:          IVAL2 = 0
 75:          IVAL3 = 128
 76: C
 77:          CALL DCDEI(HEADER(1,ICP3+4),VAL,IHDL(4))
 78:          IF (VAL .EQ. 4) IVAL1 = 7
 79:          IF (VAL .EQ. 2) IVAL1 = 11
 80:          IF (VAL .EQ. 1) IVAL1 = 13
 81:          IF (HEADER(1,ICP3+4).EQ.66) IVAL1 = 14
 82:          IF (IVAL1 .EQ. 0) GO TO 2010
 83: C
 84: C   FUNCTION
 85: C
 86: C                     PULSE ECHO CHECK
 87: C
 88:          IF (HEADER(3,ICP3+5).EQ.69) IVAL2 = 64
 89: C
 90: C                     PITCH CATCH CHECK
 91: C
 92:          IF (HEADER(3,ICP3+5).EQ.67) IVAL2 = 32
 93:          IF (IVAL2.EQ.0) GO TO 2020
 94: C
 95: C                     RF SWITCH OFF CHECK (RF MODE)
 96: C
 97:          IF (HEADER(1,ICP3+6).EQ.82) IVAL3 = 128
 98: C
 99: C                     RF SWITCH ON CHECK (VIDEO MODE)
```

```
100:  C
101:                IF (HEADER(1,ICP3+6).EQ.86) IVAL3 = 0
102:                IF (IVAL3 .GT.128) GO TO 2030
103:  C
104:                IBUF(3) = IVAL1 + IVAL2 + IVAL3
105:  C
106:  C     ATTENUATION
107:  C
108:                CALL DATTEN(HEADER(1,ICP3+7),IBUF(4),IHDL(7))
109:  C
110:  C     RESOLUTION MILS/BIT
111:  C
112:                IBUF(8) = 0
113:                CALL DCDEI(HEADER(1,ICP3+8),IRANG,IHDL(8))
114:                IF (IRANG.EQ.200) IBUF(8)=Z'F6'
115:                IF (IRANG.EQ.100) IBUF(8)=Z'F5'
116:                IF (IRANG.EQ.50)  IBUF(8)=Z'F4'
117:                IF (IRANG.EQ.10)  IBUF(8)=Z'F2'
118:                IF (IRANG.EQ.4)   IBUF(8)=Z'F1'
119:                IF (IRANG.EQ.2)   IBUF(8)=Z'F0'
120:                IF (IBUF(8).EQ.0) GO TO 2040
121:
122:  C     GATE DELAY & WIDTH
123:  C
124:                SCALE = 1
125:                IF(IRANG .GE. 50) SCALE = 10
126:  C
127:                CALL DCDEF(HEADER(1,ICP3+9),DELAY,IHDL(9))
128:                CALL DCDEF(HEADER(1,ICP3+10),WIDTH,IHDL(10))
129:  C
130:                DELAY = (DELAY /SCALE) + .05
131:                WIDTH = (WIDTH /SCALE) + .05
132:  C
133:                IA = IFIX(DELAY/10)
134:                D = DELAY - FLOAT(IA*10)
135:                IBUF(5) = 16 * (9-IA)
136:                IA = IFIX(D)
137:                D = D - FLOAT(IA)
138:                IBUF(5) = IBUF(5) + (9-IA)
139:                IA = IFIX(D*10)
140:                IBUF(6) = 16*(9-IA)
141:                IA = IFIX(WIDTH/10)
142:                R = WIDTH - FLOAT(IA*10)
143:                IBUF(7) = 16 * (9-IA)
144:                IA = IFIX(R)
145:                R = R - FLOAT(IA)
146:                IBUF(7) = IBUF(7) + (9-IA)
147:                IA = IFIX(R*10)
148:                IBUF(6) = IBUF(6) + (9-IA)
149:  C
150:  C     THRESHOLD
151:  C
152:                CALL CHRSCH(HEADER(1,ICP2+3),LEN)
153:                CALL DCDEF(HEADER(1,ICP2+3),THRSP,LEN)
154:                IBUF(9) = IFIX(THRSP * 1.27 + .5)
155:  C
156:  C     VELOCITY CONSTANT
157:  C
158:                ITEM = ICP2 + 2
159:  C
160:  C     Look for velocity calibration.
161:  C     IF DONE USE THE MEASURED NUMBER
162:  C     OTHERWISE USE THE THEORITICAL
163:  C
164:                IF (CALTYP .AND. Z'10') ITEM = ICP2 + 13
165:  C
166:                CALL CHRSCH(HEADER(1,ITEM),LEN)
167:                CALL DCDEF(HEADER(1,ITEM),VC,LEN)
168:  C
169:                VEL = VC * 128 + .5001
170:                IVEL = IFIX(VEL)
171:                IA = IFIX(VEL/256)
172:                IBUF(10) = IVEL - (IA*256)
173:                IBUF(11) = 240 + IA
174:  C
175:  C     CHECK THE RANGE AGAINST DELAY+WIDTH TIME
176:  C
```

```
177:            DMAX = (DELAY + WIDTH) * VC * .05 * SCALE
178:            IF ((DMAX .LE. (IRANG * .255)) .OR. IERR.EQ.3)
179:         $     GO TO 1000
180:  C
181:  C    CALL THE RANGE ERROR WARNING AND WAIT FOR -CR-
182:  C
183:            CALL MESLNG(4,DMAX)
184:            CALL SKN(2,1)
185:            CALL KBD(2,IRSP)
186:            IF(IRSP .EQ. 1)  GO TO 2105
187:  C
188:            IERR = 3
189: 1000       RETURN
190:  C
191:  C    ERROR ROUTINE
192:  C
193: 2010       WRITE(3,2110) (HEADER(I,ICP3+4),I=1,15)
194:            GO TO 2100
195: 2020       WRITE(3,2120) (HEADER(I,ICP3+5),I=1,15)
196:            GO TO 2100
197: 2030       WRITE(3,2130) (HEADER(I,ICP3+6),I=1,15)
198:            GO TO 2100
199: 2040       WRITE(3,2140) (HEADER(I,ICP3+8),I=1,15)
200:            GO TO 2100
201: 2050       WRITE(3,2150) (HEADER(I,ICP3+1),I=1,15)
202:            GO TO 2100
203: 2060       WRITE(3,2150) (HEADER(I,ICP3+2),I=1,15)
204: 2100       WRITE(3,2200)
205:            CALL KBD(2,IRSP)
206: 2105       IERR = 1
207:            RETURN
208:  C
209: 2110       FORMAT(1X,'ERROR CDEHDR WRONG VALUE FOR ',
210:         $     'FILTER',/,1X,'CURRENT HEADER VALUE ==> ',15A1)
211: 2120       FORMAT(1X,'ERROR CDEHDR WRONG VALUE FOR ',
212:         $     'FUNCTION SWITCH',/,1X,'CURRENT HEADER VALUE ',
213:         $     '==> ',15A1)
214: 2130       FORMAT(1X,'ERROR CDEHDR WRONG VALUE FOR ',
215:         $     'RF SWITCH',/,1X,'CURRENT HEADER VALUE ',
216:         $     '==> ',15A1)
217: 2140       FORMAT(1X,'ERROR CDEHDR WRONG VALUE FOR ',
218:         $     'RANGE SWITCH',/,1X,'CURRENT HEADER VALUE ',
219:         $     '==> ',15A1)
220: 2150       FORMAT(1X,'ERROR CDEHDR WRONG VALUE FOR ',
221:         $     'PULSE AMPLITUDE',/,1X,'CURRENT HEADER VALUE ',
222:         $     '==> ',15A1)
223: 2160       FORMAT(1X,'ERROR CDEHDR WRONG VALUE FOR ',
224:         $     'PULSE DAMPING',/,1X,'CURRENT HEADER VALUE ',
225:         $     '==> ',15A1)
226: 2200       FORMAT(1X,'GO TO HEADER AND CORRECT THE VALUE')
227:            END
228:            SUBROUTINE CHRSCH(IARRY,ILEN)
229:  C
230:  C    CHARACTER SEARCH , THIS SUBROUTINE LEFT JUSTIFIES
231:  C    ALL CHARACTERS EXCEPT BLANKS IN THE 15 ASCII STRING
232:  C    ARRAY AND RETURNS WITH A STRING LENGTH IN ARGUMENT
233:  C    'ILEN'
234:  C
235:            LOGICAL IARRY(15),IARY(30),IGF,IJMP
236:  C
237:  C    LOAD IARY(X)
238:  C
239:            DO 10 I=1,15
240:            II = I + 15
241:            IARY(I) = IARRY(I)
242:            IARY(II) = 32
243: 10         CONTINUE
244:  C
245:  C    SET FLAGS FALSE & ILEN LENGTH COUNT TO 0
246:  C
247:            IJMP = .FALSE.
248:            IGF = .FALSE.
249:            ILEN = 0
250:            IDISP = 0
251:  C
252:  C    CALCULATE ILEN & IDISP
253:  C
```

```
254:            DO 100 I=1,15
255:            IF (IJMP) GO TO 100
256:            IF (IARRY(I) .EQ. 32) GO TO 80
257:            ILEN = ILEN + 1
258:            IGF = .TRUE.
259:            GO TO 100
260:   80       IF (IGF) GO TO 90
261:            IDISP = IDISP + 1
262:            GO TO 100
263:   90       IJMP = .TRUE.
264:  100       CONTINUE
265: C
266: C   IARY(X) ==> IARRY(X) SHIFTED LEFT BY IDISP TIMES
267: C
268:            DO 500 I=1,15
269:            II = IDISP + I
270:            IARRY(I) = IARY(II)
271:  500       CONTINUE
272:            RETURN
273:            END
274:
...
288:

1:            SUBROUTINE CDEMTK(IERR)
  2: C
  3: C       ENCODE METROTEK SWITCH SETTINGS TO HEADER
  4: C
  5: C   THIS SUBROUTINE TAKES WHAT IS IN MEMORY LOCATIONS
  6: C   IN B-PAGE THAT REFLECT THE METROTEK SWITCH SETTINGS
  7: C   AND CONVERTS THEM INTO ASCII STRINGS CHARACTERS TO
  8: C   LOAD THEM INTO THEIR METROTEK HEADER VALUES FOR THE
  9: C   SWITCH POSITIONS.
 10: C
 11: C   DATE LAST MODIFIED 11/09/82 BY: JRM
 12: C       FOR: NEW METRO-TEK MODULES.
 13: C
 14: C   DATE LAST MODIFIED 03/02/83 BY: JRM
 15: C   FOR: COMMON BLOCK SIZE CHANGE
 16: C
 17: C   SUBR.   -   DESCRIPTION
 18: C   ------------------------------------------------
 19: C   MEM     -   MEMORY MANAGER
 20: C   NCDEG   -   ENCODE GATE DELAY OR WIDTH TO HEADER
 21: C   NCDEI   -   ENCODE INTERGERS TO HEADER
 22: C   NCDEF   -   ENCODE FIXED FORMAT ==> HEADER
 23: C   RATTEN  -   READ ATTENUATION SWITCH CODE ==> HEADER
 24: C   ------------------------------------------------
 25: C
 26:            LOGICAL PROMPT(20,48),TITLE(25,48),GROUTP(30,4)
 27:            LOGICAL HEADER(15,48)
 28:            LOGICAL CALTYP,SFLAG,SLOAD,INPUT(15)
 29:            COMMON /CHDRS/HEADER,NGRP(4),IGRP(4)
 30:            COMMON /CHDGS/PROMPT,TITLE,GROUPT
 31:            COMMON /CDATS/INPUT,IBUF(16),CALTYP,SFLAG,SLOAD,RADIAL(4),
 32:          $              VIEW(3)
 33: C
 34: C   BLANK OUT GROUP 4 LINES 1 THRU 10 OF HEADER
 35: C
 36:            IGP2 = NGRP(1)+NGRP(2)
 37:            IGP3 = NGRP(1)+NGRP(2)+NGRP(3)
 38:            ILG = IGP3 + 1
 39:            IHG = IGP3 + 10
 40:            DO 15 IJ = 1,15
 41:            DO 10 II = ILG,IHG
```

```
 42:            HEADER(IJ,II) = ' '
 43: 10     CONTINUE
 44: 15   CONTINUE
 45: C
 46: C   LOAD IBUF ARRAY WITH SWITCH VALUES
 47: C   IBUF(1) THRU IBUF(11) = Z'B910 THRU B91A'
 48: C
 49:        DO 20 IL=1,11
 50:        II = IL + 15
 51:        CALL MEM(2,II,IBUF(IL))
 52: 20   CONTINUE
 53: C
 54: C   ENCODE PULSE AMPLITUDE
 55: C
 56:        IJ = 0
 57:        IB = IBUF(1) .AND. 31
 58:        IF (IB .EQ. 15) IJ = 16
 59:        IF (IB .EQ. 23) IJ = 10
 60:        IF (IB .EQ. 27) IJ = 7
 61:        IF (IB .EQ. 29) IJ = 4
 62:        IF (IB .EQ. 30) IJ = 1
 63:        IF(IJ.EQ.0) GO TO 2000
 64:        IL = 2
 65:        IF(IJ.EQ.16) IL = 3
 66:        DO 30 II = 1,IL
 67:        JJ = II + IJ - 1
 68:        HEADER(II,ICPS+1)=PROMPT(JJ,ICPS+1)
 69: 30   CONTINUE
 70: C
 71: C   ENCODE PULSE DAMPING
 72: C
 73:        IJ = 0
 74:        IB = IBUF(2) .AND. 31
 75:        IF (IB .EQ. 15) IJ = 17
 76:        IF (IB .EQ. 23) IJ = 10
 77:        IF (IB .EQ. 27) IJ = 7
 78:        IF (IB .EQ. 29) IJ = 4
 79:        IF (IB .EQ. 30) IJ = 1
 80:        IF(IJ.EQ.0) GO TO 2005
 81:        IL = 2
 82:        IF(IJ.GE.10) IL = 3
 83:        DO 40 II = 1,IL
 84:        JJ = II + IJ - 1
 85:        HEADER(II,ICPS+2)=PROMPT(JJ,ICPS+2)
 86: 40   CONTINUE
 87: C
 88: C   ENCODE PULSE WIDTH
 89: C
 90:        IF (IBUF(2) - 128) 50,60,60
 91: 50     DO 55 II=1,2
 92:        JJ = II + 6
 93:        HEADER(II,ICPS+3)=PROMPT(JJ,ICPS+3)
 94: 55   CONTINUE
 95:        GO TO 70
 96: 60     DO 65 II=1,2
 97:        JJ = II
 98:        HEADER(II,ICPS+3)=PROMPT(JJ,ICPS+3)
 99: 65   CONTINUE
100: C
101: C   RF DETECT SWITCH
102: C
103: 70     IF (IBUF(3) - 128) 80,90,90
104: 80     DO 85 II=1,3
105:        JJ = II + 6
106:        HEADER(II,ICPS+6) = PROMPT(JJ,ICPS+6)
107: 85   CONTINUE
108:        GO TO 100
109: 90     DO 95 II=1,3
110:        JJ = II
111:        HEADER(II,ICPS+6) = PROMPT(JJ,ICPS+6)
112: 95   CONTINUE
113: C
114: C   ENCODE METROTEK FUNCTION
115: C
116: 100    IB = IBUF(3) .AND. 96
117:        IJ = 0
```

```
118:           IF (IB .EQ. 32) IJ = 1
119:           IF (IB .EQ. 64) IJ = 8
120:           IF (IJ .LT. 1) GO TO 2010
121:           DO 110 II = 1,3
122:           JJ = II + IJ - 1
123:           HEADER(II,ICPS+5) = PROMPT(JJ,ICPS+5)
124:  110      CONTINUE
125: C
126: C   ENCODE FILTER
127: C
128:           IB = IBUF(3) .AND. 15
129:           IJ = 0
130:           IF (IB .EQ. 7) IJ = 11
131:           IF (IB .EQ. 11) IJ = 6
132:           IF (IB .EQ. 13) IJ = 4
133:           IF (IB .EQ. 14) IJ = 1
134:           IF (IJ .LT. 1) GO TO 2020
135:           IL = 1
136:           IF(IJ.EQ.1) IL = 3
137:           DO 120 II = 1,IL
138:           JJ = II + IJ - 1
139:           HEADER(II,ICPS+5) = PROMPT(JJ,ICPS+4)
140:  120      CONTINUE
141: C
142: C   ENCODE ATTENUATION
143: C
144:           CALL RATTEN(HEADER(1,ICPS+7),IBUF(4),IERR)
145:           IF (IERR .EQ. 1) GO TO 2090
146: C
147: C   ENCODE RANGE MILS/BIT
148: C
149:           IB = IBUF(8) .AND. 7
150:           IJ = 0
151:           IF (IB .EQ. 0) IJ = 1
152:           IF (IB .EQ. 1) IJ = 3
153:           IF (IB .EQ. 2) IJ = 5
154:           IF (IB .EQ. 4) IJ = 8
155:           IF (IB .EQ. 5) IJ = 11
156:           IF (IB .EQ. 6) IJ = 13
157:           IF (IJ .LT. 1)  GO TO 2030
158:           IL = 1
159:           IF(IJ.GE.11) IL = 3
160:           IF((IJ.EQ.5).OR.(IJ.EQ.8)) IL = 2
161:           DO 130 II = 1,IL
162:           JJ = II + IJ - 1
163:           HEADER(II,ICPS+8) = PROMPT(JJ,ICPS+8)
164:  130      CONTINUE
165: C
166:           SCALE = 1
167:           IF (IJ.GE.8) SCALE = 10
168: C
169: C   ENCODE METROTEK GATE DELAY
170: C
171:           D1 = FLOAT(IBUF(5) .AND. 15)
172:           D2 = FLOAT(IBUF(5) .AND. 240)
173:           D3 = FLOAT(IBUF(6) .AND. 240)
174:           IF (D1.GT.9 .OR. D2.GT.144 .OR. D3.GT.144)
175:         8      GO TO 2040
176:           DELAY=(9-D1)+(9-(D2/16))*10+(9-(D3/16))*.1
177:           DELAY = DELAY * SCALE
178:           CALL NCDEC(HEADER(1,ICPS+9),DELAY)
179: C
180: C   ENCODE METROTEK GATE WIDTH
181: C
182:           W1 = FLOAT(IBUF(7) .AND. 15)
183:           W2 = FLOAT(IBUF(7) .AND. 240)
184:           W3 = FLOAT(IBUF(6) .AND. 15)
185:           IF (W1.GT.9 .OR. W2.GT.144 .OR. W3.GT.9)
186:         8      GO TO 2050
187:           WIDTH = (9-W1)+(9-(W2/16))*10+(9-W3)*.1
188:           WIDTH = WIDTH * SCALE
189:           CALL NCDEC(HEADER(1,ICPS+10),WIDTH)
190: C
191: C   GET VELOCITY CONSTANT THEORITICAL IF SYSTEM IS
192: C   NOT CALIBRATED & GET ADJUSTED VC IF SYS. CAL'D
193: C
```

```
194:              ITEM = ICP2 + 2
195:              IF ((CALTYP .AND. Z'10') ITEM = ICP2 + 13
196:              CALL CURSOR(HEADER(1,ITEM),LEN)
197:              CALL DUDEF(HEADER(1,ITEM),VC,LEN)
198:       C
199:       C  CALCULATE MIN. & MAX. DEPTHS VIA VC * DELAY & WIDTH
200:       C
201:              DMIN = DELAY * VC * .05
202:              DMAX = (DELAY + WIDTH) * VC * .05
203:       C
204:       C  CLEAR HEADER ASCII DATA FOR MAX & MIN DEPTHS
205:       C
206:              DO 250 IL = 1,15
207:              HEADER(IL,ICP2+6) = 32
208:              HEADER(IL,ICP2+7) = 32
209:  250     CONTINUE
210:       C
211:       C  LOAD MAX & MIN INSPECTION DEPTHS INTO HEADER
212:       C
213:              CALL NUDEF(HEADER(1,ICP2+6),DMIN)
214:              CALL NUDEF(HEADER(1,ICP2+7),DMAX)
215:       C
216:       C  CHECK TO SEE IF DELAY + WIDTH TIME IS WITHIN RANGE
217:       C
218:              CALL CURSOR(HEADER(1,ICP3+8),LEN)
219:              CALL DUDEF(HEADER(1,ICP3+8),RANGE,LEN)
220:       C
221:              IF((DMAX .LE. (RANGE * .255)).OR.IERR.EQ.3)
222:        $         GO TO 1000
223:       C
224:       C  DELAY + WIDTH TIME NOT IN RANGE ISSUE WARNING
225:       C
226:              CALL MSGRNG(4,DMAX)
227:              CALL SBN(2,1)
228:              CALL KBD(2,IRSP)
229:              IF(IRSP .EQ. 1) GO TO 2095
230:              IERR = 3
231: 1000     RETURN
232: 2000     WRITE(3,2100)
233:              GO TO 2090
234: 2005     WRITE(3,2105)
235:              GO TO 2090
236: 2010     WRITE(3,2110)
237:              GO TO 2090
238: 2020     WRITE(3,2120)
239:              GO TO 2090
240: 2030     WRITE(3,2130)
241:              GO TO 2090
242: 2040     WRITE(3,2140)
243:              GO TO 2090
244: 2050     WRITE(3,2150)
245: 2090     WRITE(3,2190)
246:              CALL KBD(2,IRSP)
247: 2095     IERR = 1
248:              RETURN
249:       C
250: 2100     FORMAT(1X,'** ERROR ** GDEMTK , PULSE AMPLITUDE',//)
251: 2105     FORMAT(1X,'** ERROR ** GDEMTK , PULSE DAMPING',//)
252: 2110     FORMAT(1X,'** ERROR ** GDEMTK , FUNCTION ',//)
253: 2120     FORMAT(1X,'** ERROR ** GDEMTK , FILTER',//)
254: 2130     FORMAT(1X,'** ERROR ** GDEMTK , RANGE',//)
255: 2140     FORMAT(1X,'** ERROR ** GDEMTK ,GATE DELAY',//)
256: 2150     FORMAT(1X,'** ERROR ** GDEMTK ,GATE WIDTH',//)
257: 2190     FORMAT(1X,'SWITCH POSITION DATA IN MEMORY IS',
258:        $         ' INCORRECT.')
259:              END
```

```
270:
271:
272:
273:
274:
  1:            SUBROUTINE DCDEF1(IARRY,VAL,ILEN)
  2: C
  3: C   DECODE F
  4: C
  5: C   DECODE AN ASCII STRING THAT IS A REPRESENTATION OF
  6: C   AN INTERGER AND CONVERTS IT TO AN INTERGER.
  7: C
  8: C   DECODES UP TO 7 CHARACTER NUMBERS INCLUDING THE
  9: C   DECIMAL POINT FROM ###.### TO #
 10: C   MAXIMUM LOCATION OF DIGITS IS 3 PLACES ON
 11: C   EITHER SIDE OF IT ......
 12: C
 13:            LOGICAL IARRY(15)
 14:            LOGICAL IL
 15: C
 16:            IDISP = 0
 17:            ICTR = 0
 18:            DO 10 IL = 1,ILEN
 19:            IF ((IARRY(IL).EQ.45 .AND. IL.GT.1) .OR.
 20:       $       (IARRY(IL).EQ.45 .AND. ILEN.EQ.1) .OR.
 21:       $       (IARRY(IL).LT.45) .OR.
 22:       $       (IARRY(IL).GT.57) .OR.
 23:       $       (IARRY(IL).EQ.47)) GO TO 2000
 24:            IF (IARRY(IL) .NE. 46) GO TO 10
 25:            IDISP = IL
 26:            ICTR = ICTR + 1
 27: 10         CONTINUE
 28:            IF (ICTR .GT. 1) GO TO 2000
 29:            GO TO(100,200,300,400,500,600,700),ILEN
 30:            GO TO 2000
 31: 100        DECODE(IARRY,110) IVAL
 32: 110        FORMAT(I1)
 33:            VAL=FLOAT(IVAL)
 34:            RETURN
 35: C   2 PLACES ##, #. , .#
 36: 200        GO TO(210,220),IDISP
 37: C   ASSUME ##
 38:            DECODE(IARRY,205) IVAL
 39: 205        FORMAT(I2)
 40:            VAL=FLOAT(IVAL)
 41:            RETURN
 42: C   NUMBER IS .#
 43: 210        DECODE(IARRY,215) VAL
 44: 215        FORMAT(F2.1)
 45:            RETURN
 46: C   NUMBER IS #.
 47: 220        DECODE(IARRY,225) VAL
 48: 225        FORMAT(F2.0)
 49:            RETURN
 50: C   THREE PLACE NUMBERS ###, ##. , #.# , .##
 51: 300        GO TO(310,320,330),IDISP
 52: C   ASSUME ###
 53:            DECODE(IARRY,305) IVAL
 54: 305        FORMAT(I3)
 55:            VAL=FLOAT(IVAL)
 56:            RETURN
 57: C   NUMBER IS .##
 58: 310        DECODE(IARRY,315) VAL
 59: 315        FORMAT(F3.2)
 60:            RETURN
 61: C   NUMBER IS #.#
 62: 320        DECODE(IARRY,325) VAL
 63: 325        FORMAT(F3.1)
 64:            RETURN
 65: C   NUMBER IS ##.
 66: 330        DECODE(IARRY,335) VAL
 67: 335        FORMAT(F3.0)
 68:            RETURN
 69: C   FOUR PLACE .###, #.##, ##.#, ###.
 70: 400        GO TO(410,420,430,440),IDISP
 71:            GO TO 2000
```

```
 72: C   NUMBER IS *.***
 73: 410     DECODE(JARRY,415) VAL
 74: 415     FORMAT(F4.3)
 75:         RETURN
 76: C   NUMBER IS *.**
 77: 420     DECODE(JARRY,425) VAL
 78: 425     FORMAT(F4.2)
 79:         RETURN
 80: C   NUMBER IS **.*
 81: 430     DECODE(JARRY,435) VAL
 82: 435     FORMAT(F4.1)
 83:         RETURN
 84: C   NUMBER IS ***.
 85: 440     DECODE(JARRY,445) VAL
 86: 445     FORMAT(F4.0)
 87:         RETURN
 88: C   FIVE PLACES *.***, **.**, ***.*
 89: 500     GO TO(2000,510,520,530),IDISP
 90:         GO TO 2000
 91: C   NUMBER IS *.***
 92: 510     DECODE(JARRY,515) VAL
 93: 515     FORMAT(F5.3)
 94:         RETURN
 95: C   NUMBER IS **.**
 96: 520     DECODE(JARRY,525) VAL
 97: 525     FORMAT(F5.2)
 98:         RETURN
 99: C   NUMBER IS ***.*
100: 530     DECODE(JARRY,535) VAL
101: 535     FORMAT(F5.1)
102:         RETURN
103: C   SIX PLACES **.***, ***.**
104: 600     GO TO(2000,2000,610,620),IDISP
105:         GO TO 2000
106: C   NUMBER IS **.***
107: 610     DECODE(JARRY,615) VAL
108: 615     FORMAT(F6.3)
109:         RETURN
110: C   NUMBER IS ***.**
111: 620     DECODE(JARRY,625) VAL
112: 625     FORMAT(F6.2)
113:         RETURN
114: C   SEVEN PLACES ***.***
115: 700     GO TO(2000,2000,2000,710),IDISP
116:         GO TO 2000
117: 710     DECODE(JARRY,715) VAL
118: 715     FORMAT(F7.3)
119:         RETURN
120: C
121: C   ERROR ROUTINE
122: C
123: 2000    VAL = 0
124:         ILEN = 0
125:         RETURN
126:         END
127:
128:
129:
130:
131:
132:
133:
134:
135:
136:
137:
138:
139:
140:
141:

1:         SUBROUTINE FRONCL(IPTR)
  2: C
  3: C   Last mod. 6/8/83 for separation of calibrations
  4: C
  5:         LOGICAL H
```

```
 6:            LOGICAL INPUT(15)
 7: C
 8:            LOGICAL LABEL1(15)
 9:            LOGICAL HEADER(15,48)
10:            LOGICAL CALTYP,SFLAG,SLOAD
11:            COMMON /CHDEF/HEADER,NCRP(4),ICRP(4)
12:            COMMON /CDATS/INPUT,IBUF(16),CALTYP,SFLAG,SLOAD,RADIAL(4),
13:       $          VIEW(3)
14: C
15: C
16:            DATA LABEL1/'C','A','L','I','B','R','A','T','E','.','F','/','P',
17:       $          ' ',' '/
18: C
19: C
20:            ICP1 = NCRP(1)
21:            ICP2 = NCRP(1) + NCRP(2)
22:            ICP3 = NCRP(1) + NCRP(2) + NCRP(3)
23: C
24:            IF(IPTH.EQ.1) GO TO 10
25: C
26:            CALL SRN(1,0)
27:            CALL TIMDIS(LABEL1)
28: C
29: 10         IERR = 0
30:            CALL CDEHDR(IERR)
31:            IF (IERR .EQ. 1) GO TO 1000
32: C
33:            CALL MEM(1,Z'0E',0)
34: C
35:            DO 20 IL=1,16
36:            II = IL + 15
37:            CALL MEM(1,II,IBUF(IL))
38: 20         CONTINUE
39: C
40: C  TAKE V.C. FROM D$19 & 1A & LOAD ==> C-4 , L-12
41: C
42:            IVCL = IBUF(10)
43:            IVCH = IBUF(11)
44:            IVC = IVCL + (IVCH .AND. 15)*256
45:            CALL NCDEI(HEADER(1,ICP3+12),IVC)
46: C
47: C  CALL LOAD VELOCITY CONSTANT
48: C
49:            CALL LDMTEK
50: C
51: C  CHECK FOR BAD LOAD
52: C
53:            CALL MEM(2,Z'0D',IFLAG)
54:            IF ((IFLAG.AND.32) .NE. 0) GO TO 1000
55: C
56:            IF(IPTH .EQ. 1)GO TO 1000
57: C
58: C  PULSE METROTEK READ SWITCH SETTINGS & DECODE
59: C  METROTEK SETTINGS TO HEADER
60: C
62:            CALL TIMDIS(LABEL1)
63:            CALL PULSE(1)
64:            CALL RDMTEK
65:            IERR = 0
66:            CALL CDEMTK(IERR)
67: C
68: C  EXIT IF AN ERROR WAS ENCOUNTERED DURING CDEMTK
69: C
70:            IF (IERR .EQ. 1) GO TO 1000
71: C
72: C  CODE HEADER TO IBUF(X) AND
73: C  MOVE BUF(15 & 16) to 'D$1E','D$1F'
74: C  With a possibility of a change in resolution the normalized
75: C  hole calibration low & high depth limits could change. And have
76: C  to be reloaded into the memory buffer.
77: C
78:            CALL CDEHDR(IERR)
79:            IF (IERR .EQ. 1) GO TO 1000
80: C
81:            CALL MEM(1,Z'1E',IBUF(15))
```

```
82:             CALL MEM(1,Z'1F',IBUF(16))
83:    C
84:    C   SET FRONT PANEL BIT ON IN CAL. FLAG
85:    C
86:             CALTYP = CALTYP .OR. 4
87:    C
88:    1000     RETURN
89:    C
90:             END
91:
92:
93:
94:
95:
96:
97:
98:
99:
100:
101:
102:
103:
104:
105:

1:             SUBROUTINE INPINV
 2:    C
 3:    C  DISPLAY INVALID INPUT ON WRITER 3 AND THE INPUT CHARACTER BUFFER
 4:    C
 5:             LOGICAL INPUT(15),CALTYP,SFLAG,SLOAD
 6:             COMMON /CDAT8/INPUT,IBUF(16),CALTYP,SFLAG,SLOAD,RADIAL(4),
 7:         $           VIEW(8)
 8:    C
 9:    C   WRITE INVALID INPUT & INPUT
10:    C
11:             WRITE(3,2900)(INPUT(II),II=1,15)
12:    C
13:             RETURN
14:    C
15:    2900     FORMAT('+ INVALID INPUT ',15A1)
16:    C
17:             END
18:
19:
20:
21:
22:
23:
24:
25:
26:
27:
28:
29:
30:
31:
32:

1:             SUBROUTINE KBD(IJMP,IRSP)
 2:    C
 3:             LOGICAL INPUT(15),CALTYP,SFLAG,SLOAD
 4:             LOGICAL INPT
 5:    C
 6:             COMMON /CDAT8/INPUT,IBUF(16),CALTYP,SFLAG,SLOAD,RADIAL(4),
 7:         $           VIEW(8)
 8:    C
 9:    C   last mod 7.20.83 for making only enter Y when ready instead of CR
10:    C
11:    C LAST MOD. 4/5/83 FOR SCREEN SIZE.
12:    C
13:    C LAST MOD. 1/3/83 FOR: REMOVAL OF ENTRY E FOR EXIT
14:    C
15:    C  MOD: 3/2/83 FOR: UPPER & LOWER CASE.
16:    C
17:    C  MOD. 3/11/83 FOR: ELIMINATION OF OPTION 4
18:    C
19:    C THIS SUBROUTINE EXPECTS A KEYBOARD RESPONCE FROM THE
```

```
20: C OPERATOR AND DECODES THE RESPONCE INTO AN INTERGER
21: C            E  =    EXIT (NO LONGER EXISTS AS OF 01-03-83)
22: C            Y  =    YES
23: C            N  =    NO
24: C            P  =    PRINT HEADER(N/A AS OF 03-11-83)
25: C            CR =    (CARRIAGE RETURN) N/A as of 7.20.83
26: C
27: C  KEYBOARD OPTIONS 1 or 3 CAN BE SELECTED
28: C  Option 2 is forced to 1
29: C
30: C  OPTION 1 ACCEPTS RESPONCE Y
31: C  OPTION 3 ACCEPTS RESPONCE Y OR N
32: C
33:          GO TO (100,100,300),IJMP
34: C
35: C  IF IJMP .NE. 1 THRU 3 DISPLAY ERROR,RETURN, & EXIT
36: C
37:          WRITE(3,3000)
38:          IRSP = 1
39:          CALL READI
40:          RETURN
41: C
42: 100      CALL SRN(2,1)
43: 105      WRITE(3,1100)
44:          GO TO 500
45: 300      CALL SRN(2,1)
46: 305      WRITE(3,1300)
47: 500      CALL READI
48:          IF (INPUT(2).NE. 32) GO TO 600
49:          INPT = INPUT(1) .AND. Z'0DF'
50:          IRSP = -1
51:          IF (INPT.EQ.89) IRSP = 2
52:          IF (INPT.EQ.78) IRSP = 3
53: 560      IF(IRSP .EQ. 2) GO TO 900
54:          IF(IRSP .EQ. 3 .AND. IJMP .EQ. 3) GO TO 900
55: 600      CALL MEM(2,2,IDAT)
56:          CALL INPINV
57:          CALL SRN(3,IDAT)
58:          CALL SRN(2,1)
59:          CALL SRN(3,IDAT)
60: C
61:          GO TO (105,105,305),IJMP
62: C
63: 900      RETURN
64: 1100     FORMAT(1H+,5X,22HEnter 'Y' when ready. )
65: 1300     FORMAT(1H+,5X,14HEnter Y or N. )
66: 3000     FORMAT(1X,'** ERROR ** KBD,IJMP OUT OF RANGE')
67:          END
```

```
 1:         SUBROUTINE MEM(ISTR,IADR,IDAT)
 2: C
 3: C                DATE MOD: 7.26.82  BY: JRM
 4: C                FOR: 'A000' ACCESS INSTEAD OF 'D000'
 5: C
 6: C                DATE MOD: 3.11.83  BY: JRM
 7: C                FOR: 'D000' ACCESS INSTEAD OF 'A000'
 8: C
 9: C  THIS PROGRAM DOES THE POKES TO MEMORY
10: C  AND PEEKS FROM MEMORY WITH AN LOGICAL TO
11: C  INTERGER CONVERSION
12: C
```

```
13:  C    IJMP = 1 WRITES TO MEMORY (POKE)
14:  C    IJMP = 2 READS FROM MEMORY (PEEK)
15:  C
16:  C    IADR = IS THE ADRESS NUMBER W/O THE OFFSET
17:  C           THE OFFSET DISPLACEMENT WILL BE ADDED
18:  C           IN THIS SUBROUTINE
19:  C
20:  C    IDAT = IS THE DATA 8 BITS (1 BYTE) RANGE OF
21:  C           0 TO 255
22:  C
23:            GO TO (100,200),IJMP
24:            WRITE (3,50)
25:  50        FORMAT(1X,'** ERROR ** MEM,IJMP OUT OF RANGE')
26:            RETURN
27:  100       CALL POKE(Z'0B000'+IADR,IDAT)
28:            RETURN
29:  200       IY = PEEK(Z'0B000'+IADR)
30:            IF (IY) 210,250,250
31:  210       IDAT = IY + 256
32:            GO TO 260
33:  250       IDAT = IY
34:  260       RETURN
35:            END
36:            SUBROUTINE MEX(IJMP,IADR,IDAT)
37:  C
38:  C              DATE MOD: 8.20.82   BY: JRM
39:  C              FOR: REAL ADDRESS ACCESS NO OFFSETS
40:  C
41:  C    THIS PROGRAM DOES THE POKES TO MEMORY
42:  C    AND PEEKS FROM MEMORY WITH AN LOGICAL TO
43:  C    INTERGER CONVERSION
44:  C
45:  C    IJMP = 1 WRITES TO MEMORY (POKE)
46:  C    IJMP = 2 READS FROM MEMORY (PEEK)
47:  C
48:  C    IADR = IS THE ADRESS NUMBER W/O THE OFFSET
49:  C           THE OFFSET DISPLACEMENT WILL BE ADDED
50:  C           IN THIS SUBROUTINE
51:  C
52:  C    IDAT = IS THE DATA 8 BITS (1 BYTE) RANGE OF
53:  C           0 TO 255
54:  C
55:  C
56:            GO TO (100,200),IJMP
57:            WRITE (3,50)
58:  50        FORMAT(1X,'** ERROR ** MEM,IJMP OUT OF RANGE')
59:            RETURN
60:  100       CALL POKE(IADR,IDAT)
61:            RETURN
62:  200       IY = PEEK(IADR)
63:            IF (IY) 210,250,250
64:  210       IDAT = IY + 256
65:            GO TO 260
66:  250       IDAT = IY
67:  260       RETURN
68:            END
69:
70:
71:
72:
73:
74:
75:
76:
77:
78:
79:
80:
81:
82:
83:
 1:           SUBROUTINE NCDEI(IARRY,IVAL)
 2:  C
 3:  C   SUBROUTINE ENCODE I FOR THE INTERGER
 4:  C
 5:  C   TAKES AN INTERGER VALUE AND CONVERTS INTO AN ASCII
```

```
 6:  C   STRING VALUE.
 7:  C
 8:          LOGICAL IARRY(1)
 9:  C
10:          IF (IVAL .LE. -100) GO TO 50
11:          IF (IVAL .LE. -10) GO TO 400
12:          IF (IVAL .LT. 0) GO TO 300
13:          IF (IVAL .LT. 10) GO TO 200
14:          IF (IVAL .LT. 100) GO TO 300
15:          IF (IVAL .LT. 1000) GO TO 400
16:  50      ENCODE(IARRY,100) IVAL
17:  100     FORMAT(I4)
18:          RETURN
19:  200     ENCODE(IARRY,220) IVAL
20:  220     FORMAT(I1)
21:          RETURN
22:  300     ENCODE(IARRY,320) IVAL
23:  320     FORMAT(I2)
24:          RETURN
25:  400     ENCODE(IARRY,420) IVAL
26:  420     FORMAT(I3)
27:          RETURN
28:          END
29:          SUBROUTINE NCDEC(IARRY,VAL)
30:  C
31:  C   SUBROUTINE ENCODE C FOR GATE DELAY & RANGE
32:  C
33:  C   TAKES THE METROTEK GATE SETTINGS FIXED VALUE OF
34:  C   XX.X us AND CONVERTS INTO AN ASCII STRING FOR THE
35:  C   HEADER.
36:  C
37:          LOGICAL IARRY(1)
38:  C
39:          ENCODE(IARRY,100) VAL
40:  100     FORMAT(F5.1)
41:          RETURN
42:          END
43:          SUBROUTINE NCDEF(IARRY,VAL)
44:          LOGICAL IARRY(15)
45:  C
46:  C   ENCODE F ENCODES FLOATING POINT DECIMAL NUMBERS
47:  C   TO AN ASCII STRING FOR THE HEADER...
48:  C
49:  C
50:          IF (VAL .LE. -100) GO TO 500
51:          IF (VAL .LE. -10) GO TO 400
52:          IF (VAL .LE. -1) GO TO 300
53:          IF (VAL .LT. 0) GO TO 200
54:          IF (VAL .LT. 1) GO TO 100
55:          IF (VAL .LT. 10) GO TO 200
56:          IF (VAL .LT. 100) GO TO 300
57:          GO TO 400
58:  C   ENCODE FOR VAL = .xxx
59:  100     ENCODE(IARRY,150) VAL
60:  150     FORMAT(F5.3)
61:          GO TO 700
62:  C   ENCODE FOR VAL = x.xxx
63:  200     ENCODE(IARRY,250) VAL
64:  250     FORMAT(F6.3)
65:          GO TO 700
66:  C   ENCODE FOR VAL = xx.xxx
67:  300     ENCODE(IARRY,350) VAL
68:  350     FORMAT(F7.3)
69:          GO TO 700
70:  C   ENCODE FOR VAL = xxx.xxx
71:  400     ENCODE(IARRY,450) VAL
72:  450     FORMAT(F8.3)
73:          GO TO 700
74:  C
75:  C   ENCODE  FOR VAL = -xxx.xxx
76:  C
77:  500     ENCODE(IARRY,550) VAL
78:  550     FORMAT(F9.3)
79:  C
80:  C   ADJUST CHARACTER STRING
81:  C
```

```
 82: 700       CALL GRRSCH(IARRY,LEN)
 83: C
 84:           RETURN
 85:           END
 86:           SUBROUTINE DCDEI(IARRY,IVAL,ILEN)
 87: C
 88: C   DECODE HEADER INTEGERS
 89: C
 90: C   DECODE AN ASCII STRING THAT IS A REPRESENTATION OF
 91: C   AN INTEGER AND CONVERTS IT TO AN INTEGER.
 92: C
 93:           LOGICAL IARRY(15),IL
 94: C
 95:           DO 10 IL=1,ILEN
 96:           IF((IARRY(IL).EQ.45 .AND. IL.EQ.1 .AND.
 97:      $       ILEN.GT.1)  .OR.
 98:      $       (IARRY(IL) .GE. 48 .AND. IARRY(IL) .LE. 57))
 99:      $       GO TO 10
100:           GO TO 2000
101: 10       CONTINUE
102:           GO TO (100,200,300,400,500),ILEN
103:           GO TO 2000
104: 100      DECODE(IARRY,110) IVAL
105: 110      FORMAT(I1)
106:           RETURN
107: 200      DECODE(IARRY,210) IVAL
108: 210      FORMAT(I2)
109:           RETURN
110: 300      DECODE(IARRY,310) IVAL
111: 310      FORMAT(I3)
112:           RETURN
113: 400      DECODE(IARRY,410) IVAL
114: 410      FORMAT(I4)
115:           RETURN
116: 500      DECODE(IARRY,510) IVAL
117: 510      FORMAT(I5)
118:           RETURN
119: C
120: C   ERROR ROUTINE
121: C
122: 2000     ILEN = 0
123:           IVAL = 0
124:           RETURN
125:           END
126:           SUBROUTINE DCDEF(IARRY,VAL,ILEN)
127: C
128: C   DECODE F
129: C
130: C   DECODE AN ASCII STRING THAT IS A REPRESENTATION OF
131: C   AN INTEGER AND CONVERTS IT TO AN INTEGER.
132: C
133: C   DECODES UP TO 7 CHARACTER NUMBERS INCLUDING THE
134: C   DECIMAL POINT FROM xxx.xxx TO x
135: C   MAXIMUM LOCATION OF DIGITS IS 3 PLACES ON
136: C   EITHER SIDE OF IT ......
137: C
138:           LOGICAL IARRY(15)
139:           LOGICAL IL
140: C
141:           IDISP = 0
142:           ICTR = 0
143:           DO 10 IL = 1,ILEN
144:           IF ((IARRY(IL).EQ.45 .AND. IL.GT.1) .OR.
145:      $       (IARRY(IL).EQ.45 .AND. ILEN.EQ.1) .OR.
146:      $       (IARRY(IL).LT.45) .OR.
147:      $       (IARRY(IL).GT.57) .OR.
148:      $       (IARRY(IL).EQ.47)) GO TO 2000
149:           IF (IARRY(IL) .NE. 46) GO TO 10
150:           IDISP = IL
151:           ICTR = ICTR + 1
152: 10       CONTINUE
153:           IF (ICTR .GT. 1) GO TO 2000
154:           GO TO(100,200,300,400,500,600,700),ILEN
155:           GO TO 2000
156: 100      DECODE(IARRY,110) IVAL
157: 110      FORMAT(I1)
```

```
158:          VAL=FLOAT(IVAL)
159:          RETURN
160: C   2 PLACES **, *. , .*
161: 200      GO TO(210,220),IDISP
162: C   ASSUME **
163:          DECODE(IARRY,205) IVAL
164: 205      FORMAT(I2)
165:          VAL=FLOAT(IVAL)
166:          RETURN
167: C   NUMBER IS .*
168: 210      DECODE(IARRY,215) VAL
169: 215      FORMAT(F2.1)
170:          RETURN
171: C   NUMBER IS *.
172: 220      DECODE(IARRY,225) VAL
173: 225      FORMAT(F2.0)
174:          RETURN
175: C   THREE PLACE NUMBERS ***, **. , *.* , .**
176: 300      GO TO(310,320,330),IDISP
177: C   ASSUME ***
178:          DECODE(IARRY,305) IVAL
179: 305      FORMAT(I3)
180:          VAL=FLOAT(IVAL)
181:          RETURN
182: C        NUMBER IS .**
183: 310      DECODE(IARRY,315) VAL
184: 315      FORMAT(F3.2)
185:          RETURN
186: C   NUMBER IS *.*
187: 320      DECODE(IARRY,325) VAL
188: 325      FORMAT(F3.1)
189:          RETURN
190: C   NUMBER IS **.
191: 330      DECODE(IARRY,335) VAL
192: 335      FORMAT(F3.0)
193:          RETURN
194: C   FOUR PLACE .***, *.**, **.*, ***.
195: 400      GO TO(410,420,430,440),IDISP
196:          GO TO 2000
197: C   NUMBER IS .***
198: 410      DECODE(IARRY,415) VAL
199: 415      FORMAT(F4.3)
200:          RETURN
201: C   NUMBER IS *.**
202: 420      DECODE(IARRY,425) VAL
203: 425      FORMAT(F4.2)
204:          RETURN
205: C   NUMBER IS **.*
206: 430      DECODE(IARRY,435) VAL
207: 435      FORMAT(F4.1)
208:          RETURN
209: C   NUMBER IS ***.
210: 440      DECODE(IARRY,445) VAL
211: 445      FORMAT(F4.0)
212:          RETURN
213: C   FIVE PLACES *.***, **.**, ***.*
214: 500      GO TO(2000,510,520,530),IDISP
215:          GO TO 2000
216: C   NUMBER IS *.***
217: 510      DECODE(IARRY,515) VAL
218: 515      FORMAT(F5.3)
219:          RETURN
220: C   NUMBER IS **.**
221: 520      DECODE(IARRY,525) VAL
222: 525      FORMAT(F5.2)
223:          RETURN
224: C   NUMBER IS ***.*
225: 530      DECODE(IARRY,535) VAL
226: 535      FORMAT(F5.1)
227:          RETURN
228: C   SIX PLACES **.***, ***.**
229: 600      GO TO(2000,2000,610,620),IDISP
230:          GO TO 2000
231: C   NUMBER IS **.***
232: 610      DECODE(IARRY,615) VAL
233: 615      FORMAT(F6.3)
```

```
234:              RETURN
235: C    NUMBER IS ###.##
236: 620      DECODE(IARRY,625) VAL
237: 625      FORMAT(F6.2)
238:          RETURN
239: C    SEVEN PLACES ###.###
240: 700      GO TO(2000,2000,2000,710),IDISP
241:          GO TO 2000
242: 710      DECODE(IARRY,715) VAL
243: 715      FORMAT(F7.3)
244:          RETURN
245: C
246: C    ERROR ROUTINE
247: C
248: 2000     VAL = 0
249:          ILEN = 0
250:          RETURN
251:          END
252:          SUBROUTINE DATTEN(IARRY,IVAL1,ILEN)
253: C
254: C   DECODE ATTENUATION FROM THE ASCII STRING VALUE
255: C   TO THE SWITCH VALUE OF THE METROTEK SETTING.
256: C
257:          DIMENSION IDAT(7)
258:          LOGICAL IARRY(15)
259:          DATA IDAT/20,20,10,6,3,2,1/
260: C
261: C    CHECK FOR 2RXXXXXXX
262: C
263:          IF (ILEN .GT. 2) GO TO 1000
264: C
265: C    BEGINNING OF '##' DECODE
266: C
267:          CALL DCDEI(IARRY,IVAL,ILEN)
268: C
269:          IA = 127
270:          DO 200 I=1,7
271:          IF (IVAL - IDAT(I)) 200,100,100
272: 100      IVAL = IVAL - IDAT(I)
273:          IA = IA - 2**(7-I)
274: 200      CONTINUE
275:          IVAL1 = IA
276:          RETURN
277: C
278: C
279: C    BEGINNING OF 2RXXXXXXX CODE
280: C
281: C
282: 1000     IA = 0
283:          DO 1500 I=1,7
284:          II = I + 2
285: C  49 IS CHARACTER '1'
286:          IF (IARRY(II) .EQ. 49) GO TO 1500
287:          IA = IA + 2**(7-I)
288: 1500     CONTINUE
289:          IVAL1 = IA
290:          RETURN
291:          END
292:          SUBROUTINE RATTEN(IARRY,IBUFF,IERR)
293: C
294: C   SUBROUTINE RATTEN READ ATTENUATION FROM
295: C   SWITCHES AND ENCODE TO HEADER ASCII VALUE.
296: C
297:          DIMENSION IDAT(7)
298:          LOGICAL IARRY(15)
299:          DATA IDAT/20,20,10,6,3,2,1/
300: C
301:          IERR = 0
302:          IARRY(1) = '2'
303:          IARRY(2) = 'R'
304:          IA = 0
305:          IB = IBUFF .AND. 127
306:          DO 200 I=1,7
307:          II=I+2
308:          IF (IB - 2**(7-I)) 100,150,150
309: 100      IARRY(II) = '1'
```

```
310:            IA = IA + IDAT(1)
311:            GO TO 200
312: 150        IARRY(I) = '0'
313:            IB = IB - 2**(7-I)
314: 200        CONTINUE
315: C
316: 400        IF (IB .NE. 0) GO TO 2000
317:            IARRY(10) = ':'
318:            CALL NCDEI(IARRY(11),IA)
319:            RETURN
320: 2000       WRITE(3,2100)
321:            CALL KBD(2,IRSP)
322:            IERR = 1
323:            RETURN
324: 2100       FORMAT(1X,' ** ERROR ** RATTEN SWITCH ENCODE',
325:     *      /,1X' MEMORY DATA D013 IS INCORRECT')
326: 2200       FORMAT(20A1)
327:            END
328:            SUBROUTINE INPTCK(INCHK,ITEM,IERR)
329: C
330: C   INPUT CHECK AGAINST THE PROMPT ARRAY
331: C   THE IERR RETURNS =    0   GOOD DATA CHECK
332: C                         1   BAD DATA CHECK
333: C                         2   PROMPT DATA ERROR
334: C                             CHECK PROMPT OR PROGRAM
335: C
336:            LOGICAL IL,II,JJ
337:            LOGICAL IDAT(4)
338:            LOGICAL ICK(38)
339:            LOGICAL INCHK(15)
340: C
341:            LOGICAL HEADER(15,48)
342:            LOGICAL PROMPT(20,48),TITLE(15,48),GROUPT(30,4)
343:            COMMON /CHPD1/HEADER,NCRP(4),ICRP(4)
344:            COMMON /CHPD2/PROMPT,TITLE,GROUPT
345: C
346:            DATA IDAT/'(','o','r',','/
347: C
348:            IERR = 1
349:            IF (PROMPT(1,ITEM) .EQ. 32) GO TO 100
350: C
351: C   CLEAN UP INCHK ARRAY
352: C
353:            CALL CHRSCH(INCHK,INLEN)
354:            DO 10 IL=1,15
355:            IF (IL .GT. INLEN) INCHK(IL) = 32
356: 10         CONTINUE
357: C
358:            IRNG = 0
359:            ICHR = 0
360: C   CLEAR PROMPT CHECK ARRAY WITH BLANKS
361:
362:            ICK(II) = 32
363: 20         CONTINUE
364: C   GET CHECK MODE & REMOVE UNWANTED DATA CHECK ARRAY
365:            DO 50 II=1,20
366: C   CHECK FOR RANGE VIA 'to'
367:            IF (PROMPT(II,ITEM).EQ.IDAT(1) .AND.
368:     *         PROMPT(II+1,ITEM).EQ.IDAT(2)) IRNG = 1
369: C   CHECK FOR CHARACTER STRINGS VIA 'or'
370:            IF (PROMPT(II,ITEM).EQ.IDAT(2) .AND.
371:     *         PROMPT(II+1,ITEM).EQ.IDAT(3)) ICHR = 1
372:            ICK(II) = PROMPT(II,ITEM)
373: C   REPLACE '(' 'o' 'r' & ',' WITH A BLANK
374:            IF ((PROMPT(II,ITEM).EQ. IDAT(1)) .OR.
375:     *         (PROMPT(II,ITEM).EQ.IDAT(2)) .OR.
376:     *         (PROMPT(II,ITEM).EQ.IDAT(3)) .OR.
377:     *         (PROMPT(II,ITEM).EQ.IDAT(4))) ICK(II)=32
378: 50         CONTINUE
379: C
380:            IF (IRNG .EQ. 1) GO TO 200
381:            IF (ICHR .EQ. 1) GO TO 300
382:            IERR = 2
383:            WRITE(3,2900)ITEM,(PROMPT(I,ITEM),I=1,20)
384:            CALL KBD(2,IRSP)
385:            GO TO 1000
```

```
386: 100     IF (INCHK(1) .NE. 32) IERR = 0
387:         RETURN
388: 200     IF(INLEN .EQ. 0) GO TO 1000
389:         DO 220 IL=1,INLEN
390:         IF(INCHK(IL).LT.46 .OR. INCHK(IL).GT.57 .OR.
391:       $    INCHK(IL).EQ.47) GO TO 1000
392: 220     CONTINUE
393:         CALL DCDEF(INCHK,VIN,INLEN)
394:         IF (VIN .EQ. 0 .AND. INLEN .EQ. 0) GO TO 1000
395:         CALL CHRSCH(ICK(1),LEN)
396:         CALL DCDEF(ICK(1),VLO,LEN)
397:         CALL CHRSCH(ICK(LEN+1),ILN)
398:         CALL DCDEF(ICK(LEN+1),VHI,ILN)
399:         IF ((VIN .GE. VLO) .AND. (VIN .LE. VHI))
400:       $    IERR = 0
401:         RETURN
402: 300     LEN = 0
403:         IDISP = 1
404: C
405: C    CHANGE LOWER CASE TO UPPER CASE
406: C
407:         DO 310 II=1,15
408:         IF((INCHK(II).GE.Z'61') .AND. (INCHK(II).LE.Z'7A'))
409:       $    INCHK(II) = INCHK(II) .AND. Z'DF'
410: 310     CONTINUE
411: C
412:         DO 350 II = 1,18
413:         CALL CHRSCH(ICK(IDISP),LEN)
414:         IF(LEN.EQ.0 .OR. (IDISP+LEN).GE.20) GO TO 1000
415:         ICTR = 0
416:         IF (INLEN .NE. LEN) GO TO 345
417:         DO 340 IJ = 1,LEN
418:         IDS = IJ + IDISP -1
419:         IF(INCHK(IJ).EQ.ICK(IDS)) ICTR=ICTR+1
420: 340     CONTINUE
421:         IF (ICTR .EQ. LEN) IERR=0
422: 345     IDISP = IDISP + LEN + 1
423: 350     CONTINUE
424: 1000    RETURN
425: 2900    FORMAT(1X,'** ERROR ** INVALID DATA IN PROMPT',
426:       $   ' ITEM ',I2,' ==>',20A1)
427:         END
428:         SUBROUTINE FTIHDR(IARY)
429:         LOGICAL IARY(15),IL
430: C
431: C   FLOATING POINT TO INTEGER CONVERSION
432: C   FOR THE HEADER ASCII HEADER CHARACTERS
433: C
434: C   GET FLOATING POINT NUMBER FROM HEADER
435: C
436:         CALL CHRSCH(IARY(1),LEN)
437:         CALL DCDEF(IARY(1),VAL,LEN)
438: C
439: C   CONVERT TO INTEGER VALUE
440: C
441:         IVAL = IFIX(VAL)
442: C
443: C   CLEAR HEADER ITEM WITH BLANKS
444: C
445:         DO 100 IL = 1,15
446:         IARY(IL) = 32
447: 100     CONTINUE
448: C
449: C   LOAD HEADER WITH CONVERTED VALUE
450: C
451:         CALL NCDEI(IARY(1),IVAL)
452: C
453:         RETURN
454:         END
```

```
462:
463:
464:
465:
466:
467:
468:
469:
  1:            SUBROUTINE PULSE(IPTH)
  2:  C
  3:  C   LAST MOD 01.06.84 FOR REMOVAL OF ENTER Y PROMPT.
  4:  C
  5:  C   LAST MOD 11.15.83 FOR DIGITAL THICKNESS DISPLAY WHEN MPULSE IS CALLED
  6:  C
  7:  C   PULSE ULTRASONIC OPTION 4
  8:  C   PULSE ULTRASONIC FOR SET UP OF PANEL SWITCHES
  9:  C
 10:            LOGICAL LABEL(15)
 11:  C
 12:            DATA LABEL/'P','U','L','S','E',' ','S','Y','S','T','E','M',' ',
 13:       $             ' ',' '/
 14:  C
 15:  C
 16:  C   CHOOSE PATH FOR PULSE
 17:  C
 18:            IF(IPTH.EQ.1) GO TO 20
 19:  C
 20:            CALL SRN(1,0)
 21:            CALL TIMDIS(LABEL)
 22:  C
 23:  20        CALL SRN(3,7)
 24:            WRITE(3,100)
 25:  C
 26:  C   CALL THE ASSEMBLY PULSE ROUTINE
 27:  C
 28:            IERR = 0
 29:  45        CALL MPULSE(ITHK,IAMP,IERR)
 30:  C
 31:            IF(IERR.EQ.0) RETURN
 32:            CALL SRN(3,18)
 33:            IF(IERR.EQ.11) GO TO 45
 34:            WRITE(3,2000) ITHK,IAMP
 35:  C
 36:            GO TO 45
 37:  60        RETURN
 38:  C
 39:  100       FORMAT(1H+,20X,'ULTRASONIC INTERNAL PULSE MODE',//,
 40:       $          4X,'CAUTION - DO NOT DISCONNECT ',
 41:       $          'TRANSDUCER WHILE SYSTEM IS PULSING.',/,
 42:       $          18X,'EXIT PULSE MODE BEFORE ',
 43:       $          'DISCONNECTING.',//,
 44:       $          5X,'Enter CR to exit Pulse Mode.')
 45:  C
 46:  2000      FORMAT(10X,'THICK = ',I5,5X,'AMPL = ',I5)
 47:  C
 48:            END
 49:
 50:
 51:
 52:
 53:
 54:
 55:
 56:
 57:
 58:
 59:
 60:
  2:  C
  3:  C   READ CONSOLE INPUT ROUTINE
  4:  C
  5:            LOGICAL INPUT(15),CALTYP,SFLAG,SLOAD
  6:            COMMON /CDATS/INPUT,IBUF(16),CALTYP,SFLAG,SLOAD,RADIAL(4),
  7:       $                  VIEW(3)
  8:  C
```

```
 9: C  CLEAR INPUT BUFFER
10: C
11:        CALL CLEAR1
12: C
13:        READ(1,2100) INPUT
14: C
15:        RETURN
16: C
17: C  FORMAT STATEMENTS
18: C
19: 2100   FORMAT(15A1)
20:        END
21:
22:
23:
24:
25:
26:
27:
28:
29:
30:
31:
32:
33:
34:
35:

61: C
62: C  SUBR. -   DESCRIPTION
63: C  ----------------------
64: C  KBD-   KEYBOARD PROMPT & EXPECTED RESPONCE
65: C  SRN-   SCREEN MANAGER
66: C  MEM-   MEMORY MANAGER
67: C  CDEHDR-CODE HEADER TO IBUF(X)
68: C  CDEMTK-CODE METROTEK TO HEADER
69: C  RATTEN-READ & CALC. ATTENUATION
70: C  NCDEI- ENCODE I,  SWITCH POSITIONS ==> HEADER
71: C  NCDEF- ENCODE FIXED FORMAT ==> HEADER
72: C  INITM- ZERO SCAN MEMORY
73: C  LSTHDR-DISPLAY 1ST 10 LINES OF HEADER
74: C  INPTCK-CHECK INPUT AGAINST PROMPT
75: C  CHRSCH-CHARACTER SERCH LEFT JUSTIFIES HEADER &
76: C         RETURNS WITH A CHARACTER STRING LENGTH
77: C  DCDEI- DECODE INTERGER HEADER INFO.==> IBUF
78: C  PRESCN-CALL TO ASSM. SCAN
79: C  DCDEF- DECODE FORMATED HEADER INFO. ==> VALUE
80: C  TIMGET-TIME GET FROM CLOCK ==> HEADER ARRAY
81: C  TIMDIS- DISPLAY LABEL AND TIME ON 1ST LINE
82: C
83: C  ----------------------
84: C         SUBROUTINE SCAN (RARG)
85:          DIMENSION ITAB(11)
86:          INTEGER COLORG(6,4),COLORT(10,4),DCOLOR(3)
87:          LOGICAL IL,INPUT(15),RDCMP,IDAT(3)
88: C
89:          LOGICAL ICAL(15)
90:          LOGICAL VERSON(15)
91:          LOGICAL LABEL(15)
92:          LOGICAL HEADER(15,48)
93:          LOGICAL PROMPT(29,48),TITLE(15,48),CROUPT(30,4)
94:          LOGICAL CALTYP,SFLAG,SLOAD
95:          COMMON /CHDIS/HEADER,NCRP(4),ICRP(4)
96:          COMMON /CHDDS/PROMPT,TITLE,CROUPT
97:          COMMON /CDATS/INPUT,IBUF(16),CALTYP,SFLAG,SLOAD,RADIAL(4),
98:       $         VIEW(3)
99:          COMMON /CCOLS/COLORG,COLORT,DCOLOR
100:         COMMON /CVERS/VERSON
101: C
102:         DATA IDAT/'P','R','E'/
103: C
104:         DATA LABEL/'S','C','A','N',' ',' ',' ',' ',' ',' ',' ',
105:      $       ' ',' ',' ',' '/
106: C
107:         IPTH = 0
108:         ICLR = 0
109:         RARG = 0
```

```
110:              IERR = 0
111:              IRSP = 0
112:              ICP1 = NCRP(1)
113:              ICP2 = NCRP(1) + NCRP(2)
114:              ICP3 = NCRP(1) + NCRP(2) + NCRP(3)
115: C
116: C    CLEAR SCREEN & LOOK TO SEE IF SCAN HAD BEEN ENTERED BEFORE
117: C
118:              CALL SRN(1,0)
119:              CALL TIMDIS(LABEL)
120:              CALL SRN(3,6)
121: C
122: C    CHECK FOR SYSTEM CALIBRATION
123: C
124:              IF (CALTYP .AND. 1) GO TO 10
125: C
126: C    DISPLAY 'SYSTEM NOT CALIBRATED' WAIT FOR CR & EXIT
127: C
128:              WRITE(3,1220)
129:              CALL SRN(2,1)
130:              CALL KBD(2,IRSP)
131:              GO TO 1000
132: C
133: 10           IF(SFLAG.EQ.0) GO TO 100
134: C
135: C    ASK TO RESUME SCANNING ?
136: C
137:              ICLR = 1
138:              WRITE(3,1100)
139:              CALL SRN(2,1)
140:              CALL KBD(3,IRSP)
141:              GO TO(1000,40,50),IRSP
142: C
143: 40           IPTH = 1
144:              GO TO 300
145: C
146: 50           IF (SFLAG.NE.1) GO TO 100
147:              ICLR = 1
148:              WRITE(3,1200)
149:              CALL SRN(2,1)
150:              CALL KBD(3,IRSP)
151:              GO TO(1000,100,1000),IRSP
152: C
153: C    move calibration type into temporary location
154: C
155: 100          DO 110 II=1,15
156:              ICAL(II) = HEADER(II,ICP2+15)
157: 110         CONTINUE
158: C
159: C    CODE HEADER AND COMPARE TO MEMORY 'D010-D018'
160: C    EXCEPT 'D013' THE ATTENUATION SETTINGS.
161: C
162: 120          CALL CDEHDR(IERR)
163: C
164:              IF (IERR .EQ. 1) GO TO 1000
165: C
166:              HDRCMP = .TRUE.
167:              DO 130 IL=1,9
168:              II = IL + 15
169:              CALL MEM(2,II,IBC)
170:              IF(IBC.EQ.IBUF(IL) .OR. IL.EQ.4) GO TO 130
171:              HDRCMP = .FALSE.
172: 130         CONTINUE
173:              IF (HDRCMP) GO TO 180
174: C
175: C    HEADER DIDN'T COMPARE
176: C
177:              ICLR = 1
178:              CALL SRN(2,1)
179:              WRITE(3,1210)
180:              CALL SRN(2,1)
181:              CALL KBD(3,IRSP)
182:              GO TO(1000,1000,150),IRSP
183: 150          IERR = 0
184:              CALL CDENTK(IERR)
185: C
```

```
186:  C   EXIT IF AN ERROR ENCOUNTERED IN CODE METROTEK
187:  C
188:              IF(IERR .EQ. 1) GO TO 1000
189:  C
190:  C   PUT PRE IN FRONT OF CALIBRATION TYPE IN THE HEADER
191:  C
192:              DO 170 II = 1,15
193:              IF(II.GT.3) GO TO 165
194:              HEADER(II,ICP2+15) = IDAT(II)
195:              GO TO 170
196:  165         HEADER(II,ICP2+15) = ICAL(II-3)
197:  170         CONTINUE
198:  C
199:  C
200:  C   LOAD HEADER WITH M-TEK V. CONSTANT
201:  C
202:  180         CALL MEM(2,Z'1A',IVCH)
203:              CALL MEM(2,Z'19',IVCL)
204:  C
205:  C   BLANK OUT OLD ATTEN. IN THE HEADER &
206:  C   BLANK OUT VELOCITY CONSTANTS IN THE HEADER
207:  C
208:              DO 200 IL=1,15
209:              HEADER(IL,ICP2+13) = 32
210:              HEADER(IL,ICP3+12) = 32
211:              HEADER(IL,ICP3+7) = 32
212:  200         CONTINUE
213:  C
214:              IVCT = ((IVCH.AND.15)*256)+IVCL
215:              CALL NCDEI(HEADER(1,ICP3+12),IVCT)
216:              VCT = FLOAT(IVCT)/128
217:              CALL NCDEF(HEADER(1,ICP2+13),VCT)
218:  C
219:  C   GET ATTENUATION OUT OF MEMORY & PUT INTO HEADER
220:  C
221:              CALL MEM(2,Z'13',IATTN)
222:              CALL RATTEN(HEADER(1,ICP3+7),IATTN)
223:  C
224:  C   Display needed scan information.
225:  C
226:  C   Max & Min Inspection depths
227:  C   Static system delay
228:  C   Detection Thershold
229:  C   VELOCITY CONSTANT
230:  C   Scan axis
231:  C   Grid size
232:  C
233:              IF(IERR .GT. 0) ICLR = 1
234:              IF(ICLR.EQ.0) GO TO 235
235:              CALL SEN(1,0)
236:              CALL TIRDIS(LABEL)
237:              CALL SEN(0,0)
238:  C   min. insp. depth
239:  235         ITEM = ICP2 + 6
240:              WRITE(3,2100)(TITLE(IL,ITEM),IL=1,15),(HEADER(IL,ITEM),IL=1,15)
241:  C   max. insp. depth
242:              ITEM = ICP2 + 7
243:              WRITE(3,2100)(TITLE(IL,ITEM),IL=1,15),(HEADER(IL,ITEM),IL=1,15)
244:  C   Static delay
245:              ITEM = ICP1 + 6
246:              WRITE(3,2100)(TITLE(IL,ITEM),IL=1,15),(HEADER(IL,ITEM),IL=1,15)
247:  C   thres.
248:              ITEM = ICP2 + 3
249:              WRITE(3,2100)(TITLE(IL,ITEM),IL=1,15),(HEADER(IL,ITEM),IL=1,15)
250:  C   VELOCITY CONSTANT ADJUSTED
251:              ITEM = ICP2 + 13
252:              WRITE(3,2100)(TITLE(IL,ITEM),IL=1,15),(HEADER(IL,ITEM),IL=1,15)
253:  C   scan axis
254:              ITEM = ICP1 + 4
255:              WRITE(3,2100)(TITLE(IL,ITEM),IL=1,15),(HEADER(IL,ITEM),IL=1,15)
256:  C   grid size
257:              ITEM = ICP1 + 1
258:              WRITE(3,2100)(TITLE(IL,ITEM),IL=1,15),(HEADER(IL,ITEM),IL=1,15)
259:  C   Calibration type
260:              ITEM = ICP2 + 15
261:              WRITE(3,2100)(TITLE(IL,ITEM),IL=1,15),(HEADER(IL,ITEM),IL=1,15)
```

```
262: C
263: C    ASK THE OPPERATOR TO ENTER MAN #
264: C
265:          ITEM = 4
266: 240      CALL SRN(3,14)
267:          WRITE(3,2200)(PROMPT(IL,ITEM),IL=1,29)
268:          WRITE(3,2000) (TITLE(IL,ITEM),IL=1,15)
269:          CALL READI
270:          CALL SRN(3,14)
271:          CALL SRN(2,4)
272:          CALL INPTCK(INPUT,ITEM,IERR)
273:          IF(IERR .EQ. 0) GO TO 250
274:          CALL SRN(3,16)
275:          CALL INPINV
276:          GO TO 240
277: 250      DO 260 IL = 1,15
278:          HEADER(IL,ITEM) = INPUT(IL)
279: 260      CONTINUE
280: C
281: C   get the resolution.
282: C
283: 300      CALL CHRSCH(HEADER(1,ICPS+3),LEN)
284:          CALL DCDEF(HEADER(1,ICPS+3),RANGE,LEN)
285: C
286:          IF(VIEW(3) .LT. 2.9) GO TO 330
287:          ICN = IFIX(VIEW(3) + .1) - 2
288:          ICL = 4
289:          IF(ICN.GT.2) ICL = 8
290:          GO TO 400
291: C
292: C    FILL SCAN DISPLAY DATA AREA WITH ALL THE SAME COLOR
293: C
294: 330      DO 340 JJ= 1,255
295:          CALL MEM(1,JJ-3840,8)
296: 340      CONTINUE
297:          GO TO 490
298: C
299: C    SET UP COLOR TABLE FOR DISPLAY DEPTH WHILE SCANNING
300: C 302:          VH = VIEW(2)
303:          IF(VL.EQ.VH) VH=VH+.008
304:          IF(VL.LT.VH) GO TO 445
305: C SWAP HIGH & LOW VALUES
306:          VX=VL
307:          VL=VH
308:          VH=VX
309: C
310: 445      STEP = (VH-VL)/ICL
311: C
312: C   BUILD LOADING TABLE.
313: C
314:          RMUL = RANGE * .001
315:          ITAB(1) = 255
316:          ITAB(ICL+3) = 1
317: C
318:          JH = ICL + 2
319:          DO 460 II = 2,JH
320:          ITAB(II) = IFIX(VH/RMUL)
321:          IF(ITAB(II).GT.255) ITAB(II) = 255
322:          VH = VH - STEP
323: 460      CONTINUE
324: C
325: C FILL COLOR BUFFER
326: C
327:          DO 480 II = 1,JH
328:          IB = ITAB(II+1)
329:          IT = ITAB(II)
330:          DO 470 JJ = IB,IT
331:          CALL MEM(1,JJ-3840,COLORT(II,ICN))
332: 470      CONTINUE
333: 480      CONTINUE
334: C
335: 490      CALL MEM(1,-3840,15)
336: C
337: C
```

```
338: C   GET TRACK LINEAR FACTOR FROM HEADER
339: C
340: 500     CALL CHRSCH(HEADER(1,ICP1+2),ILEN)
341:         CALL DCDEI(HEADER(1,ICP1+2),LSFT,ILEN)
342: C
343: C   GET ARM LINEAR FACTOR FROM HEADER
344: C
345:         CALL CHRSCH(HEADER(1,ICP1+3),ILEN)
346:         CALL DCDEI(HEADER(1,ICP1+3),LSFA,ILEN)
347: C
348: C   GET HEADER GRID AREA FACTOR
349: C
350:         CALL CHRSCH(HEADER(1,ICP1+1),ILEN)
351:         CALL DCDEI(HEADER(1,ICP1+1),ICS,ILEN)
352: C
353: C
354: C   CALCULATE RADIAL OFF-SETS
355: C
356:         RTRK = RADIAL(1)/RADIAL(2)
357:         RARM = RADIAL(3)/RADIAL(4)
358: C
359: C   CALCULATE THE AREA FACTOR
360: C
361: 560     DO 570 II = 1,5
362:         IAF = 10 * 2 ** II
363:         IAFACT = 1 + (16 * II)
364:         RGRID = FLOAT(ICS)/FLOAT(IAF)
365:         ISFT = IFIX(FLOAT(LSFT) * RGRID * RTRK)
366:         ISFA = IFIX(FLOAT(LSFA) * RGRID * RARM)
367: C
368: C   CHECK FOR WITH-IN RANGE COND.
369: C
370:         IF(ISFT.LE.256 .AND. ISFA.LE.256) GO TO 580
371: 570     CONTINUE
372: C
373: C   IF THE DO LOOP ENDED BY THE LAST CONTINUE THE
374: C   CORRECT IAF WASN'T FOUND.
375: C
376:         CALL SRN(1,0)
377:         CALL TIMDIS(LABEL)
378:         CALL SRN(3,4)
379:         WRITE(3,4400)
380:         CALL SRN(2,1)
381:         CALL KBD(2,IRSP)
382:         GO TO 1000
383: C
384: C   THE CORRECT IAF WAS SELECTED. "LET'S SEE IF UNDER RANGE ?"
385: C
386: 580     IF(ISFT.LT.LSFT .OR. ISFA.LT.LSFA) GO TO 590
387:         GO TO 595
388: C
389: C   DISPLAY WARNING FOR UNDER RANGE
390: C
391: 590     CALL SRN(1,0)
392:         CALL TIMDIS(LABEL)
393:         CALL SRN(3,4)
394:         WRITE(3,4500)
395:         CALL SRN(2,1)
396:         CALL KBD(1,IRSP)
397: C
398: C   LOAD THE SCALE FACTORS, AREA FACTORS, AND PORT ADRESSES INTO MEMORY.
399: C
400: C   AREA FACTOR LOAD.
401: C
402: 595     CALL MEM(1,Z'2C',IAFACT)
403: C
404: C   CHECK FOR X OR Y SCAN DIRECTION.
405: C
406:         IF(HEADER(1,ICP1+4).EQ.89) GO TO 600
407: C   X = TRACK , Y = ARM
408:         CALL MEM(1,Z'09',Z'45')
409:         CALL MEM(1,Z'0A',Z'47')
410:         CALL MEM(1,Z'2A',ISFT)
411:         CALL MEM(1,Z'2B',ISFA)
412:         GO TO 650
413: C
```

```
414: C   Y = TRACK , X = ARM
415: C
416: 600     CALL MEM(1,Z'09',Z'47')
417:        CALL MEM(1,Z'0A',Z'45')
418:        CALL MEM(1,Z'2A',ISFA)
419:        CALL MEM(1,Z'2B',ISFT)
420: C
421: C   IF RESUME SCANNING PATH WAS SELECTED GO TO RESUME
422: C   OTHERWISE JUMP OVER THIS CODE AND ASSUME NEW SCAN.
423: C
424: 650     IF(IPTH .EQ. 0) GO TO 700
425:        CALL RESCAN
426:        GO TO 900
427: C
428: C   GET SYSTEM DELAY AND LOAD IT INTO SYSTEM
429: C
430: 700     CALL CHRSCH(HEADER(1,ICP1+6),LEN)
431:        CALL DCDEF(HEADER(1,ICP1+6),SDELAY,LEN)
432: C
433: C DELAY(bits) = SDELAY(us) * VC(10**-5 in/sec) /RANGE(10**-3 in/bit)
434: C
435: C DELAY(bits) = SDELAY * VC / RANGE (10**-6sec * 10**5in/sec / 10**-3in/bit)
436: C
437: C DELAY(bits) = SDELAY * VC / RANGE  times 10**2
438: C
439:        IDLY = IFIX((SDELAY * VCT * 100 / RANGE ) + .5001)
440:        IDLYH = IFIX(FLOAT(IDLY) / 256)
441:        IDLYL = IDLY - (IDLYH * 256)
442: C
443:        CALL MEM(1,Z'20',IDLYL)
444:        CALL MEM(1,Z'21',IDLYH)
445: C
446: C   ZERO SCAN MEMORY AND SET SFLAG TO FALSE.
447: C
448:        CALL INITM
449:        CALL SRN(3,18)
450:        SFLAG = 2
451:        SLOAD = .FALSE.
452:        CALL MEM(1,Z'0D',0)
453: C
454: C   LOAD HEADER ITEM WITH SCAN TIME
455: C
456:        CALL TIMGET(HEADER(1,10))
457: C
458: C   CALL THE ASSEMBLY SCAN ROUTINE
459: C
460:        CALL PRESCN
461: C
462: C   CHECK FOR EXIT END FROM SCAN
463: C
464: 900     CALL MEM(2,Z'0D',IEXIT)
465:        IEXIT = IEXIT .AND. Z'0F0'
466:        IF (IEXIT .GT. 0) GO TO 1000
467: C
468: C   GET NOMINAL THICKNESS AND RANGE SELECT
469: C
470: 910     CALL CHRSCH(HEADER(1,ICP2+4),ILEN)
471:        CALL DCDEF(HEADER(1,ICP2+4),THICK,ILEN)
472: C
473: C   Range has been taken before
474: C
475: C   CALCULATE NOMINAL DEPTH SCALED & LOAD IT
476: C   INTO MEMORY Z'D02F'
477: C
478:        NDSCLD= IFIX(100*(THICK/RANGE))
479:        CALL MEM(1,Z'2F',NDSCLD)
480: C
481: C   SET SFLAG TO TRUE TO INDICATE THERE IS SCAN DATA THERE.
482: C
483:        SFLAG = 1
484: C
485: C   LOAD THE SYSTEM VERSION INTO C-1 L-12
486: C   AND CLEAR THE RADIAL RATIO'S IN THE HEADER C2,1089
487: C
488:        DO 920 II=1,15
489:        HEADER(II,12)=VERSON(II)
```

```
490:            HEADER(II,ICPI+8) = 32
491:            HEADER(II,ICPI+9) = 32
492: 920     CONTINUE
493: C
494: C    LOAD HEADER ITEMS FOR RADIAL OFFSET #'S
495: C
496:            CALL NCDEF(HEADER(1,ICPI+8),RTREC)
497:            CALL NCDEF(HEADER(1,ICPI+9),RARM)
498: C
499: C    ASK TO SAVE SCAN ?
500: C
501:            RARG = 0
502:            CALL SRN(1,0)
503:            CALL TIMDIS(LABEL)
504:            CALL SRN(3,4)
505:            WRITE(3,5000)
506:            CALL SRN(2,1)
507:            CALL KBD(3,IRSP)
508: C
509:            IF(IRSP.EQ.2) RARG = 2.3
510: C
511: C    END OF SCAN ROUTINE
512: C
513: 1000    RETURN
514: C
515: C    FORMAT STATEMENTS FOR SCAN
516: C
517: 1100    FORMAT('+    Do you wish to resume scanning ?')
518: 1200    FORMAT(1H+,27X,'** CAUTION **',/,
519:      $    12X,'THE SCAN IN MEMORY HAS NOT BEEN SAVED TO DISK.',//,
520:      $    5X,'Do you wish to rescan ?')
521: 1210    FORMAT(11X,'THE ULTRASONIC SETTINGS IN THE HEADER ',/,
522:      $    11X,'DO NOT MATCH THOSE USED FOR CALIBRATION.',//,
523:      $    5X,'Do you wish to re-calibrate the system ?')
524: 1220    FORMAT(5X,'THE SYSTEM IS NOT CALIBRATED')
525: 2100    FORMAT(18X,15A1,3X,'=',3X,15A1)
526: 2200    FORMAT('+    Enter ',20A1)
527: 2300    FORMAT(18X,15A1,' ? =    ')
528: 4400    FORMAT(1X,'** ERROR **   SCANNER FACTOR(S) OVERFLOW ON THE',
529:      $    ' HIGHEST AREA FACTOR.',//,
530:      $    5X,'Go to header and reduce the GRID SIZE !')
531: 4500    FORMAT(1X,'** WARNING **   THE LINEAR > ACTUAL SCALE ',
532:      $    'FACTOR(S).')
533: 5000    FORMAT('+    Save scan data to disk ?')
534: C
535:            END
536:
537:
538:
539:
540:
  1:            SUBROUTINE SETUP(RARG)
  2: C
  3: C    OPTION 9 SYSTEM SETUP PROCEDURES
  4: C
  5: C    SET UP SCAN COLOR MAPPING
  6: C    SET UP DISPLAY COLOR MAPPING DEFAULT
  7: C    CALIBRATE THE SCANNER
  8: C
  9: C Last mod 6.10.83 For: Add scan direction swapping and clean up
 10: C
 11: C LAST MOD 04/05/83  FOR: SCREEN SIZE CHANGES
 12: C
 13: C    CREATED BY: JIM
 14: C    ON: 02-20-83
 15: C
 16:            LOGICAL LABEL(15)
 17:            LOGICAL INPUT(15),IL,CALTYP,SFLAG,SLOAD
 18: C
 19:            COMMON /CDATB/INPUT,IBUF(16),CALTYP,SFLAG,SLOAD,RADIAL(4),
 20:      $        VIEW(3)
 21: C
 22:            DATA LABEL/'S','E','T',' ','U','P',' ',' ',' ',' ',' ',' ',
 23:      $        ' ',' ',' '/
 24: C
 25: C WRITE MENU AND SELECT OPTION
```

```
 26: C
 27:              RARG = 0
 28:              IRSP = 0
 29: 10          CALL SRN(1,0)
 30:              CALL TIMDIS(LABEL)
 31:              CALL SRN(3,4)
 32:              WRITE(3,2000)
 33: 20          CALL SRN(3,14)
 34:              WRITE(3,2200)
 35:              CALL READI
 36:              IF (INPUT(2) .NE. 32) GO TO 50
 37:              IOPT = INPUT(1) - 48
 38:              GO TO (1000,200,200,400,500),IOPT
 39: 50          CALL INPINV
 40:              CALL SRN(3,14)
 41:              CALL SRN(2,1)
 42:              GO TO 20
 43: C
 44: C   SET COLOR LEVEL
 45: C                                IOPT = 2  SET SCAN COLOR
 46: C                                IOPT = 3  SET DISPLAY COLOR
 47: C
 48: 200         CALL SCOLOR(IOPT)
 49:              IF(IOPT.EQ.1) GO TO 1000
 50:              GO TO 10
 51: C
 52: C   select the scan data drive assignment.
 53: C
 54: 400         CALL SDRIVE
 55:              GO TO 10
 56: 500         CALL SSDIR
 57:              GO TO 10
 58: C
 59: C
 60: 1000        RETURN
 61: 2000        FORMAT(1H+,28X,'SYSTEM SET UP',//,
 62:        $    ,20X,'1 - RETURN TO COMMAND LIST',
 63:        $    /,20X,'2 - SCAN MAPPING SELECTION',
 64:        $    /,20X,'3 - DISPLAY COLOR SELECTION',
 65:        $    /,20X,'4 - DATA DISK DRIVE ASSIGNMENT',
 66:        $    /,20X,'5 - CHANGE SCANNING DIRECTION')
 67: 2200        FORMAT('+    Enter option NUMBER - ')
 68:              END
 69:              SUBROUTINE SCOLOR(IOPT)
 70: C
 71: C   SUBROUTINE SCOLOR
 72: C
 73: C   IOPT = 2  PRE-SELECTS THE COLOR MAPPING COLOR
 74: C             FOR SCANNING DEPTH DISPLAY.
 75: C
 76: C   IOPT = 3 PRE-SELECTS COLOR MAPPING FOR DISPLAY.
 77: C
 78: C        CREATED BY: JRM  02-23-83
 79: C
 80:              INTEGER DCOLOR(3)
 81:              INTEGER COLORC(6,4),COLORT(10,4)
 82:              DIMENSION ITAB(11)
 83:              LOGICAL IX
 84:              LOGICAL LABEL(15)
 85:              LOGICAL INPUT(15)
 86:              LOGICAL HEADER(15,48)
 87:              LOGICAL PROMPT(20,48),TITLE(15,48),GROUPT(30,4)
 88:              LOGICAL CALTYP,SFLAG,SLOAD
 89: C
 90:              COMMON /CHDR$/HEADER,NGRP(4),IGRP(4)
 91:              COMMON /CHDD$/PROMPT,TITLE,GROUPT
 92:              COMMON /CDAT$/INPUT,IBUF(16),CALTYP,SFLAG,SLOAD,RADIAL(4),
 93:        $           VIEW(3)
 94:              COMMON /CCOL$/COLORC,COLORT,DCOLOR
 95: C
 96:              DATA LABEL/'S','E','T',' ','U','P',' ',' ',' ',' ',' ',
 97:        $         ' ',' ',' ',' '/
 98: C
 99:              IERR = 0
100:              IRSP = 0
101:              IGP1 = NGRP(1)
```

```
102:            ICP2 = NCRP(1) + NCRP(2)
103:            ICP3 = NCRP(1) + NCRP(2) + NCRP(3)
104: C
105:            LABEL(8) = INPUT(1)
106: C
107:            GO TO(1000,300,100),IOPT
108:            GO TO 1000
109: C
110: C    COLOR SELECTION FOR DISPLAY
111: C
112: 100        CALL SRN(1,0)
113:            CALL TIMDIS(LABEL)
114:            CALL SRN(3,4)
115:            WRITE(3,3010)
116:            WRITE(3,3050)
117: 110        CALL SRN(3,14)
118:            WRITE(3,3100)
119:            CALL READI
120:            CALL CHRSCH(INPUT,LEN)
121:            CALL DCDEI(INPUT,ICNM,LEN)
122:            IF((ICNM.GE.1).AND.(ICNM.LE.6)) GO TO 120
123:            IF((INPUT(1).EQ.32).AND.(LEN.EQ.0)) GO TO 1000
124:            CALL INPINV
125: 115        CALL SRN(3,14)
126:            CALL SRN(2,1)
127:            GO TO 110
128: C
129: 120        GO TO(900,200,125,125,125,125),ICNM
130: 125        DCOLOR(2) = 4
131:            DCOLOR(1) = ICNM - 2
132:            IF(ICNM.GT.4) DCOLOR(2) = 8
133: C
134: C   Check if over 100%
135: C
136:            IF((DCOLOR(2)*DCOLOR(3)).LE.100) GO TO 1000
137:            WRITE(3,3500)
138:            GO TO 115
139: C
140: C    SET UP PERCENT SLICES.
141: C
142: 200        CALL SRN(3,15)
143:            CALL SRN(2,2)
144: 205        CALL SRN(3,17)
145:            WRITE(3,3300)
146: C
147:            CALL READI
148:            CALL CHRSCH(INPUT,LEN)
149:            CALL DSDEF(INPUT,CENT,LEN)
150:            IF(CENT.LE.0) GO TO 207
151:            IF((DCOLOR(2)*CENT).LE.100) GO TO 210
152:            WRITE(3,3500)
153:            GO TO 208
154: 207        CALL INPINV
155: 208        CALL SRN(3,17)
156:            CALL SRN(2,1)
157:            GO TO 205
158: C
159: C   LOAD DCOLOR(3) WITH INTERGER FIXED CENT
160: C
161: 210        ICENT = IFIX(CENT)
162:            DCOLOR(3) = ICENT
163:            GO TO 1000
164: C
165: C
166: C    COLOR SELECTION FOR SCANNING
167: C
168: 300        CALL SRN(1,0)
169:            CALL TIMDIS(LABEL)
170:            CALL SRN(3,4)
171:            WRITE(3,3000)
172:            WRITE(3,3050)
173: 310        CALL SRN(3,14)
174:            WRITE(3,3100)
175: C
176:            CALL READI
177:            CALL CHRSCH(INPUT,LEN)
```

```
178:          CALL DCDEI(INPUT,ICNM,LEN)
179:          IF((ICNM.GE.1).AND.(ICNM.LE.6)) GO TO 320
180:          IF((INPUT(1).EQ.32).AND.(LEN.EQ.0)) GO TO 1000

182:          CALL SRN(3,14)
183:          CALL SRN(2,1)
184:          GO TO 310
185:  320     IF(ICNM .EQ. 1) GO TO 900
186:          VIEW(3) = FLOAT(ICNM)
187:          IF(ICNM .EQ. 2) GO TO 1000
188: C
189: C  Prompt for low and high viewing thresholds.
190: C
191:  405     CALL SRN(3,15)
192:          CALL SRN(2,1)
193:          ITEM = ICP2 + 4
194:          DO 440 II=1,2
195:          ISRNL = (3 * II) + 13
196:  410     CALL SRN(3,ISRNL)
197:          IF(II.EQ.1) WRITE(3,2400)
198:          IF(II.EQ.2) WRITE(3,2500)
199:          WRITE(3,2250)(PROMPT(IL,ITEM),IL=1,29)
200:          CALL READI
201:          CALL INPTCK(INPUT,ITEM,IERR)
202:          IF(IERR.EQ.0) GO TO 420
203:          CALL INPINV
204:          CALL SRN(3,ISRNL)
205:          CALL SRN(2,2)
206:          GO TO 410
207: C
208:  420     ISRNX = ISRNL + 2
209:          CALL SRN(3,ISRNX)
210:          CALL SRN(2,1)
211:          CALL CHRSCH(INPUT,LEN)
212:          IF(II.EQ.1) CALL DCDEF(INPUT,VIEW(1),LEN)
213:          IF(II.EQ.2) CALL DCDEF(INPUT,VIEW(2),LEN)
214:  440     CONTINUE
215: C
216: C  End of entering low and high scan display mapping parameters.
217: C
218:          GO TO 1000
219: C
220:  900     IOPT = 1
221: C
222: 1000     RETURN
223: C
224: C    FORMAT STATEMENTS FOR COLORS
225: C
226: 2250     FORMAT(5X,29A1,1X)
227: 2400     FORMAT('+    Enter low viewing threshold')
228: 2500     FORMAT('+    Enter high viewing threshold')
229: 3000     FORMAT(1H+,29X,'SCAN MAPPING',//,
230:     $           23X,'1 - RETURN TO COMMAND LIST',/,
231:     $           23X,'2 - NO LEVELS')
232: 3010     FORMAT(1H+,23X,'DISPLAY COLOR SELECTION',//,
233:     $           23X,'1 - RETURN TO COMMAND LIST',/,
234:     $           23X,'2 - CHANGE STEP SIZE')
235: 3050     FORMAT(23X,'3 - 4 LEVEL GRAY',/,
236:     $           23X,'4 - 4 LEVEL COLOR',/,
237:     $           23X,'5 - 8 LEVEL GRAY',/,
238:     $           23X,'6 - 8 LEVEL COLOR',/)
239: 3100     FORMAT('+    Enter option NUMBER or CR for no change..- ')
240: 3300     FORMAT('+    Enter thinning percent (ex: 5) - ')
241: 3500     FORMAT(1H+,4X,'MAXIMUM SLICE > 100% ,',
242:     $          'Either lower % or # of LEVELS.')
243: C
244: C
245:          END
246:          SUBROUTINE SDRIVE
247: C
248: C  CHANGE THE SCAN DISK DRIVE TO ANOTHER DRIVE.
249: C
250: C  LAST MODIFIED : 11/11/82   BY: JRM
251: C  FOR: INITIAL CREATION
252: C
253: C  LAST MOD. 03-02-83  BY: JRM
```

```
254: C   FOR: COMMON BLOCK SIZE, AND UPPER & LOWER CASE.
255: C
256:        LOGICAL LABEL(15)
257:        LOGICAL TABLN(11),DFILE(11),SDISK
258:        LOGICAL INPUT(15),CALTYP,SFLAG,SLOAD
259: C
260:        COMMON /CDATS/INPUT,IBUF(16),CALTYP,SFLAG,SLOAD,RADIAL(4),
261:       $       VIEW(3)
262:        COMMON /CFLES/TABLN,DFILE,SDISK
263: C
264:        DATA LABEL/'S','E','T',' ','U','P','.','A','S','S','I','G','N',
265:       $       ' ',' ',' '/
266: C
267:        CALL SRN(1,0)
268:        CALL TIMDIS(LABEL)
269: C
270:        IL = SDISK + 64
271: C
272:        CALL SRN(3,4)
273:        WRITE(3,2000) IL
274: 20     CALL SRN(3,9)
275:        WRITE(3,2100)
276:        CALL READI
277:        CALL CHRSCH(INPUT,LEN)
278:        IF(INPUT(1).EQ.32) GO TO 1000
279:        IDISK = (INPUT(1) .AND. Z'DF') - 64
280:        IF((IDISK.GE.1).AND.(IDISK.LE.2)) GO TO 100
281: C
282: C      ERROR MESSAGE
283: C
284:        CALL INPINV
285:        CALL SRN(3,9)
286:        CALL SRN(2,1)
287:        GO TO 20
288: C
289: C      MAKE SDISK EQUAL TO THE OPERATOR'S SELECTION
290: C
291: 100    SDISK = IDISK
292: C
293: C
294: 1000   RETURN
295: C
296: 2000   FORMAT(1H+,23X,'DATA DISK DRIVE ASSIGNMENT',//,
297:       $       19X,'THE DATA DRIVE IS CURRENTLY DRIVE ',A1,'.',//,
298:       $       5X,'Enter the desired scan disk drive letter (A or B)')
299: 2100   FORMAT('+     or CR for no change - ')
300: C
301:        END
302:        SUBROUTINE SSDIR
303: C
304: C      SWAP SCANNING DIRECTION(S)
305: C
306:        LOGICAL LABEL(15),IDIR,JDIR(3,2)
307:        DATA LABEL/'S','E','T',' ','U','P','.','S','C','A','N',
308:       $       ' ','D','I','R'/
309: C
310:        DATA JDIR/'P','o','s','N','e','g'/
311: C
312:        IDIR = 0
313: C
314:        CALL SRN(1,0)
315:        CALL TIMDIS(LABEL)
316:        CALL SRN(3,4)
317: C
318:        WRITE(3,2100)
319:        CALL SRN(2,1)
320:        CALL KBD(3,IRSP)
321: C
322:        IF(IRSP.EQ.2) IDIR = 1
323: C
324:        CALL SRN(3,8)
325:        WRITE(3,2200)
326:        CALL SRN(2,1)
327:        CALL KBD(3,IRSP)
328: C
329:        IF(IRSP.EQ.2) IDIR = IDIR + 2
```

```
330:  C
331:            CALL SCDIR(JDIR)
332:  C
333:            ITRKD = 1
334:            IARMD = 1
335:  C
336:            IF(JDIR.AND.1) ITRKD = 2
337:            IF(JDIR.AND.2) IARMD = 2
338:  C
339:            CALL SRN(3,11)
340:            WRITE(3,2300)(JDIR(II,ITRKD),II=1,3),(JDIR(II,IARMD),II=1,3)
341:            CALL SRN(2,1)
342:            CALL KBD(2,IRSP)
343:  C
344:            RETURN
345:  C
346:  2100     FORMAT('+     Reverse track scanning direction ?')
347:  2200     FORMAT('+     Reverse arm scanning direction ?')
348:  2300     FORMAT(1H+,25X,'SCANNING DIRECTIONS',//,
349:       &              29X,'Track = ',3A1,/,
350:       &              29X,'Arm   = ',3A1)
351:  C
352:            END
353:
354:
355:
356:
357:
358:
359:
360:

1:            SUBROUTINE SRN(IJMP,NTIM)
 2:  C
 3:  C
 4:  C  LAST MOD: 3-11-83 BY: JRM   FOR: GRAFICS CHANGES.
 5:  C
 6:  C  DATE LAST MODIFIED 1/6/83   BY: JRM
 7:  C
 8:  C  IF IJMP IS 1
 9:  C  CLEAR SCREEN
10:  C
11:  C  IF IJMP IS 2
12:  C  WRITE BLANK LINE(S) WHERE AS NTIM = # OF LINE(S)
13:  C
14:  C  IF IJMP IS 3
15:  C  LINE ADJUST POSITIONS CURSOR ON A SPECFIC (NTIM)
16:  C  LINE NUMBER
17:  C
18:            GO TO (100,200,300),IJMP
19:  C
20:  C  IJMP OUT OF RANGE SHOW ERROR MESAGE & RETURN
21:  C
22:            WRITE(3,50)
23:            RETURN
24:  50       FORMAT(1X,'** ERROR ** SRN,IJMP OUT OF RANGE')
25:  C
26:  C  CLEAR SCREEN
27:  C
28:  100      WRITE(3,110)
29:  110      FORMAT(1H1)
30:            RETURN
31:  C
32:  C  WRITE BLANK LINES
33:  C
34:  200      DO 230 I = 1 , NTIM
35:            WRITE(3,210)
36:  210      FORMAT(1X)
37:  230      CONTINUE
38:            RETURN
39:  C
40:  C  POSITION CUSOR
41:  C
42:  300      CALL CREM
43:            CALL MEM(1,1,0)
44:            IPOS = NTIM - 1
45:            CALL MEM(1,2,IPOS)
```

```
46:            RETURN
47: C
48:            END
49:
50:
51:
52:
53:
54:
55:
56:
57:
58:
59:
60:
 1:            SUBROUTINE THKCL
 2: C
 3: C     Last mod. 12.14.83 for removal of extra. write statements
 4: C                        and comment clean up
 5: C
 6: C   last mod. 12.08.83 for extra write stat. for vel. cal debug
 7: C
 8: C   Last mod. 11.21.83 for long delay in the caladj calculation.
 9: C
10: C   LAST MOD. 8.25.83 ADD 50 MILS/BIT CORRECTION. ADD PROMPTS FOR
11: C                       CHANGES IN RES. AND GATE SWITCHES. LOOK
12: C                       @ CALBLOCK ADJ. TO DETERMINE INTERNAL RES.
13: C
14: C   last mod 8.22.83 Remove extra format statements from thickness cal
15: C
16: C   Last mod 7.18.83 add cal block thick & measured thickness at end of
17: C                     velocity calibration.
18: C  Last mod. 7.19.83 take out LDMTEX @ end of THKCL & put in @
19: C                     end of CALBET subroutine.
20: C
21: C   LAst mod. 7.15.83 clean up program(still has some diagnostic WRITES)
22: C
23: C   Last mod. 6/30/83 for program creation.
24: C
25:            LOGICAL IL
26:            LOGICAL INPUT(15)
27: C
28:            LOGICAL LABEL1(15)
29:            LOGICAL LABEL2(15)
30:            LOGICAL HEADER(15,48)
31:            LOGICAL CALTYP,SFLAG,SLOAD
32:            COMMON /CHDR$/HEADER,NGRP(4),IGRP(4)
33:            COMMON /CDAT$/INPUT,IBUF(16),CALTYP,SFLAG,SLOAD,RADIAL(4),
34:         $            VIEW(8)
35: C
36: C
37:            DATA LABEL1/'C','A','L','I','B','R','A','T','E','.','D','E','L',
38:         $            'A','Y'/
39: C
40:            DATA LABEL2/'C','A','L','I','B','R','A','T','E','.','V','E','L',
41:         $            'O','C'/
42: C
43:            IGP1 = NGRP(1)
44:            IGP2 = NGRP(1) + NGRP(2)
45:            IGP3 = NGRP(1) + NGRP(2) + NGRP(3)
46: C
47:            CALL SRN(1,0)
48:            CALL TINDIS(LABEL1)
49:            CALL SRN(3,4)
50: C
51: C   GET RESOLUTION RANGE,GATE DELAY & WIDTH
52: C
53:            CALL CHRSCH(HEADER(1,IGP3+8),LEN)
54:            CALL DDDEF(HEADER(1,IGP3+8),RANGE,LEN)
55:            CALL CHRSCH(HEADER(1,IGP3+9),LEN)
56:            CALL DDDEF(HEADER(1,IGP3+9),DELAY,LEN)
57:            CALL CHRSCH(HEADER(1,IGP3+10),LEN)
58:            CALL DDDEF(HEADER(1,IGP3+10),WIDTH,LEN)
59: C
60: C   get cal block thickness,header velocity constant
```

```
61: C
62:             CALL CHRSCH(HEADER(1,IGP2+2),LEN)
63:             CALL DCDEF(HEADER(1,IGP2+2),VCH,LEN)
64:             CALL CHRSCH(HEADER(1,IGP2+3),LEN)
65:             CALL DCDEF(HEADER(1,IGP2+3),CALBLK,LEN)
66: C
67: C    Calculate for correct internal resolution via the calblock
68: C    limitation and the internal set vel. con. vs thero. vc ratios.
69: C
70: C           CALADJ = CALBLK * (VCH/2.0)
71: C
72:             CALADJ = (DELAY+WIDTH) * 2.0 * .05 + CALBLK * (VCH/2.0)
73: C
74: C
75: C    logic for selection of correct internal range selection.
76: C
77:             RESI = .2
78: C
79:             IF(CALADJ .LE. 400.0) RESI = .1
80:             IF(CALADJ .LE. 200.0) RESI = .05
81:             IF(CALADJ .LE. 40.0) RESI = .01
82:             IF(CALADJ .LE. 16.0) RESI = .004
83:             IF(CALADJ .LE. 8.0) RESI = .002
84: C
85:             RANGI = 1000.0 * RESI
86: C
87: C    SET UP BIT PATTERN FOR RANGE SWITCH.
88: C
89:             IF(RESI .EQ. .002) IRSW = Z'0F0'
90:             IF(RESI .EQ. .004) IRSW = Z'0F1'
91:             IF(RESI .EQ. .010) IRSW = Z'0F2'
92:             IF(RESI .EQ. .050) IRSW = Z'0F4'
93:             IF(RESI .EQ. .100) IRSW = Z'0F5'
94:             IF(RESI .EQ. .200) IRSW = Z'0F6'
95: C
96: C
97: 10          IERR = 0
98:             CALL CDEHDR(IERR)
99:             IF (IERR .EQ. 1) GO TO 1000
100: C
101: 15         CALL MEM(1,Z'0E',0)
102: C
103:            DO 20 IL=1,16
104:            II = IL + 15
105:            CALL MEM(1,II,IBUF(IL))
106: 20         CONTINUE
107: C
108: C    Prompt for delay calibration?
109: C
110:            WRITE(3,1000)
111:            CALL SRN(2,1)
112:            CALL KBD(3,IRSP)
113:            GO TO(1000,30,500),IRSP
114: C
115: C    beginning of delay calibration
116: C
117: C    set delay to zero. 20 = low byte, 21 = high byte
118: C
119: C    Look at range word and restore original switch values.
120: C    Prompt the operator to change the resolution and
121: C    if the Gate delay & width has a decade change.
122: C
123: 30         CALL SRN(1,0)
124:            CALL TIMDIS(LABEL1)
125:            CALL SRN(3,4)
126: C
127:            CALL MEM(1,Z'20',0)
128:            CALL MEM(1,Z'21',0)
129: C
130:            CALL RUNTEK
131:            CALL MEM(2,Z'17',IRSW1)
132:            DO 32 IL = 1,16
133:            II = IL + 15
134:            CALL MEM(1,II,IBUF(IL))
135: 32         CONTINUE
136: C
```

```
137: C
138: C    SET UP RESOLUTION INTERNAL FOR DELAY MEASUREMENT.
139: C
140:           CALL MEM(1,Z'17',IRSW)
141: C
142: C    SET VELOCITY CONSTANT INTERNAL TO 2.0 X 10**5 IN/SEC
143: C    WHICH IS A VALUE OF 256
144: C    19 = LOW BYTE, 1A = HIGH BYTE
145: C
146:           CALL MEM(1,Z'19',0)
147:           CALL MEM(1,Z'1A',Z'F1')
148: C
149:           IF(RANGE.GE.50 .AND. RESI.LE. 0.01) GO TO 35
150: C
151:           IF(IRSW .EQ. IRSW1) GO TO 55
152:           WRITE(3,1100) RESI
153:           GO TO 50
154: 35        IF(IRSW .NE. IRSW1) WRITE(3,1100) RESI
155:           CALL SRN(2,1)
156:           WRITE(3,1150)
157: C
158: C    GET GATE VALUES OUT OF MEMORY
159: C
160:           CALL MEM(2,Z'14',IGDLY)
161:           CALL MEM(2,Z'15',IGDW)
162:           CALL MEM(2,Z'16',IGWTH)
163: C
164: C    SORT VALUES OUT
165: C
166:           ID1 = IGDLY .AND. Z'0F'
167:           ID2 = (IGDLY .AND. Z'0F0') / Z'10'
168:           ID3 = (IGDW  .AND. Z'0F0') / Z'10'
169:           IW1 = IGWTH .AND. Z'0F'
170:           IW2 = (IGWTH .AND. Z'0F0') / Z'10'
171:           IW3 = IGDW  .AND. Z'0F'
172: C
173: C    SHIFT UP ONE DECADE
174: C
175:           ID2 = ID1
176:           ID1 = ID3
177:           IW2 = IW1
178:           IW1 = IW3
179: C
180: C    RESTORE NEW VALUES
181: C
182:           IGDLY = ID2 * Z'10' + ID1
183:           IGWTH = IW2 * Z'10' + IW1
184: C
185: C    LOAD VALUES INTO MEMORY
186: C
187:           CALL MEM(1,Z'14',IGDLY)
188:           CALL MEM(1,Z'15',Z'99')
189:           CALL MEM(1,Z'16',IGWTH)
190: C
191: C    WAIT FOR 'Y'
192: C
193: 50        CALL SRN(2,1)
194:           CALL KBD(1,IRSP)
195: C
196: C    Load the metrotek with the value
197: C
198: 55        CALL LDMTEK
199: C
200: C    look for bad load
201: C
202:           CALL MEM(1,Z'0D',IFLAG)
203:           IF((IFLAG.AND.Z'20') .NE. 0) GO TO 1000
204: C
205: C    pulse system
206: C
207: 60        CALL SRN(1,0)
208:           CALL TIMDIS(LABEL1)
209:           CALL PULSE(1)
210: C
211: C    get the thickness for calculations
212: C
```

```
213:            CALL SRN(1,0)
214:            CALL TIMDIS(LABEL1)
215:            CALL SRN(3,4)
216:            CALL READTK(ITHK1,IAMP,IERRT)
217:    C
218:    C   check to see if thickness read had an error
219:    C
220:            IF(IERRT.EQ.0) GO TO 80
221:    C   error
222:            WRITE(3,1400)
223:            CALL SRN(2,1)
224:            CALL KBD(3,IRSP)
225:            GO TO(1000,60,1000),IRSP
226:    C
227:    C   do calculations
228:    C
229:    C   ITHK         = XX in bits
230:    C   resol        = RANGI x 10**-8  inches/bit
231:    C   velocity     = 2.0 x 10**5  inches/sec
232:    C
233:    C   to get time of 1st echo
234:    C
235:    C   TIME1        =   ITHK * resol / velocity = nn * 2 x10**-3/2 x10**5
236:    C
237:    C           time1  = ITHK * 10**-8  seconds  = ITHK x 10**-2 micro seconds
238:    C
239:    C           to convert ITHK to us just devide by 100 * RANGI/2.0
240:    C
241: 80         TIME1 = ITHK1 * RANGI / 299
242:    C
243:            WRITE(3,2000) TIME1
244:            CALL SRN(2,1)
245:    C
246:    C   issue a message to set metrotek delay too get 2nd echo
247:    C
248: 90         WRITE(3,1500)
249:    C
250:    C   start system pulsing
251:    C
252:            CALL MPULSE(ITK,IAM,IER)
253:    C
254:    C   read the metrotek switches
255:    C
256:            CALL RDMTEK
257:    C
258:    C   REPRESERVE all settings except delay & width
259:    C
260:            DO 95 IL=1,4
261:            II = IL + 15
262:            CALL MEM(1,II,IBUF(IL))
263: 95         CONTINUE
264:    C
265:    C
266:    C   Set resolution it internal value of IRSW
267:    C
268:            CALL MEM(1,Z'17',IRSW)
269:    C
270:    C
271:    C   read thickness 2
272:    C
273:            CALL SRN(1,0)
274:            CALL TIMDIS(LABEL1)
275:            CALL SRN(3,4)
276:            CALL READTK(ITHK2,IAMP,IERRT)
277:    C
278:    C   check for errors
279:    C
280:            IF(IERRT.EQ.0) GO TO 110
281:    C
282:    C   error
283:    C
284:            WRITE(3,1400)
285:            CALL SRN(2,1)
286:            CALL KBD(3,IRSP)
287:            GO TO(1000,100,1000),IRSP
288:    C
```

```
289: 100      CALL SRN(1,0)
290:          CALL TIMDIS(LABEL1)
291:          GO TO 90
292: C
293: C   calculate the system static delay
294: C
295: 110      TIME2 = TIME2 * RANGE / 200
296: C
297: C   calc. system delay.
298: C
299:          SDELAY = (2 * TIME1) - TIME2
300: C
301:          WRITE(3,2100) TIME1,TIME2
302:          CALL SRN(2,1)
303:          WRITE(3,1600) SDELAY
304:          CALL SRN(2,1)
305: C
306:          IF(SDELAY.GE.0) GO TO 120
307:          WRITE(3,2200)
308:          CALL SRN(2,1)
309:          CALL KBD(1,IRSP)
310:          CALL SRN(1,0)
311:          CALL TIMDIS(LABEL1)
312:          CALL SRN(3,4)
313:          GO TO 15
314: C
315: C
316: C
317: 120      CALL KBD(2,IRSP)
318: C
319: C   load header with new delay value.
320: C
321:          DO 130 II=1,15
322:          HEADER(II,IGP1+6) = 32
323: 130      CONTINUE
324: C
325:          CALL NCDEF(HEADER(1,IGP1+6),SDELAY)
326: C
327: C   set CALTYP to reflect delay cal was done
328: C
329:          CALTYP = CALTYP .OR. Z'08'
330: C
331: C   END OF DELAY PROGRAM
332: C
333: 500      CALL SRN(1,0)
334:          CALL TIMDIS(LABEL2)
335: C
336:          DO 520 IL=1,16
337:          II = IL + 15
338:          CALL MEM(1,II,IBUF(IL))
339: 520      CONTINUE
340: C
341: C   Prompt for velocity calibration?
342: C
343:          CALL SRN(3,4)
344:          WRITE(3,1700)
345:          CALL SRN(2,1)
346:          CALL KBD(3,IRSP)
347:          GO TO(1000,550,1000),IRSP
348: C
349: C   beginning of velocity calibration
350: C
351: C   set system delay from header (20 = low byte,21 = high byte)
352: C
353: 550      CALL CHRSCH(HEADER(1,IGP1+6),LEN)
354:          CALL DCDEF(HEADER(1,IGP1+6),SDELAY,LEN)
355: C
356: C   to convert system delay into counts per resolution
357: C
358: C   IDLY (bits) = SDELAY(us) * .2(in/us) /RANGE (mils/in)
359: C
360: C        system delay * velocity / adj. resolution
361: C
362:          IDLY = SDELAY * 200/RANGE + .5001
363:          IDLYH = IDLY / 256
364:          IDLYL = IDLY - (IDLYH * 256)
```

```
365: C
366: C
367:              CALL MEM(1,Z'20',IDLYL)
368:              CALL MEM(1,Z'21',IDLYH)
369: C
370:              CALL RDITEK
371:              CALL MEM(2,Z'17',IRSW1)
372:              DO 552 IL = 1,16
373:              II = IL + 15
374:              CALL MEM(1,II,IBUF(IL))
375: 552         CONTINUE
376: C
377: C   SET UP RESOLUTION FOR INTERNAL FOR THE VELOCITY CAL.
378: C
379:              CALL MEM(1,Z'17',IRSW)
380: C
381: C   set velocity constant internal to 2.0 x 10**5 in/sec
382: C   which is a value of 256
383: C   19 = low byte, 1A = high byte
384: C
385:              CALL MEM(1,Z'19',0)
386:              CALL MEM(1,Z'1A',Z'F1')
387: C
388: C   PROMPT THE OPERATOR TO CHANGE THE RESOLUTION AND
389: C   IF THE GATE DELAY & WIDTH HAS A DECADE CHANGE.
390: C
391:              CALL SRN(1,0)
392:              CALL TIMDIS(LABEL2)
393:              CALL SRN(3,4)
394: C
395:              IF(RANGE.GE.50 .AND. RESI.LE. 0.01) GO TO 560
396: C
397:              IF(IRSW .EQ. IRSW1) GO TO 570
398:              WRITE(3,1100) RESI
399:              GO TO 565
400: 560         IF(IRSW .NE. IRSW1) WRITE(3,1100) RESI
401:              CALL SRN(2,1)
402:              WRITE(3,1150)
403: C
404: C   GET GATE VALUES OUT OF MEMORY
405: C
406:              CALL MEM(2,Z'14',IGDLY)
407:              CALL MEM(2,Z'15',IGDW)
408:              CALL MEM(2,Z'16',IGWTH)
409: C
410: C   SORT VALUES OUT
411: C
412:              ID1 = IGDLY .AND. Z'0F'
413:              ID2 = (IGDLY .AND. Z'0F0') / Z'10'
414:              ID3 = (IGDW  .AND. Z'0F0') / Z'10'
415:              IW1 = IGWTH .AND. Z'0F'
416:              IW2 = (IGWTH .AND. Z'0F0') / Z'10'
417:              IW3 = IGDW  .AND. Z'0F'
418: C
419: C   SHIFT UP ONE DECADE
420: C
421:              ID2 = ID1
422:              ID1 = ID3
423:              IW2 = IW1
424:              IW1 = IW3
425: C
426: C   RESTORE NEW VALUES
427: C
428:              IGDLY = ID2 * Z'10' + ID1
429:              IGWTH = IW2 * Z'10' + IW1
430: C
431: C   LOAD VALUES INTO MEMORY
432: C
433:              CALL MEM(1,Z'14',IGDLY)
434:              CALL MEM(1,Z'15',Z'99')
435:              CALL MEM(1,Z'16',IGWTH)
436: C
437: C   WAIT FOR CR
438: C
439: 565         CALL SRN(2,1)
440:              CALL KBD(1,IRSP)
```

```
441: C
442: C
443: C   Load the metrotek with the value
444: C
445: 570      CALL LDMTEK
446: C
447: C   look for bad load
448: C
449:          CALL MEM(1,Z'0D',IFLAG)
450:          IF((IFLAG.AND.Z'20') .NE. 0) GO TO 1000
451: C
452: C   pulse system
453: C
454: 580      CALL SRN(1,0)
455:          CALL TIMDIS(LABEL2)
456:          CALL PULSE(1)
457:          CALL SRN(1,0)
458:          CALL TIMDIS(LABEL2)
459:          CALL SRN(3,4)
460:          CALL READTK(ITHK,IAMP,IERRT)
461: C
462: C   check for errors
463: C
464:          IF(IERRT.EQ.0) GO TO 600
465: C
466: C   error
467:          WRITE(3,1400)
468:          CALL SRN(2,1)
469:          CALL KBD(3,IRSP)
470:          GO TO(1000,580,1000),IRSP
471: C
472: C   calculate the measured vc and display it
473: C   velocity constant measured = internal vc * calblock thk/ITHK * resol
474: C
475: C   vc measured = set vc(.21u/us) * cal blk.(1u) / ITHK(bits)*(RESI 1u/bit)
476: C
477: C
478: 600      THICKM = ITHK * RESI
479: C
480: C   calculate velocity measured
481: C
482:          VCM = 2.0 * CALBLK / THICKM
483:          IVCM = VCM * 128 + .5001
484:          VCM = IVCM / 128.0
485: C
486:          WRITE(3,2000) ITHK,THICKM,IVCM
487: C
488: C   reload velocity constant measured and read thickness and compare
489: C
490:          ITRY = 1
491: 710      IA = IVCM / 256
492:          IVCL = IVCM - (IA * 256)
493:          IVCH = Z'F0' + IA
494: C
495: C   load velocity contant in memory
496: C
497:          CALL MEM(1,Z'19',IVCL)
498:          CALL MEM(1,Z'1A',IVCH)
499: C
500: C   to convert system delay into counts per resolution
501: C
502: C   IDLY (bits) = SDELAY(us) * IVCM(int bits) /(RESI *128*10)
503: C
504: C                                     material
505: C              system delay * velocity / adjusted resolution
506: C
507:          IDLY = (SDELAY * IVCM /(RESI * 1280)) + .5001
508:          IDLYH = IDLY / 256
509:          IDLYL = IDLY - (IDLYH * 256)
510: C
511:          CALL MEM(1,Z'20',IDLYL)
512:          CALL MEM(1,Z'21',IDLYH)
513: C
514: C
515: C   load metrotek with values
516: C
```

```
517:          CALL LDTTHK
518: C
519: 720      CALL READTK(ITHK,IAMP,IERRT)
520: C
521: C check for errors
522: C
523:          IF(IERRT.EQ.0) GO TO 750
524: C
525: C error
526:          WRITE(3,1400)
527:          CALL SRN(2,1)
528:          CALL KBD(3,IRSP)
529:          GO TO(1000,725,1000),IRSP
530: 725      CALL SRN(1,0)
531:          CALL TIMDIS(LABEL2)
532:          CALL SRN(3,4)
533:          GO TO 720
534: C
535: C
536: 750      THICKM = ITHK * RES1
537: C
538: C        WRITE(3,2300) ITHK,THICKM,IVCM
539: C
540:          IF(ITRY .GT. 2) GO TO 800
541: C
542:          IF(THICKM .EQ. CALBLK) GO TO 800
543:          IF(THICKM .LT. CALBLK) IVCM = IVCM + 1
544:          IF(THICKM .GT. CALBLK) IVCM = IVCM - 1
545:          ITRY = ITRY + 1
546:          GO TO 710
547: C
548: 800      VCM = IVCM / 128.0
549:          WRITE(3,1200) VCM,VCM,THICKM,CALBLK
550:          CALL SRN(2,1)
551:          CALL KBD(2,IRSP)
552: C
553: C set thickness flag on
554: C load velocity contant in the header adj. #
555: C
556:          CALTYP = CALTYP .OR. Z'10'
557: C
558: C LOAD BLANKS INTO VELOCITY CONSTANTS ADJ. & INTERNAL
559: C AND ATTENUATIONS THE ENCODE NEW VALUES INTO THEM.
560: C
561:          DO 820 IL=1,15
562:          HEADER(IL,ICP2+6) = 32
563:          HEADER(IL,ICP2+7) = 32
564:          HEADER(IL,ICP2+13) = 32
565:          HEADER(IL,ICP3+12) = 32
566: 820      CONTINUE
567:          CALL NCDEI(HEADER(1,ICP3+12),IVCM)
568:          CALL NCDEF(HEADER(1,ICP2+13),VCM)
569: C
570: C Re-adjust max & min inspection depths with new velocity constant.
571: C Calculate max & min depths.
572: C
573:          DMIN = DELAY * VCM * .05
574:          DMAX = (DELAY + WIDTH) * VCM * .05
575: C
576: C Load Header with new values of min & max.
577: C
578:          CALL NCDEF(HEADER(1,ICP2+6),DMIN)
579:          CALL NCDEF(HEADER(1,ICP2+7),DMAX)
580: C
581: C
582: C Check if over range on the resolution.
583: C
584:          IF(DMAX .LE. (RANGE * 255)) GO TO 950
585: C
586: C if greater or equal to display warning
587: C
588:          CALL MESRNG(4,DMAX)
589:          CALL SRN(2,1)
590:          CALL KBD(2,IRSP)
591: C
592: 950      CALL MEM(1,Z'0E',0)
```

```
593:   C
594:          DO 970 IL=1,8
595:          II = IL + 15
596:          CALL MEM(1,II,IBUF(IL))
597:   970    CONTINUE
598:   C
599:   C RETURN TO CALLING ROUTINE
600:   C
602:   C
603:   C  FORMAT STATEMENTS FOR CALIBRATION
604:   C
605:   1100   FORMAT(5X,'Change resolution to ',F4.3,' inches.')
606:   1150   FORMAT(5X,'Change gate delay & width switches,',
607:      $       '(does not use 10X scaling)',/,
608:      $       5X,'      for new resolution.')
609:   1200   FORMAT(25X,'MEASURED      HEADER',//,
610:      $       3X,'VELOCITY CONSTANT',6X,F7.3,2X,F7.3,7X,'10 ** 5 in/sec',/,
611:      $       3X,'CALIBRATION BLOCK',6X,F7.3,2X,F7.3,7X,'inches')
612:   C
613:   1300   FORMAT('+    Do delay measurement ?')
614:   1400   FORMAT(8X,'ERROR IN THICKNESS MEASUREMENT - ',
615:      $       'To try again Enter [Y]')
616:   1500   FORMAT(5X,'Move gate DELAY & WIDTH to read 2nd echo.',
617:      $       //,5X,21HEnter 'CR' when ready)
618:   1600   FORMAT(18X,'SYSTEM MEASURED DELAY = ',F7.3,' us')
619:   1700   FORMAT('+    Do velocity calibration ?')
620:   2000   FORMAT(26X,'TIME1 = ',F8.3,' us')
621:   2100   FORMAT(26X,'TIME1 = ',F8.3,' us',/
622:      $       26X,'TIME2 = ',F8.3,' us')
623:   2200   FORMAT(5X,'** ERROR ** DELAY MEASUREMENT PRODUCT IS NEGATIVE!')
624:   C2300  FORMAT(10X,'ITHK = ',I5,'   THICKM = ',F7.3,'   IVCM = ',I5)
625:   C
626:          END
627:
 1:            SUBROUTINE TIMDIS(LABEL)
 2:    C
 3:            LOGICAL LABEL(15),TIMDPY(15)
 4:            LOGICAL HEADER(15,48)
 5:            COMMON /CHDRS/HEADER,NGRP(4),IGRP(4)
 6:    C
 7:    C DISPLAY LABEL STARTING IN COL. 4 AND THE TIME IN 50.
 8:    C ALL IN ROW 1
 9:    C
10:    C
11:    C GET CLOCK TIME
12:    C
13:            CALL TIMGET(TIMDPY)
14:    C
15:    C DISPLAY THE LABEL & TIME
16:    C
17:            WRITE(3,2000) (TIMDPY(II),II=1,15),(LABEL(II),II=1,15),
18:       $           (HEADER(II,1),II=1,15),(HEADER(II,2),II=1,15),
19:       $           (HEADER(II,3),II=1,15),(HEADER(II,10),II=1,15)
20:    C
21:            RETURN
22:    C
23:    2000   FORMAT(1H+,4X,15A1,31X,15A1,/,5X,4(1X,15A1))
24:            END
```

```
 1:  ; Routine to link FORTRAN with 'OB030'
 2:  ;
 3:          ENTRY    CREM,TEXTMD,INITM,MPULSE,PRESCN
 4:          ENTRY    READTK,HOLCAL,INITCF,LIMTEK
 5:          ENTRY    TESTSW,SYSIN,SYSIND,DISPAR,AREA2
 6:          ENTRY    RDMTEK,SCNCAL,RESCAN
 7:  ;
 8:  AADR    EQU      0B030H   ;ADDRESS OF JUMP TABLE IN BPAGE
 9:  ;
10:  CREM:   JMP      AADR
11:  TEXTMD: JMP      AADR+03H
12:  INITM:  JMP      AADR+06H
13:  MPULSE: JMP      AADR+09H
14:  PRESCN: JMP      AADR+0CH
15:  READTK: JMP      AADR+0FH
16:  HOLCAL: JMP      AADR+12H
17:  INITCF: JMP      AADR+15H
18:  LIMTEK: JMP      AADR+18H
19:  TESTSW: JMP      AADR+1BH
20:  SYSIN:  JMP      AADR+1EH
21:  SYSIND: JMP      AADR+21H
22:  DISPAR: JMP      AADR+24H
23:  AREA2:  JMP      AADR+27H
24:  RDMTEK: JMP      AADR+2AH
25:  SCNCAL: JMP      AADR+2DH
26:  RESCAN: JMP      AADR+30H
27:          END
```

What is claimed is:

1. A method for video contrast imaging a workpiece in real time with ultrasonic scanning means positioned in proximity to the workpiece and carrying transducer means which are adapted to scan an area of the workpiece with ultrasonic pulses and which are adapted to detect ultrasonic echoes caused by said pulses, said scanning means adapted to convert said echoes into values of image data, said imaging method comprising:

(a) storing an image data value for a grid position, taken in real time from a scanning movement of said scanning means, in a scan data memory cell;

(b) comparing the stored image data value with a programmable range of contrast values ordered such that different values of the stored image data correspond to different contrast values;

(c) selecting the contrast value corresponding to a stored value of image data;

(d) storing that contrast value in real time in a video memory;

(e) storing a pixel position in said video memory corresponding to said element position;

(f) displaying the stored contrast values on a video display at the pixel locations stored in said video memory; and repeating steps a-f for every grid position scanned by said scanning means during a scan movement.

2. A video contrast imaging method as set forth in claim 1 wherein:

said range of contrast image values corresponds to a plurality of hue values for said video display.

3. A video contrast imaging method as set forth in claim 1 wherein:
said range of contrast image values corresponds to a plurality of intensity values for said display.

4. A video contrast imaging method as set forth in claim 1 wherein the step of storing an image data value includes:
storing values indicative of the time duration between a pulse and an echo.

5. A method for video contrast imaging a workpiece as set forth in claim 4 wherein the step of storing an image data value includes the step of:
storing image data values indicative of the amplitude of the echo.

6. A method for video contrast imaging a workpiece as set forth in claim 5 which further includes:
selecting whether to display in real time said image data values indicative of the time duration between a pulse and echo or said image data values indicative of the amplitude of the echo.

7. A video contrast imaging method as set forth in claim 1 wherein the step of storing an image data value includes the step of:
storing image data values indicative of the amplitude of the echo.

8. A method for video contrast imaging a workpiece as set forth in claim 1 wherein there are a predetermined number of grid positions, each corresponding to an actual area on the workpiece, and which further includes the step of:
adjusting the actual area of the workpiece which each grid position represents.

9. A method for video contrast imaging a workpiece as set forth in claim 1 which further includes the step of:
displaying said stored image data values in an analysis mode subsequently to said step of displaying said image data values in real time.

10. A method for video contrast imaging a workpiece as set forth in claim 9 which further includes the step of:
comparing the stored image data values with a programmable range of contrast values ordered such that different values of the stored image data correspond to different contrast values; and
displaying said selected contrast values corresponding to said image data values.

11. A method for video contrast imaging a workpiece as set forth in claim 10 which further includes the step of:
switching between displaying said image data values in real time and displaying said image data values in said analysis mode.

* * * * *

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-indentified patent and that said Letters Patent is hereby corrected as shown below:

The title page should be deleted to appear as shown on the attached page.

The sheets of drawings consisting of Figs. 1-20, should be added as shown on the attached pages.

United States Patent [19]

P'an et al.

[11] Patent Number: 4,836,026
[45] Date of Patent: Jun. 6, 1989

[54] ULTRASONIC IMAGING SYSTEM

[75] Inventors: Charles T. P'an, Mystic; Dean E. Christie, Ledyard; Robert H. Grills, New London, all of Conn.

[73] Assignee: Science Applications International Corporation, LaJolla, Calif.

[21] Appl. No.: 616,351

[22] Filed: Jun. 1, 1984

[51] Int. Cl.⁴ ............................................. G01N 29/00
[52] U.S. Cl. ........................................ 73/620; 73/606; 73/609; 73/618
[58] Field of Search ................. 73/606, 607, 609, 618, 73/620

[56] References Cited

U.S. PATENT DOCUMENTS

| | | | |
|---|---|---|---|
| 4,106,346 | 8/1978 | Matzerk | 73/620 |
| 4,226,122 | 10/1980 | Land et al. | 73/609 |
| 4,325,256 | 4/1982 | Horn | 73/607 |
| 4,333,346 | 6/1982 | Renzel | 73/606 |
| 4,359,904 | 11/1982 | Engle et al. | 73/620 |
| 4,381,787 | 5/1983 | Hottinger | 73/620 |
| 4,417,475 | 11/1983 | Okazaki | 73/606 |
| 4,596,145 | 6/1986 | Smith et al. | 73/607 |

FOREIGN PATENT DOCUMENTS 2036322  6/1980  United Kingdom ................. 73/606

Primary Examiner—Howard A. Birmiel
Attorney, Agent, or Firm—Fitch, Even, Tabin & Flannery

[57] ABSTRACT

An ultrasonic imaging system which is used to provide contact imaging of a component. A transducer is scanned across a workpiece to collect image data from a scan area comprising a plurality of pixels. Means for resiliently carrying the transducer with two separate degrees of freedom maintain a tight acoustic coupling between the workpiece surface and the transducer. The image data relating to each position in the scanned area describe the amplitude of a reflection and its depth from a reference. Means are provided for easily varying the size of the image area while the number of pixels remains constant. The system provides a real-time visual display of the scanned area while the transducer is moving over the area in contrast as either a grey scale or a color scale for each pixel. An automatic calibration mode for the sytem is provided as another feature to remove acoustic delay, caused by transducer coupling, from the image data. As an option to the calibration mode, the system provides for the translation of the scan area into a true proportional size for a radial mounting geometry of the workpiece.

11 Claims, 30 Drawing Sheets

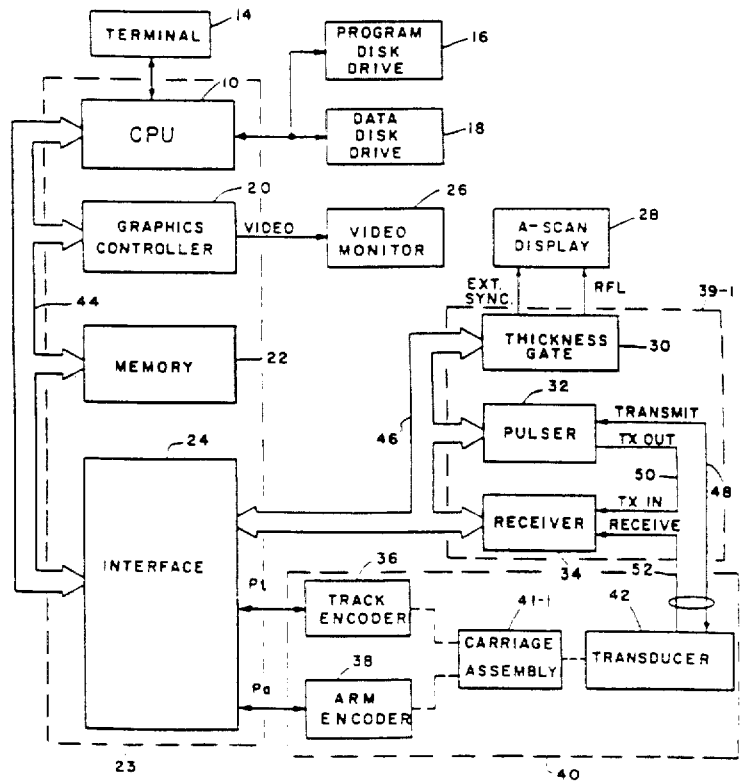

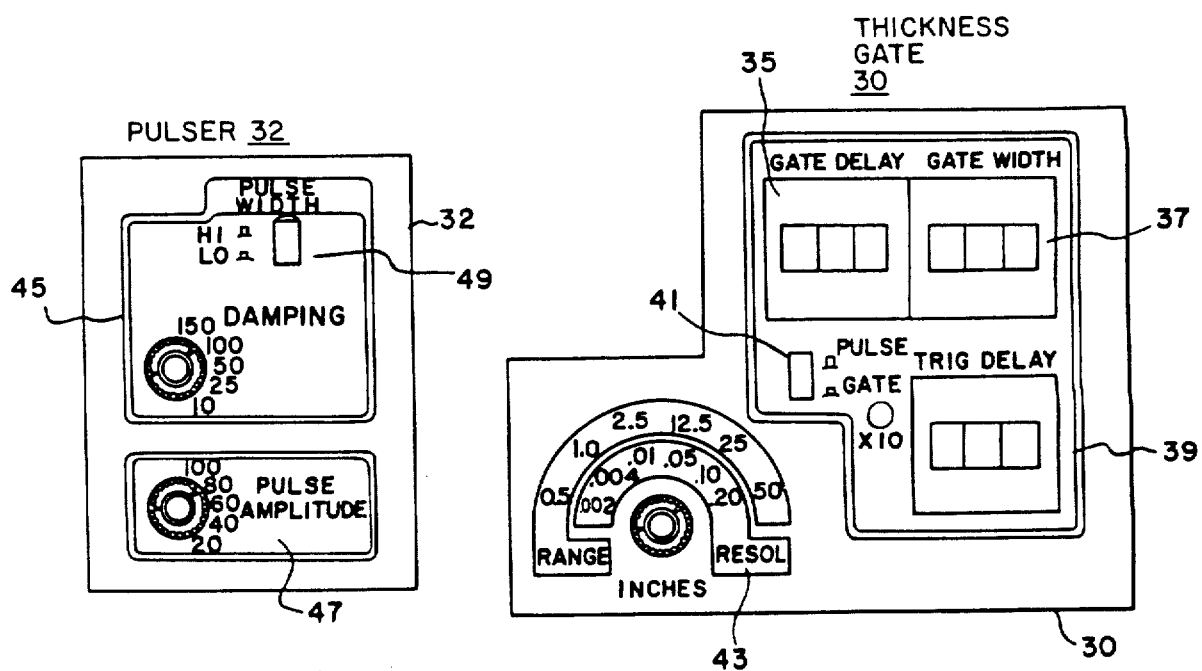
FIG. 1B
FIG. 1A
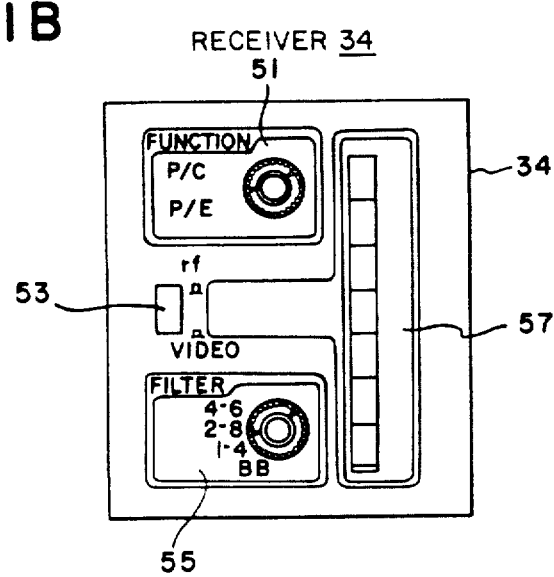
FIG. 1C

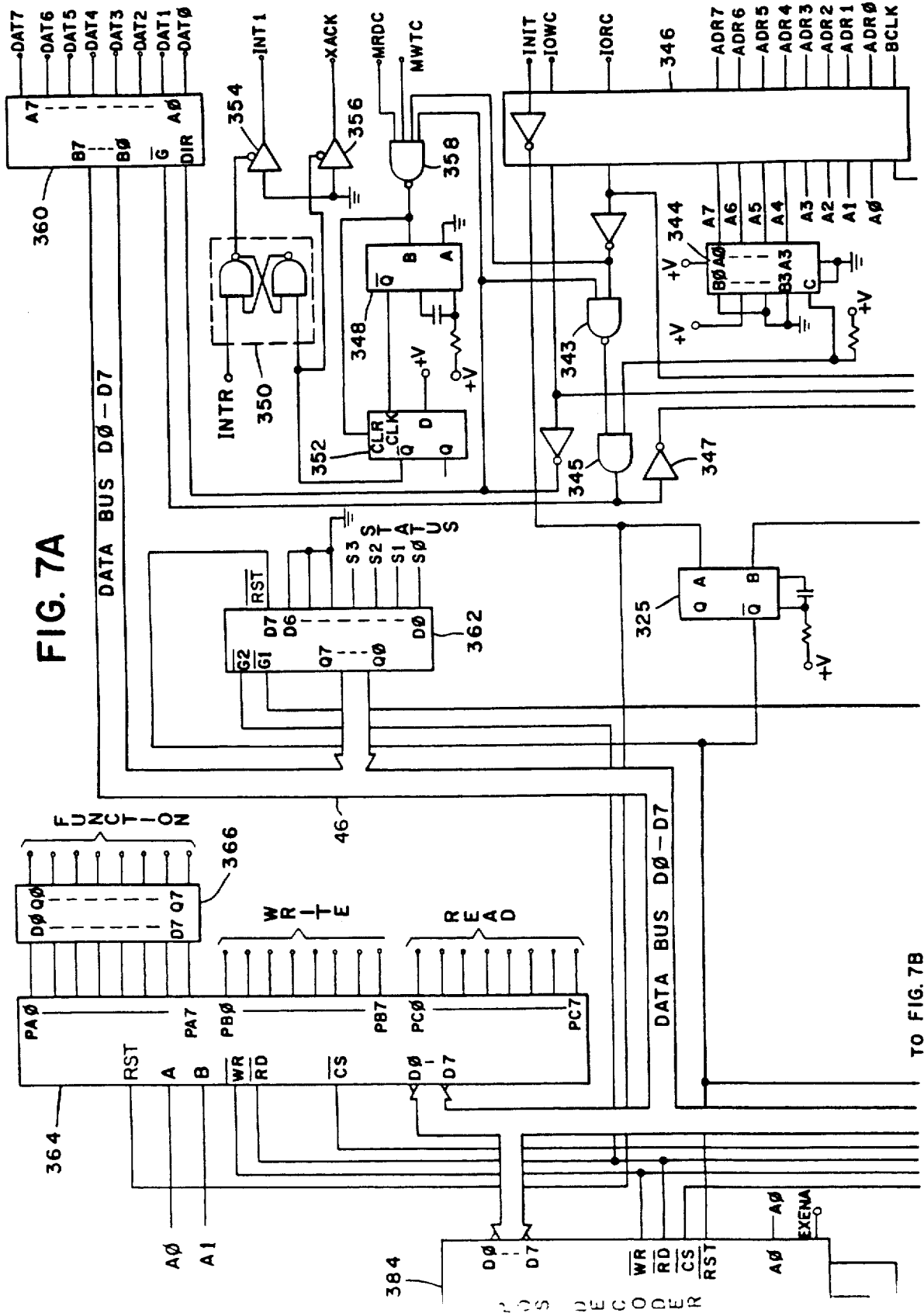

| ADDRESS DECODE | |
|---|---|
| ADDR | FUNCTION |
| 40 | CLOCK ADDR LATCH |
| 41 | SOFTWARE RESET |
| 42 | CLOCK DATA |
| 43 | STROBE PORT |
| 44 | X DATA |
| 45 | X STATUS |
| 46 | Y DATA |
| 47 | Y STATUS |
| 48 | ADDRESS PORT |
| 49 | WRITE PORT |
| 4A | READ PORT |
| 4B | MODE CONTROL |
| 4C | |
| 4D | STATUS INPUT |
| 4E | |
| 4F | INT 1 RESET |

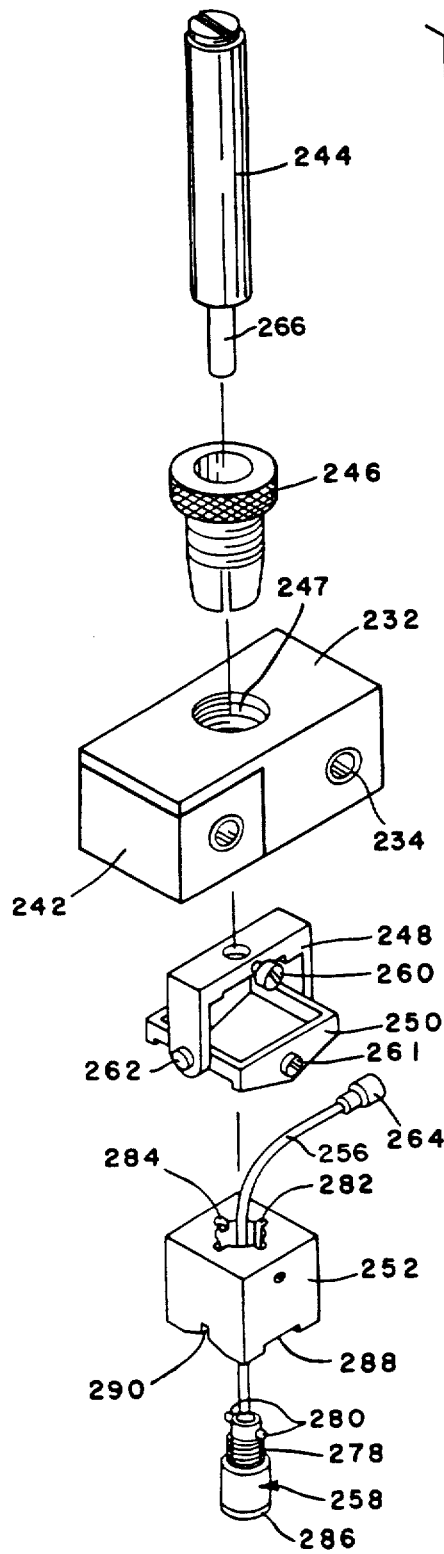
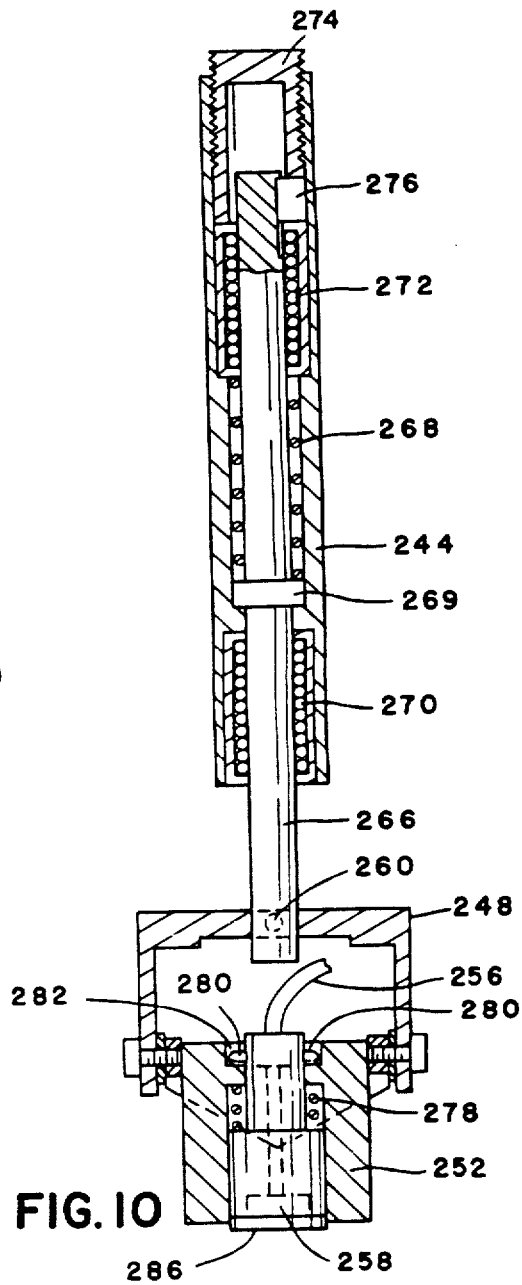
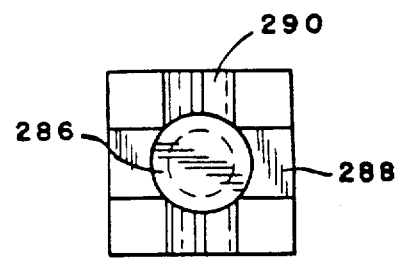
FIG. 9
FIG. 10
FIG. 11

| GROUP A — ADMINISTRATIVE DATA | | |
|---|---|---|
| 1. PROJECT | = | DEMONSTRATE |
| 2. TASK | = | OPERATION |
| 3. SCAN | = | 1 |
| 4. INSPECTOR | = | |
| 5. PREV. SCAN REF. | = | 1 |
| 6. TRANSDUCER | = | 5 MHZ/0.25 IN |
| 7. CAL. BLOCK | = | 10 STEP STEEL |
| 8. CREATED TIME | = | |
| 9. ACCESSED TIME | = | |
| 10. SCAN TIME | = | |
| 11. SYSTEM UNITS | = | ENGLISH |
| 12. SYSTEM VERSION | = | |

| GROUP B — SCANNER SET UP | | |
|---|---|---|
| 1. GRID SPACING | = | 20 |
| 2. TRK SCALE FACTR | = | 45 |
| 3. ARM SCALE FACTR | = | 67 |
| 4. SCANNING AXIS | = | X |
| 5. XDUCER ANGLE | = | 0 |
| 6. DELAY TIME | = | 0 |
| 7. SCANNER ORIENT | = | N |
| 8. TRACK RATIO | = | |
| 9. ARM RATIO | = | |

| GROUP C — CALIBRATION DATA | | |
|---|---|---|
| 1. MATERIAL | = | STEEL |
| 2. VEL. CONSTANT | = | 2.3 |
| 3. THRESHOLD % | = | 40 |
| 4. NOM. THICKNESS | = | 1.0 |
| 5. CAL. BLOCK THICK | = | 0.5 |
| 6. MIN. INSP. DEPTH | = | 0.1 |
| 7. MAX. INSP. DEPTH | = | 1.0 |
| 8. HOLE MIN. DEPTH | = | 0.1 |
| 9. HOLE MAX. DEPTH | = | 0.9 |
| 10. MIN. PIXEL COUNT | = | 10 |
| 11. MAX. PIXEL COUNT | = | 100 |
| 12. PIXEL COUNT | = | |
| 13. VEL. CONST. ADJ. | = | |
| 14. ATTEN ADJ. | = | |
| 15. CAL TYPE | = | |

| GROUP D — ULTRASONIC EQUIPMENT SETTINGS | | |
|---|---|---|
| 1. PULSE AMPLITUDE | = | 60 |
| 2. PULSE DAMPING | = | 50 |
| 3. PULSE WIDTH | = | HI |
| 4. FILTER | = | 4 |
| 5. FUNCTION | = | P/C |
| 6. R.F./VIDEO | = | VID |
| 7. ATTENUATION | = | 16 |
| 8. RESOLUTION | = | 4 |
| 9. GATE DELAY | = | .9 |
| 10. GATE WIDTH | = | 7.8 |
| 11. PUSE RATE | = | 2 |
| 12. INTERNAL VC | = | |

FIG. 13A

CAL TYPE

| 7 | 6 | 5 | 4 | 3 | 2 | 1 | 0 |
|---|---|---|---|---|---|---|---|
| | | | | | | | |

0 — CALIBRATION COMPLETE
1 — HEADER CALIBRATION
2 — FRONT PANEL CALIBRATION
3 — DELAY CALIBRATION
4 — VELOCITY CALIBRATION
5 — HOLE CALIBRATION

FIG. 13B $D2 = D1 \, R_2/R_1$

RT1 = DTH + CALBLK
RT2 = DTH + 2(CALBLK)
DTH = R(2T1 − T2)
DT = $\dfrac{R(2T1 - T2)}{VC}$

DT = (2T1 − T2) × 10⁻⁵

VCM = $\dfrac{2.0 \text{ CALBLK}}{ITHK \cdot RESI}$

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-identified patent and that said Letters Patent is hereby corrected as shown below:

Column 1, line 36, change "to" (second occurrence) to --for--.

Column 2, line 45, change "or" to --of--;

line 50, change "this" to --the--.

Column 3, line 38, change "mutual" to --manual--;

line 58, change "has" to --have--.

Column 4, line 30, change "where" to --which compensates for--;

line 32, delete "is compensated for".

Column 5, line 11, change "of" (first occurrence) to --for--;

line 45, change "datected" to --detected--.

Column 7, line 36, change "FIG. 7" to --FIGS. 7A and 7B--;

line 39, change "FIG. 7" to --FIGS. 7A and 7B--.

Column 8, line 16, change "16" to --16-1 and 16-2--;

line 21, change "THIKLCL" to --THIKCL--;

line 26, change "18" to --18-1, 18-2, 18-3, 18-4, and 18-5--;

UNITED STATES PATENT AND TRADEMARK OFFICE
CERTIFICATE OF CORRECTION

PATENT NO. : 4,836,026
DATED : June 6, 1989
INVENTOR(S) : P'an et al.

It is certified that error appears in the above-identified patent and that said Letters Patent is hereby corrected as shown below:

Column 8, line 48, change "herein" to --therein--.
Column 9, line 5, change "gree" to --green--;
line 8, change "real time" to --real-time--.
Column 11, line 68, change "outputbuffer" to --output buffer--.
Column 12, line 43, change "from", second occurrence, to --form--;
line 60, change "64 k" to --64k--.
Column 13, line 2, change "disc" to --disk--;
line 3, change "disc" to --disk--;
line 8, change "bidirecional" to --bidirectional--.
Column 15, line 10, change "flip flop" to --flip-flop--;
line 48, change "X" to --$\hat{X}$--;
line 49, change "Y" to --$\hat{Y}$--.
Column 16, line 54, change "X, X" to --X, $\hat{X}$--.

UNITED STATES PATENT AND TRADEMARK OFFICE
CERTIFICATE OF CORRECTION

PATENT NO. : 4,836,026
DATED : June 6, 1989
INVENTOR(S) : P'an et al.

It is certified that error appears in the above-identified patent and that said Letters Patent is hereby corrected as shown below:

Column 17, line 47, change "flang" to --flange--;
   line 66, change "16" to --36--.
Column 18, line 3, change "X, X" to --X, $\hat{X}$--;
   line 28, change "body" to --box--;
   line 29, change "cain" to --chain--.
Column 19, line 27, change "and" to --are--;
   line 62, after "bias" delete the "k".
Column 20, line 14, change "radical" to --radial--.
Column 21, line 6, change "positive" to --position--;
   line 58, change "constat" to --constant--.
Column 22, line 50, change "illuminae" to --illuminate--;
   line 66, change "dislay" to --display--.
Column 23, line 2, change "locatin" to --location--;
   line 20, change "thesholds" to --thresholds--;

UNITED STATES PATENT AND TRADEMARK OFFICE
CERTIFICATE OF CORRECTION

PATENT NO. : 4,836,026
DATED : June 6, 1989
INVENTOR(S) : P'an et al.

It is certified that error appears in the above-identified patent and that said Letters Patent is hereby corrected as shown below:

line 32, change "real tim" to --real time--;
                line 58, change "bits" to --bit--.
    Column 24, line 17, change "radical" to --radial--;
                line 32, change "208" to --A208--;
                line 35, change "firs" to --first--;
                line 40, change "CLATYP" to --CALTYP--;
                line 62, change "FIG." to --FIGS.--.
    Column 25, line 3, change "syste" to --system--;
                line 10, change "anothermode" to --another mode--;
                line 19, change "kto" to --to--;
                line 22, change "eqyal" to --equal--;
                line 38, change "CDHDR" to --CDEHDR--.
    Column 26, line 50, change "A361(" to --A361,--;
                line 63, after "to" delete "the".
    Column 27, line 14, change "seal" to --scale--;
                line 33, after "of" delete "the";
                line 42, change "valve" to --value--

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-identified patent and that said Letters Patent is hereby corrected as shown below:

```
Column 28, line  8, change "397" to --A397--;
          line 26, change "softward" to --software--;
          line 36, change "TIMIDIS" to --TIMDIS--
          line 66, change "scann" to --scan--.
Column 29, line 10, change "SET UP" to --SETUP--;
          line 13, change "stop" to --step--;
          line 34, change "real time" to --real time--.
Column 30, line 25, change "return" to --returned--;
          line 43, change "if" to --of--.
Column 31, line  4, change "are" to --area--;
          line  5, change "on the" to --can be--;
          line  6, change "x" to --X--;
          line  7, change "y" to --Y--;
          line  8, change "x" to --X--;
          line  9, change "y" to --Y--;
          line 27, after "for" insert --a--;
```

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-identified patent and that said Letters Patent is hereby corrected as shown below:

line 30, change "RADIAL (1) to --RADIAL(1)--;

line 54, change "programd" to --program--;

line 59, change "sued" to --used--;

line 60, change "larges" to --largest--.

Column 32, line 5, change "cailbration" to --calibration--;

line 17, change "RADIAL (1-4)" to --RADIAL(1-4)--;

line 33, change "informating" to --informing--;

line 36, change "operator" to --operation--;

line 47, change "2'33 4'" to --2" X 4"--.

Column 33, line 2, change "x" to --X--;

line 4, change "transduceer" to --transducer-- ;

line 5, change "x" to --X--;

line 6, change "y" to --Y--;

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-identified patent and that said Letters Patent is hereby corrected as shown below:

line 8, change "x" to --X--;

line 11, change "x" to --X--;

line 20, change "bore" to --before--;

line 25, change "aradial" to --a radial--;

line 64, change "ultransonic" to --ultrasonic--.

Column 34, line 8, change "th" to --the--;

line 11, change "ultrasonis" to --ultrasonic--;

line 13, change "subroutne" to --subroutine--;

line 50, change "WIDTh)" to --WIDTH)--;

line 65, change "seeting" to --setting--;

Column 35, line 2, change "if" to --If--;

line 23, change "acces" to --access--;

line 24, change "582" to --A582--;

UNITED STATES PATENT AND TRADEMARK OFFICE
CERTIFICATE OF CORRECTION

PATENT NO. : 4,836,026                             Page 40 of 43
DATED     : June 6, 1989
INVENTOR(S) : P'an et al.

It is certified that error appears in the above-identified patent and that said Letters Patent is hereby corrected as shown below:

line 30, change "determined" to --determine--;
                line 38, change "request" to --requests--;
                line 48, change "routeine" to --routine--;
                line 57, change "perimeter" to --parameter--;
                line 61, change "perimeter" to --parameter--.
Column 36, line 58, change "change" to --chance--.
Column 37, line 5, after "it" insert --is--.
Column 38, line 44, after "his" insert --input--.
Column 39, line 26, change "634" to --B634--;
                line 27, change "632" to --B632--;
                line 52, change "$T_1$" to --T1--;
                line 55, change "A-scan" to --A-Scan--;
                line 62, after "in" delete "the".
Column 40, line 13, change "DTH = R(2T1 = T2)" to --DTH = R(2T1-T2)--;

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-identified patent and that said Letters Patent is hereby corrected as shown below:

Column 40, line 15, change "preparation" to --propagation--;

line 41, change "unitl" to --until--.

Column 41, line 24, change "programs" to --program--;

line 40, change "programs" to --program--.

Column 42, line 32, change "the" to --this--.

Column 83, line 10, change the line to read: --121: IF (II.EQ.1) WRITE (3,4210)--

Column 89, line 22, between the lines numbered "120" and "122" insert --121: C--.

Column 95, line 20, change the line to read: --61: IF (IB .EQ. 29) IJ = 4--.

Column 101, line 66, change the line to read: --61: C NUMBER IS #.#--.

Column 103, line 50, change the line to read --121: C ERROR ROUTINE--.

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-identified patent and that said Letters Patent is hereby corrected as shown below:

Column 105, line 56, between the lines numbered "60" and "62" insert --61:     60           CALL SRN(1,0)--.

Column 109, line 64, between the lines numbered "82" and "2" insert --1:          SUBROUTINE MEM(IJMP,IADR,IDAT)--.

Column 121, line 52, between the lines numbered "360" and "362" insert --361:          DO 20 II=1,38--.

Column 125, line 69, between the lines numbered "60" and "2" insert --1:          SUBROUTINE READI--.

Column 133, line 40, between the lines numbered "300" and "302" insert --301: 400           VL = VIEW(1)--.

Column 145, line 4, between the lines numbered "180" and "182" insert --181:          CALL INPINV--.

Column 167, line 9, between the lines numbered "600" and "602" insert --601: 1000          RETURN--.

Column 171, line 7, after "storing" insert --image data--.

UNITED STATES PATENT AND TRADEMARK OFFICE
CERTIFICATE OF CORRECTION

PATENT NO. : 4,836,026

DATED : June 6, 1989

INVENTOR(S) : P'an et al.

It is certified that error appears in the above-identified patent and that said Letters Patent is hereby corrected as shown below:

Column 172, line 9, change "subsequently" to --subsequent--.

Signed and Sealed this

Twenty-eighth Day of September, 1993

*Attest:*

*Attesting Officer*

BRUCE LEHMAN

*Commissioner of Patents and Trademarks*